Oct. 31, 1961 G. S. VERNAM ET AL 3,006,986

TELEGRAPH SWITCHING SYSTEM

Filed Feb. 5, 1959 84 Sheets-Sheet 1

Oct. 31, 1961 G. S. VERNAM ET AL 3,006,986

TELEGRAPH SWITCHING SYSTEM

Filed Feb. 5, 1959 84 Sheets-Sheet 2

INVENTORS
G. S. VERNAM
M. D. ADAMS
E. J. CHOJNOWSKI
W. B. BLANTON
H. A. JANSSON

BY

ATTORNEY M. R. Marsh

FIG. 1B

| | | | | | | | | |
|---|---|---|---|---|---|---|---|---|
| | | | | | | | FIG. 3 | |
| | | | FIG. 28 | FIG. 23 | | | 4 | FIG. 1 |
| FIG. 49 | FIG. 43 | FIG. 40 | 29 | 24 | FIG 17 | FIG. 11 | 5 | 2 |
| 50 | 44 | 41 | 30 | 25 | 18 | 12 | 6 | |
| 51 | 45 | 42 | 31 | 26 | 19 | 13 | 7 | |
| | 46 | 37 | 32 | 27 | 20 | 14 | 8 | |
| | 47 | 38 | 33 | 35 | 21 | 15 | 9 | |
| | 48 | 39 | 34 | 36 | 22 | 16 | 10 | |

FIG. 1C

| |
|---|
| FIG. 52 |
| 53 |

FIG. 1E

| | | |
|---|---|---|
| FIG. 76 | FIG. 77 | FIG. 78 |

FIG. 1F

| | | |
|---|---|---|
| FIG. 79 | FIG. 80 | FIG. 81 |
| | 82 | |

FIG. 1D

| | | | | | | | | | |
|---|---|---|---|---|---|---|---|---|---|
| FIG. 73 | FIG. 70 | FIG. 68 | FIG. 66 | FIG. 64 | FIG. 62 | FIG. 60 | FIG. 58 | FIG. 56 | FIG. 54 |
| 74 | 71 | 69 | 67 | 65 | 63 | 61 | 59 | 57 | 55 |
| 75 | 72 | | | | | | | | |

Oct. 31, 1961 G. S. VERNAM ET AL 3,006,986

TELEGRAPH SWITCHING SYSTEM

Filed Feb. 5, 1959 84 Sheets-Sheet 4

Oct. 31, 1961 G. S. VERNAM ET AL 3,006,986

TELEGRAPH SWITCHING SYSTEM

Filed Feb. 5, 1959 84 Sheets-Sheet 6

Oct. 31, 1961 G. S. VERNAM ET AL 3,006,986

TELEGRAPH SWITCHING SYSTEM

Filed Feb. 5, 1959 84 Sheets-Sheet 9

Oct. 31, 1961 G. S. VERNAM ET AL 3,006,986

TELEGRAPH SWITCHING SYSTEM

Filed Feb. 5, 1959 84 Sheets-Sheet 12

Oct. 31, 1961 G. S. VERNAM ET AL 3,006,986

TELEGRAPH SWITCHING SYSTEM

Filed Feb. 5, 1959 84 Sheets-Sheet 13

Oct. 31, 1961 G. S. VERNAM ET AL 3,006,986

TELEGRAPH SWITCHING SYSTEM

Filed Feb. 5, 1959 84 Sheets-Sheet 15

Oct. 31, 1961 G. S. VERNAM ET AL 3,006,986

TELEGRAPH SWITCHING SYSTEM

Filed Feb. 5, 1959 84 Sheets-Sheet 20

Oct. 31, 1961 G. S. VERNAM ET AL 3,006,986

TELEGRAPH SWITCHING SYSTEM

Filed Feb. 5, 1959 84 Sheets-Sheet 26

Oct. 31, 1961 G. S. VERNAM ET AL 3,006,986

TELEGRAPH SWITCHING SYSTEM

Filed Feb. 5, 1959 84 Sheets-Sheet 29

Oct. 31, 1961 G. S. VERNAM ET AL 3,006,986

TELEGRAPH SWITCHING SYSTEM

Filed Feb. 5, 1959 84 Sheets-Sheet 33

Oct. 31, 1961 G. S. VERNAM ET AL 3,006,986

TELEGRAPH SWITCHING SYSTEM

Filed Feb. 5, 1959 84 Sheets-Sheet 37

Oct. 31, 1961 G. S. VERNAM ET AL 3,006,986

TELEGRAPH SWITCHING SYSTEM

Filed Feb. 5, 1959 84 Sheets-Sheet 40

Oct. 31, 1961 G. S. VERNAM ET AL 3,006,986

TELEGRAPH SWITCHING SYSTEM

Filed Feb. 5, 1959 84 Sheets-Sheet 42

Oct. 31, 1961 G. S. VERNAM ET AL 3,006,986

TELEGRAPH SWITCHING SYSTEM

Filed Feb. 5, 1959 84 Sheets-Sheet 43

Oct. 31, 1961 G. S. VERNAM ET AL 3,006,986

TELEGRAPH SWITCHING SYSTEM

Filed Feb. 5, 1959 84 Sheets-Sheet 45

Oct. 31, 1961 G. S. VERNAM ET AL 3,006,986

TELEGRAPH SWITCHING SYSTEM

Filed Feb. 5, 1959 84 Sheets-Sheet 48

Oct. 31, 1961 G. S. VERNAM ET AL 3,006,986

TELEGRAPH SWITCHING SYSTEM

Filed Feb. 5, 1959 84 Sheets-Sheet 63

Oct. 31, 1961 G. S. VERNAM ET AL 3,006,986

TELEGRAPH SWITCHING SYSTEM

Filed Feb. 5, 1959 84 Sheets-Sheet 66

TELEGRAPH SWITCHING SYSTEM

Filed Feb. 5, 1959 84 Sheets-Sheet 68

Oct. 31, 1961 G. S. VERNAM ET AL 3,006,986

TELEGRAPH SWITCHING SYSTEM

Filed Feb. 5, 1959 84 Sheets-Sheet 73

Oct. 31, 1961 G. S. VERNAM ET AL 3,006,986

TELEGRAPH SWITCHING SYSTEM

Filed Feb. 5, 1959 84 Sheets-Sheet 77

Oct. 31, 1961 G. S. VERNAM ET AL 3,006,986

TELEGRAPH SWITCHING SYSTEM

Filed Feb. 5, 1959 84 Sheets-Sheet 78

Oct. 31, 1961 G. S. VERNAM ET AL 3,006,986

TELEGRAPH SWITCHING SYSTEM

Filed Feb. 5, 1959 84 Sheets-Sheet 80

Oct. 31, 1961 G. S. VERNAM ET AL 3,006,986

TELEGRAPH SWITCHING SYSTEM

Filed Feb. 5, 1959 84 Sheets-Sheet 84

United States Patent Office
3,006,986
Patented Oct. 31, 1961

3,006,986
TELEGRAPH SWITCHING SYSTEM

Gilbert S. Vernam, Hackensack, N.J., and Myron D. Adams, New York, Edward J. Chojnowski, Valley Stream, William B. Blanton, Rockville Center, and Henry A. Jansson, New York, N.Y., assignors to The Western Union Telegraph Company, New York, N.Y., a corporation of New York Filed Feb. 5, 1959, Ser. No. 791,404
25 Claims. (Cl. 178—2)

This invention relates to telegraph systems and particularly to so-called double storage type telegraph switching systems wherein incoming messages received at a switching center or office from an outlying, remote, tributary or other switching office are automatically stored by signal controlled receiving mechanisms in storage mediums such as perforated tapes, and then electrically transmitted cross-office to the desired sending positions where they are again stored in another tape to control a transmitter associated with an outgoing sending circuit.

The present invention has as one of its main objects to provide an improved high speed reperforator switching system of the above type and incorporating therein features particularly adapted to meet the high speed requirements of one or more branches of the Armed Services, and while the system is designed to meet these specific requirements, various features thereof are of course applicable to other reperforator switching systems.

One of the requirements of a system for a branch of the service is that a central office or switching center be capable of being easily and quickly set up and put into operation or moved and that such offices be capable of being easily and quickly enlarged or expanded in a "building block" arrangement to accommodate a greater number of incoming and outgoing circuits.

Another requirement for a system for such use is that different classes of messages switched through a switching center such as those having high priority be handled before those of a routine character.

In a switching center of the present invention each incoming line or circuit is terminated in a self-contained incoming line receiving position and each outgoing line has associated therewith a self-contained outgoing or transmitting line position. The two types of equipment are linked together by cross-office switching circuits over which messages are transmitted, and in the system disclosed the cross-office transmission speed is considerably higher than the line transmission speed and may be of the order of 200 words per minute.

Two incoming line positions are associated together in a single console for purposes of convenience and each pair has a group of push-buttons for directing the associated switching equipment to the desired sending line position and normally a small switching center having but a few lines terminating therein would have the messages switched manually by means of the push-buttons. However, larger switching offices normally would incorporate therein automatic switching equipment whereby the received messages are automatically switched across office to the desired sending position, and a feature of the invention resides in the provision of incoming line positions capable of being individually converted from manual to automatic operation and vice versa by merely operating a single switch.

Each incoming line position has associated therewith control circuits which monitor the incoming line reception to detect start-of-message signals, end-of-message signals, and other special prearranged character groups. Also included in the receiving position is a message waiting indicator to indicate the number of messages on hand waiting to be switched, and it operates to add one count for each complete message received and to subtract one count for each message switched from that position to a sending position.

The cross-office transmission from the line receiving position is effected by a so-called loop gate transmitter which, as more fully described hereinafter, permits certain parts of the message, such as the address and other special parts, to be sensed a plurality of times, the first sensing setting up the desired circuits and the second sensing transmitting the address cross-office for transmission to the next switching center or destination. Another feature of the invention resides in the ability of each receiving position to establish a plurality of cross-office circuits simultaneously. In this way a multiple address message received at a switching center can be simultaneously transmitted cross-office to a plurality of sending positions and transmitted over associated circuits when they become available. In the arrangement disclosed four cross-office line connections are possible for a given message, and if more than four line connections are required, one of these connections is diverted to a special group of sending positions to handle multiple address messages, as more fully set forth hereinafter.

In addition to the above arrangements, each incoming line position has associated therewith at least one sequence number indicator, sometimes referred to as an SNI unit, for automatically checking the sequence numbers of the received messages. The practice is to give each message transmitted over a channel a sequence number and the omission of a sequence number indicates the loss of a message. An arrangement is also provided for employing a plurality of sequence number indicators on a single circuit to check the sequence number continuity from a plurality of stations on a multistation tributary circuit. Also on a trunk circuit when receiving from a station sending high and low precedence traffic under two sequence numbers two SNI units would be employed.

The SNI unit operates in two phases, the first of which is comparing the characters of the incoming channel with a preset character sequence in the unit and the second phase is transmitting to the connected cross-office reperforator, the channel number and other information which it has just checked.

Each incoming line position also includes a number of signal lights and manually operable switches. The lights indicate various phases of the normal operation or abnormal operation of the receiving position, such as for example, a message waiting lamp, a low tape lamp etc. Various timers are also associated with the receiving position to call an attendant when certain functions are not effected within a predetermined time.

Equipment associated with outgoing lines is arranged in consoles with two such sending positions in a console one above the other. Each position has a message numbering machine which functions to automatically number each outgoing message and additional numbering machines may be associated with a single position to permit individual number sequences to each station of a multistation circuit. The reperforators at the sending positions also have so-called "read back" pins which are used to check the accuracy of certain characters transmitted to the reperforator from the cross-office transmitter of the line receiving position. The tapes prepared by the reperforators control a tape transmitter for sending to the outgoing line and each is supplied with the necessary control circuits. In some instances an outgoing channel may be shared by two line sending positions and in such a case one would normally be for the transmission of high precedence messages and the other for low precedence messages. In this arrangement the high precedence position is always given preference in sending to the line.

Each sending line position also has a number of controls and signals for indicating its operation and for varying the same under certain operating conditions as will be more fully set forth hereinafter.

For full automatic operation directors are employed which together with associated translators recognize and react to precedence prosigna which indicate the priority of the accompanying message, routing indicators which indicate the route and the address or addresses of the message as well as the end of routing combinations. The directors are associated with the incoming line positions on a concentrator basis and a smaller number of translators are common to a number of directors. The translators interpret the information recognized by the directors. Each director is also provided with a pin jack board whereby the routing of messages to various outlets may be changed to meet various operating conditions such as when a particular channel is out of service or to send a message to another tributary for special handling when the desired one is closed down.

An additional feature of the present system is the arrangement of circuits whereby a so-called traffic control center may be provided at the larger switching centers where all route control conductors from receiving positions of the incoming line positions are terminated. By use of patching cords at the control center the route conductors may be arranged to permit high and low precedence traffic for any destination to be handled over separate or common cross office routes. Also, high precedence and/or low precedence traffic for any destination can be alternatively routed to a spare position for temporary storage.

The traffic control center also includes a connection indicator board with a neon lamp and push button for each receiving and sending position. The operation of a push button associated with an incoming line position will cause the lamps to glow at all outgoing line positions connected thereto. Similarly, operation of a push button associated with an outgoing line will cause the lamp to glow of the connected incoming line positions.

The traffic control center also includes a closeout indicator board consisting of a group of lamps for each outgoing line position and indicates to the supervisor the current operating status of these positions. These lamps include among others a "line closed" lamp and a "transmitter stopped" lamp.

*Message format*

For fully automatic and semi-automatic operation of a switching center it is necessary to control the switching by certain control characters and/or machine functions which appear at specific places in the message format. In accordance with the system of the present invention the following message parts occur in the following order:

*Part A.*—Start of message signal following the end of the previous message and in the illustrative embodiment the start of message characters are ZCZC.

*Part A1.*—A single character designation, such as X, Y or Z, employed when more than one sequence number series is transmitted over a single channel to indicate the stations of the multistation circuit. This character is used for equipment control purposes.

*Part B.*—Incoming message channel member. The first three characters of this part are originating station and channel identifying letters which are followed by a figures shift, a three-digit number, and terminated by a letters shift.

*Part C.*—A section treated as extraneous information or characters that may be introduced in the message at the point of origin such as at a torn tape relay center. These extraneous characters may also include one or more channel members associated with preceding transmission of the message.

*Part D.*—A character used for equipment control purposes and indicates that the precedence and routing information immediately follows.

*Part E.*—The precedence designation and consists in the embodiment disclosed of any one of six pairs of identical characters such as ZZ for a flash message; YY, an emergency message; OO, operation immediately; PP, priority; RR, routine; and MM, deferred. As hereinafter set forth, the first two precedence designations are preceded by a bell signal which consists of a figures shift, 5 J characters, 5 S characters, and a letters shift.

*Part F.*—Routing indicator. In the embodiment disclosed the routing indicator always has as the first character thereof an R and the next three characters indicate the relay station serving the destination of the message, and the remaining characters if any indicate a tributary station. Each routing indicator appearing in the routing line is preceded by a space character.

*Part G.*—A part of the message used for equipment control purposes and indicate the end of a routing line.

*Part H.*—Indicates the origin of the message including the switching center associated with the tributary at which the message may have originated.

*Part I.*—The text of the message itself.

*Part J.*—A series of line feeds to permit separation of the message blanks on the final recording printer.

*Part K.*—The end-of-message signal (EOM) consisting of at least four N characters.

*Part L.*—The message termination and may consist of characters such as blanks injected by the receiving reperforator for tape feedout purposes. These are extraneous characters and will not be forwarded in subsequent transmission.

*General operation—Automatic switching*

A brief summary will now be given of the operation of certain parts of the equipment in connection with the automatic switching of a message through a relay station. As a message is received the printer-perforator associated with the incoming circuit begins to record the message and feed-out tape. As the tape loop increases, the tape arm drops and the associated transmitter begins to step the tape therethrough. All characters in the tape are ignored by the transmitter until the start of message signal (ZCZC) or part A is detected. After the detection of the start of message signal by the transmitter, a sequence number indicator (SNI unit) is connected to the transmitter to compare the message sequence number and other characters with preestablished characters set up in the SNI unit. If these characters agree, the transmitter continues to step tape until a line feed character or part D is detected.

The detection of the line feed character stops the transmitter, conditions the tape reset mechanism of the transmitter and initiates a request for a director. The tape reset mechanism of the transmitter causes all subsequent tape advanced through the transmitter to form a loop. When a connection has been established to a director, the transmitter automatically restarts operation and transmits the bell signals, if any, and the next three characters in the tape to the director. This section of the tape is identified as part E of the message and includes the repeated precedence prosign followed by a space character. The precedence prosign characters are read by the director and the resulting information stored as either high or low precedence.

The transmitter is then restarted and the routing indicator or part F is transmitted to the director. The first four characters of the routing indicator identify the relay station serving the destination of the message, and if these characters are those of a station other than the one processing the message, the remaining characters, if any, are ignored by the director. However, if the first four characters of the routing indicator are those of the relay station processing the message, the next two characters are used to determine the required tributary character. The translator interprets the stored routing indicator and this information is stored at the incoming line position. The transmitter is again restarted and checks the next three characters or part G to indicate the end of the routing information. At the end of the routing information the transmitter loop gate is reset to position the beginning of the first character of part E over the sensing pins for subsequent retransmission of it and following information in the tape to a sending position.

At this point in the operation, the precedence prosign and cross-office routing information has been set up and the SNI unit is ready to operate to transmit the checked information cross-office. If a complete message is stored in the tape as indicated by the message waiting indicator, the desired cross-office connection proceeds to be established.

These cross-office circuits are established with high precedence message having preference over those of lower precedence, and when a connection has been established, the automatic numbering machine associated with the selected outgoing line position transmits a start-of-message signal and the next consecutive channel number into the associated cross-office reperforator. The start-of-message characters in the tape are checked by read-back pins to insure proper operation of the numbering machine and reperforator, and if such characters check properly the SNI unit then transmits cross-office to the reperforator certain information part of which is also checked. If these characters check, it is an indication that the cross-office circuit is functioning properly.

The cross-office transmitter at the incoming line position then transmits signals stored in the tape up to the carriage return character immediately following the routing indicator. When the transmitter reaches this point in the tape, the processing of the message is completed and transmission of the text thereof begins and continues until the end-of-message signal, or part K, is detected at the cross-office transmitter. Thereupon certain characters are checked to determine their presence in the tape associated with the outgoing line position and the checking thereof gives reasonable assurance that the cross-office facilities functioned properly during the transmission of the message.

*Multiple address messages*

In accordance with the principles of the present invention each incoming line receiving position is capable of transmitting the same message simultaneously cross-office to a plurality of outgoing line positions. A multiple address message is characterized by having more than one routing indicator therein, and in the embodiment disclosed as many as nine separate routing indicators may precede a single message. The routing indicators in a message are similar to the part F heretofore defined and each is separated by a space character and the last is terminated by an end of routing line or part G. This includes a carriage return signal and obviously all routing indicators are contained on one line of a page print copy of text. The routing indicators are processed one at a time and at a switching center several of the routing indicators in a message may be interpreted as requiring the same outgoing channel. For example, two or more routing indicators may indicate destinations or tributaries of another relay station thus requiring only one transmission of the message to that particular relay station. The routing indicators are segregated into the required channels in accordance with the number of transmissions required by the relay station processing the message at that time. The arrangement is such that each tape produced at the line sending position contains only the routing indicators required at the next station connected to the associated channel.

It is possible that the nine routing indicators will require a corresponding number of outgoing transmission channels. However, the arrangement of the relay stations is such that a total of four channels will accommodate all but a very small number of messages processed. When a message requires more than four circuit outlets, a spillover position is substituted for one of the first four, and in this case three outlets and the spillover position are used. Consequently a message requiring one or more different outlets than the three selected outlets is sent to the spillover position and the message recorded thereat with at least three less routing indicators than it had when received at the relay center.

When cross-office connections are attempted for several outlets it is possible that a delay may be encountered in seizing one of the desired sending positions as it could be busy receiving a message from some other line receiving position. In this case an automatic timer operates and makes a connection to a so-called busy spillover position where the message and routing indicators programmed for the busy outlet are recorded. Thus transmission to the other circuits is delayed no further.

From this point on the cross-office transmission of the message to the selected outlet positions is substantially similar to that described above for a single address message. In this case, however, the individual numbering machines of the selected outlets operates to send the next consecutive channel member to its respective circuit followed by the operation of the SNI unit at the incoming line position to transmit the previously checked incoming channel message number. The incoming line position transmitter then transmits the precedence prosigns to all connected outgoing line positions and the routing indicators are then distributed to their respective cross office reperforators, and all connected outgoing line positions then record the remainder of the message.

*Manual switchnig*

As above set forth, each incoming line position is provided with an "automatic—manual" switch which in one position conditions the switching equipment for automatic control in accordance with signals perforated in the tape, and in its other or manual position conditions the circuits for operation in response to destination indicating push buttons, a group of which is associated with each pair of incoming line positions. In the case of manual switching all preliminary operations of the equipment as described for automatic switching are the same up to the precedence prosign characters and in manual switching when the transmitter reaches the line feed character preceding the precedence prosign, a message waiting lamp is operated. This lamp attracts the attention of the attendant who thereupon inspects the tape and determines whether the accompanying message is a high precedence or a low precedence one. In accordance with the precedence prosign, the operator then operates a corresponding precedence push button and the transmitter will step the precedence prosign characters through the transmitter and stop on the next space character immediately following. Thereupon a switching control lamp glows and the attendant reads the routing indicator in the tape and depresses the appropriate destination indicating push button. The transmitter then steps through the routing indicator and stops, and if the message being processed contains more than one routing indicator, the transmitter stops on the space separating the first from the following routing indicator and the switching control lamp again glows. The attendant then operates another destination indicating push button corresponding to the next routing indicator, and so on until all the routing indicators have been processed. The routing indicators are terminated by signals including the carriage return signal and its detection in the tape transmitter will cause the start lamp to glow indicating that all routing indicators have been processed. Then the depression of the start push button resets the tape to the desired position, disconnects the push button panel and initiates operation of the circuits involved as in automatic switching. The start button may be operated after only one routing indicator has been processed to permit transmission of a multiaddress message requiring correction to a supervisory position with a single push button operation. However, once a second destination push button has been depressed, the start button is inoperative until the end of the routing indicators has been reached.

Normally messages of flash or emergency precedence contain bell signals and the presence of these bell signals are detected on the incoming line reperforator. Such detection operates an alarm including a lamp and audible signal and priority for an incoming line position having such a message is established over other positions which may be waiting for a particular cross office connection to an outgoing line position, except those positions which have high precedence messages to the same destination. Messages containing bell signals follow the same switching sequence as that outlined above, except that cross-office transmission of these messages is started as soon as a connection to the desired outgoing line position can be established without waiting for the end-of-message signal. This priority also applies to any unswitched messages which may be in the tape of the line receiving position ahead of the message containing the bell signals.

Another feature of the invention is the so-called "connect through" facility which permits the establishment of through connections through one or more switching centers. Normally a "connect through" request has characters CC in lieu of the repeated precedence prosign and usually is treated as a high precedence message. Such a message also causes the "connect through" lamp to glow to inform the attendant, among other things, that the cross-office transmitter is stopped to prevent switching of the message from taking place for the time being. The attendant operates the "connect through" switch which disables the end-of-message reading circuit and activates a double tape feed arrangement. The originating station may start transmitting items of information as soon as the through connection request message has been transmitted and each item of information will begin with a Z character and end with an end-of-message signal. A start of a message signal will not be used for these items of information, however, when the originating station wishes to terminate a through connection, the last message transmittted will contain a start of message signal. The detection of this signal stops the incoming line position transmitter and operates a lamp to inform the attendant to restore the "connect through" switch to its normal position.

With the above description of some of the major components and the general operation of the present invention in mind the following objects and features of the invention will be more apparent.

These include the feature of normally delaying the automatic start of the cross office switching of a message until the complete message has been received but to start the switching immediately on the receipt of certain messages such as those preceded by bell signals. Another feature resides in the arrangement of employing the sequence number indicator, first to compare the message numbers that are perforated in the tape at the incoming line position and secondly, employing the same sequence number indicator to retransmit the number cross office.

Another feature of the invention resides in the use of a 25-point and an 8-point rotary switch to select any one of 200 route leads, 100 high and 100 low precedent leads. Thus each pair of switches can select any one of 100 destinations with a destination being either a single channel line, a multichannel group of lines, or a station on a way wire or multipoint line.

Still another feature of the invention resides in the provision of means for selecting up to four destinations for each message by using four pairs of route switches. This in effect makes each line receiving position a master sending position. A further feature in this connection resides in the arrangement whereby when more than four destinations are required, the fourth is combined with the remaining and routed to a multisend position for rehandling. In connection with the above, still another feature of the invention resides in the so-called "program" circuit which "remembers" pair of route switches selected for each routing indicator, so that the routing indicator can be sorted out later and transmitted to its own destination.

In respect to the director arrangement, a feature of the invention resides in gating circuits for connecting a receiving position to an idle director and for connecting a director to an idle translator, combined with means for preventing any receiving position or group of receiving positions from monopolizing a director. A feature of the translator operation resides in its ability to translate letter combinations to numerical switch settings by use of relays, rotary switches, or electronic circuits and patching panels for combining route indicator combinations.

Still another feature with respect to the director resides in the provision of permitting following routing indicator characters to be sent into the director while the route switches are operating to set up the route indicated by the previous set of routing indicator characters.

In respect to the cross-office arrangement, features of the invention reside in the general method of switching cross office from incoming line positions to outgoing line positions in which route switches at the receiving positions select a destination represented by a single conductor in a multiple common to all receiving positions, wait if all the sending positions to the destinations are busy, seize a sending position when it becomes available, operate a "code" relay at the seized sending position to mark a cross-office switch at the receiving position so that it selects a cross-office line conductor extending to the selected sending position in a common multiple of such conductors.

The invention also has as a feature thereof a load distributor arrangement for multichannel outlets arranged to concentrate the messages on sending positions in alphabetical order during periods of light loads and to distribute traffic substantially uniformly to all channels in the multichannel group during busy periods.

*Detailed description*

The detailed description of the operation of the various elements of a switching center arranged and operated in accordance with the principles of the present invention will now be set forth. This description will follow the general plan in which a message received at an incoming line position of a switching center is detected and processed and then switched cross office to the desired outgoing line position or lines positions in the case of a multi-address message for subsequent transmission therefrom.

*The drawings*

The drawings disclose circuit details of the preferred embodiment of the invention and are arranged to a considerable extent as separate operating units or circuits with the name of the unit indicating the function performed thereby.

Figure 1:
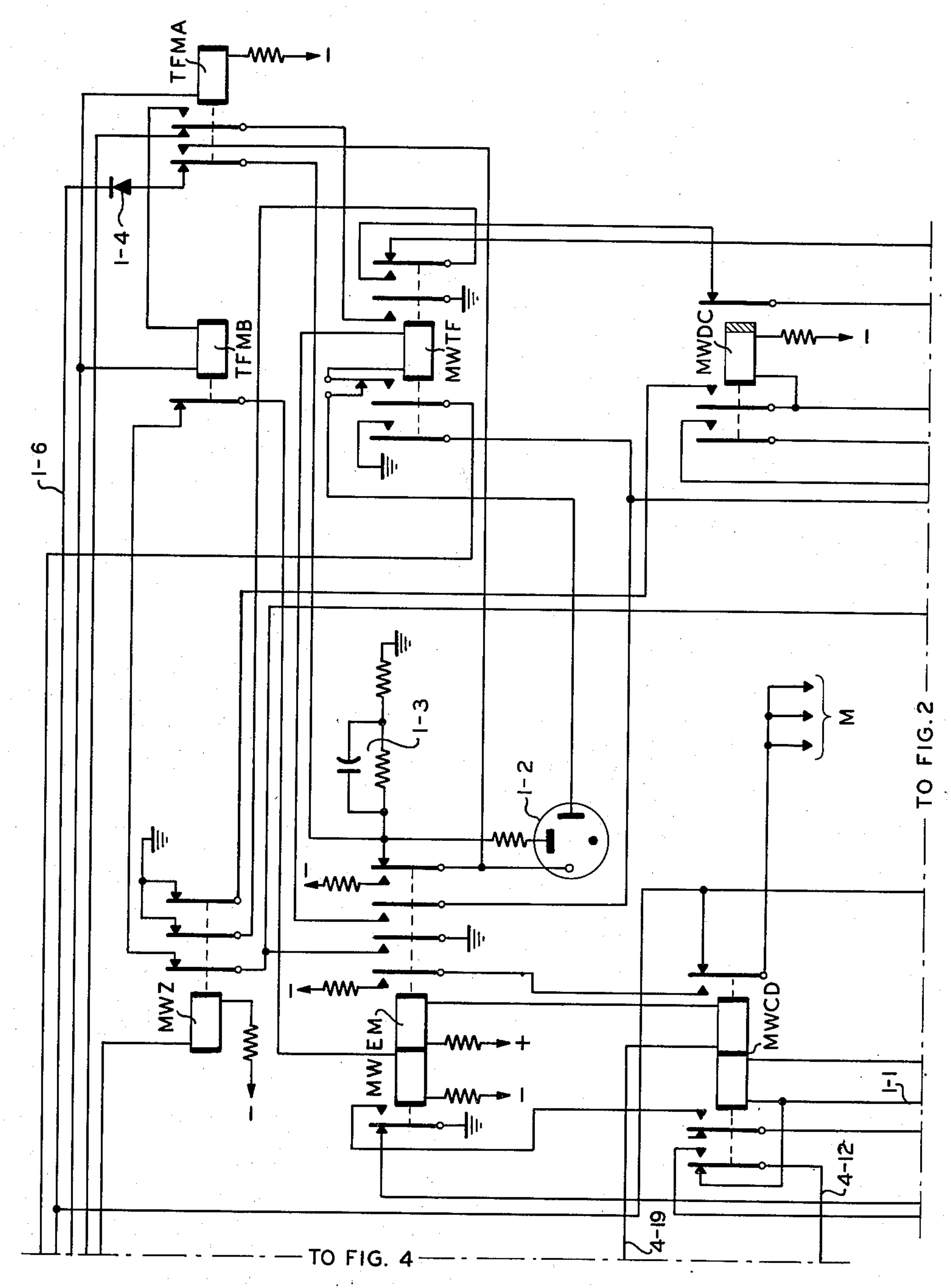
FIGS. 1 to 4 show the circuit details of a line receiving position.
Figure 1A:
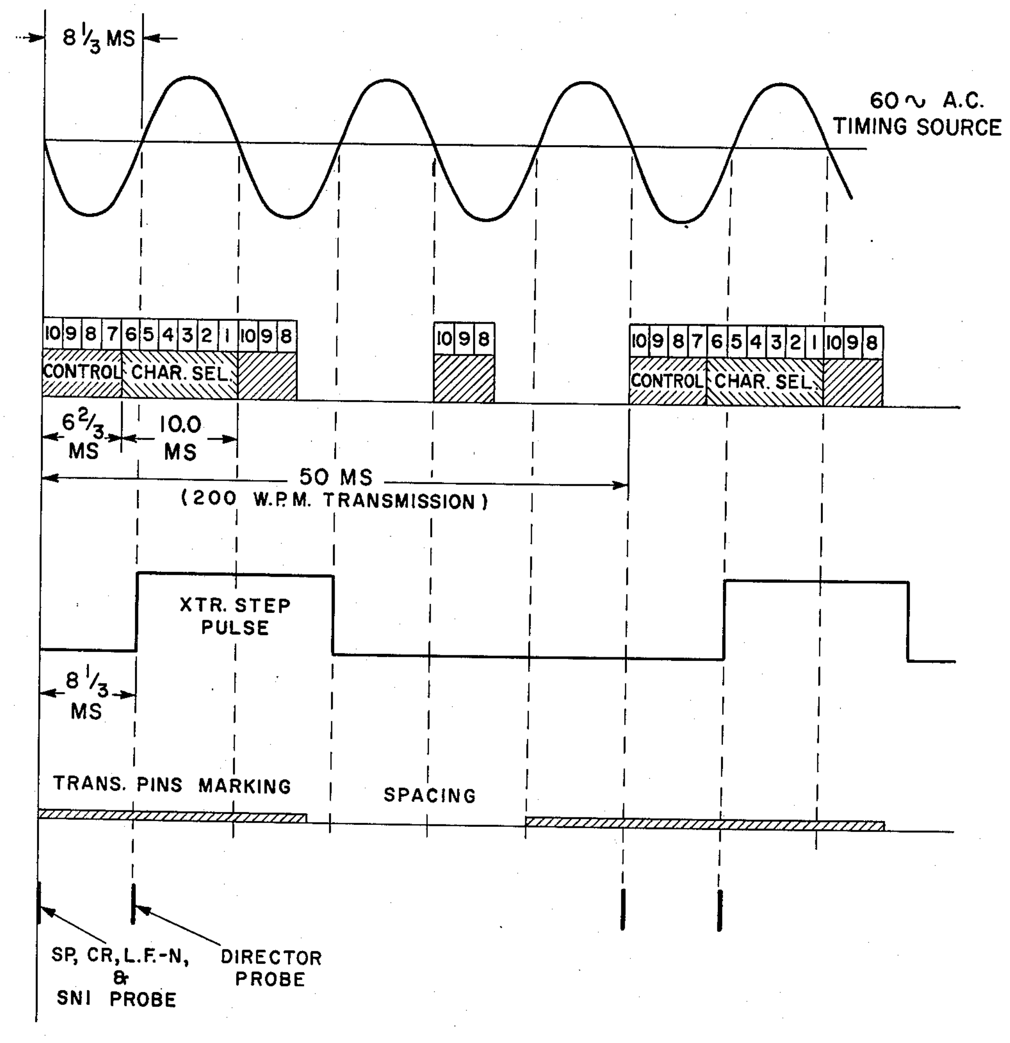
Figure 52:
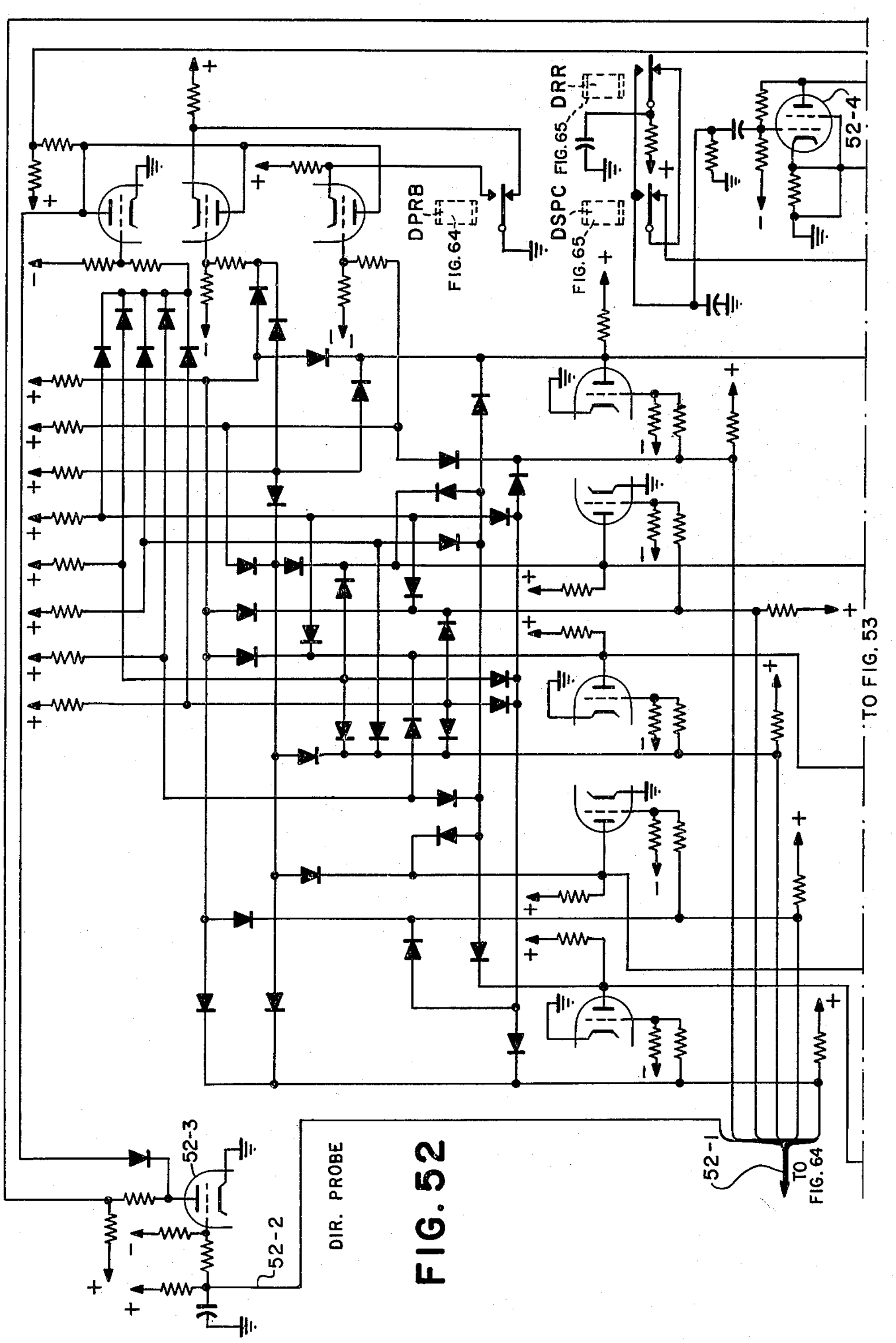
Figure 53:
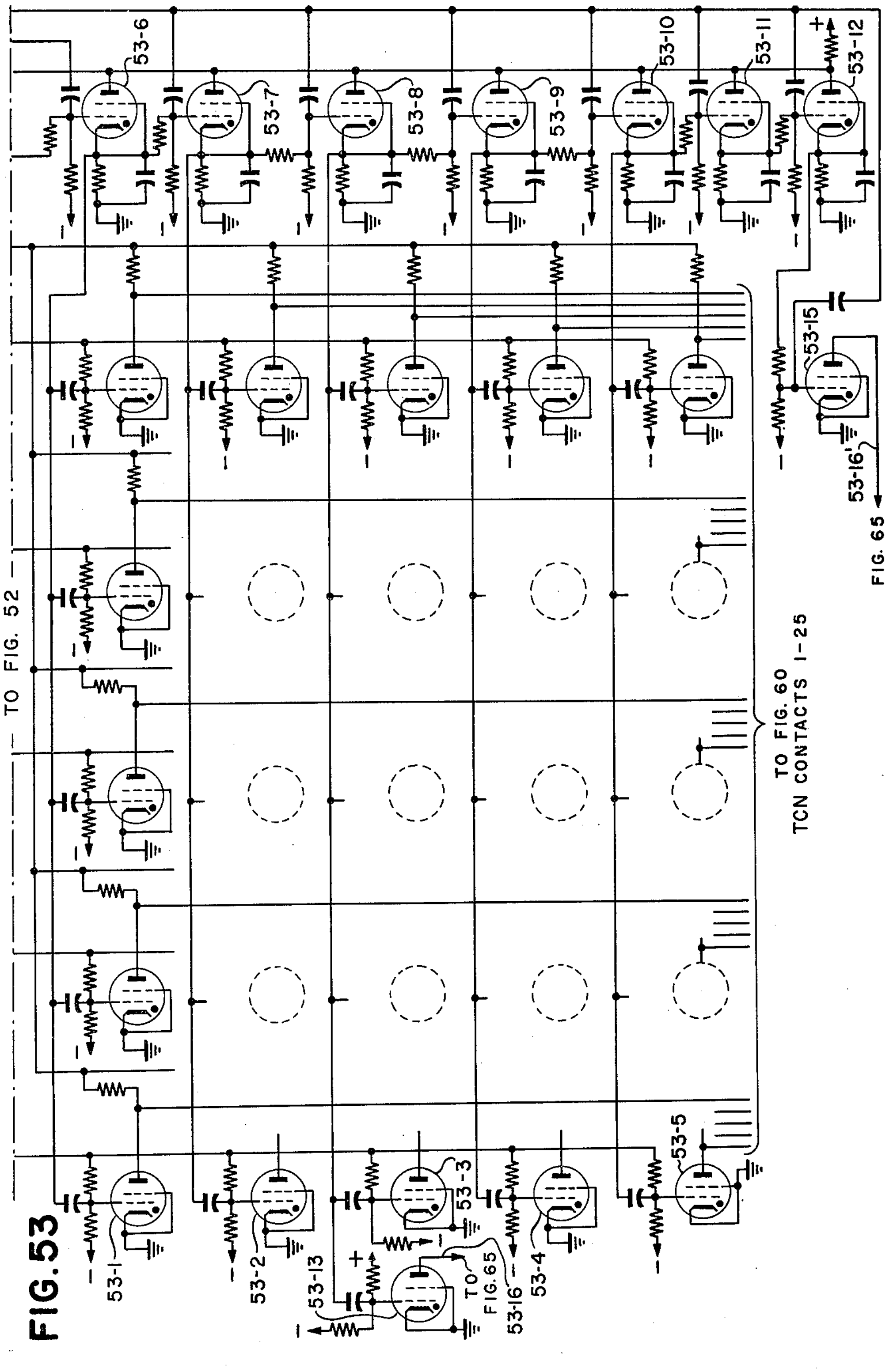
Figure 54:
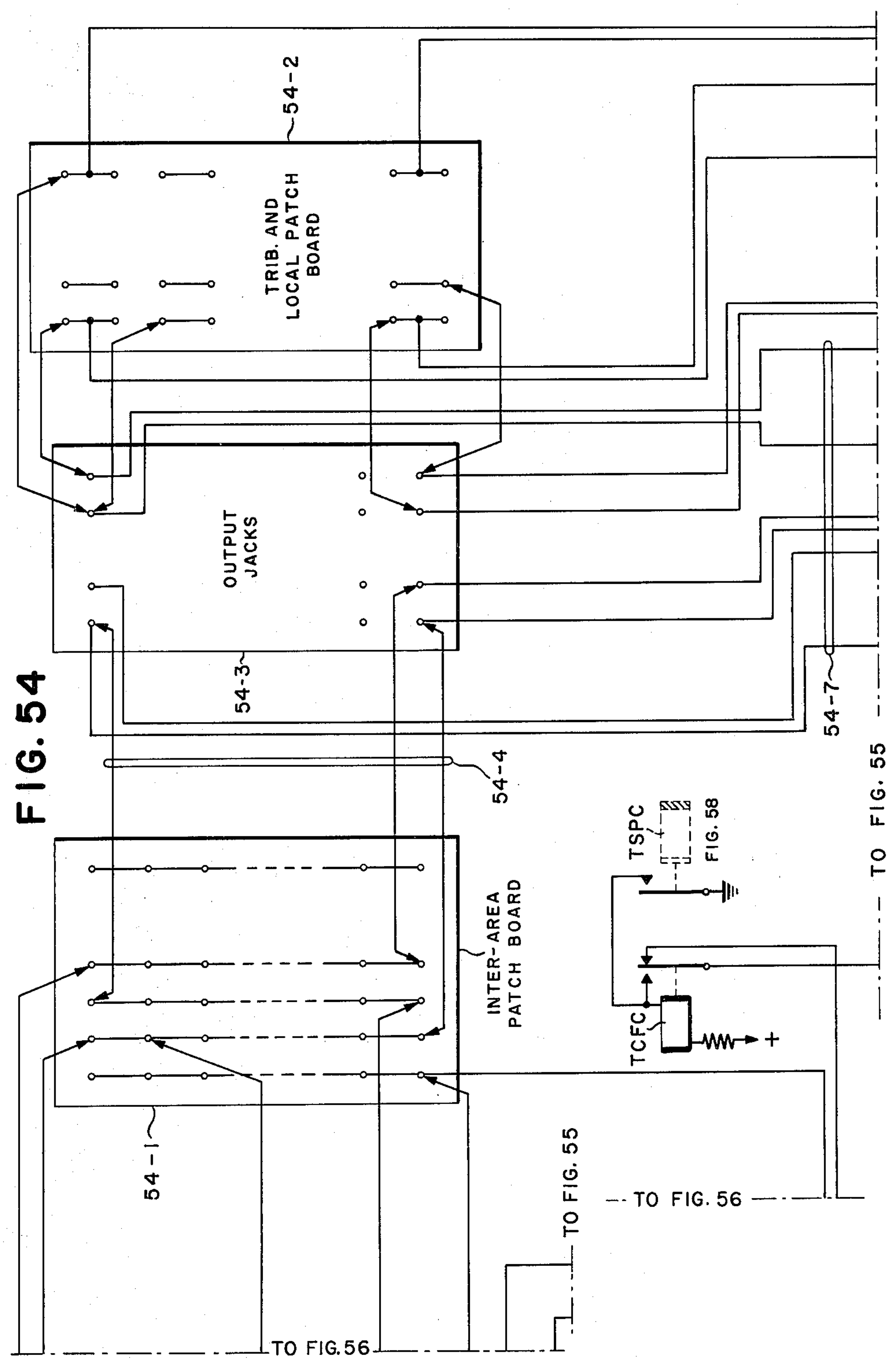
Figure 76:
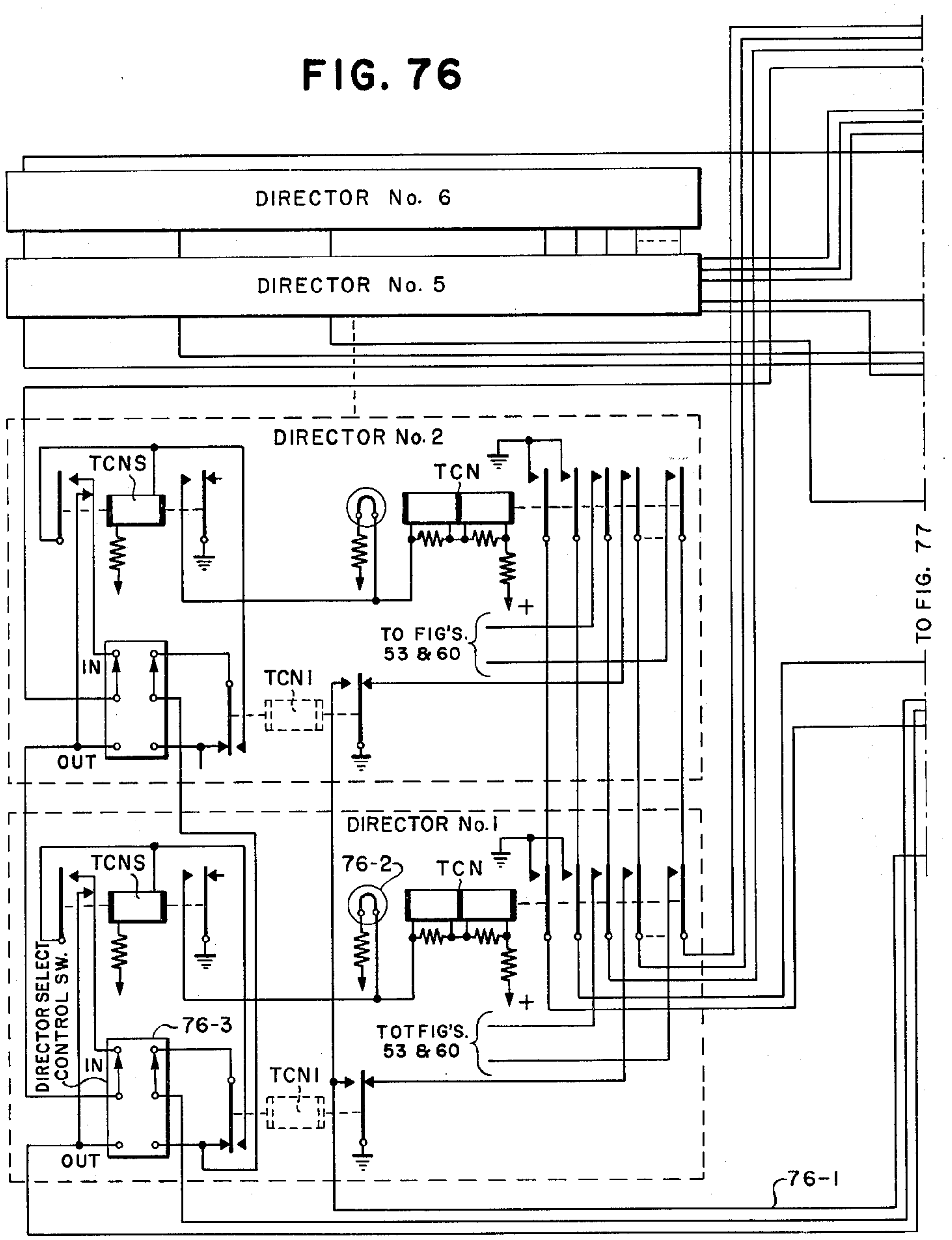
Figure 77:
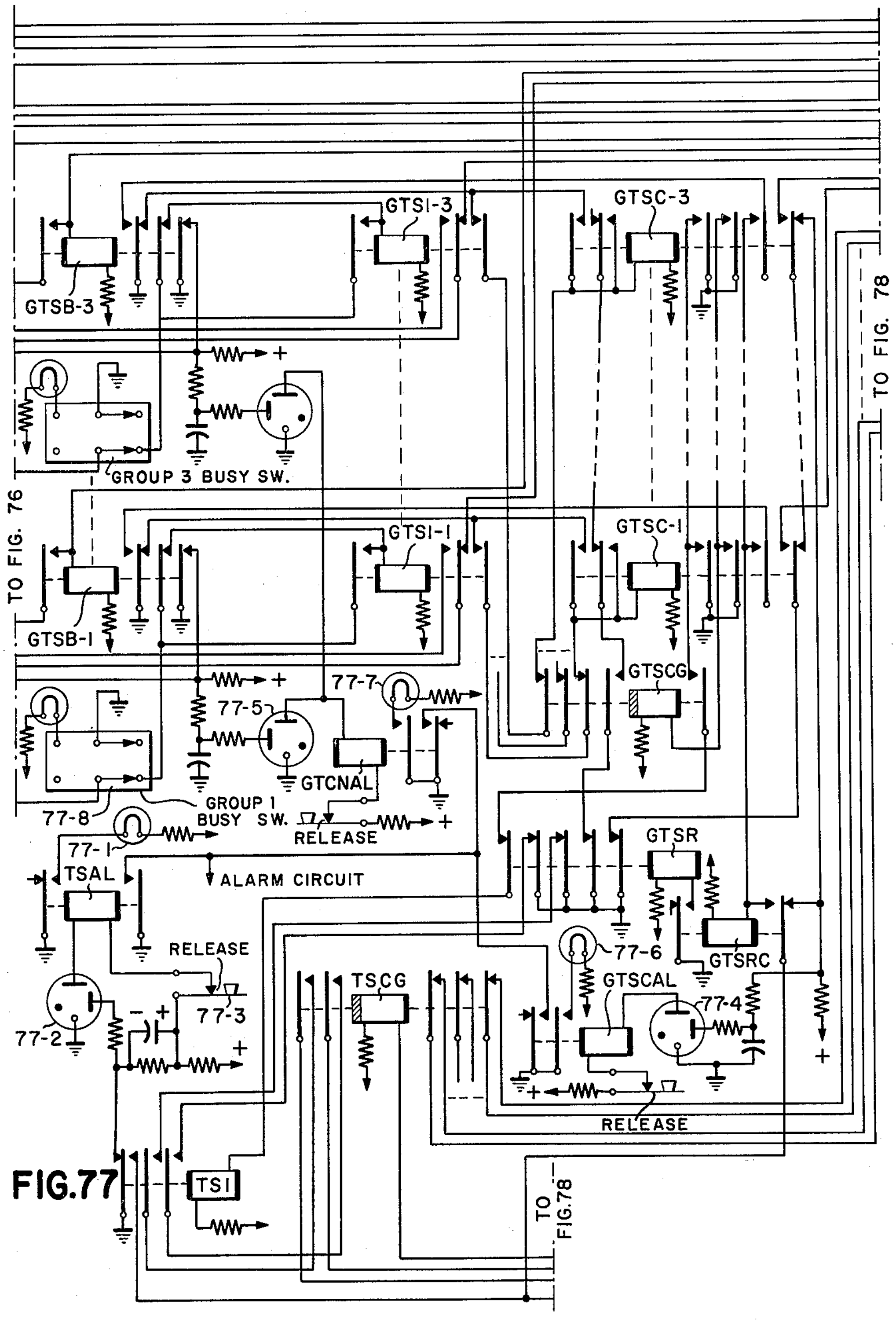
Figure 78:
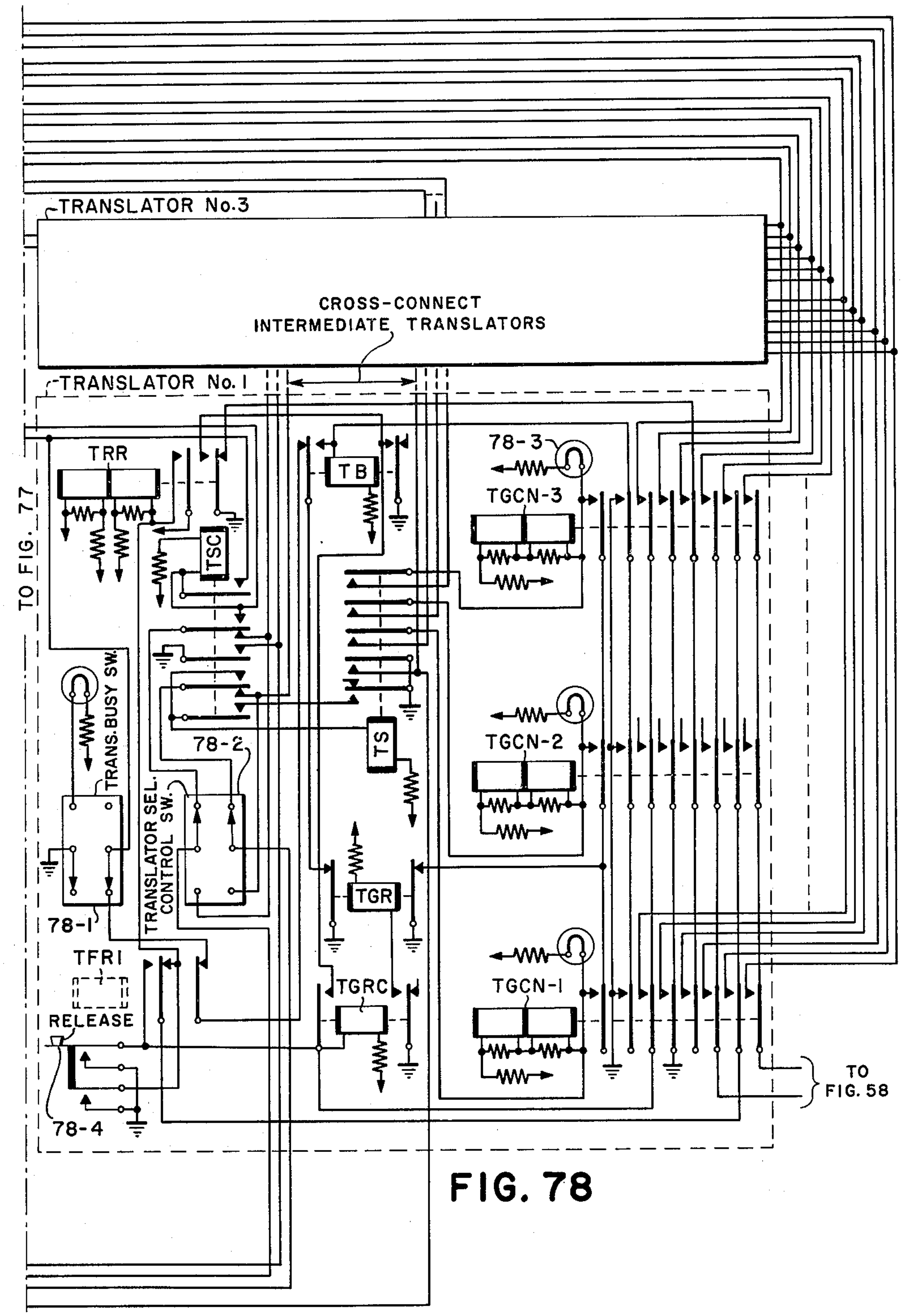

FIGS. 7 to 10, 13 to 16, and 19 to 22 show details of the control circuits of an incoming or line receiving position;

FIGS. 23 to 31 show details of the electronic cross-office transmission control circuits;

FIGS. 32 to 39 show details of the sending line position control circuits;

FIGS. 40 to 51 show details of the circuits of the cross-office side of the sending line position;

FIGS. 52 and 53 show circuits of the character storage unit;

FIGS. 54 to 75 show circuit details of the director and translator;

FIGS. 76 to 78 show translator connecting circuits;

FIGS. 79 to 82 show allotter control circuits;

FIG. 1A is a timing chart;

FIG. 1B shows the pattern for arrangement of FIGS. 1 to 51 to represent a part of the switching system;

FIG. 1C shows the pattern for arranging FIGS. 52 and 53;

FIG. 1D shows the pattern for arrangement of FIGS. 54 to 75 comprising the director and translator;

FIG. 1E shows the pattern for arrangement of FIGS. 76 to 78; and

FIG. 1F shows the pattern for arrangement of FIGS. 79 to 82.

*Incoming line position*

The equipment terminating an incoming line is hereinafter referred to collectively as an incoming line position or a line receiving position, and the operation of the circuits and equipment in such a position in a central or switching office will now be described in connection with the receipt of a message over an incoming line. Incoming messages are recorded by a printer-perforator and an associated control circuit and a message waiting indicator included in the incoming line position are shown in FIGS. 1 to 4.

In order to more readily follow the description of the the illustrated embodiment of the invention, most of the relays are identified by the initials of the functions of the relays, for example, relays identified as MWEM and MWAL are the "mesage waiting end of message" and "message waiting alarm" relays respectively. Also, the reference numerals employed follow a plan and for the most part each includes a dash with the number preceding the dash identifying a figure of the drawings in which the element identified appears, and in the case of a conductor extending through more than one figure, the number preceding the dash indicates the figure where the conductor is first identified, with the numeral following the dash identifying the particular element or conductor found on the indicated figure. A number of the elements and groups of relays are also identified by legends which describe to a considerable extent the purpose and function of the groups.

Figure 3:
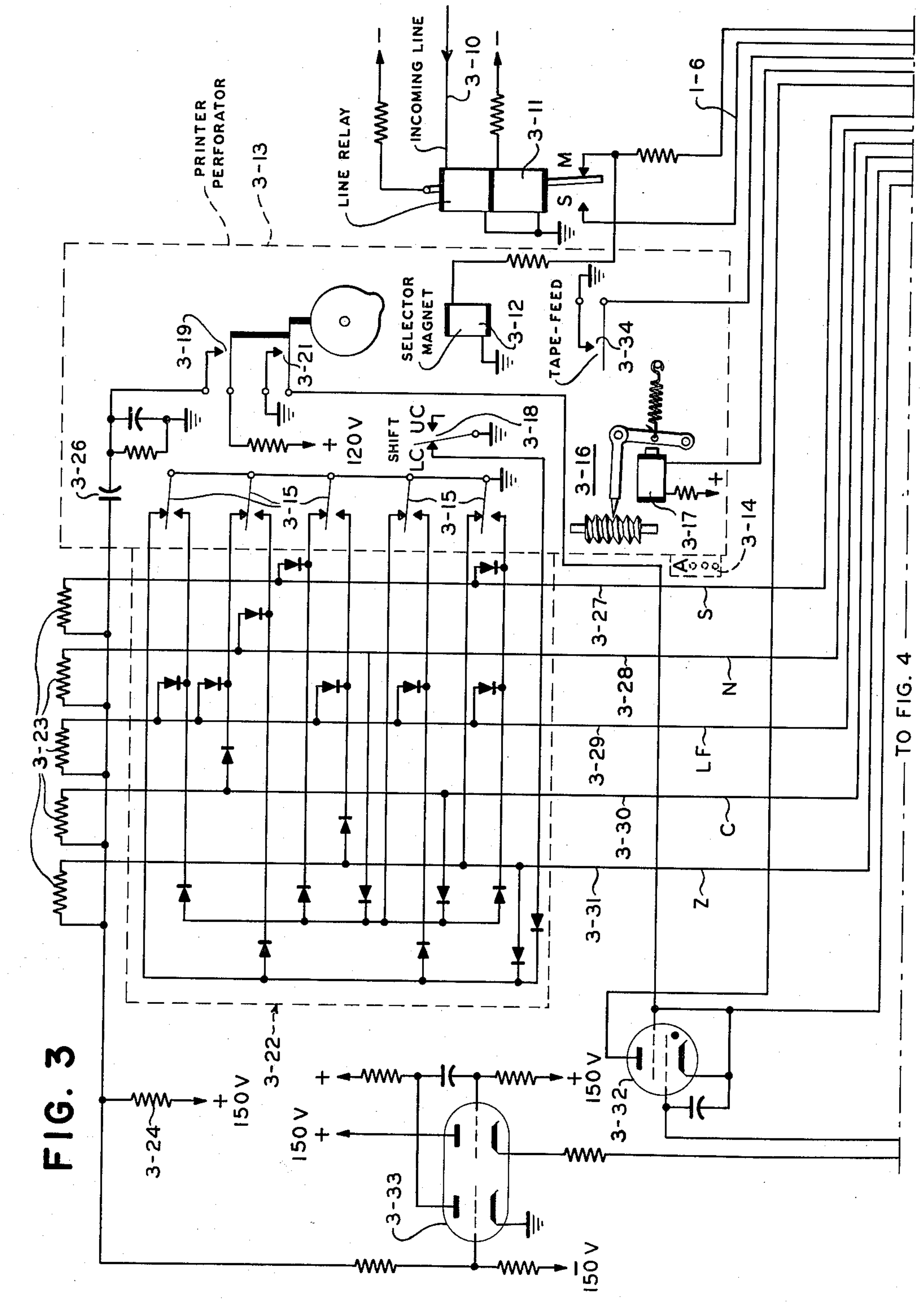
Figure 4:
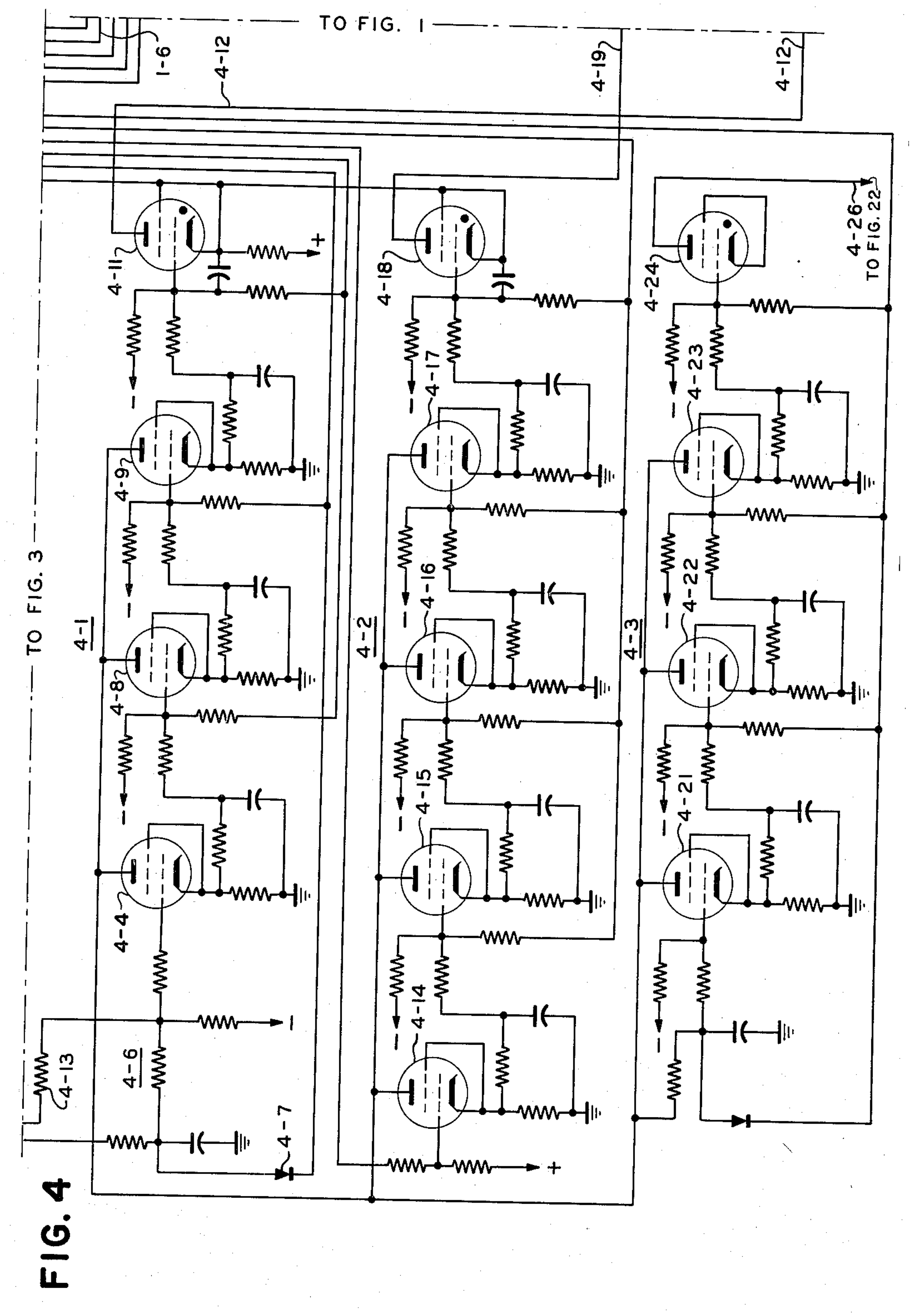

Referring now to FIG. 3, incoming line 3–10 controls the line relay 3–11 in accordance with the received signals. The incoming line 3–10 may be any one of a number of different type circuits such as a multistation line, a single station line or one channel of a multichannel trunk circuit. The marking contact of the line relay is connected to the selector magnet 3–12 of a printer-perforator 3–13 which operates to perforate and print a tape 3–14 in accordance with the received signals. The printer-perforator includes a tape feedout mechanism 3–16 arranged to feed out a predetermined length of blank tape at certain times such as on the succession of signals, and is initiated into operation by its associated magnet 3–17. The printer-perforator also includes a set of five character reading contacts 3–15, a shift contact 3–18 and two sets of cam operated probe contacts 3–19 and 3–21. The contacts 3–19 and 3–21 are arranged so that the former closes slightly ahead of the latter and the latter opens slightly ahead of the former once for each cycle of operation of the printer-perforator 3–13.

The character reading contacts 3–15 are operated in various combinations concomitantly with the printing and perforating of a character in the tape and the said contacts exercise control over various circuits hereinafter described. Associated with the character reading contacts is a diode gating network indicated generally by reference numeral 3–22 which in conjunction with three sequence counter rings 4–1, 4–2 and 4–3 detect certain characters and sequence of characters as they are perforated in the tape.

The arrangement of the diode gating network is such that a character read output is obtained when all conducting paths to ground through the gating diodes and the printer perforator character reading contacts 3–15 are removed from one of the read output load resistors 3–23 allowing the output voltage to rise positive when the probe contacts 3–19 apply a positive pulse thereto. The individual read output load resistors 3–23 are connected through a common resistor 3–24 to positive battery and a positive pulse is coupled by capacitor 3–26 to the resistor 3–24 from the contacts 3–19. The resistor 3–24 forms a voltage divider with the load resistors 3–23 and in the absence of any character that is to be read all the load resistors are connected to ground through some path of the gating diodes in the grid 3–22. Under these conditions the voltage at the junction of the load resistors 3–23 and resistor 3–24 is approximately 30 volts since the load resistors 3–23 are in parallel with each other. The voltage change applied to the coupling capacitor 3–26 is approximately 120 volts and this added to the 30-volt bias applies a signal to the character read outputs that is approximately 150 volts positive with respect to ground when a character is read. The character read outputs representing the characters "S," "N," "line feed," "C" and "Z" are applied to leads or conductors 3–27, 3–28, 3–29, 3–20 and 3–21 respectively and lead to the ring counters 4–1, 4–2 and 4–3 which are used to count the character sequences by triggering the thyratron of these counters. Normally, all thyratrons of the ring counters are unfired and the first control character read on the printer perforator triggers the first tube of the corresponding ring. The output of the first tube provides a pedestal for the second tube in the ring and this tube fires on the next character if the proper character is read and so on for the succeeding stages of the ring counters resulting in a control output.

The common plate output of all the counter thyratrons is coupled to the grid thyratron 4–4 of ring counter 4–1 through a resistor divider network 4–6. With all the thyratrons extinguished a positive pedestal is applied through conductor 3–31 and a diode 4–7 to cause the tube to fire on the detection of a Z character. The second tube 4–8 of the ring 4–1 will have a positive pedestal applied to its grid which is coupled to the cathode output of 4–4 and this tube will fire if the next character is C causing a read output pulse to be applied through conductor 3–30 to the grid of tube 4–8. Similarly, tubes 4–9 and 4–11 fire if the next two characters are Z and C respectively and results in a control output being applied to conductor 4–12. The control output applied to conductor 4–12 is extended through a tongue and back contact of relay MWCD (message waiting count drive relay), a conductor 1–1 and the coil of relay MWSM (message waiting start of message relay) to potential causing the last said relay to operate. Thus in response to the start of message signal ZCZC, relay MWSM is operated. Vacuum tube 3–32 fires coincidentally with the triggering of tube 4–4 and has its grid tied to the grid of the latter tube through an isolating resistor 4–13. The purpose of tube 3–32 will be apparent hereinafter.

In substantially the same manner the ring counter 4–2 detects an end-of-message signal consisting of a line feed character followed by four N characters. This ring counter is triggered from the diode gating output over conductor 3–29 to fire thyratron 4–14 in response to a line feed signal. This tube is fired directly with a pedestal from the common plates of the thyratron because no other tube in the ring triggers on the same character. The cathode output of tube 4–14 applies a pedestal to the grid of tube 4–15 and if the next character is an N with a pulse supplied from the diode network 3–22 over conductor 3–28, tube 4–15 will fire. Similarly, the other 3 tubes 4–16, 4–17 and 4–18 of ring counter 4–2 are fired for each succeeding N character and on the firing of the last tube, a control output from the plate thereof is applied over conductor 4–19 and through the right hand coils of relays MWCD and MWEM.

The ring counter 4–3 detects the 4-bell signal sequence and is similar in operation to ring counter 4–1 in that the first stage obtains a pedestal from the plates of the thyratrons. Tube 4–21 fires on the character combination for the letter S with the shift contacts 1–18 in the shift position or in the position to remove ground from the S output control lead 3–27. The remaining tubes 4–22, 4–23 and 4–24 fire for succeeding upper case S or bell signals to provide a control output from the plate of the latter tube to control output lead 4–26 leading to the coil of relay OPH, the cross office high priority relay.

Thyratrons 3–32, 4–11 and 4–18 are extinguished by the closing of contacts 3–21 of the printer-perforator which grounds the cathodes of these tubes. Thyratron 4–24 has a manually operated key for opening its plate circuit.

When a control character sequence is not completed, the sequence counters are reset. This is accomplished by a probe pulse extinguishing any conducting thyratron in a ring whenever a character fails to fire a thyratron in a sequence counter. Resetting therefore is attempted on every character received by the printer perforator but does not affect a thyratron that is being fired. The reset circuit includes the cathode follower section of reset tube 3–33, whose output supplies the battery potential for the plates of all the thyratrons in the ring counters. The left-hand section of reset tube 3–33 operates as an inverter and derives a negative pulse from the positive common contact 3–19. This negative pulse occurs for every character and is capacitively coupled to the grid of the right hand section of tube 3–33 and since this section is connected as a cathode follower, the cathode will be at approximately the same potential as the grid. This causes the cathode voltage to drop and should a thyratron be fired in one of the counters, the potential of the plate with respect to the cathode will instantaneously become negative, hence the tube will be extinguished. Previous to conduction the cathode of a thyratron is at ground potential such that the tube can be triggered simultaneously with the application of the reset pulse because the reset pulse does not drive the common plates sufficiently negative to make the plate potential negative with respect to the cathode. Hence, there remains enough potential across the tube during resetting to allow a thyratron to be fired. Only the previously conducting thyratron will be extinguished as its cathode potential was positive before resetting occurred and the cathode potential can not follow the plate potential because of the commutating capacitor in the cathode circuit.

The arrangement of the control circuits for the ring counters 4–1, 4–2 and 4–3 are such that a counter will be reset on a character that appears in the sequence but not in the right order. For example, if the characters ZCZ have been stored as evidence by the firing of tube 4–9 and the next character is another Z, the counter will be reset since thyratron 4–11, the only tube having at this time a firing pedestal, is only triggered by a C output applied to conductor 3–30. Therefore, the counter will be reset and the character causing the resetting, in this case a Z, may be the first character of a correct sequence. Therefore, it is necessary to store this character on thyratron 4–4. Hence the counter must be reset before the Z can be stored, as thyratron 4–4 cannot be triggered unless all the ring counter thyratrons are extinguished. This condition is taken care of by having the probe pulse generated by contacts 3–19 of greater length than the reset pulse generated by contacts 3–21.

*Message waiting indicator*

Associated with an incoming line position is a message waiting indicator 2–1 which operates to add one count for each message received and to subtract one count for each message switched cross-office. The net count is indicated by the relative position of a dial 2–2 and a pointer 2–3 and thus indicates the number of complete message on hand which have not been switched cross-office from its receiving position.

As previously set forth, each received message is preceded by the start-of-message combination ZCZC and terminated by the end-of-message combination, line feed and four N's. Relay MWSM is operated on the final C of the ZCZC combination and at the end of the pulse from contacts 3–19 incident to the operation thereof, relay MWCD operates by a circuit including a back contact and ground of unoperated relay MWEM which should operate before another start-of-message combination is received. After the operation of relays MWCD and MWSM by the start-of-message combination, the end-of-message combination for that message completes a circuit for the operation of relay MWEM by a circuit from the plate of thyratron 4–18, conductor 4–19 and the right-hand coils of relays MWCD and MWEM. For the duration of the operating pulse for this circuit, relay MWCD is held operated and a circuit is completed from a grounded tongue and front contact of relay MWEM, a front contact and tongue of relay MWCD, a back contact and tongue of relay MWAL, the upper closed contact of the tape feed key 2–4, the lower contacts of the connect-through and conference key 2–6 and the coil of the add magnet 2–7 of the message waiting indicator to potential. This operates the indicator to advance one count.

Should another start-of-message combination be received without an intervening end-of-message signal, the second control output from the counter ring 4–1 would complete a circuit through the front contact of relay MWCD, and the coil of relay MWAL to operate the same. The operation of relay MWAL, the message waiting alarm relay, completes a circuit for an alarm to apprise the attendant of the situation. In this event, even though succeeding messages are received with start-of-message and end-of-message combinations in proper sequence, no count on the indicator will be registered for them.

At the conclusion of each cross-office message switching operation, the cross office connection end relay OSNE, as hereinafter described, operates and provides an operating pulse for the operation of the subtract magnet 2–8 of the indicator. The operation of this magnet subtracts one count from the indicator. If the alarm relay MWAL operates as pointed out above, the message waiting indicator will register a zero count at the time the message lacking an end-of-message combination reaches the transmitter for processing and cam operated contacts of the indicator in this position complete an alarm circuit to inform the attendant that the message lacking the end-of-message sequence is just ahead of the transmitter. The operation of the add push button 209 restores the indicator to normal and opens the locking circuit to relay MWAL.

*Tape feedout*

In order to enable the last received message characters to reach the transmitter when the incoming line signals cease, it is necessary to feed out blank tape from the printer-perforator 3–31. However, during certain times it is necessary to restrict the feedout operation so that it will occur only between the end of one message and the start of another. Initiation of a tape feedout is subject to a tight tape condition as indicated by the operation of the autostop lever contacts 2–11. However, due to the high cross-office transmission speed in the neighborhood of 200 words per minute, it is desirable to keep the tape moving through the transmitter as uniformly as possible. To provide for this, the message waiting indicator 2–1 is equipped with a set of contacts 2–12 which close when the number of messages indicated is zero or one but open for any number greater than one. With contacts 2–12 closed, a tape feedout can be initiated independently of the autostop lever 2–11 either of which conditions provide a ground for initiating the tape feedout operation.

Operation of relay MWEM with contacts 2–11 or 2–12 closed extends the ground thereat through the coil of the message waiting tape feed relay MWTF to the plate of timing tube 1–2. Relay MWEM in operating also connects negative potential to the starter anode of tube 1–2. The starter anode is provided with a timing network 1–3 which is also connected through a tongue and back contact of relay TFMA, a diode 1–4, and conductor 1–6 to the spacing contact S of the line relay 3–11. The timing network has an interval of approximately one second and each spacing operation of the polar line relay 3–11 resets the timing action. When the line signals cease for the duration of the timing interval, tube 1–2 fires and causes the operation of relay MWTF which locks to ground subject to relay MWEM remaining operated and to negative potential subject to polar relay 3–11 remaining on its marking contact. Relay MWTF in operating opens the plate circuit of tube 1–2, completes a circuit with the operation of the printer-perforator feedout magnet 3–17 through contacts of released relay TFMA. Operation of magnet 3–17 initiates a blank tape punching operation and through the tape feedout mechanism closes the normally open tape feed contacts 3–34 which remain closed for the duration of the tape feedout operation and open when it is terminated. The initial closing of contacts 3–34 operates relay TFMA which opens the circuit to the magnet 3–17 and resets the timing network of 1–2. The feedout magnet 3–17 remains operated due to a latching arrangement and the feed operation continues until the tape meter contacts 3–34 open at the end thereof whereupon a circuit is completed for the operation of relay TFMB in series with TFMA. This also opens the locking circuit for relay MWEM which in releasing releases relay MWTF followed by the release of relays TFMA and TFMB. When the tape meter contacts 3–34 open at the end of a tape feedout the latched feedout magnet 3–17 is released and the punching of blank tape ceases.

Incoming line signals cause the polar relay 3–17 to move between the marking and spacing contacts and such operation during a blank tape feedout releases relay MWTF even though relay MWEM remains operated. Any incoming line signal also operates the link to the tape feedout magnet 3–17 and thus the blank tape feedout is immediately terminated. When the first received character is a Z, relay MWZ operates to release relay MWEM and in this case no further tape feedout can occur until another end-of-message signal is recorded.

The operation of tape feedout key 2–4 completes a circuit for the operation of relay MWEM through released relay MWZ and TFMB whereupon relay MWEM locks up and sets up the condition for starting a blank tape feedout. The message waiting indicator is prevented from advancing in the above situation by opening the circuit to the add magnet 2–7 thereof when the tape feed key is operated.

It is sometimes desirous, such as when a "connect-through" set up is established, to feed a double length blank tape, and this is accomplished by the automatic operation of the connect-through key 2–6. Initiation of the feedout of the first length of blank tape occurs as set forth above and with relay MWZ released, operation of relay MWTF completes a circuit for operating a circuit MWDF, through released relay MWDC. Operation of relay TFMA at the start of the feedout resets the timing network of tube 1–2 as set forth. At the end of the first feedout, relays MWEM, MWTF, TFMA and TFMB release as described and release of relay MWTF locks relay MWDF. When relay MWEM releases, it closes an operating circuit for relay MWDC through released relay MWSM and operated MWDF. With relays MWDF and MWDC operated, and the message waiting indicator 2–1 set to a count of one as a result of the operation of the connect-through switch 2–6, ground is connected through the contacts 2–14 and a circuit including the restart key 2–13, contacts of the connect-through switch 2–6, back contacts of relay MWSM, front contacts of relays MWDC, MWDF and back contacts of relays MWZ and TFMB for immediately reoperating relay MWEM. This establishes the required conditions for initiating a second blank tape feedout which will occur when the second timing interval of tube 1–2 elapses.

Operation of relay MWTF for the second feedout releases relay MWTF but relay MWDC remains locked through back contacts of relay MWZ. Accordingly, no further tape feedouts can occur once the second one is completed until relay MWDC is released. This will not occur until the incoming line character Z is received. If the first blank feedout is completed before the connect-through switch is operated, a second feedout will be initiated when the switch is thrown.

*Electronic equipment*

To meet the requirement of high speed cross-office transmission of messages and to permit a switching center to be easily expanded, contracted, and/or moved by merely plugging together additional sending and receiving consoles, and to keep the number of plugs and sockets, switches and related equipment to a minimum, the present system is arranged to use single cross-office conductors for each connection as compared to as many as 9 conductors required in other prior art reperforator switching systems. The cross-office signaling is effected electronically over the single conductor and control signals are transmitted in both directions by means of electronic pulses in addition to the transmission of the message character signals from the transmitter of the receiving line position to the reperforator of the sending line position.

Parts of the electronic equipment are individual to each operating position while the rest is common to both operating positions in a console. The electronic units generate, transmit and detect message and control pulses sent across the office and in addition control the stepping of the tape transmitter and numbering machine, detect and indicate trouble conditions, read certain message characters as they are being transmitted at high speed, test the idle or busy condition of a selected route or routes, and control other equipment such as the message waiting indicator hereinbefore described.

*Electronic pulse generator*

One of the basic units of electronic equipment is an electronic pulse generator which serves as a distributor pulse source for both the line receiving and line sending electronic units. As arranged in the present system one electronic pulse generator is provided for each pair of incoming line positions and one for each pair of line sending positions. These units generate ten sequentially distributed pulses for transmitting signals and ten distributed pulses for detectors. The detectors are so displaced in time as to fall in the center of corresponding transmitting pulses and the complete sequence of ten pulses occurs during the period of one cycle of a sixty cycle timing source and repeats continuously at a sixty cycle rate.

Included in the pulse generator is a five-stage ring counter which is employed to count and distribute the ten pulses, a 600 cycle start-stop local oscillator and a corrective network which corrects the oscillator frequency to be ten times that of the sixty cycle synchronizing frequency. The ring counter is driven by the 600 cycle oscillator which is started by a trigger pulse from the sixty cycle timing source and stopped on the fifth count of the ring counter. Two synchronizing pulses are derived from one cycle of the timing source by means of gating in such a manner that the ring counter counts up to five twice for each cycle of the timing frequency. The ten distributed pulses are derived by gating the five outputs of the ring counter with each of the two half cycles of the timing source.

The 600 cycle oscillator is automatically corrected by sampling the fifth pulse interval of the ring counter. The width of this pulse is a function of the frequency of the local oscillator with regard to the timing frequency, this pulse being too long when the oscillator frequency is too high and too short when the frequency is too low. The variation of this pulse width is converted to a voltage regulation by capacitively coupling the signal to an amplifier whose output is used to control the frequency of an oscillator in a direction opposite to that which caused the error.

Figure 23:
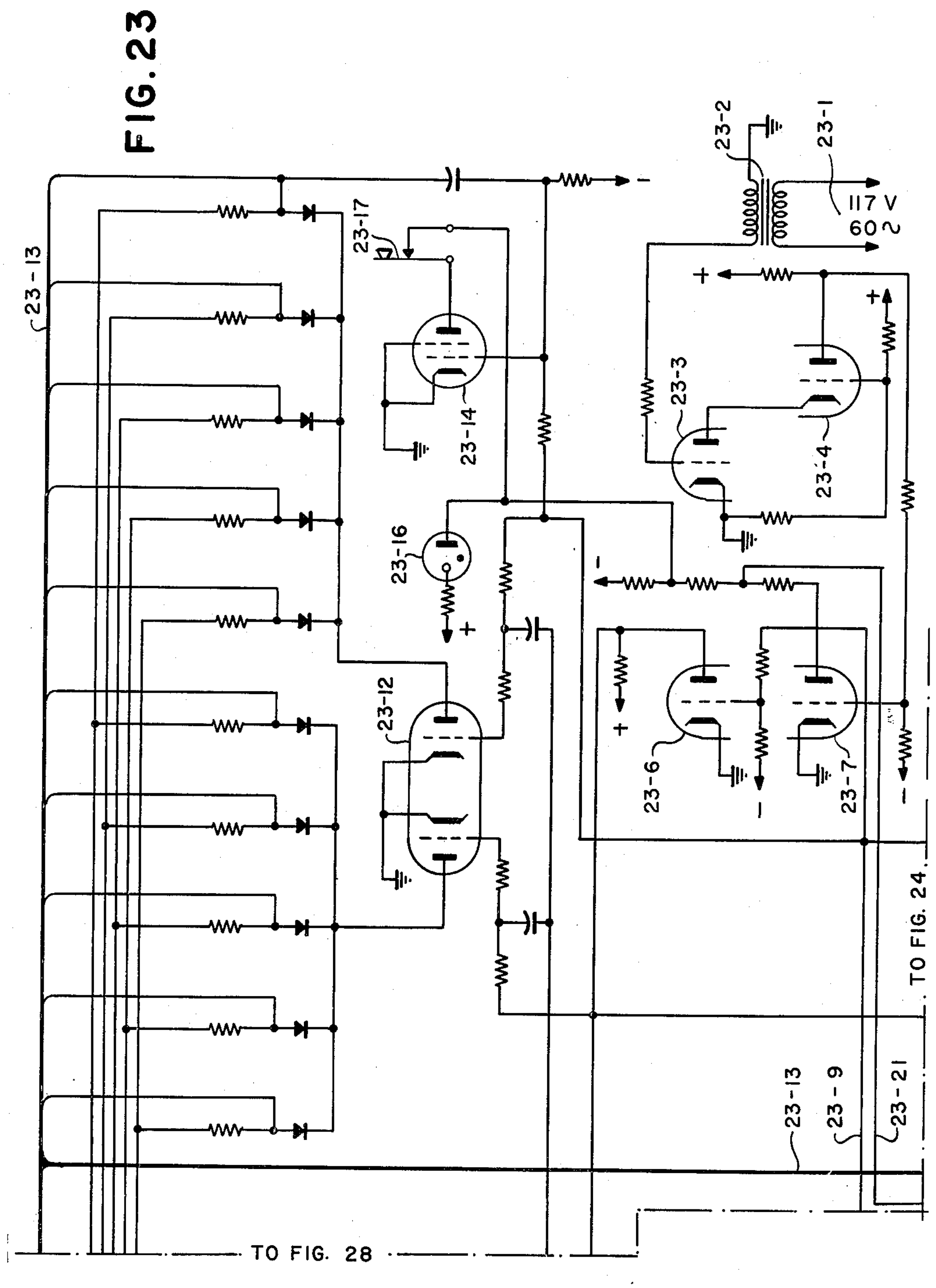
Figure 24:
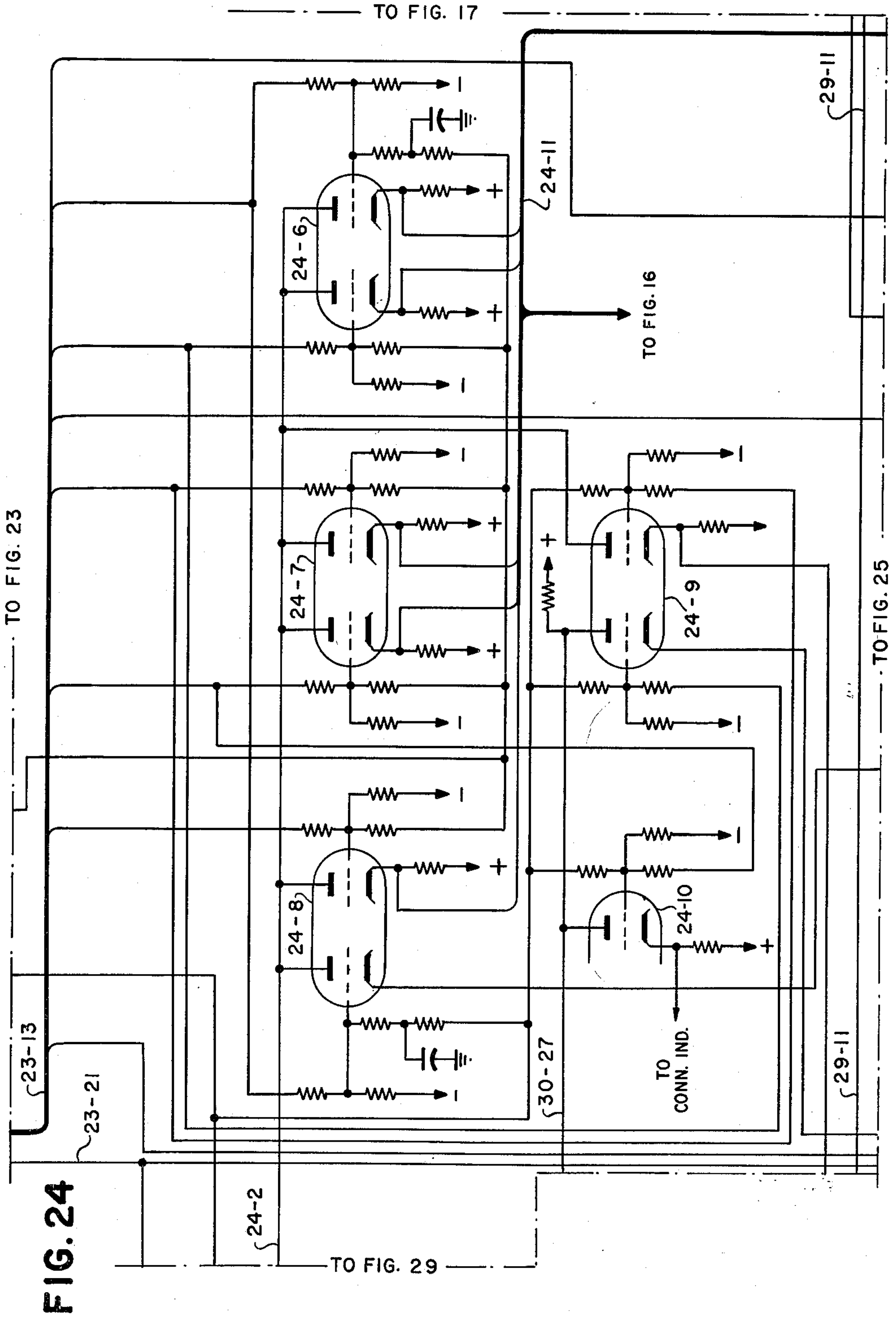
Figure 25:
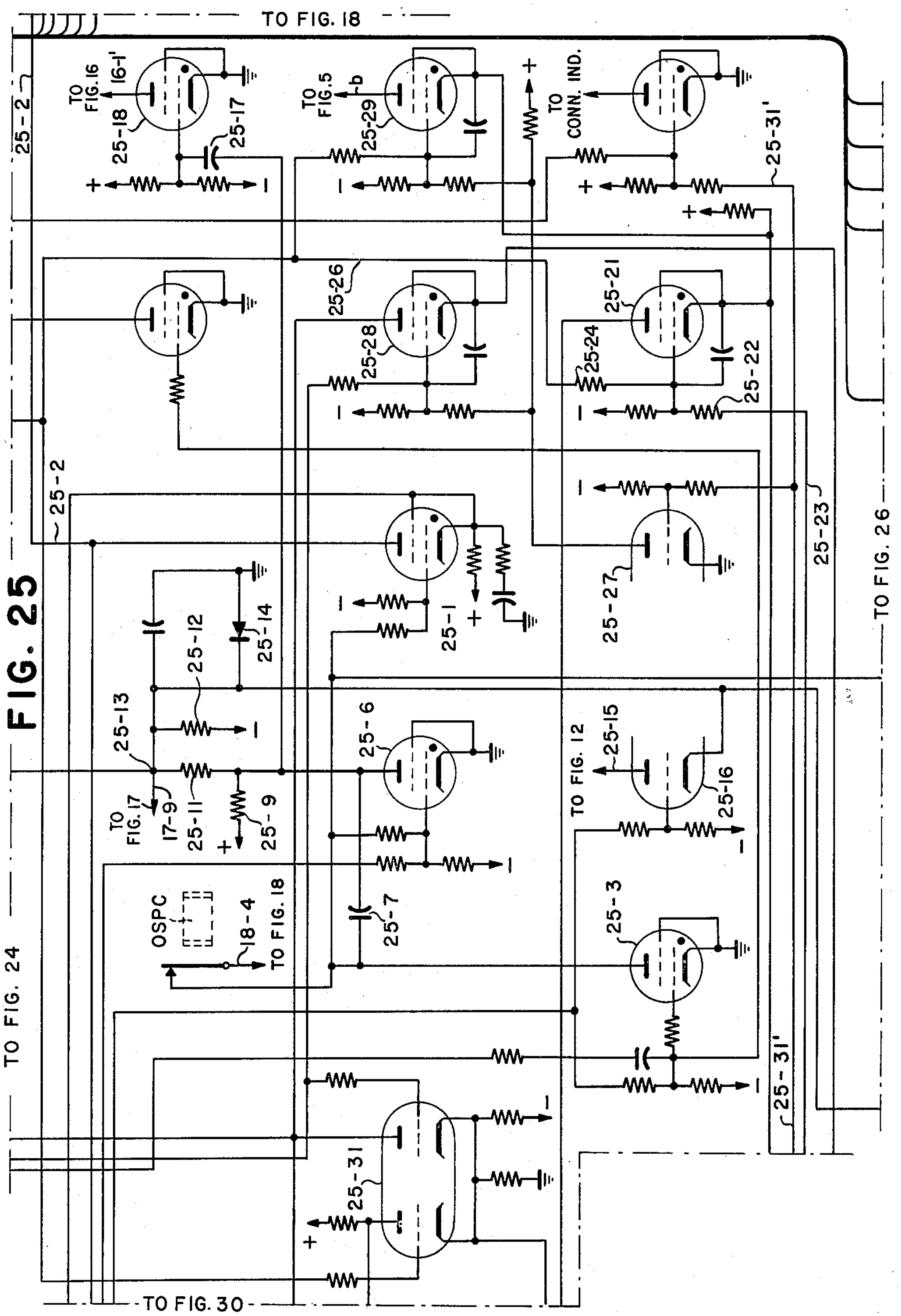
Figure 26:
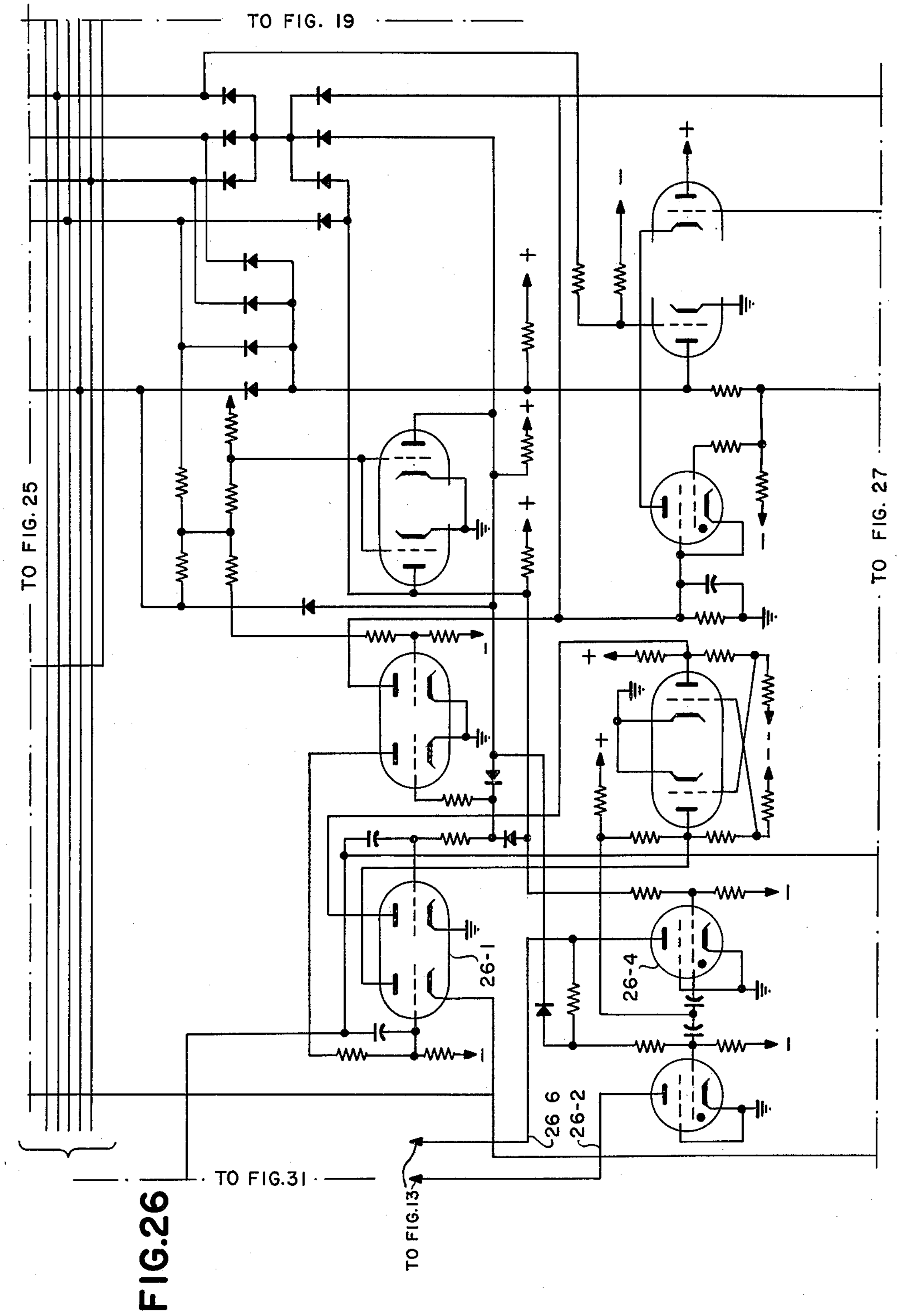
Figure 27:
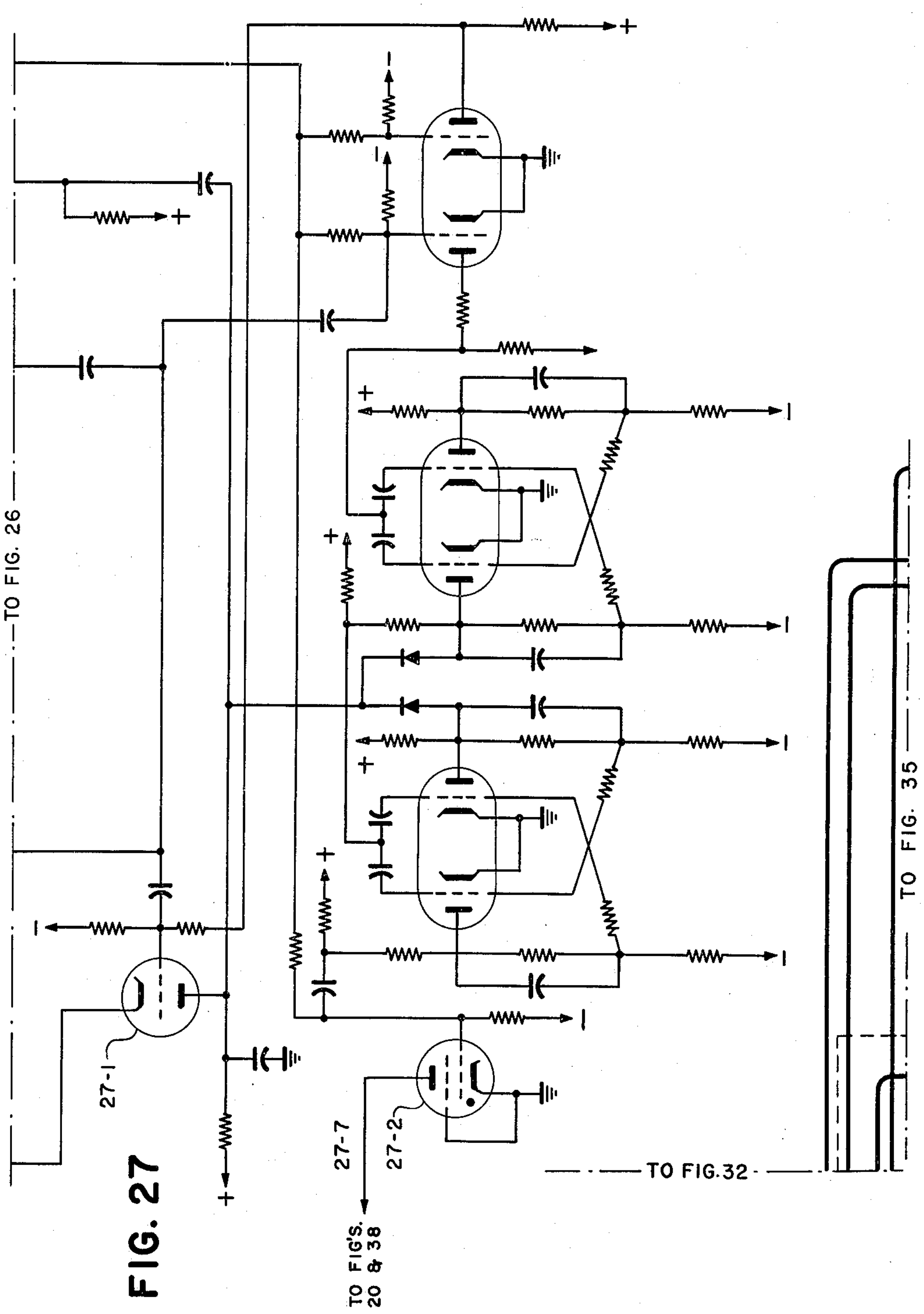
Figure 28:
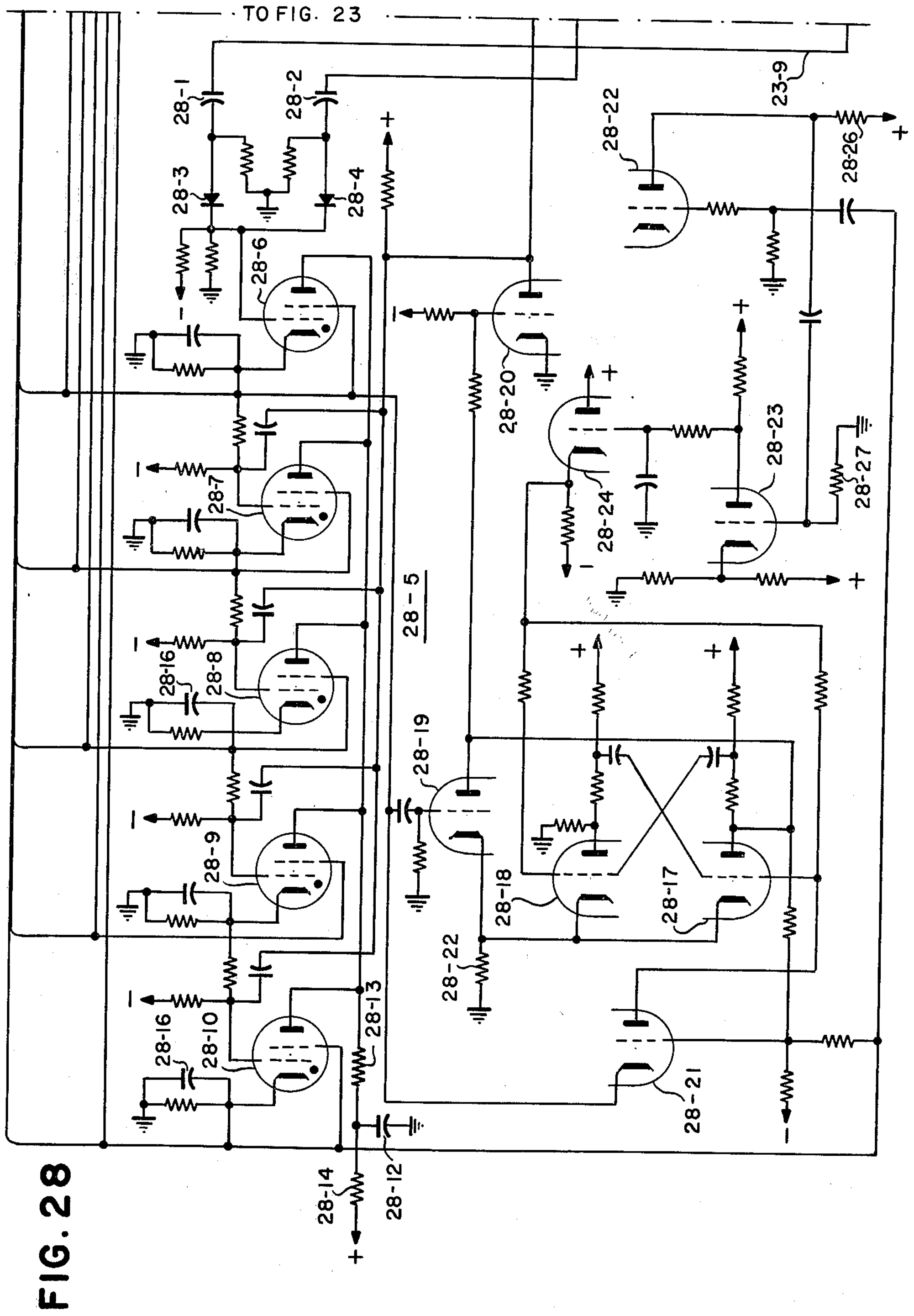

The circuits of the electronic pulse generator are shown in FIGS. 23 and 28 where a 60 cycle source 23–1 is fed through a transformer 23–2 to the grid of vacuum tube 23–3. The output of the cascade clipping amplifier tube 23–3 is applied to the cathode of tube 23–4 which results in a highly symmetrical square wave output which is used for triggering synchronizing pulses on both the negative and positive swings of the square wave voltage. The output of tube 23–4 is directly coupled to tube 23–6 which in turn is directly coupled to tube 23–7. The output signals from tubes 23–6 and 23–7 are identical but inverted with regard to each other and these outputs provide the gate voltages which are used to obtain the ten distributed pulses. Tube 23–6 gates the first five outputs and tube 23–7 gates the second five outputs of the ten pulses.

The outputs from the plates of tubes 23–6 and 23–7 constitute trigger pulses and are applied over conductors 23–9 and 23–11 through capacitors 28–1 and 28–2 and diodes 28–3 and 28–4 to the control grid of the thyratron 28–6. The thyratron 28–6 is the first stage of the pulse distributor ring counter 28–5 which includes four other thyratrons 28–7, 28–8, 28–9 and 28–10. The plates of the five thyratrons of 28–6 to 28–10 are connected together and returned to positive potential at 28–12 through a common resistor 28–13 of 2.7K ohms in series with a 470 ohm resistor 28–14. This connection plus the commutating capacitors 28–16 of .01 mf. connected across the cathode load resistors provide the extinction circuit for the previously fired or conducting thyratron each time one is fired. In the ring counter two conditions are necessary to trigger a thyratron. First a pedestal must be applied to the grid of a thyratron through a resistor divider that couples the output of the previously fired thyratron and secondly, a trigger pulse must be coupled to the grid from the local oscillator. The first stage of the counter vacuum tube 28–6 triggers without a pedestal on every trigger pulse from tubes 23–6 and 23–7 which are so arranged by means of the diodes 28–3 and 28–4 that only the positive pulses from the gates trigger the tubes.

In the sequence of operation the first thing that occurs is the triggering of the first stage of the counter or thyratron 28–6 on a positive synch pulse. Since the voltage across the capacitor in the cathode circuit of this thyratron cannot change instantaneously, the common plate circuit of all the thyratrons is driven momentarily to near ground potential. Assuming that the last stage thyratron 28–10 has been previously fired, its cathode potential is highly positive. Since its commutating capacitor also prevents the voltage from changing instantaneously, thyratron 28–10 sees a negative potential across its plate when thyratron 28–6 is fired. This potential remains across the tube sufficiently long to extinguish the tube, leaving only tube 28–6 fired. The extinction of tube 28–10 releases the local oscillators 28–17 and 28–18 and pulses therefrom are now coupled to the last four stages of the ring counter.

The output of the local oscillator is coupled through the start tube 28–19 and a buffer tube 28–20 to the control grids of the last four stages of the ring counter. The first tube to fire from the oscillator pulse is thyratron 28–7 which is the only one at this time having a pedestal applied thereto through the resistor divider coupling it to the fired thyratron 28–6. On succeeding pulses from the local oscillator the ring counter continues to advance one stage for each pulse until thyratron 28–10 is fired, at which time the oscillator is again stopped. If the oscillator frequency is correct, the ring counter will complete its cycle before the next synch pulse, at which time the cycle will be repeated. Thus in response to two synch pulses the thyratron ring counter 28–5 operates through two cycles and in so operating generates ten distributor timing pulses.

The frequency of the local oscillator must be exactly ten times the synchronizing frequency in order to obtain five evenly spaced pulses from the ring counter on each half cycle of the synchronizing frequency. The oscillator tubes 28–17 and 28–18 are arranged as a free running multivibrator that is started and stopped from the control of the ring counter 28–5 in cooperation with the start tube 28–19 and a stop tube 28–21. The cathodes of the oscillator tubes are connected through a resistor 28–22 to ground which biases the tubes to cut-off when the grids thereof are at ground potential.

This arrangement provides for stopping the oscillator by applying ground potential to the grids thereof through tube 28–21 when it is made to conduct. The latter tube conducts only when the cathode of thyratron 28–10 in the ring counter is positive and when tube 28–17 is cut off. Either condition by itself cannot stop the oscillator. Starting of the oscillator would normally occur when thyratron 28–10 is extinguished except that the grid of tube 28–17 rises exponentially to conduction. This conduction would cause delay in the starting of the oscillator and to overcome this condition tube 28–19 is used to trigger tube 28–17 immediately on the start pulse. This occurs when thyratron 28–6 conducts on the synch pulse, since the same positive pulse is coupled to the grid of tube 28–19 causing it to conduct. The latter tube is connected across tube 28–17 which causes its plate potential to swing negative on the start pulse. The negative swing is coupled to the grid of tube 28–18 causing it to cut off. The positive swing of tube 28–18 is now coupled to the grid of tube 28–17 thus driving it to conduction. Once this switching transient is completed the oscillator runs free until the ring counter cycle is completed. The buffer tube 28–20 prevents loading of the oscillator and is used to couple the oscillator pulses to the ring counter.

The frequency of the oscillator is controlled by changing the grid return potential of both tube sections thereof. This voltage is applied through a correction network which selects the proper operating voltage to effect the correct oscillating frequency. This network includes an inverter and potential reference tube 28–22, a feedback amplifier tube 28–23, and a buffer tube 28–24 which supplies the grid operating potential to the oscillator. The signal that is applied to the inverter tube 28–22 is the positive rest pulse from the ring counter which should be one-fifth the width of the total period thereof. At the output of tube 28–22 these signals appear as negative pulses of the same period and also the voltage swing is nearly equal to the plate supply voltage of 150 volts because of the large plate resistor 28–26 of 470K ohms in the circuit. The average voltage level of this signal is down 30 volts from the positive extreme. By capacitatively coupling this signal to the grid of tube 28–23 and returning the grid to ground through a 10 megohm resistor 28–27, the signal appearing at the grid of tube 28–23 will be 30 volts positive at the most positive extreme. This is true because the averaging effect of the coupling capacitor and because the average level is fixed at the ground potential by the return of the grid resistor to ground. Should the width of the sampled pulse vary, the average level will shift and the positive extreme will rise or fall depending upon whether the pulse becomes wider or narrower. The sample pulse becomes wider when the oscillator frequency is too high and narrower when the frequency is too low. The amplifier tube 28–23 is a high gain tube and is either fully conducting or cut off on a small change of signal. Thus an incremental change of grid voltage above the cathode potential causes the tube to fully conduct and an incremental change of signal below that of the cathode potential completely cuts off the amplifier.

The output of the amplifier tube 28–23 is filtered and coupled through the tube 28–24 to the grids of the oscillator tubes and normally would cause a very large shift in the oscillator frequency. However, by biasing the amplifier tube cathode 30 volts positive, the potential applied to the amplifier grid is the same as the positive extreme of the error sampling pulse. The time constants of the oscillator circuit are selected so that the proper operating voltage for the grids lies somewhere between 150 volts positive and 30 volts positive, the two extremes that the feedback amplifier can assume. Since a slight change in the oscillator frequency from the correct frequency would cause a shift in the sampling signal, the amplification of this signal would cause the grid voltage of the oscillator to change and thus produce a considerable change in the oscillator frequency in the direction opposite to that which caused the error. Equilibrium is established and the correct operating voltage applied to the oscillator to derive the proper width for the sampling pulse. The cathode bias of tube 28–23 determines the width of the pulse effected by correction and it also determines to the greatest extent the accuracy of the correction.

*Detector pulse forming*

The pulse generator of FIGS. 23 and 28 also generates the ten detector pulses and they are derived by gating the outputs from tubes 23–6 and 23–7 with the five outputs of the ring counter 28–5 and an output from the local oscillator. The gating takes place in the two halves of tube 23–12. Three conditions are necessary to obtain the positive detector pulse output. The first condition is that the plate output from either half of ube 23–12 must be near ground potential. The second condition is that a negative pulse from the oscillator must drive either half of the tube 23–12 to cut-off which occurs only when both of the above conditions occur at the same time. Coincident with the cut-off of the tube, one of the five pulses coupled from the ring counter must be positive for the third condition. All of these three conditions are met one at a time in sequential order and the correspondingly generated ten detector pulses are applied to the ten output leads numbered 7 to 16 of cable 23–12. Only detector pulses 8, 9 and 10 or those applied to leads 14, 15 and 16 are employed by the electronic transmitter at the line receiving position, the others being employed at the line sending position.

Included in the pulse generator is a pulse generator failure detection circuit which includes a thyratron 23–14 which is normally biased at cut-off during proper operation of the generator. The signal that is coupled to the grid of thyratron 23–14 consists of a pedestal applied from the plate output of tube 23–6 and a capacitive coupled synch pulse from the last pulse detector output. Normally, the synch pulse occurs only when there is no pedestal and the tube is not triggered. Only when the ring counter runs wild will the synch pulse coincide with the pedestal at some point causing thyratron 23–14 to fire. Thus when such a failure occurs, the conducting tube grounds out tube 23–6 which is the trigger tube for the frequency divider. The firing of tube 23–14 also lights lamp 23–16 to call the attention of an attendant. A reset button 23–17 is provided for extinguishing the tube 23–14 when the trouble is corrected.

*Delegation of pulse functions*

The electronic transmission and reception on a single cross office conductor as employed in the present system involves the keying of any ten designated signal pulses which are transmitted in rotational order. As employed herein the complete pulse sequence of ten pulses requires 16⅔ milliseconds and each pulse is assigned a definite function. The pulses are numbered in reverse order 10 to 1 and the last six pulses comprise the character selection group. The first three pulses numbered 10, 9 and 8 are control signals and are transmitted at the 60-cycle rate while the last seven are transmitted at the rate of twenty per second or one group for every three of the pulses 10 to 8. The transmission of the character selection group twenty times per second corresponds to the rate of 200 words per minute.

As will be more apparent hereinafter in the detailed description of some of the circuits, the No. 10 pulse, or the first one transmitted, is a character-check pulse and is only transmitted in one direction, from the cross office line sending position to the line receiving position. The reception of this pulse at the line receiving position following the transmission of the numbering machine step pulse, which is the No. 7 pulse, indicates a correct check of the start of message character ZCZC ahead of the outgoing message number. As will be described this can occur only when the correct information is punched in the tape by the line sending position reperforator. The detection of the No. 10 pulse by the line receiving position initiates the next function in a transmission sequence which is the transmission of the incoming message number by a sequence number indicator unit at the line receiving position. The characters ZC ahead of this number, if properly punched by the reperforator, are acknowledged by the removal of the No. 10 pulse and the removal thereof during this part of the transmission sequence initiates the transmission of routing information and the message text from the tape transmitter. As will be pointed out the No. 10 pulse is also used to acknowledge the correct reception of the end-of-message signal at the line receiving position and to initiate a line disconnect function.

The No. 9 control pulse called the connection indicator pulse is transmitted and received by either the line sending or line receiving position. It is used as a line connection indicator and is manually keyed by a push button.

The No. 8 pulse, called the line detection pulse, is transmitted by the line receiving position whenever a cross-office line connection has been made. This pulse is used to prevent a second position from sending the line and interfering with an established connection.

When a line connection is established, the automatic message number is injected into the tape at the line sending position. The No. 7 pulse is used to step the numbering machine and this pulse is removed from the line as soon as the number check is acknowledged. The remaining six pulses are the character selection group with the No. 6 being the reperforator clutch trip magnet and the other five the character selection pulses.

*Electronic transmitter*

The timing source for the cross-office electronic transmission and reception of the signal pulses is the 60-cycle A.C. voltage common to both the sending and receiving positions. FIG. 1A shows a timing chart for the line receiving position electronic unit indicating the relationship of the various operating functions. This chart shows the sequence of operation for one period of a 200 w.p.m. transmission rate or 20 characters per second which is obtained by a division of the 60 cycles by three.

The character selection pulses 6 to 1 are transmitted in a period of ten milliseconds. The local pulse for stepping the cross-office tape transmitter begins with the transmission of the No. 5 selector pulse but the transmitter does not advance the tape therein until the complete character selection has been transmitted. Control pulses are transmitted and received in sequence in the control block preceding the character selection block. The reading or probing of space, carriage return, line feed N characters and the sequence number indicator probe occurs at the start of the control signal block. This timing provides for the advance reading of some of these characters in order that channel control may be established before the character is transmitted. The director probe pulse occurs at the start of the No. 5 character selection pulse and coincident with the start of the transmitter step pulse.

The 20 character per second transmission rate is obtained from the 60-cycle source by means of gated outputs from a frequency divider. A two-stage counter which normally provides a division of four is recycled to obtain a division of three. With gating arrangements the various probing pulses and line signal pulses are timed from the counter.

Figure 29:
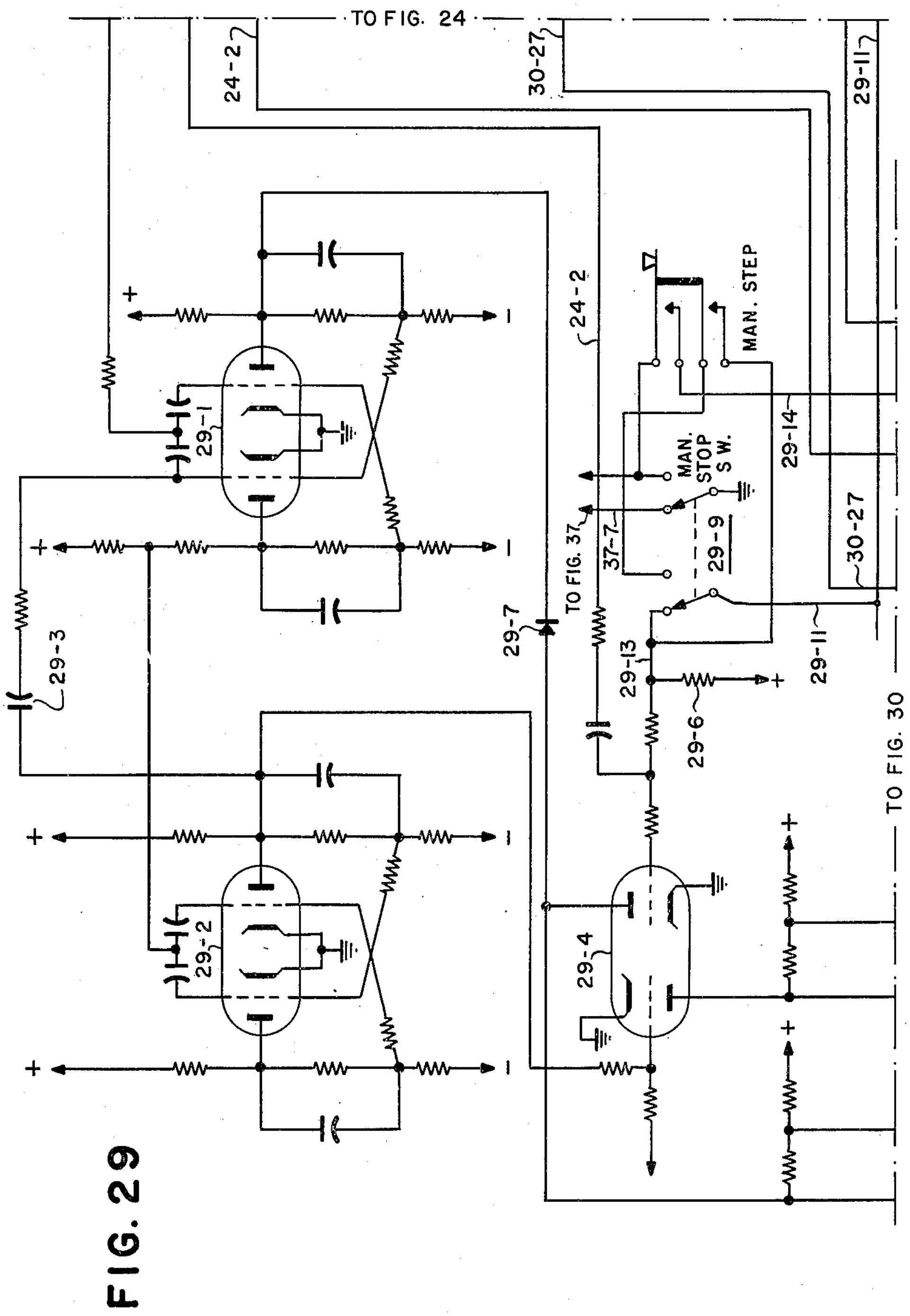

The circuitry of the frequency divider and counter are shown principally in FIG. 29 and include left and right hand sections of tubes 29–1 and 29–2. Tube 29–1 is driven by the 60-cycle square wave voltage obtained from the plate divider of tube 23–6 in the pulse generator. The counter stages trigger only on negative voltage changes when the trigger signals are of the correct amplitude. The output of the first counter stage triggers the second stage and normally provides a division of the 60-cycle frequency by four. To recycle the counter for a count of three the output from the plate of the righthand section of tube 29–2 is coupled by capacitor 29–3 to the grid of the lefthand section of tube 29–1, which is the trigger source for the second stage. Each time the plate voltage on the righthand section of tube 29–2 swings negative, forcing the grid of the left hand section of tube 29–1 to cut off, recycling occurs. The recycling pulse overrides the normal switching of the counter stage which normally switches each time a negative pulse is coupled to it from the first stage or righthand section of tube 29–1. When the plate of the righthand section of tube 29–2 swings negative, a pulse is coupled to the first stage and cuts off the lefthand section of tube 29–1, which was just switched to conduction by the same pulse that initiated the recycling. Thus the counter switches twice on a single input trigger at the point of recycling and the counter is reset after the third count instead of the normal fourth count.

The plate voltage output of the righthand sections of tubes 29–1 and 29–2 provide the necessary gate pulses for establishing the 20 character per second transmission rate. Gate pulses of 16⅔ milliseconds or equal to one-third of the total period are obtained from the counter with the recycling arrangement. The gate control wave forms are displaced from each other by 16⅔ milliseconds or one period of the 60-cycle timing source and are similar in wave shape except that one is the inverse of the other. Since all line signals are initially generated with a 60-cycle repetition rate in the pulse generator, it is necessary to select a signal group once every third cycle for the desired cross-office transmission rate of 20 characters per second. The voltage output of the right hand section of tube 29–2 is used to gate the line signals of the character selection group and one of the control pulses and this gating takes place in the circuits of tube 30–1.

The line signals are keyed by the tape transmitter or control relays through circuits hereinafter described and are coupled over conductor 24–2 to the cathode of the righthand section of tube 30–1. To the grid of this section is coupled a 16⅔ millisecond positive gate pulse from the plate of the left hand section of tube 29–4. This gate pulse is inverted with respect to the output of the left hand section of tube 29–2. Marking signals provide a ground path for the cathode of the right hand section of tube 30–1 but the tube conducts only on signals that are coincident with the positive gate pulse to the grid thereof. The coupling to the grid is through a diode 30–2 and the purpose of the diode is to isolate the plate of the left hand section of tube 29–4 from a ground which may appear through resistors 30–3 and 30–4 applied to conductor 30–6 in a manner hereinafter described normally terminating at positive battery. The ground is applied to conductor 30–6 through relay control circuits when space signals are read in the tape transmitter during certain parts of the route processing sequences. The effect of this is to suppress line transmission until certain switching functions are completed.

The plate of the right hand section of tube 30–1 is connected over conductor 30–7 in parallel to the control grids of tubes 30–8, 30–9, 31–1 and 31–2 through individual diodes 30–11, 30–12, 31–2 and 31–3. The latter tubes are referred to as the channel control tubes and their associated circuits provide a means for selecting transmitting channels through cross-office circuits to selected sending line positions in the manner hereinafter pointed out. The channel control tubes invert the line signals coming from the gate circuit of the righthand section of tube 30–1 so that marking signals become positive pulses. To select a particular channel, a ground is applied to the control lead such as 30–13 associated with a control tube, such as 30–8 for example, which terminates in positive potential through resistor 30–14. The direction of diode 30–11 together with diode 30–16 is such that the highest potential applied to the plate of either diode will prevail at the junction of their cathodes. Thus as long as the resistor 30–14 is at ground potential, the marking signal from the plate of the righthand section of tube 30–1 will cause cut-off of channel control tube 30–8. With the control lead 30–13 ungrounded, tube 30–8 remains conducting continuously thus blocking signal transmission. Similarly control leads 30–17, 30–18 and 30–19 control their respective channel control tubes 30–9, 31–1 and 31–2. The application of a ground to lead 31–3 through diodes 30–21, 30–22, 31–4 and 31–5 causes all channels to transmit. This condition prevails on the reading of a carriage return code combination in the transmitter which indicate the beginning of the transmission of the message text.

The outputs of the channel control tubes provide the proper signal wave form for line transmission but are high impedance circuits. Accordingly, the channel control tube outputs are applied to associated cathode follower tubes 30–23, 30–24, 31–6 and 31–7 which couple the signals from the channel output tubes to respective conductors of cable 30–26.

Figure 30:
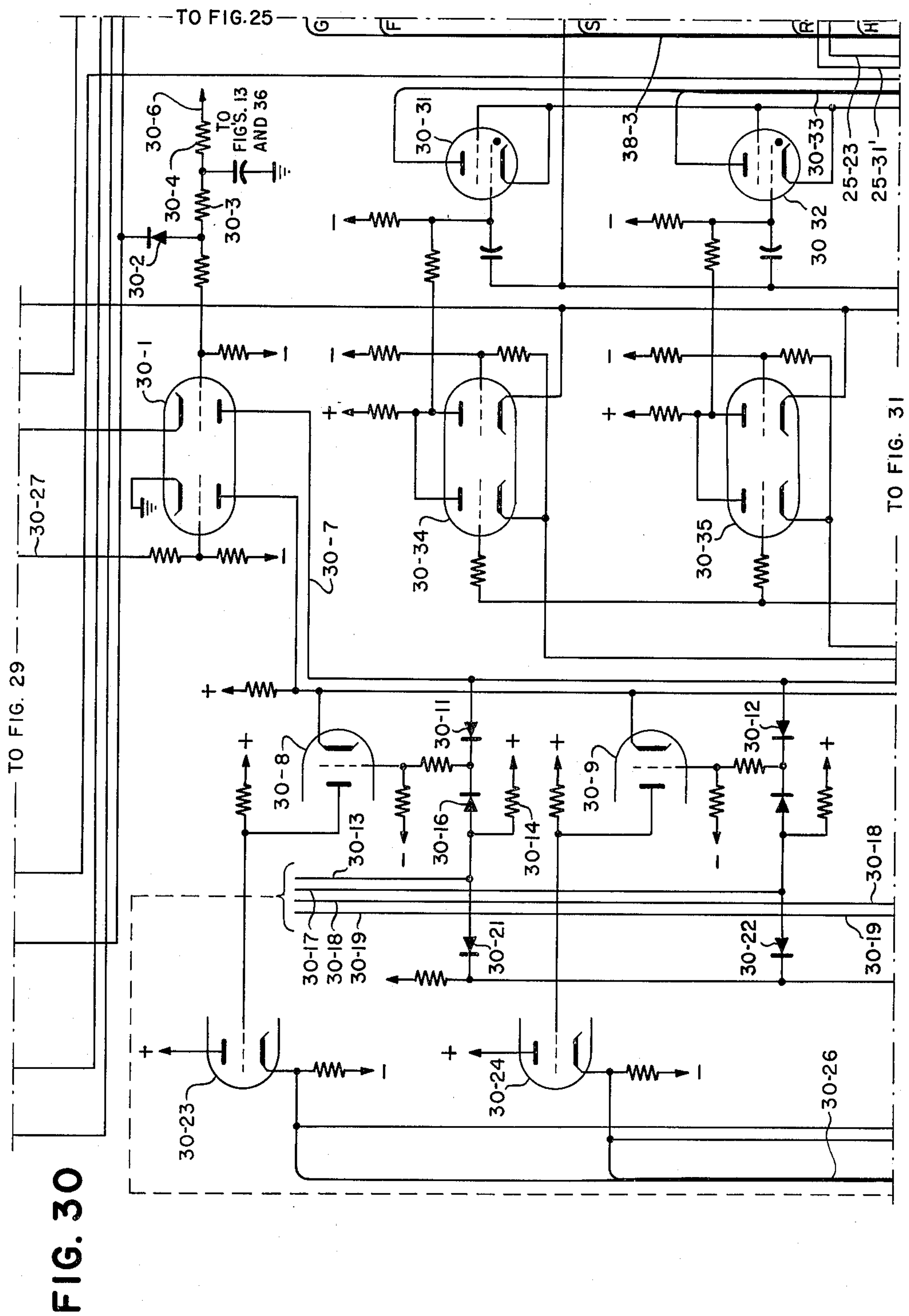
Figure 31:
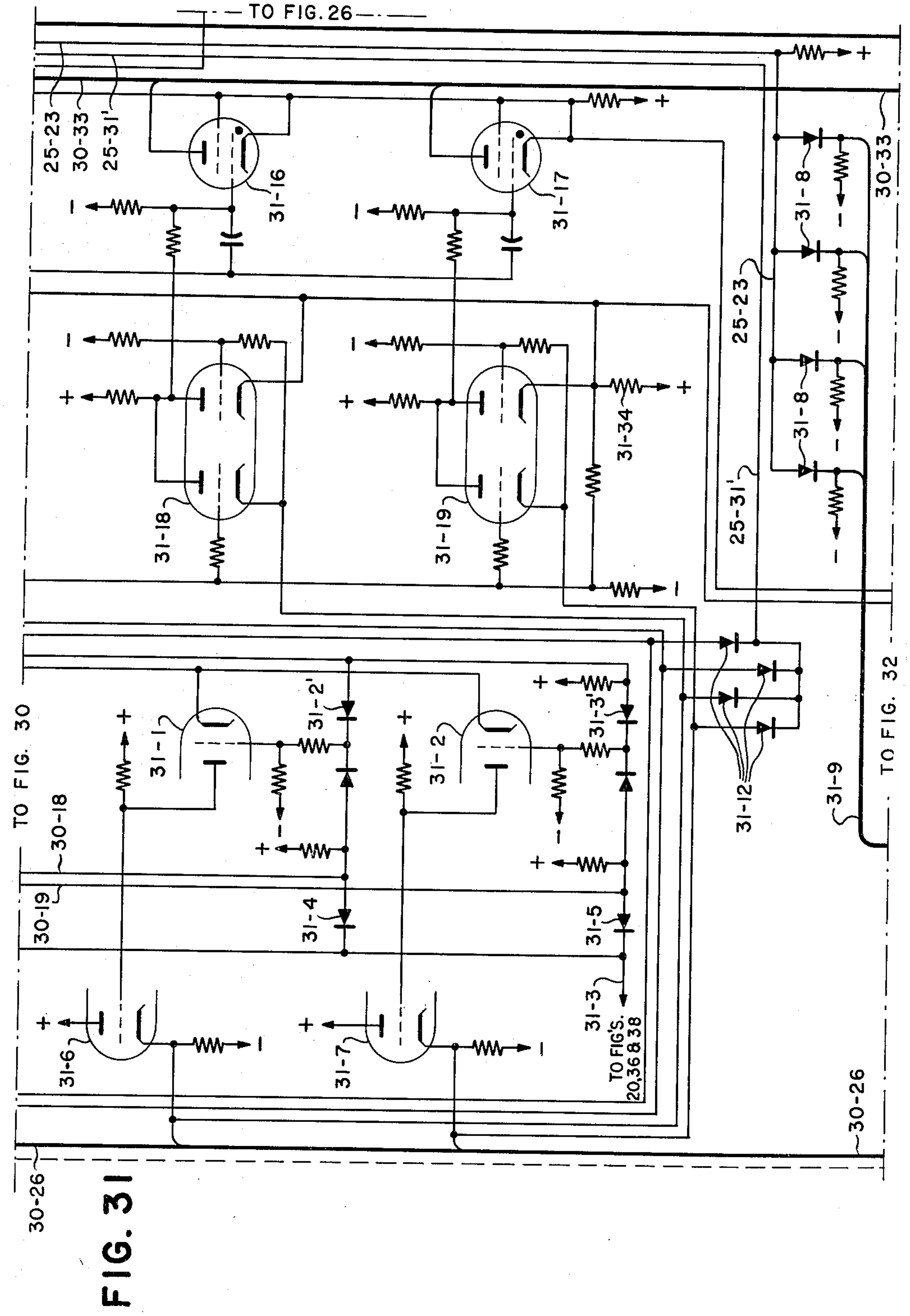
Figure 32:
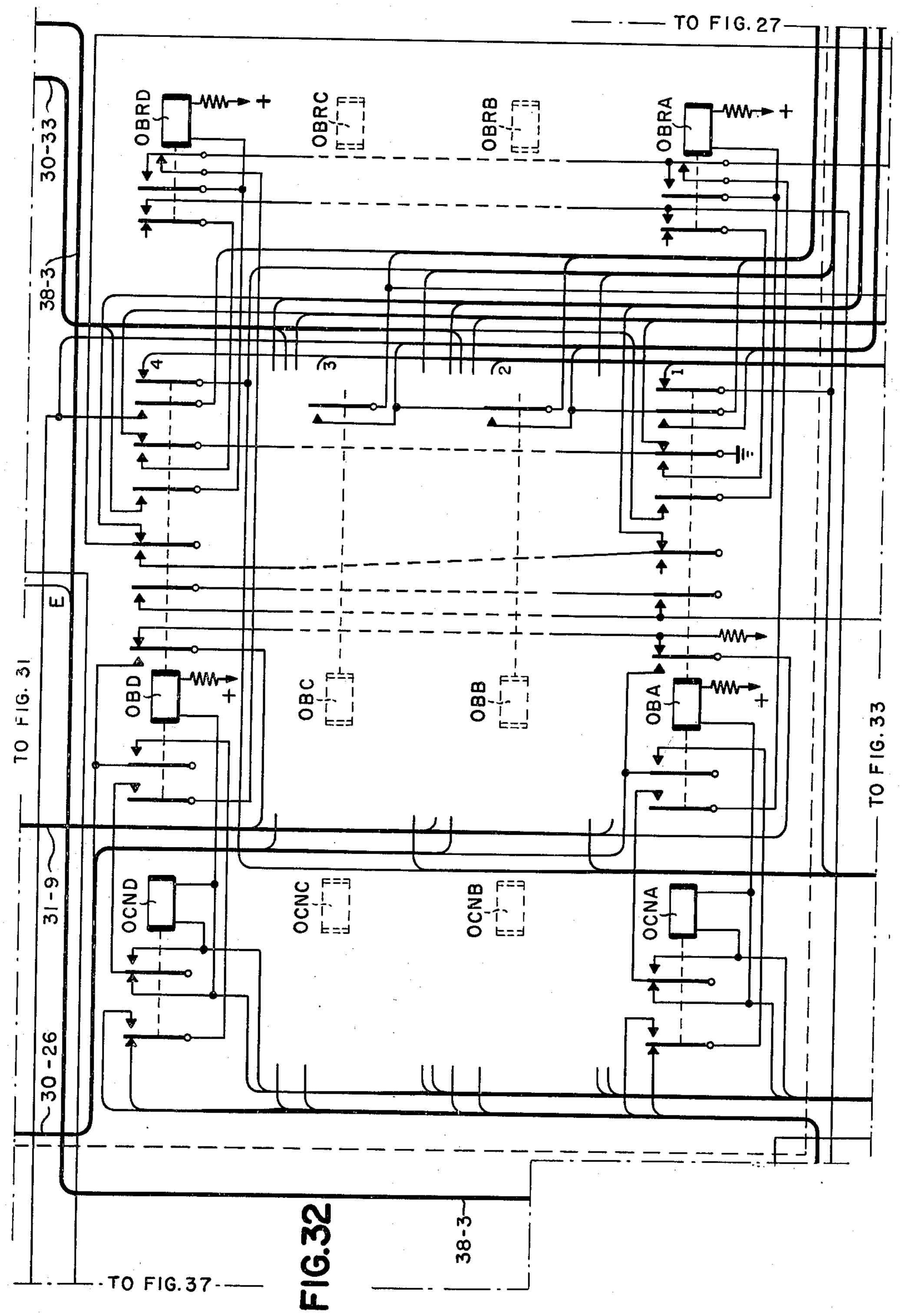

As hereinbefore pointed out, three of the ten control pulses are transmitted to the line at the 60-cycle rate while the other seven are transmitted only on every third cycle of the 60-cycle frequency. Two of the three control pulses are generated at the line receiving position, and these pulses are gated so that they bypass the channel control circuits and appear directly at the line outputs when properly keyed. As shown in FIGS. 30 and 31, the cathodes of the channel control tubes 30–8, 30–9, 31–1 and 31–2 are connected to ground through the plate and cathode circuit of the lefthand section of tube 30–1. Accordingly, the channel control tubes 30–8, etc., can conduct only if the lefthand section of tube 30–1 conducts. The keyed control signals applied over conductor 30–27 to the grid of the lefthand section of tube 30–1 cut off the tube of marking signals and hence all channel control tubes stop conducting under this condition. Accordingly, positive marking signals appear at the plates of the channel control tubes 30–8, etc., regardless of channel selection.

*Pulse combining and keying*

Before the signal pulses appear on or are applied to the cross office channels, they are keyed and combined into a single conducting channel which takes place in two stages. Initially, the pulses are gated together in two groups, pulses 1 through 7 comprising one group and pulses 8 and 9 comprising the other. Final combining of the two signal groups occurs in the channel control tubes 30–8, etc., as previously pointed out.

Tubes 24–6, 24–7, 24–8, 24–9 and 24–10 are included in the combining circuit and as will be noted, the first five conductors numbered 1 to 5 of cable 23–13 from the ring counter 28–5 are connected through appropriate resistances to the control grids of both sections of tube 24–6 and 24–7 and the right hand section of tube 24–8. Conductor No. 1 of cable 23–13 is also connected to the control grid of the left hand section of tub 24–8 and conductors 2, 3 and 4 are also connected to control grids of both sections of tube 24–9 and tube 24–10. The pulses from the pulse generator, FIGS. 23 and 28, appear on the five conductors of cable 23–13 in sequential order as pointed out and the gate pulses from the plates of tubes 23–6 and 23–7 determine which group of impulses are gated. A positive pulse from the ring counter coincident with a positive gate pulse such as from the plate of tube 23–6 for pulses 1 to 5 and from the plate of tube 23–7 for pulses 6 to 10, drives the grid of the combining section of its respective tube to conduction. For example, a positive pulse from the ring counter on conductor No. 1, combined with a positive gate pulse from the plate of tube 23–6 will drive the grid of the right hand section of tube 24–6 to conduction. Similarly, for this sequence of pulses the grid of the left hand section of tube 24–6 is driven to conduction on a pulse from the ring counter over conductor No. 2 of cable 23–13. Thereafter, the grids of both section of tube 24–7 and the right hand section of tube 24–8 are driven to conduction for the next three pulses from the ring counter at which time the gate pulse from tube 23–6 ceases and the gate pulse from tube 23–7 begins. Thus, the next four pulses on the next cycle of the ring counter are sequentially applied to the left hand section of tube 24–8, both sections of tube 24–9 and tube 24–10 to drive the grids of the said sections to conduction. Each section of the combining tubes 24–6 to 24–10 will conduct one at a time in sequence when their respective cathodes are grounded. The cathodes of the first five sections, representing the five intelligence pulses of each code group, are connected to respective conductors of cable 24–11, which normally extends to the tongues of the receiving line position tape transmitter and various relays or rotary switches to effect transmission of intelligence bearing pulses in a manner hereinafter more apparent.

The plates of both sections of tubes 24–6, 24–7 and 24–8, and the right hand section of tube 24–9 are connected in parallel over conductor 24–2 to the cathode of the right hand section of tube 30–1 and therefore a single output is obtained for the 1 through 7 pulse sequence. Similarly, the plates of the left hand section of tube 24–9 and 24–10 are connected together and by conductor 30–27 to the control grid of the left hand section of tube 30–1 to form the eighth and ninth pulse group.

The cathodes of the combining tubes are returned to positive battery through 15K resistors with the exception of the sixth pulse section or the cathode of the left hand section of tube 24–8 which is connected to an autostop control circuit hereinafter described, and the eighth pulse section or left hand section of tube 24–9 which is returned to battery through a relay circuit also described hereinafter.

Keying of the combining tubes consists of grounding the individual cathodes to transmit signals and pulses 1 through 5 are normally keyed by tape transmitter sensing pins where a ground represents a marking condition on the pins. The sixth pulse combining section derives its ground from the autostop control and the remaining control pulse sections receive their respective grounds from relay control circuits.

*Tape transmitter step circuit*

The arrangement and circuits have been described whereby certain characters such as the start-of-message characters ZCZC are checked as they are received on the printer perforator 3–13. Other parts of the message such as the sequence number are checked in the associated tape transmitter where also the destination indicating characters and routing information is detected. Obviously these latter parts are checked after the information is perforated in the tape. The tape 3–14 issuing from the printer perforator feeds to the tape transmitter such as 18–1. The transmitter 18–1 includes a set of contacts 18–2 which are operated in various combinations in accordance with the transverse row of perforations in the tape directly over the sensing pins of the transmitter. A step magnet SM advances the tape in conjunction with each cycle of operation. The tape transmitter 18–1 has also associated therewith a so-called loop gate whereby certain sections of the message may be brought into registration with the sensing pins a plurality of times. This particular phase of operation of the transmitter will be pointed out more fully hereinafter and the loop gate may be arranged in accordance with the loop gate disclosed in Patent No. 2,816,161, issued December 10, 1957, and which is made a part hereof by reference.

Actually the tape transmitter 18–1 is located in close proximity to the printer perforator so as to keep the length of tape between the two units at a minimum during tight tape conditions and it will be understood that the tape 3–14 is continuous from the printer perforator to the transmitter. It will also be understood that there is provision for the formation of a tape storage loop between the two units with an autostop tape lever 2–16, riding the tape and operating contacts in accordance with tight and loose tape conditions.

In order to properly key the character selection pulses set up by the tape transmitter, a fixed time relation is required between the transmission of the pulses and the stepping of the tape transmitter. The tape step circuit is also provided with an electronic autostop circuit for precise autostop control.

The circuit for the step magnet SM of the tape transmitter 18–1 is from potential through the coil of the step magnet, conductor 18–4, back contacts of relay OSPC to the plate of the step thyratron 25–3. The step thyratron is fired when a positive gate pulse from the plate of the left hand section of tube 29–4 is coupled through a resistor voltage divider to the grid of the step tube coincident with a capacitively coupled positive synch pulse over conductor 23–21 from the plate of tube 23–6. In order to extinguish the step thyratron 25–3, the so-called knockout thyratron 25–6 is employed and coupled to the plate of the step tube through a capacitor 25–7 of one microfarad capacity and the two tubes are arranged in such fashion that the firing of one thyratron couples a negative pulse to the other. The negative pulse drives the plate of the previously fired conducting tube negative with respect to the cathode and remains across the tube long enough for the tube to deionize. The knockout thyratron 25–6 receives a trigger pulse 12⅔ milliseconds following conduction of thyratron 25–3 and hence provides a 16⅔ millisecond step pulse. The trigger pulse for the knockout thyratron is from the right hand section of tube 29–4.

The knockout thyratron 25–6 also serves as the autostop control tube. The triggering of this tube 25–6 is subject to keying from various autostop control circuits hereinafter described. To fire the step thyratron 25–3 and cause stepping of the transmitter 18–1, a ground must be applied to the 15K marking resistor 29–6 in the control circuit of the right hand section of tube 29–4. This ground removes the positive bias to the grid of the tube through the resistor divider. A negative pulse from tube 23–7 of pulse generator is capacitively coupled to the grid divider and cuts off the right hand section of tube 29–4. The grid of the tube can not be driven to cut off with positive bias. The positive synch pulses appearing at the plate of the right hand section of tube 29–4 are 60 cycle pulses and are gated with the plate of the right hand section of tube 29–1 through a diode 29–7 in order to derive the desired frequency of trigger pulses for the step thyratron 25–3 or at the rate of 200 w.p.m. These pulses are directly coupled through a resistor divider to the control grid of the knockout tube 25–6 to cause stepping. Since the trigger pulses are removed from the knockout thyratron only during an auto-stop condition, the step thyratron 25–3 will remain fired and the transmitter will stop at such times with its sensing pins retracted.

In addition to the stopping of the tape transmitter 18–1 during an autostop condition or other times of inactivity of the tape transmitter, other electronic circuits must be disabled in order to prevent improper operation. During an autostop condition, the No. 6 selector pulse must not be transmitted to the line. Also the character read reset, the sequence number indicator and the director probing hereinafter described, must be stopped. The control for the No. 6 selector pulse, the character read reset pulse and the sequence number indicator probe pulse is derived from the plate circuit of the knockout thyratron 25–6 through a gating network. The plate of the knock-out thyratron 25–6 is connected through a 1.5K resistor 25–9 to positive potential and through a resistor divider network comprising resistors 25–11 and 25–12 to negative potential. By this arrangement a point of negative potential with respect to ground is obtained when the knock-out tube 25–6 is conducting and a positive potential of approximately 50 volts prevails at the point when the tube is cut off. This potential point indicated by reference numeral 25–13 is clamped to ground through diode 25–14 when the voltage attempts to go negative. Hence the voltage at point 25–13 is at ground potential or approximately 50 volts positive. This point is also connected to the cathodes of vacuum tubes 25–16, 27–1 and the left hand sections of tubes 26–1 and 24–8. With the control point 25–13 at ground potential these tubes function normally to provide keying of the No. 6 selector pulse, the sequence number probe pulse, and character reset functions. When the control point goes positive, the tubes having their cathodes connected thereto are biased to cut off and accordingly cease functioning.

During the normal stepping of the tape transmitter tube 25–6 is conducting for all but 16⅔ milliseconds of the step cycle and its operation is timed such that its conduction overlaps the various probe functions. In an autostop condition the knock-out tube 25–6 remains non-conducting and hence various probe functions cease until the tape transmitter resumes stepping operations. The stopping of the director probe pulse is effected by driving a capacitively coupled output from the plate of tube 25–6 through condenser 25–17 to the control grid of the director probe tube 25–18. A trigger pulse is coupled to the grid of tube 25–18 only when tube 25–6 goes from conduction to cut-off. As long as the latter tube does not change its state, the director probe tube 25–18 will not be triggered which is the situation that prevails during an autostop condition.

*Control circuits*

A number of alarm and control circuits are employed in the operation of the system to insure proper functioning of the various equipments. These circuits include an arrangement for the acknowledgment of check signals from every line sending position that is connected to a particular line receiving position. The acknowledgment of a check signal is necessary in order to complete certain functional operations in the transmitting sequence. In this connection separate gate circuits are employed for the detection of the presence of check signals and for the detection of the absence of check signals. Either of such signals when properly checked will cause the firing of a thyratron in a relay control circuit as will be apparent hereinafter.

The circuit for detecting the presence of the No. 10 pulse, which as pointed out is a character check pulse, includes thyratron 25–21, and this check pulse is transmitted from the line sending position or positions back to the line receiving position such as the one presently being described. One connection to the control grid of the thyratron 25–21 is through resistor 25–22 and conductor 25–23 to the common connecting point of a set of four diodes 31–8 and through the same to individual conductors of cable 31–9. The cable 31–9 extends to the route selection and control equipment shown in FIGS. 32 to 39 where, as pointed out hereinafter, a signal appears on the respective conductor of cable 31–9 when it is connected to a line sending position. When a particular channel is not in use the corresponding one of the four conductors of cable 31–9 is disconnected from the diode network. Another connection from the control grid of thyratron 25–21 is through resistor 25–24 and over conductor 25–26 to conductor 16 of cable 23–13 upon which the No. 10 detector pulse of the pulse generator is applied. In order for the thyratron 25–21 to fire, a positive line signal from the route selection and control equipment must appear across the divider network in its grid circuit, coincident with the No. 10 detector pulse. When such a condition occurs the two positive signals raise the grid voltage sufficient to fire the tube. As will appear, the firing of the tube controls a relay in a control circuit.

A so-called absence check gating circuit is employed for detecting the absence of check signals and includes the circuitry associated with vacuum tube 25–27 and thyratrons 25–28 and 25–29. The control grid of vacuum tube 25–27 is connected over conductor 25–31 to the common junction point of diodes 31–12. The four diodes 31–12 are individually connected to the four conductors of cable 30–26 leading to the route selection and control equipment of FIGS. 32–39, and are poled oppositely to the diodes 31–8. With the above arrangement signals from any one of the lines will appear at the output of the diode gate and a positive pulse appearing thereat is direct coupled to tube 25–27. Tube 25–27 inverts the signals applied thereto and such signals appear as negative pulses on the plate thereof. This plate is coupled through a resistor divider network to the control grids of thyratrons 25–28 and 25–29 which are the No. 8 and No. 10 absent detector tubes. The grids of these thyratrons 25–28 and 25–29 are also connected to conductors 14 and 16 respectively of cable 23–13 to which the Nos. 8 and 10 detector pulses are applied. The firing of either one of these thyratrons operates control circuits as will appear hereinafter.

If a line receiving position is transmitting cross-office over more than one cross-office channel and trouble develops on one or more of the cross-office channels or at an associated line sending position, it is desirable to determine which channel is in trouble and initiate a message disregard function to clear out the connected channels. For this purpose there is a message disregard control circuit which includes four thyratrons, one for each cross-office channel to which a line receiving position may be connected. These thyratrons 30–31, 30–32, 31–16, and 31–17 have the plates thereof connected over individual conductors of cable 30–33 leading to the route selection and control equipment of FIGS. 32 to 39. The firing of any one or more of these thyratrons operates one or more control relays for sending out the proper message disregard pattern. Selector circuits are keyed to set up the detection pattern for each of the check pulse sequences. The checking of the presence or the absence of pulses is selected by keying the circuits of vacuum tubes 30–34, 30–35, 31–18, and 31–19. The selection of the eight or ten pulse detector is made through vacuum tube 25–31. Vacuum tube 30–34 provides a pedestal for the detector thyraton grid 30–31 through a resistor voltage divider, and a similar vacuum tube is provided for the other thyratrons. When both sections of vacuum tube 30–34 are cut off, the grid potential of its associated thyratron 30–31 is sufficiently high to be triggered on a detector synch pulse. When the cathode of the right hand section of vacuum tube 30–34 is returned to positive potential, the signals coupled to the cathode of the left hand section thereof appear at the common plates in the same polarity. In this case the associated thyratron 30–31 will detect the presence of a line signal. By grounding the 15K marking resistor 31–34 in the cathode circuit of the right hand section of tube 30–34, the polarity of the pulse appearing at the plates of the tube in inverted. In this case the associated thyratron will trigger on the absence of the line signal. The selection of the proper detector synch pulse is made by removing grounds from the plates of vacuum tube 25–31 and applying positive potential. Both sections of the vacuum tube 25–31 are cathode follower coupling circuits with a common cathode connection for combining the outputs thereof. With the ground removed from the plate of the left hand section of tube 25–31 it couples the No. 10 synch pulse from the pulse generator section. Similarly the right hand section of this tube couples the No. 8 synch pulse when its plate is returned to positive battery. The plate of the right hand section of tube 25–31 is connected to the cathode of the left hand section of vacuum tube 24–9 of the No. 8 transmitting pulse keying section, so that the detection of a line receiving position's own No. 8 pulse is not possible since the No. 8 dectector synch pulse is selected by the removal of the same ground that keys the transmitting pulse.

*Sequence number indicator and control circuits*

A sequence number indicator which is sometimes referred to as the SNI unit and its control circuit is associated with each incoming line position and is used to detect the start of message combination to check the channel identification characters and accompanying message sequence number punched in the tape as the same passes through the cross office tape transmitter 18–1. The SNI unit with its associated control circuits is shown principally in FIGS. 5, 6, 11, 12, 17 and 18.

It will be assumed that the tape transmitter 18–1 has idled blank tape therethrough until the first character of the start of message combination or Z is over the pins of the transmitter. The first function of the SNI unit is to detect this start of message combination but before describing this operation, a brief description of the unit will be given.

The sequence number indicator itself includes a 10-level, 25-point rotary switch 6–1 and three 6-level, 10-point rotary switches 6–2, 6–3 and 6–4. The switch 6–1 is identified as the main switch and functionally a rotation of this switch is divided into two parts. The No. 1 point or stud is in its home position and in this position ciircuit connections exist for the purpose of initiating a stepping operation thereof. Studs 2 to 11 are concerned with comparing characters in the tape with preset information contained in the sequence number indicator while studs 12 to 25 are concerned with the retransmission of this information cross office. The channel identification characters are different from each incoming line and to enable these characters to be readily changed certain studs of some of the levels of the main switch are brought out and terminate in a socket 6–6. Cooperating with the socket is a plug 6–7 which is strapped to set up the particular channel identification characters required. The auxiliary switches 6–2, 6–3 and 6–4 are referred to as the digit switches, the first being the units switch, the second the tens switch and the third the hundreds switch. Each of the digit switches has an associated set of neon lamps 6–5 to visually indicate the number the incoming message should have.

Normally an incoming line from a tributary office will have only one message number series and hence only require a single sequence number indicator. However, incoming trunk circuits may require two message number series, one for high precedence messages, and the other for low precedence messages. In such cases, two sequence number indicators are required to maintain the message number sequences for the two classes of messages. Similarly, an incoming multipoint or way circuit connecting a plurality of stations to a switching center may require a separate number sequence for each such station. In the system disclosed as many as three stations may be served by a multistation circuit and provision is made in the control circuits of the SNI unit for selecting any one of three sequence number indicators. Where more than one sequence number indicator is associated with the circuit, a sequence number selection character is required and this character immediately follows a start of message combination. In the arrangement disclosed, three characters which may be used for this purpose are X, Y and Z. The sequence number indicator shown in the drawings is selected by the character X and the selection circuits for the Y and Z units are indicated.

In processing a message at a receiving position a definite sequence of operations is followed. These are controlled by circuits including a transmission sequence switch XSQ, FIG. 14, a three-level rotary switch. With switch XSQ in its No. 1 position, or with the wipers thereof in contact with the No. 1 studs, a circuit is completed from ground on the lower tongue of the master reset key 14–1 through the A level of switch XSQ and the No. 1 stud thereof, over conductor 14–2, and through the coil of relay SNIC, FIG. 18, to battery, causing operation of this relay. Relay SNIC is called the sequence number input control relay and its operation completes a circuit from the left hand movable element of the manual stop switch 29–9 over conductor 29–11 through the left hand front contacts of relay SNIC, conductor 18–3, the No. 1 stud of the B level of switch XSQ and wiper, a back contact of relay OCNR, conductor 8–1, to the right hand contact of the autostop tape lever control contacts 2–11. The above circuit is referred to as the transmitter autostop control circuit, and other connections are made thereto for autostop control purposes in a manner hereinafter apparent. Through the five inner right hand tongues and contacts of relay SNIC, the sensing pin contacts 18–2 of the tape transmitter are connected to an electronic control circuit shown principally in FIGS 12 and 18. This control circuit is for selecting any one of the sequence number indicators with which the receiving position may be equipped. In addition to the above, the operation of relay SNIC through its outer right hand tongue closes a circuit from the plate of vacuum tube 25–1 over conductor 25–2, through front contacts of relay SNIC, conductor 18–5 to the plate of vacuum tube 11–1. This circuit in a manner hereinafter apparent controls the stepping action of the transmitter 18–1.

As set forth, one side of the step magnet SM of the tape transmitter 18–1 is connected to potential and the other side is normally connected to the plate of the step tube 25–3 periodically pulsed from the pulse generator circuit, FIGS. 23 and 28. If the autostop or tape lever switch 2–11 is closed to its right hand contact, indicating a loose tape condition between the perforator and the transmitter, pulses from the step tube 25–3 will operate the step magnet to advance the tape through the transmitter 18–1.

Figure 5:
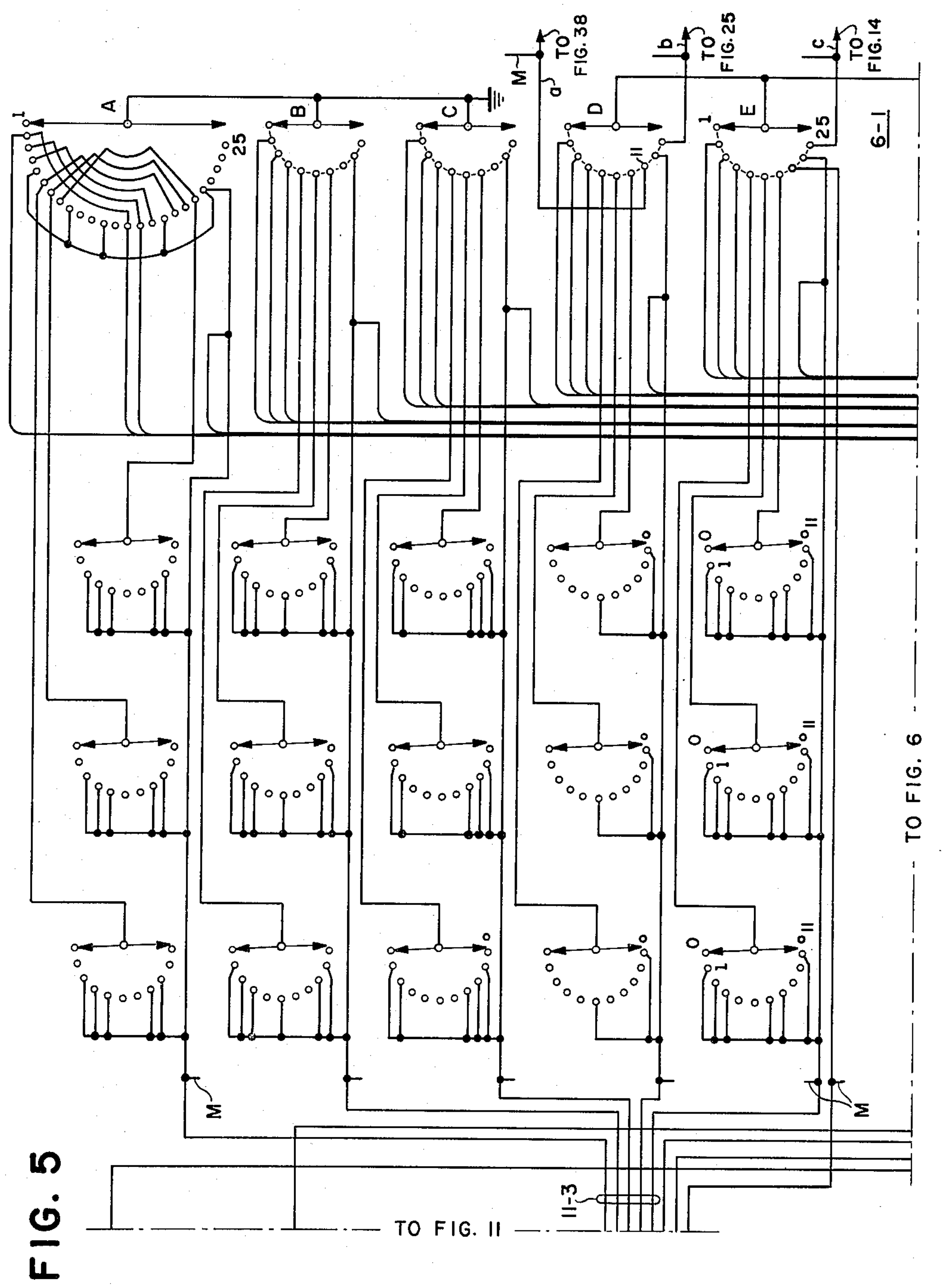
FIGS. 5, 6, 11, 12, 17 and 18 show the circuit details of a sequence number indicator and control circuits.
Figure 6:
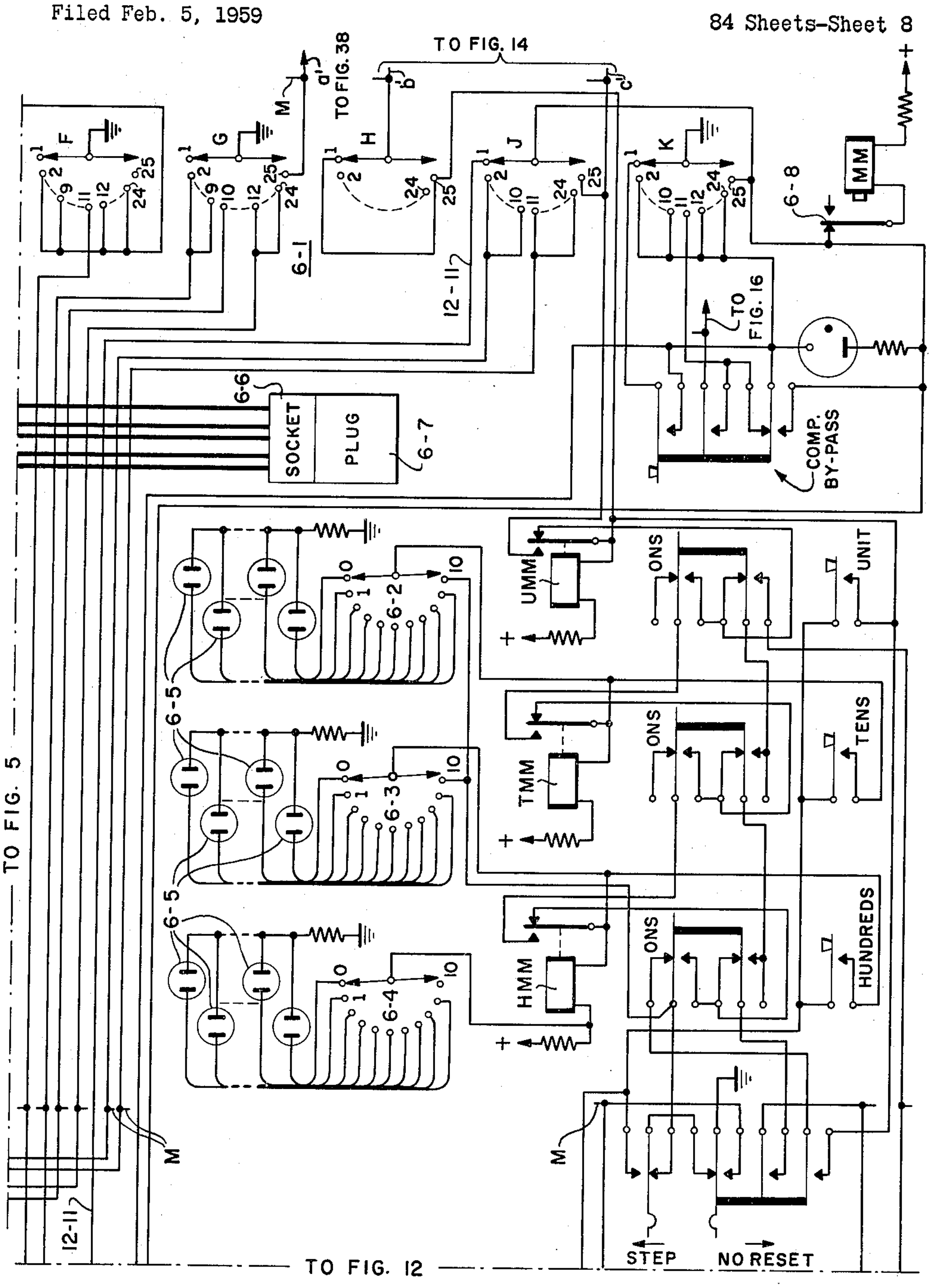
Figure 7:
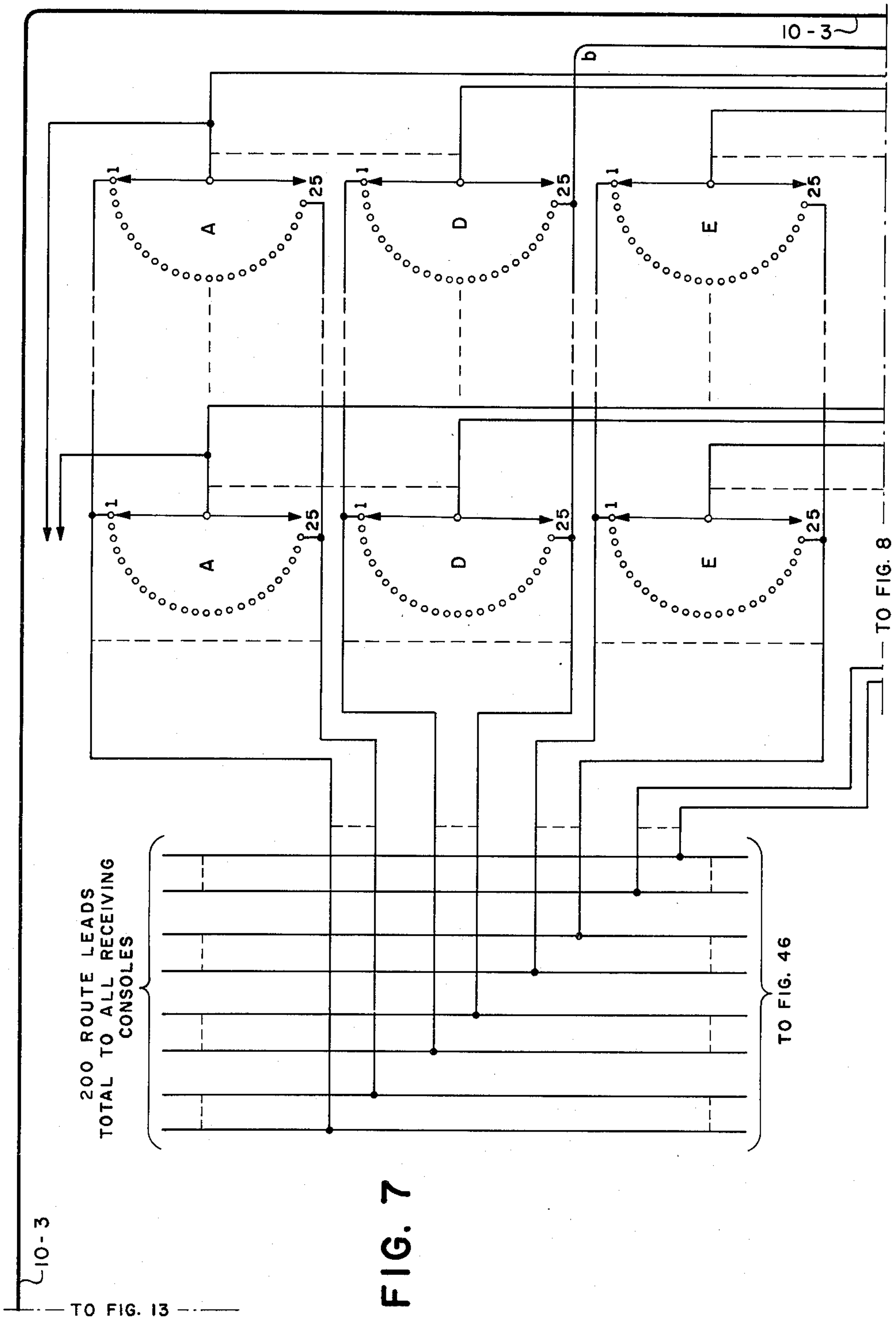
Figure 12:
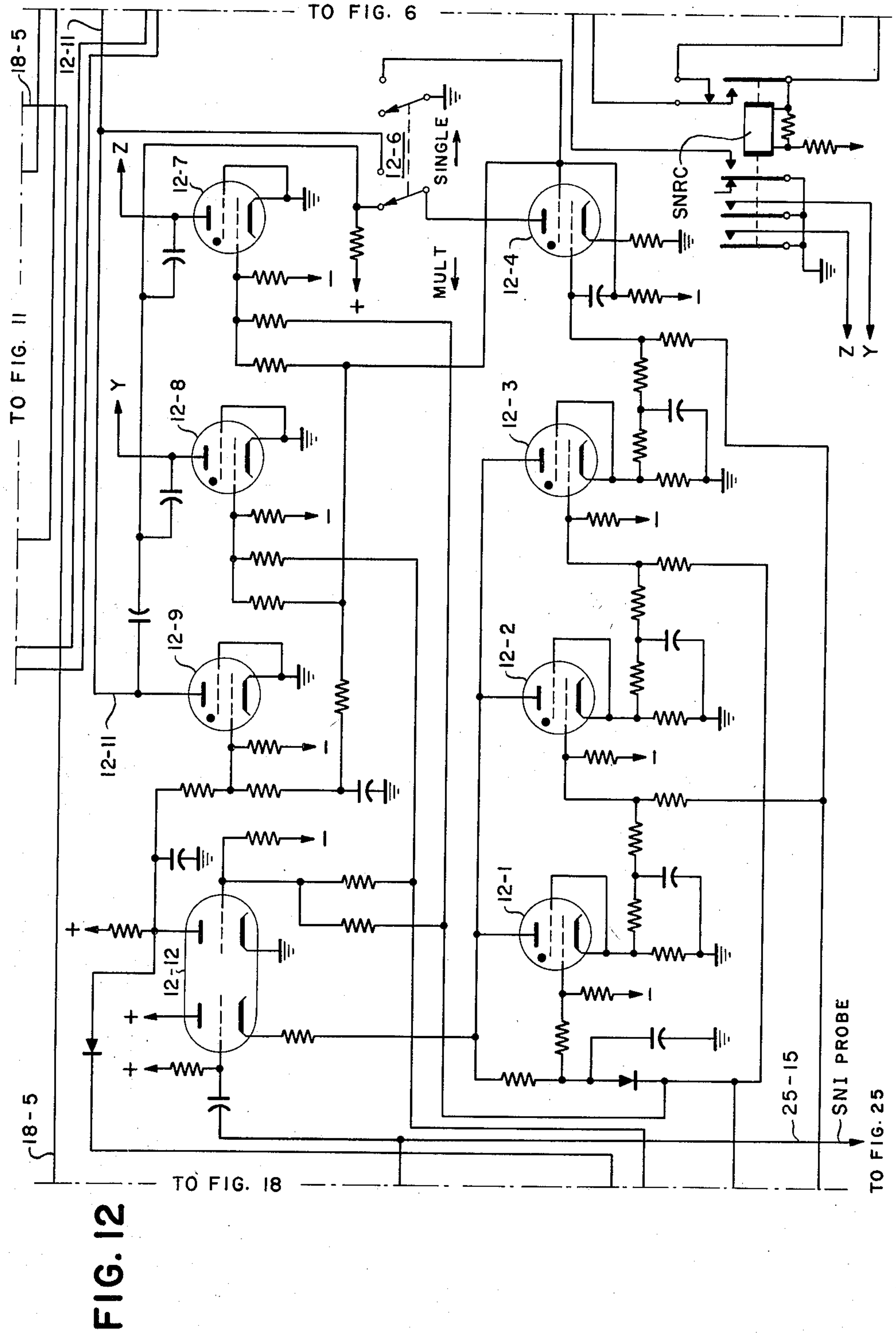
Figure 13:
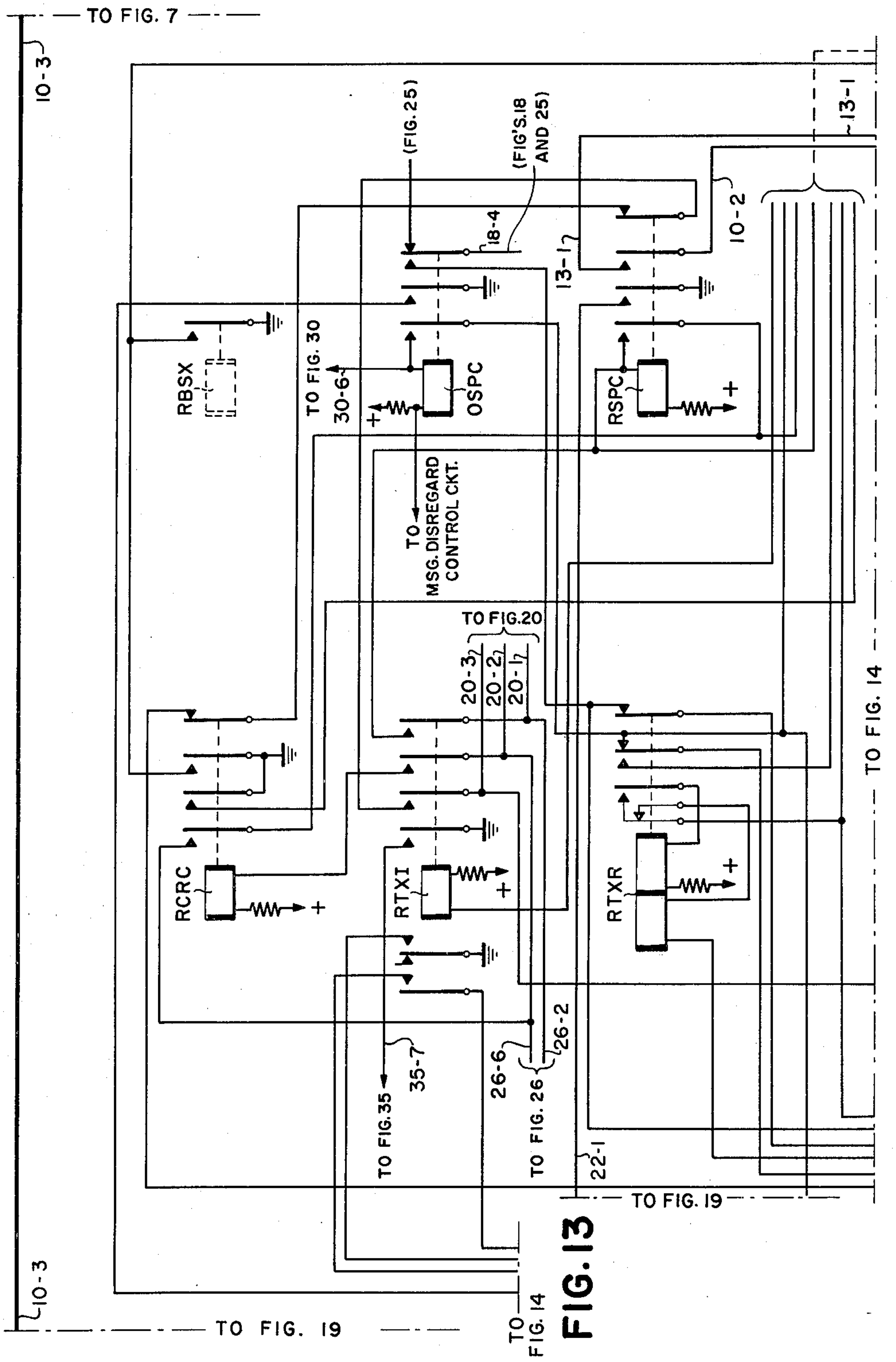
Figure 14:
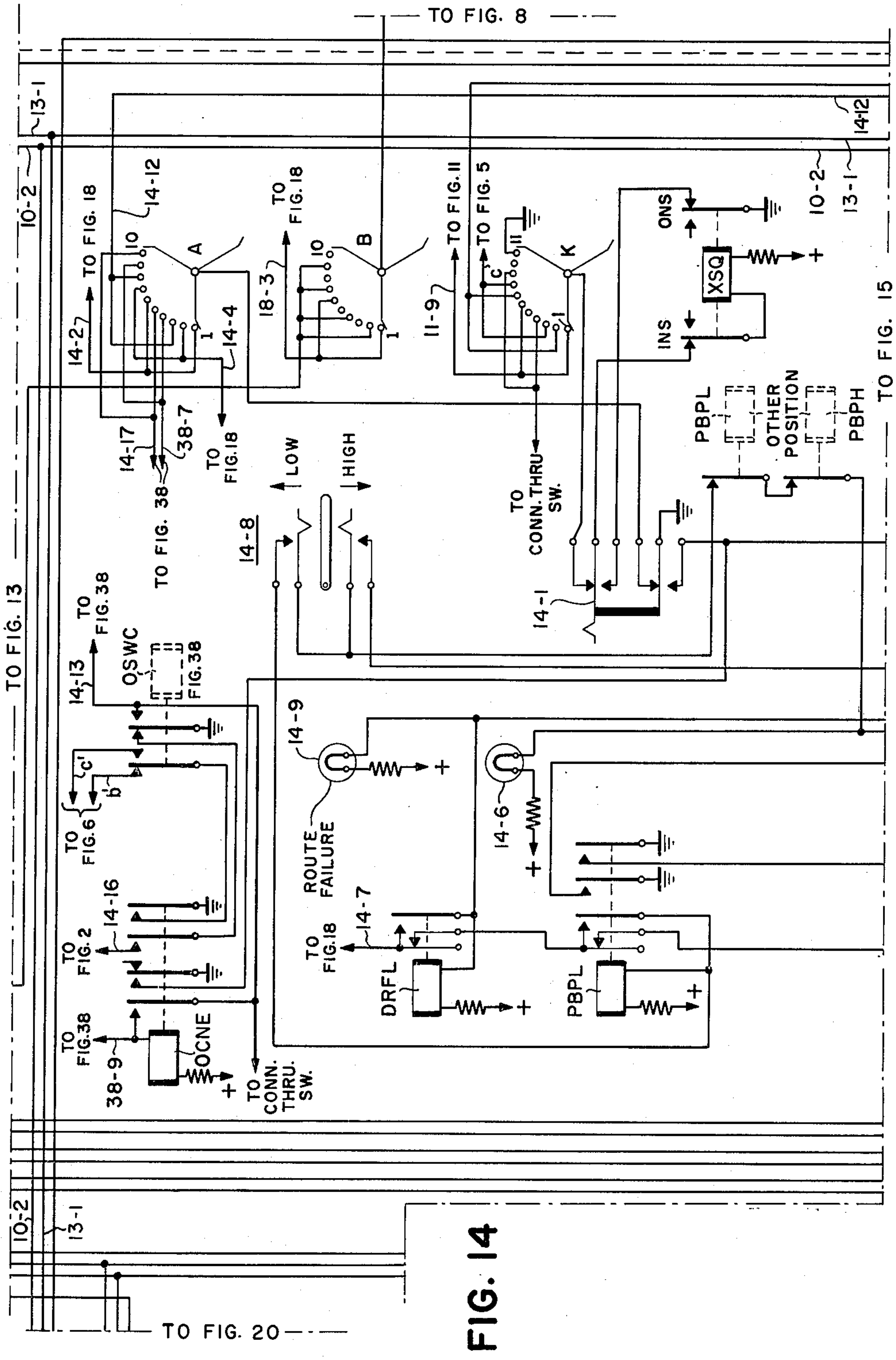
Figure 15:
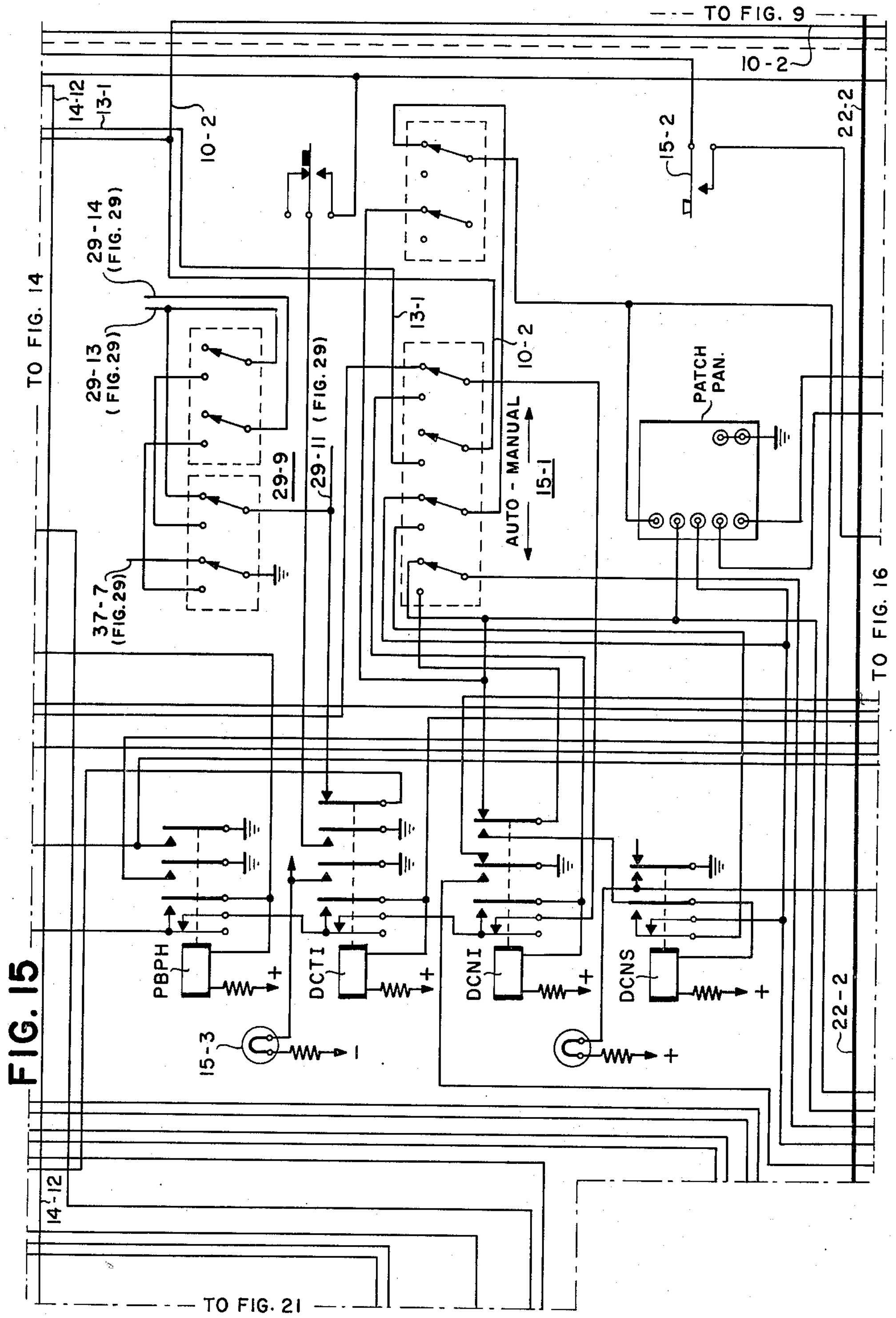
Figure 16:
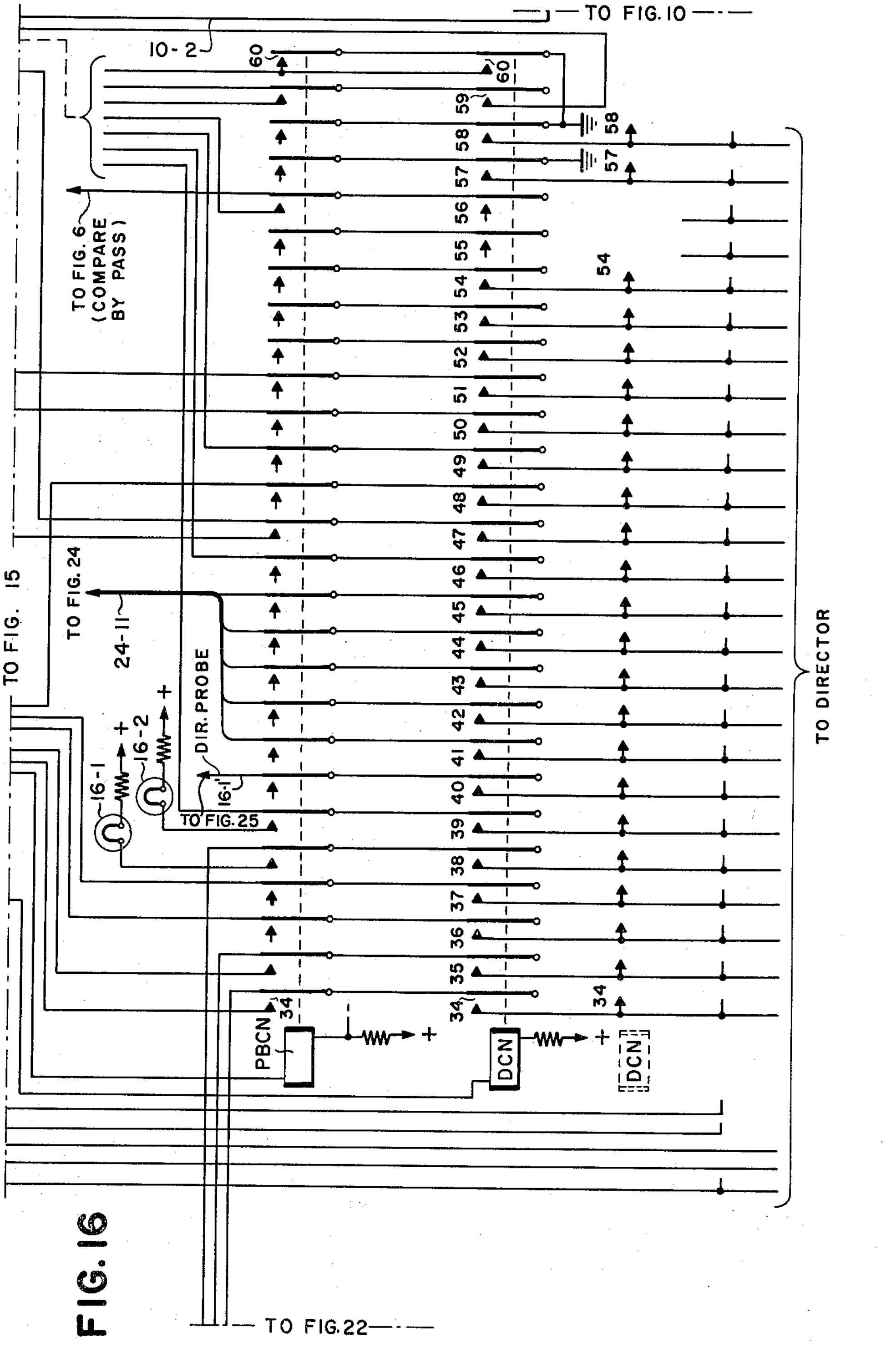
Figure 17:
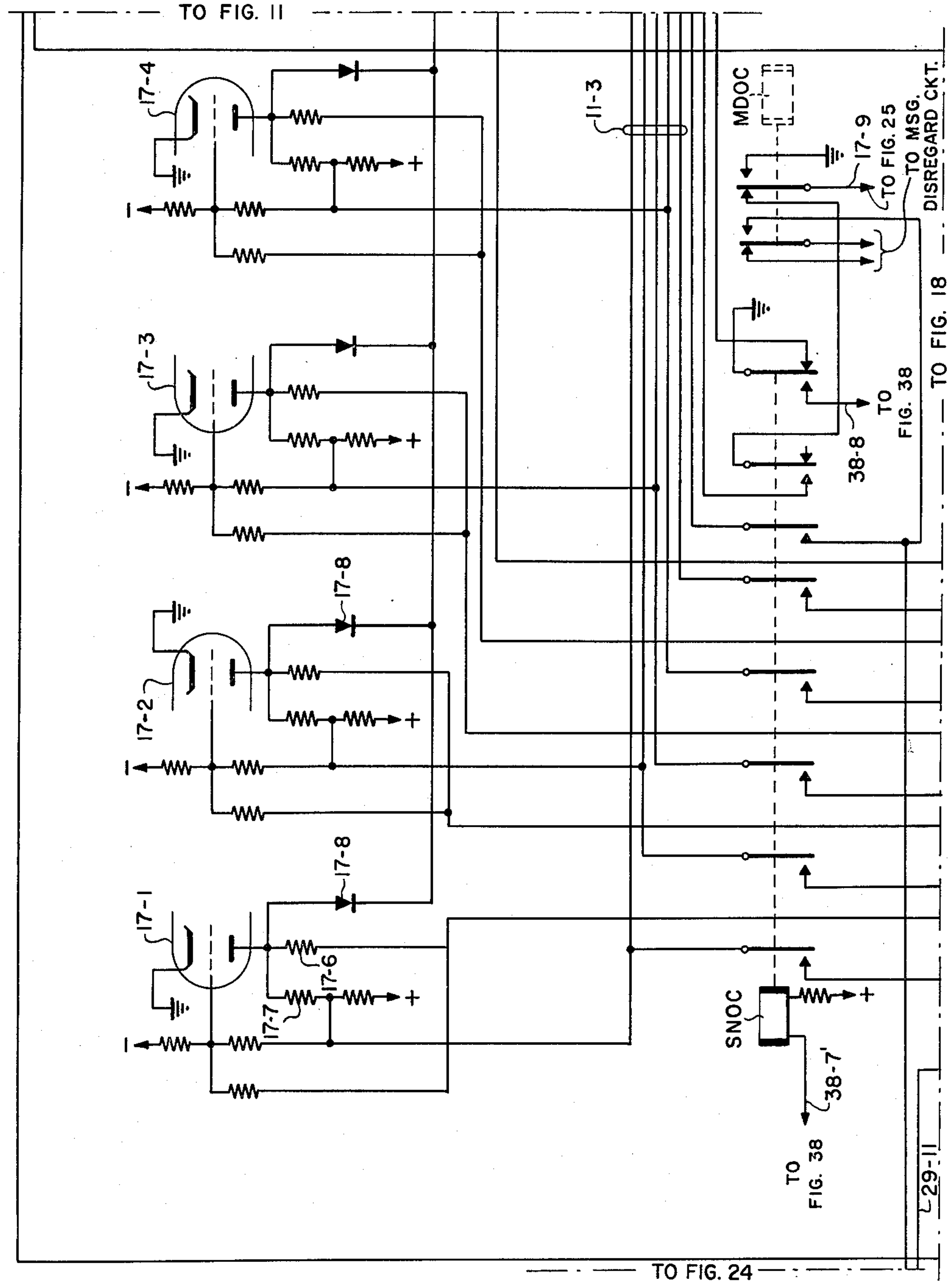
Figure 18:
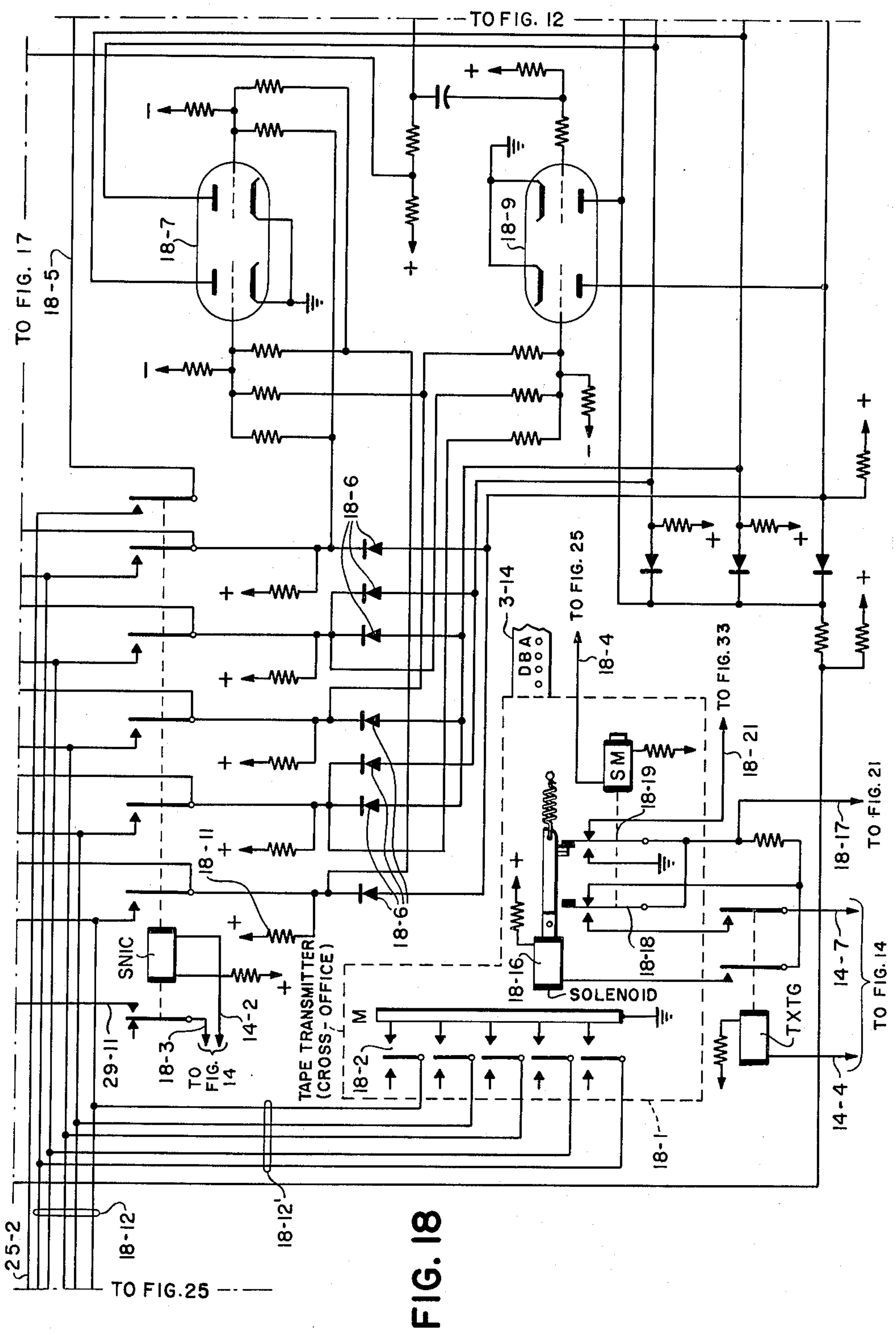

At this time the tape sensing contacts 18–2 of the transmitter are connected through contacts of relay SNIC to the electronic control circuit of FIGS. 12 and 18. This control circuit includes a set of diodes 18–6 which together with vacuum tubes 18–7, 18–9, and thyratrons 12–1, 12–2, 12–3 and 12–4 are operative to detect the complete start-of-message signal sequence ZCZC. The last four of these tubes comprise a three-stage thyratron ring counter and an output thyratron for reading the last C character. A reset tube 12–12 extinguishes the first three thyratrons when the ZCZC sequence is interrupted. When a complete start-of-message sequence is detected, tube 12–4 provides an output pulse to the left hand tongue of a switch 12–6. Switch 12–6 is a so-called multiple-single switch and in its right hand position it controls a circuit for the reception of but a single sequence number series, whereas in its left hand position the circuits are controlled for the reception of up to three separate sequences of numbers. With the switch 12–6 in its multiple position the next character following the start-of-message or ZCZC combination should be an X, Y, or Z to indicate which one of the three sequence number indicators is to be selected. If this next character is a Z, an output will be obtained from tube 12–7, if a Y an output from tube 12–8, and if an X an output from tube 12–9 or any other character except Y or Z. The sequence number indicator of FIGS. 5 and 6 is shown connected to tube 12–9 and hence it will be assumed that an X or some other character except Y or Z follows the ZCZC combination. The plate of tube 12–9 is connected over conductor 12–11 to the No. 1 point of the J-level of the main switch 6–1 of the SNI unit, the wiper of which is connected through the interrupter contacts 6–8 and the coil of the motor magnet MM to potential. Hence when a pulse is obtained from vacuum tube 12–9, the main switch 6–1 will step from the No. 1 to the No. 2 points.

Points 2 through 9 of the A to E levels of the main switch 6–1 of the SNI unit are coded in the following manner: First channel call letter, second channel call letter, third channel call letter, figure shift, sequence number hundreds digit, sequence number tens digit, sequence number units digits, and letter shift. Through switches 6–2, 6–3 and 6–4 the sequence number hundreds, tens and units digits are changed in sequential order for each operation of the sequence number unit, and as set forth the first, second and third channel call letters are brought out to the socket 6–6 to the coding plug 6–7.

When the main rotary switch 6–1 advances to the No. 2 point, the character comparison circuit is activated and a comparison circuit output thyratron then has control of the stepping of the switch 6–1 from point 2 through point 10. These points, as was pointed out, are the comparison section of the switch and during this phase of its operation the incoming channel identification characters and message sequence number perforated in the tape are compared with those in the SNI unit. This comparison is effected through five vacuum tube sections 17–1, 17–2, 17–3, 17–4 and the left hand section of 11–2, one for each transmitter pin or each element of the code groups.

Each comparison tube section such as 17–1 has two 330K plate load resistors 17–6 and 17–7. Load resistor 17–6 is returned to 120 volt positive potential through marking resistor 18–11 which is also connected to one of the transmitter sensing pins with relay SNIC operated. The other load resistors 17–7 of each comparing section is connected to strapped points on the rotary switches 6–1 to 6–4. The various connections of the SNI unit rotary switches including the plug and socket 6–7 and 6–6 respectively are such that each of the five conductors 11–3 extending between the tube comparison sections and the rotary switches have either positive or ground potential applied thereto in combinations representative of the channel identification characters and the particular sequence number of the message in the process being transmitted. Similarly, load resistors such as 17–6 have positive marking potential applied thereto or are grounded through respective tongues of the tape transmitter in various combinations depending upon the particular character perforation over the pins of the transmitter. Each pair of load resistors is coupled through a resistor divider network to the grid of its tube and the tube is made to conduct only when both plate leads are positive.

A pair of plate leads, one from the transmitter and one from the SNI unit rotary switches, can be both positive, both grounded, or one positive and the other grounded. When both are positive the tube conducts and the plate is at approximately ground potential. Therefore, when both plate load resistors are connected to the same potential, both grounded or both positive, the plate output will be at ground potential. When the voltages applied over a pair of control circuits are different, the associated tube section will be cut off and the plate output will be at the half way point or approximately 60 volts. Hence a correct comparison between the settings of the transmitter pins with the strapped points of the rotary switches results in a grounded plate output from the various comparing sections. The plate outputs from the five comparing sections are gated through diodes 17–8 and in such a manner that any one pulse not properly comparing results in the common output points of the diodes going positive, whereas on a correct comparison of all five sections, the common output point is at ground potential. The output from the comparing sections is coupled through a resistance divider to the grid of the right hand section of tube 11–2. The circuitry associated with this section allows a probing synch pulse receiver over conductor 25–15 from the transmitter control section and capacitor coupled to the divider to cut off the tube on negative pulses, only when the comparison output is grounded. The plate output of this tube consists of a positive spike capacitor coupled to thyratron 11–3 which controls the stepping of the main SNI rotary switch 6–1 other than for its first step.

At the time that the comparison circuit is activated, a wrong comparison circuit is also activated and conditioned in such a manner that if a character fails to compare correctly, the wrong comparison thyratron 11–6 is fired. The firing of this thyratron operates the sequence number wrong comparison relay SNWC which in turn light the wrong comparison lamp 11–7 and complete an alarm circuit as well as to interrupt and complete various other circuits. Among these circuits is one causing autostopping of the tape transmitter. Thyratron 11–6 is triggered on a positive probe pulse capacitatively coupled to its grid from the plate divider of the right hand section of tube 18–9, the character read probe tube. Thyratron 11–6 is only triggered by such a pulse when a positive pedestal is applied to the grid thereof from the common point connection to the various diodes 17–8.

Assuming that the incoming channel identification characters and message sequence number properly compare, the main rotary switch of the SNI unit will have advanced to its No. 10 point. Here the wrong comparison circuit is disabled and its disablement is effected by the wiper of the G level of switch 6–1 removing the ground connection from the grid and cathode of thyratron 11–6. With switch 6–1 in its No. 10 point, thyratron 11–1 is activated and fires when a line feed signal is read by the tape transmitter. As thyratron 11–1 fires, the conduction thereof grounds out the plate of tube 25–1, the manual step tube, in the electronic transmitter section. The manual step tube is connected to the plate load resistor of the right hand section of tube 29–4 which is the transmitter knock out tube trigger source. The grounding of this control point blocks the triggering of the knockout tube and thus causes autostopping. The primary purpose of this tube is to cause autostopping immediately upon recognition of a line feed code operation and thus prevent any following characters from being stepped through the transmitter after the detection of the line feed. Thyratron 25–1 is activated by grounding out the 220K resistor in its grid circuit when the SNI unit rotary switch 6–1 rests on point 10. This ground applies a pedestal to the grid through the resistor divider coupling network. A capacitively coupled pulse triggers the tube coincidentally with the triggering of the SNI unit step thyratron 11–3.

As the circuits are conditioned to detect a line feed combination other characters continue to be idled through the tape transmitter if any are present. These characters may include additional numbers which may have been inserted in the message at previous switching centers and the end of the complete message numbering is indicated by two carriage returns followed by a line feed combination.

When the line feed combination is detected vacuum tube 11–3 fires and completes a circuit through the No.

10 point of the J level of the SNI main switch 6–1 to step the switch to point 11. With the switch 6–1 on point 11, a circuit is completed from ground through the F level, back contact of relay SNWC, conductor 11–9 to point 1 of the K level of the transmitter sequence switch XSQ, closed contacts of the master reset switch to step magnet of this switch. This steps the latter switch to its No. 2 point and releases relay SNIC. When relay SNIC releases, it opens the transmitter autostop circuit and disconnects the sensing pins of the transmitter from the control circuits of the SNI unit.

Up to this point in the operation of the circuits, a message has been received and stored in the tape 3–14 and among other things the start of message has been received and checked, the sequence number and channel identification characters perforated in the tape have been checked and found to correctly compare with what they should be and the system is now assumed to be in condition to initiate the processing of the message in the tape for cross-office transmission. However, before describing that phase of the system, the description of the operation of the SNI unit will be continued and its operation set forth in connection with the transmission of the channel identification characters and the message sequence number cross-office although this operation actually occurs somewhat later in the sequence of events. The cross-office transmission of these characters is controlled by the second part of the operation of the main rotary switch 6–1 of the SNI unit. To initiate this cross-office transmission the sequence number output control relay SNOC is operated in the manner hereinafter pointed out and its operation closes circuits from the rotary switches of the SNI unit to conductors 18–12. Thereupon grounds applied to the conductors 18–12 in various combinations are transmitted cross office in the same manner as transmission normally occurs from the tape transmitter. At this time, the tape transmitter is autostopped and accordingly no interference with the transmission from the SNI unit will occur. The operation of SNOC also closes a stepping control circuit from vacuum tube 11–2 through points 11 to 24 of the J level of rotary switch 6–1 in the SNI unit. A circuit is also closed from points 12–24 of the G level for controlling as hereinafter pointed out the cross-office transmission. With switch 6–11 on point 11, the latter circuit is open and no character transmission takes place at this time.

Tube 11–2 provides a pulse output at the rate of 20 pulses per second. The first pulse steps the main switch 6–1 from point 11 to point 12 and the G level ground on point 12 allows character transmission to start. While the switch 6–1 is advancing from point 12 through point 24, the following are transmitted: Z, C, first, second, third channel call letters, figure shift, first, second, third sequence digit number, letters shift, carriage return, carriage return and terminated by a line feed combination. When the switch steps from point 24 to 25, the G level control circuit is opened and no further character transmission can then take place.

When disconnection of the cross-office circuits occurs or when lines 18–21 are disconnected from the SNI unit, a ground, as hereinafter apparent, is applied to the H wiper of switch 6–1. At this time the switch 6–1 is on point 25 and this ground is extended to the step magnet of the units switch 6–2 which operates and through its interrupter contacts completes a circuit through the J level of switch 6–1 to advance this switch to point 26. Thereupon ground on the K level wiper steps switch 6–1 to its home or No. 1 position. Removing the ground from point 25 of the H level releases the step magnet of the units switch whereupon it advances to the next digit position. Thus the digit indicating switch is advanced one step in conjunction with each operation of the main switch 6–1. When the units switch steps from its digit 9 to digit 0 position, it passes over intervening stop 11 and this provides a circuit for advancing the tens digit switch 6–3 one step. In a similar manner the hundreds digit switch 6–4 is advanced one step after each ten steps of the tens digit switch.

Figure 11:
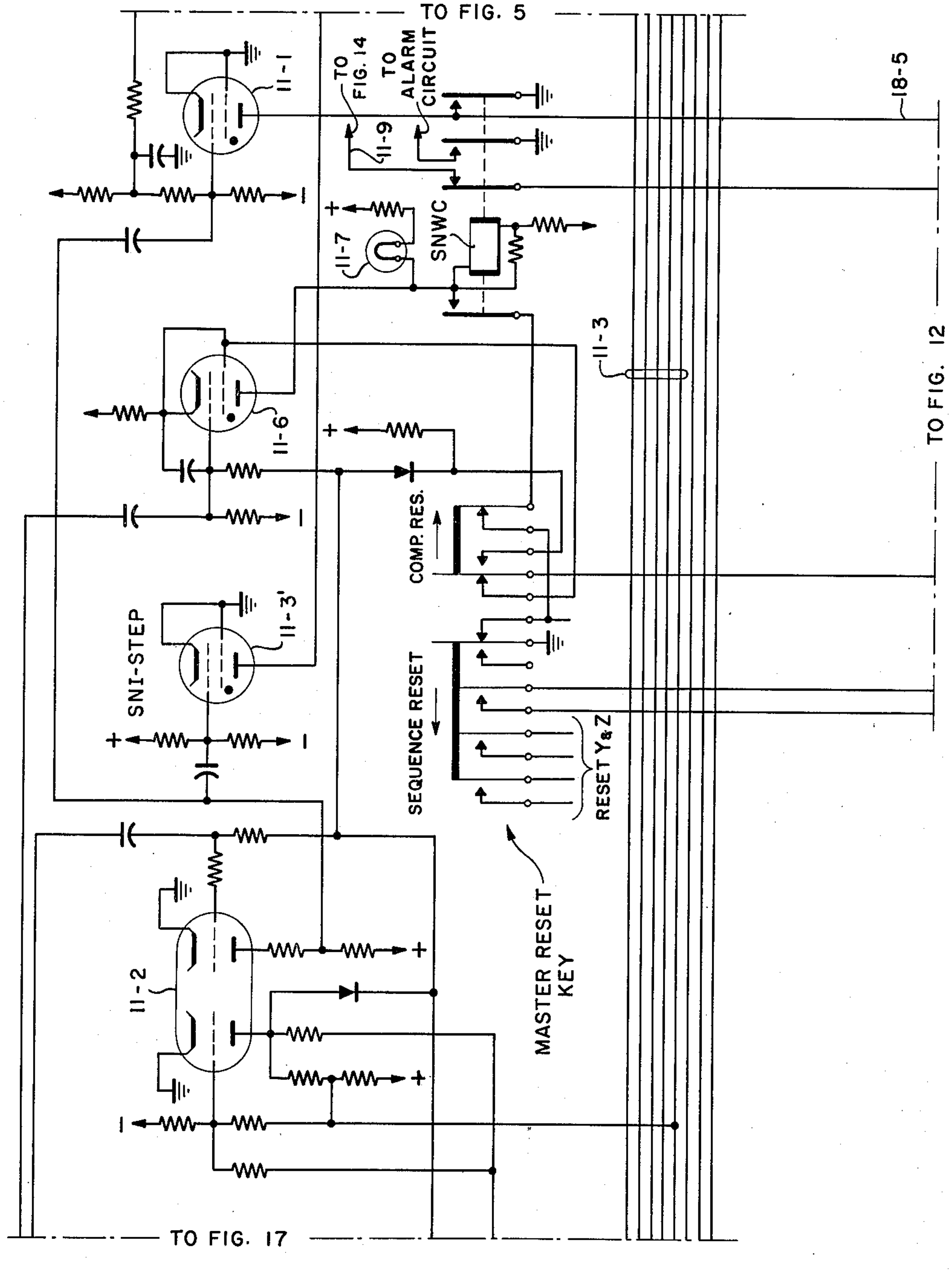

A number of manual controls are provided for the sequence number switch and these include a master reset key, FIG. 11, which when operated to its sequence reset position or to the left, clears out all operated receiving sections and returns any operated sequence number indicator main switch such as 6–1 to its home or point 1 position. This operation is controlled from the K levels of the main switches which applies ground through the sequence reset contacts to the step magnet from points 2 through 26 but not at point 1. When the main switch is returned to its home position by the operation of the master reset key, there is no advance of the units digit switch. Accordingly, the sequence number indicator retains the previously registered number and the message bearing that number must be reprocessed.

In the event of a wrong sequence number comparison which results in the operation of relay SNWC as outlined above, operation of the master reset key to the right or to its comparison reset position releases relay SNWC and this allows the tape transmitter to resume operation. If the master reset key is held to the right, no actual comparison of further tape characters is made and the sequence number indicator main switch merely advances one step for each character passed through the transmitter and stops on point 10 until a line feed character is detected at the end of the numbering sequence. Main switch 6–1 then steps to point 11 in the normal manner. By momentarily operating the master reset key to the right, relay SNWC will release and comparison of the tape characters will be resumed in the normal manner. At times it is desirable to omit the comparison function entirely and at such times it is still necessary to establish proper control of the switching functions which follow. This is accomplished by the comparison bypass key, FIG. 6, which when operated advances the main switch to point 11 regardless of the particular characters contained in the tape.

When it is desired to reset the sequence number unit for the beginning of a new series of numbers, the number reset switch, FIG. 6, is operated which completes circuits for advancing of the digit switches to their home positions. When reaching their home position relay SNRC, FIG. 12, operates until the switch is released and operation of relay SNRC advances the digit switch to a no number indication, and release of the switch releases relay SNRC restoring all circuits to their normal condition, and during this operation the unit digit switch advances one more step to indicate a sequence number of 1.

At times it is necessary to change the number registered by a sequence number indicator to bring it into agreement with an incoming message number, and operation of the number reset key in an upward direction completes circuits whereby individual push buttons associated with the units, tens, hundreds switches may be individually advanced. When the individual switches are advanced in this manner, the units switches in passing over points 11 do not step the hundreds and tens digit switches. Thus each of the three switches may be positioned independently to provide a desired number indication.

*Route selection*

It will be assumed that the sequence number perforated in the tape has been properly checked and in conjunction therewith the main switch 6–1 of the SNI unit reached point 11. This operation completed a circuit to energize the step magnet of the transmitter sequence switch XSQ and caused it to step from its home position or point 1 to point 2. With switch XSQ on point 2, a circuit is completed through the A level, conductor 14–4, to the coil of relay TXTG operating the same. At this time the tape transmitter is auto-stopped by control circuits hereinbefore described.

Figure 21:
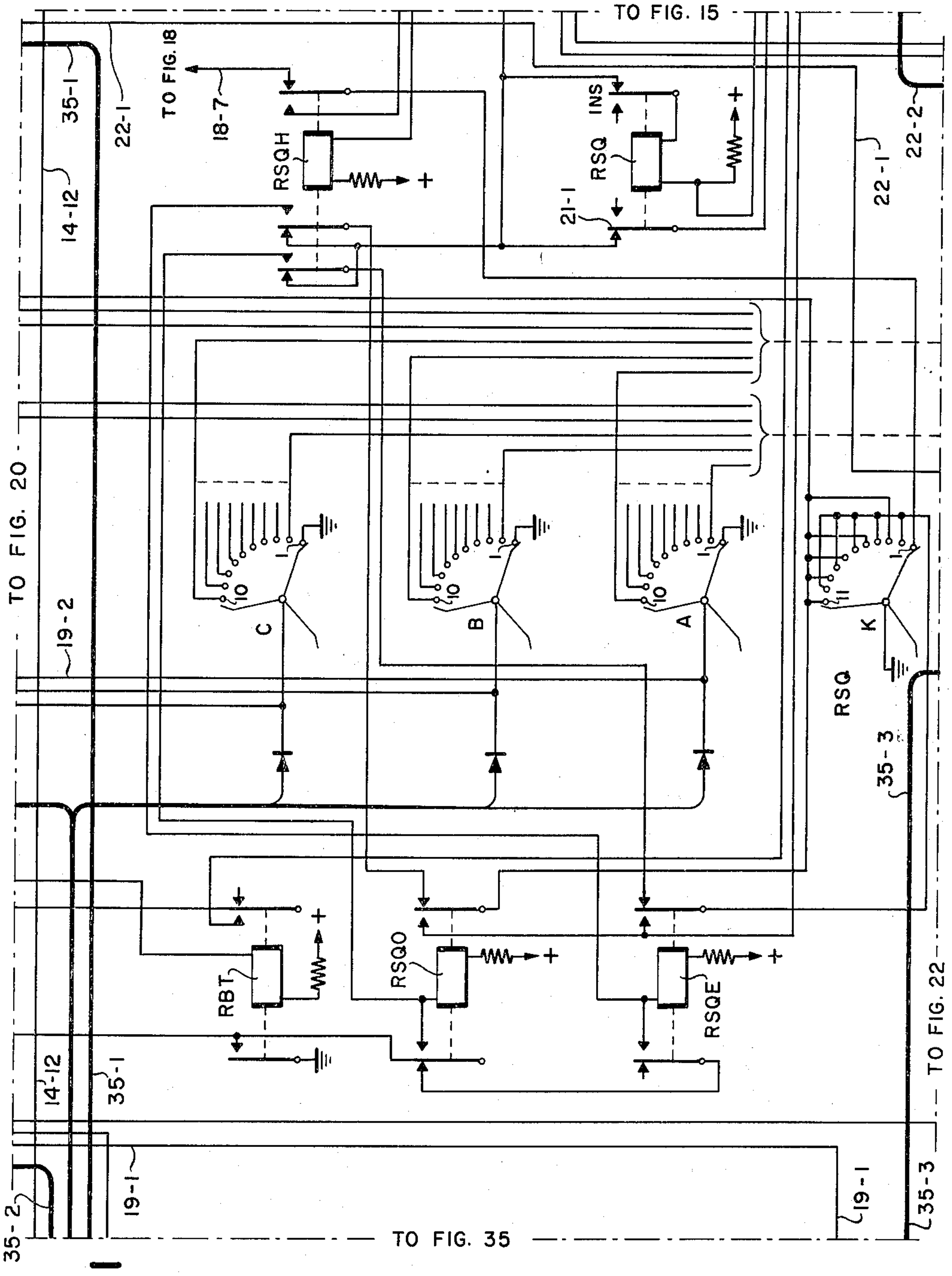

Operation of relay TXTG completes a circuit through the coil of solenoid 18–16 of the tape transmitter, over conductor 18–17, a back contact of relay RSQH, FIG. 21, and the No. 1 point of the K level of the transmission sequence rotary switch RSQ. The completion of the above circuit to the solenoid moves a slide member 34 as shown in FIG. 1 of the above-mentioned U.S. Patent 2,816,161 to the left and blocks further movement of the tape at some point to the left of the sensing pins but permitting the tape to be advanced over the pins as fully explained in the above mentioned patent.

As the solenoid operated slide leaves its right hand position, contacts 18–19 operate to apply a holding ground through front contacts of relay TXTG to the solenoid 18–16 and when the slide reaches its extreme left hand position, contacts 18–18 are operated and apply a ground through front contacts of relay TXTG. This indicates to the control circuits that the slide has been properly positioned.

The description of the operation of the route selection circuits will first be described in connection with the manual switching of a message where the directing of the message is under control of manually operated destination indicating push buttons, such as PB1 to PB200, FIGS. 9 and 10. With the slide of the tape transmitter in its left hand position, and with the automatic-manual switch 15–1 to the right or in the "manual" position, a circuit is completed for the operation of the message waiting lamp 14–6. This circuit originates at the lamp and extends through contacts of the automatic-manual switch 15–1, back contacts of relays DCNI, DCTI, PBPH, PBPL, DRFL, conductor 14–7, front contacts of relay TXTG and solenoid operated contacts 18–18 and 18–19 to ground. Movement of the slide member to the left also permits the printed characters on the tape just ahead of the sensing pins to be observed. In accordance with the message format, these two characters will be the precedence prosign and will be any one of six different character pairs, and as far as the switching circuits are concerned, these pairs of characters are divided into two groups, a high priority group and a low priority group. The pair of characters that appear determines to which position a priority switch is operated which in effect constitutes a transmitter initiate switch.

As hereinbefore pointed out, each console terminates a pair of receiving lines and a single set of destination push buttons is provided for each console. However, only one receiving position of a console can use the push button panel at a time.

Assuming the message has a high priority, the operator will operate the priority intiate switch 14–8 to close its lower set of contacts and complete a circuit for the operation of the associated high priority push button relay PBPH. This circuit includes back contacts of the high and low priority relays PBPH and PBPL of the other position in the console and precludes interference of the switching operation under way by the other receiving position in the same console. Had the message carried a low priority, the switch 14–8 would have been operated to close its upper contacts and complete a circuit for the operation of the low priority push button relay PBPL which circuit also extends through the high and low priority push button relays of the other position. Whichever relay PBPL or PBPH operates, the message waiting lamp 14–6 at the involved position is extinguished. The operation of relay PBCN also establishes the required connections between the route processing control circuits of the involved position and the push button panel including the push buttons PH1 to PB200, FIGS. 9 and 10. Operation of PBCN also closes circuits for the operation of relays RPL or RPH depending upon which of the corresponding priority push button relays PBPL or PBPH was operated; which one of the two relays RPL or RPH is operated indicates the priority basis assigned to the message being processed for latter cross office switching purposes.

Figure 8:
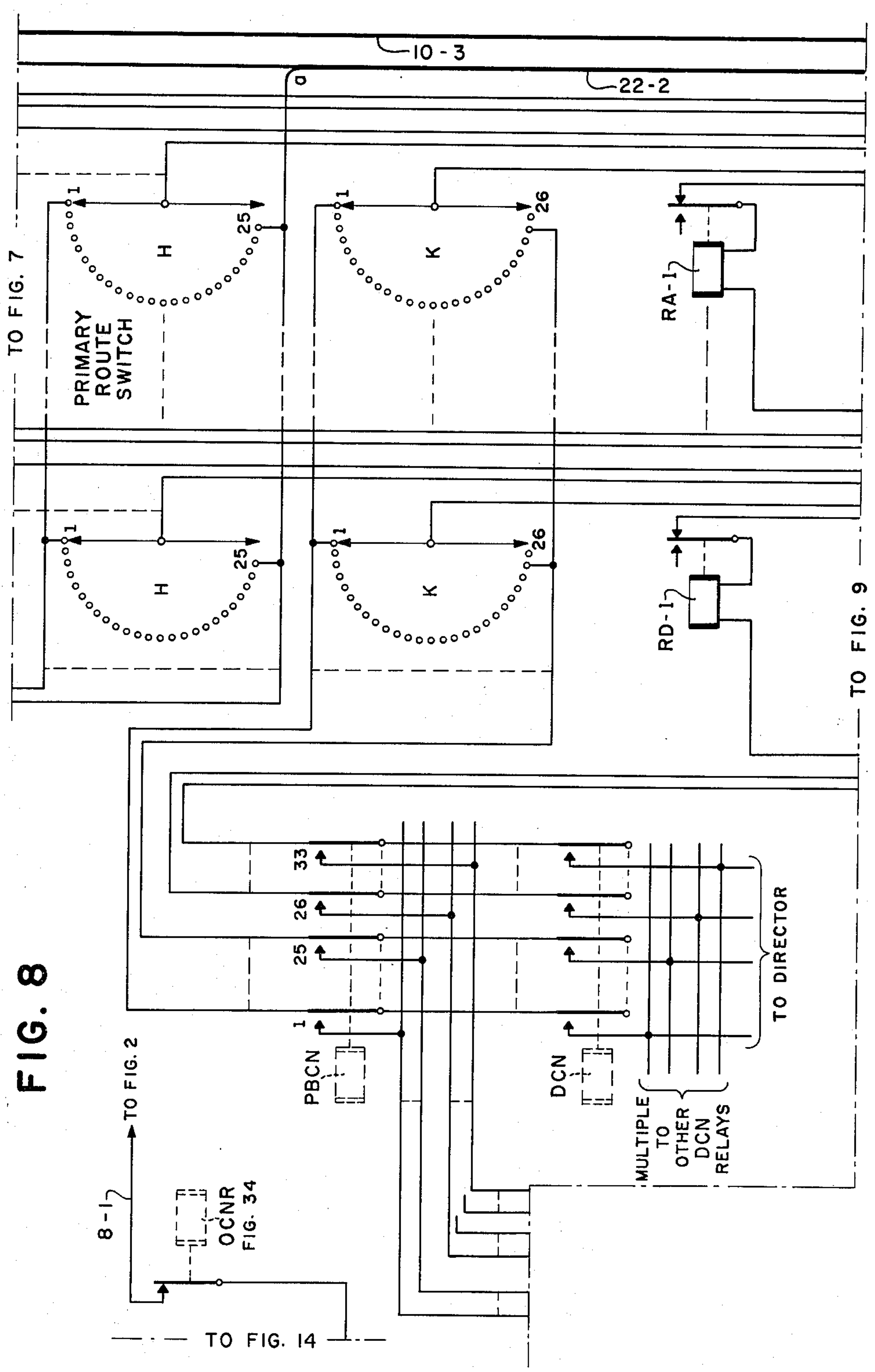

Relay PBCN is a multiple contact relay having some 60 tongues and make contacts. Part of the contacts operated by this relay are shown in FIG. 8, particularly those numbered 1 to 33 and having to do with the circuits hereinafter described involving the primary and secondary route switches and the destination push buttons PH1, etc. In addition to the above, the operation of relay PBCN completes a circuit for the operation of relay RTXI, FIG. 13, and the latter relay in operating closes the autostop circuit for the tape transmitter. This permits the two precedence prosign characters in the tape to pass over the sensing pins and since the tape is blocked at some point beyond the sensing pins, the precedence prosign characters commence to form a loop in the tape as fully described in the above mentioned patent.

Relay RTXI in operating also closes a circuit from point 1 of the K level of the transmission sequence switch RSQ, through front contacts of relay RSQH to the step magnet SM of switch RSQ which causes the switch to step to point 2. Here the switch is set to process the first routing indicator which comprises a series of destination indicating characters next appearing in the tape. A circuit is then closed through point 2 of the K level of switch RSQ for operating a relay RSQE indicating that switch RSQ is on an even-numbered point.

The routing line of any message may contain from 1 to 9 routing indicators in addition to the precedence prosign, and each routing indicator represents a destination to which a copy of the message must be transmitted. In processing the message each routing indicator is examined in turn to determine the switching requirements and the 10 point 6 level transmission sequence rotary switch RSQ controls the examination. Point 1 of the rotary switch is subsequently used for cross office transmission control of the precedence prosign and the remaining points 2 through 10 provide for recording information to be associated with each of the possible 9 routing indicators.

Point 1 is the home position of switch RSQ and with the homing relay RSQH, the even relay RSQE and the odd relay RSQO released, points 2 through 11 of the K level of switch RSQ are connected to the step magnet circuit of the switch. Accordingly, with these relays released the switch will be in its home position since the K level wiper is grounded.

With relay RSQH operated, the K level points are divided into two groups, an even numbered and an odd numbered group. These two groups, in conjunction with the odd and even relays provide a means for insuring that the switch takes only one step for each routing indicator processed.

In response to switching information obtained from the routing indicators as many as four cross office connections can be established for subsequent transmission of the message to as many as four outgoing sending positions. It is therefore necessary to determine for each routing indicator the particular cross office connection with which it is to be associated. Thus, in processing a complete set of routing indicators a pattern of association is established for the routing indicators whereby those requiring transmission to the same sending line position will be transmitted cross office to that position regardless of their order of appearance in the line of routing indicators.

Figure 22:
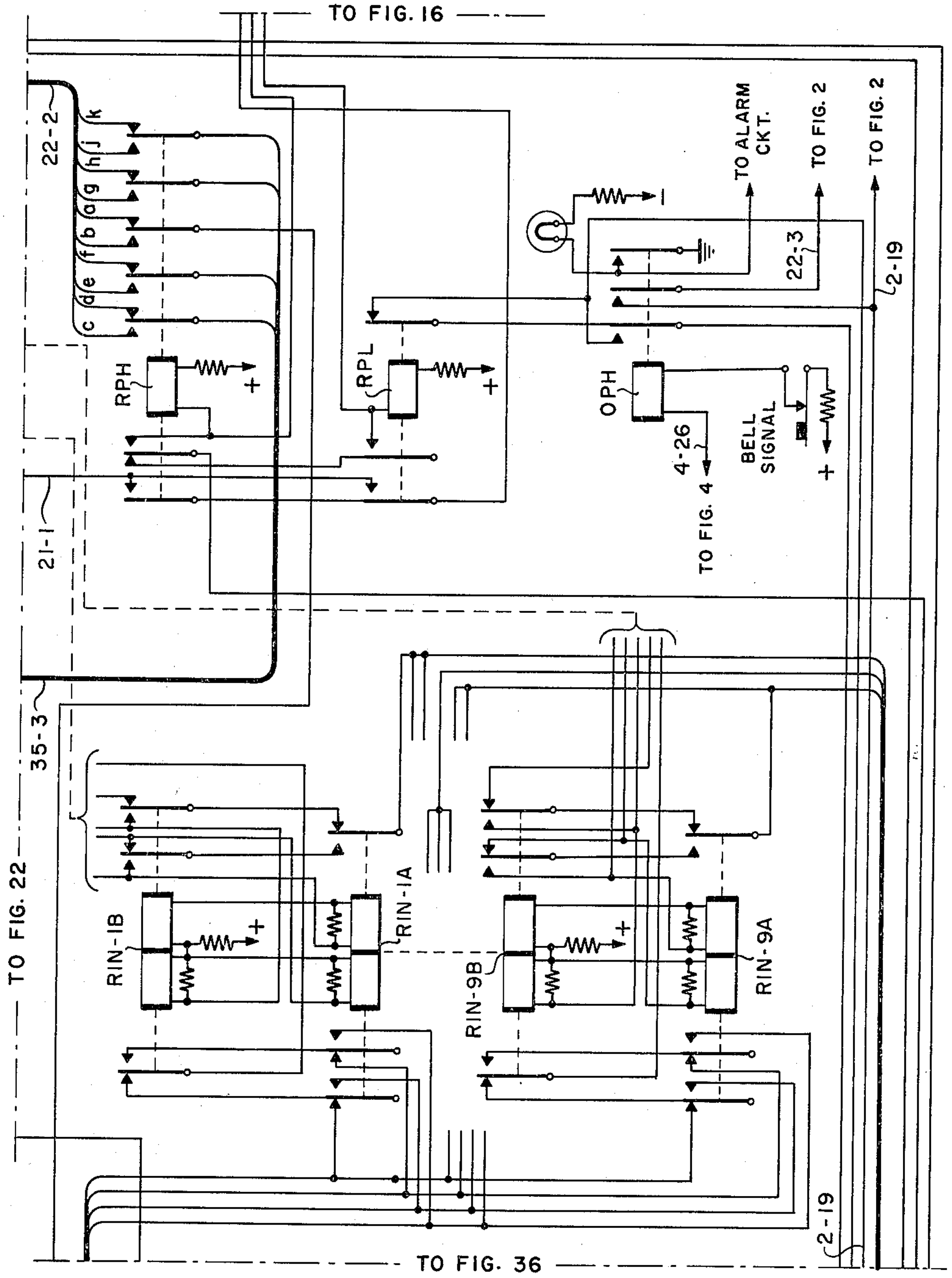

As indicated in FIG. 22 nine pairs of relay RIN–1A and RIN–1B to RIN–9A and RIN–9B are provided, one for each possible routing indicator. The 1A and 1B relays are provided for the first routing indicator and are connected to point 2 circuits of switch RSQ levels A through E. Such a pair of RIN relays has four possible combinations of positions and these positions indicate which one of the four possible cross office connections over which the routing indicator is to be transmitted. The four possible connections are designated as A through D and with the 1A and 1B relays, both relays are operated for an A indication, only the 1A relay is operated for a B indication only the 1B relay is operated for a C indication and neither relay is operated for a D indication. Thus as switch RSQ advances one step for each routing indicator processed, a record is made of the actual cross-office connection over which that routing indicator is to be transmitted. The routing indicators requiring transmission to the same outgoing destination will have their RNI relay pairs operated in similar conditions.

*Route leads*

Reference is now made to FIGS. 7 to 10, inclusive, which shows some of the major parts of the equipment whereby selection of one or more desired sending line positions for a cross-office connection is controlled via route leads. Each route lead in effect represents a desired destination or sending line position, and as many as four separate cross-office route leads from a single incoming line position transmitter can be established simultaneously. It has been found that with four route leads, substantially all multiple address messages can be handled even though a multiple address message in accordance with the disclosed system may contain as many as nine separate routing indicators. This is because a message for a plurality of destinations which may be served through a remote switching center are transmitted to such a remote switching center only once via a trunk circuit connection, and at the remote switching center the single received message is distributed to the desired tributary stations.

Because separate handling of high precedence messages may be required for some destinations, two route leads at a switching center are provided for each destination, and since the maximum capacity of a center in accordance with the present disclosure is 200 destinations, there may be as many as 400 route leads. Access to the route leads is provided through an arrangement of rotary switches. The general plan employed is to use two groups of four each, so-called primary group switches and a common secondary group of rotary switches which determines which ones of the primary groups are employed. One group of four primary route switches is shown and indicated in FIGS. 7 and 8, and each switch employs nine levels of 25 points each. In processing the routing information of a message it is necessary to position the sets of switches to points assigned to the desired outgoing destinations for each of the four possible cross-office connections.

The primary route switches are indicated by reference numerals RA–1 to RD–1 and the single set of five level ten point secondary route switches are indicated by reference numerals RA–2 to RD–2. The K-level points of each group of route switches are multiplied and consist of a set of 25 conductors and a set of 8 conductors. To select a particular destination, one conductor in each of these groups is grounded to mark the points assigned to this destination. In addition it is necessary to determine which set of route switches is to be operated. As hereinafter pointed out, this selection is performed by relays RFA–1 through RFD–1, RFA–2 through RFD–2, and RBA through RBD.

Figure 9:
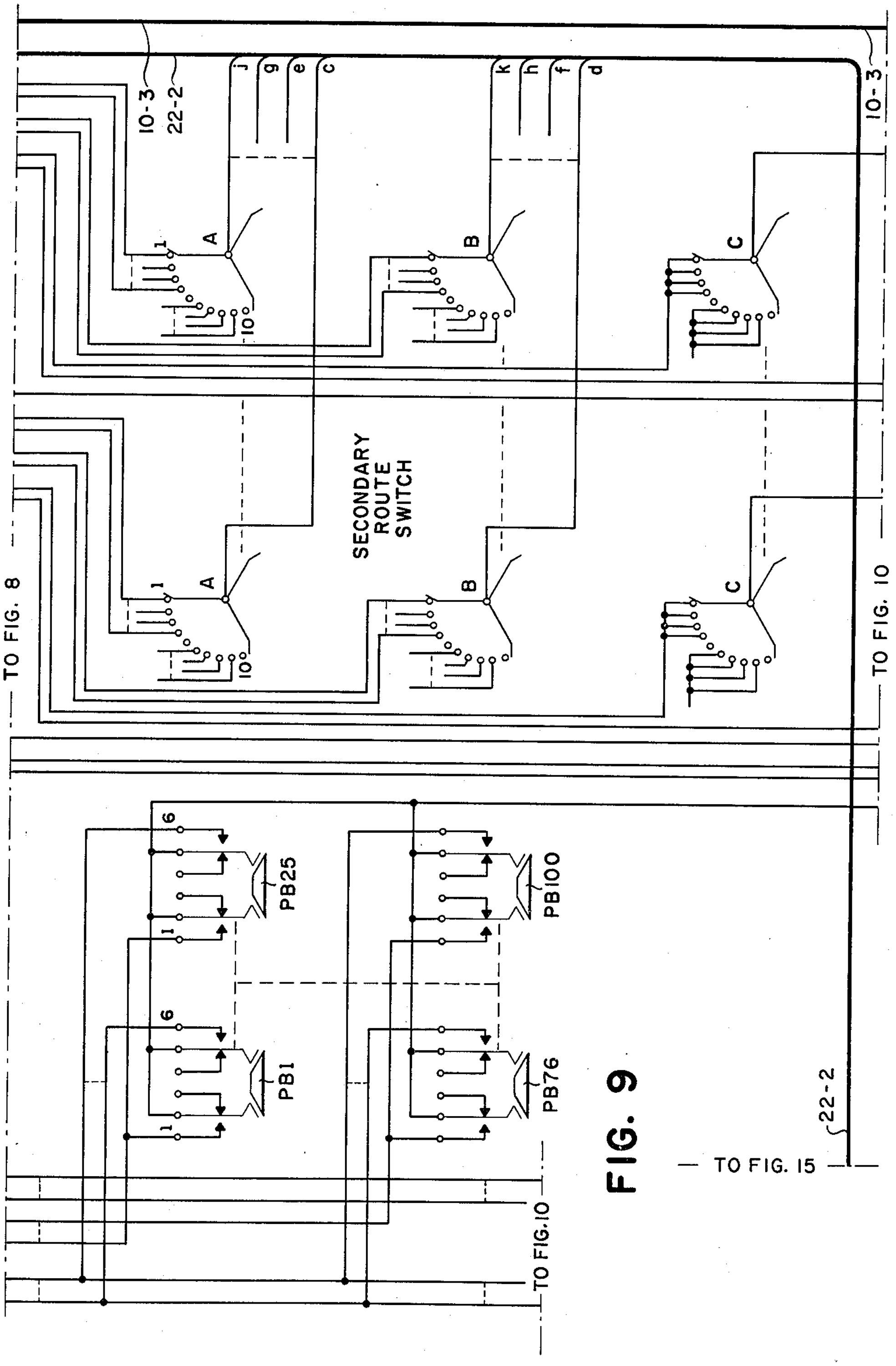
Figure 10:
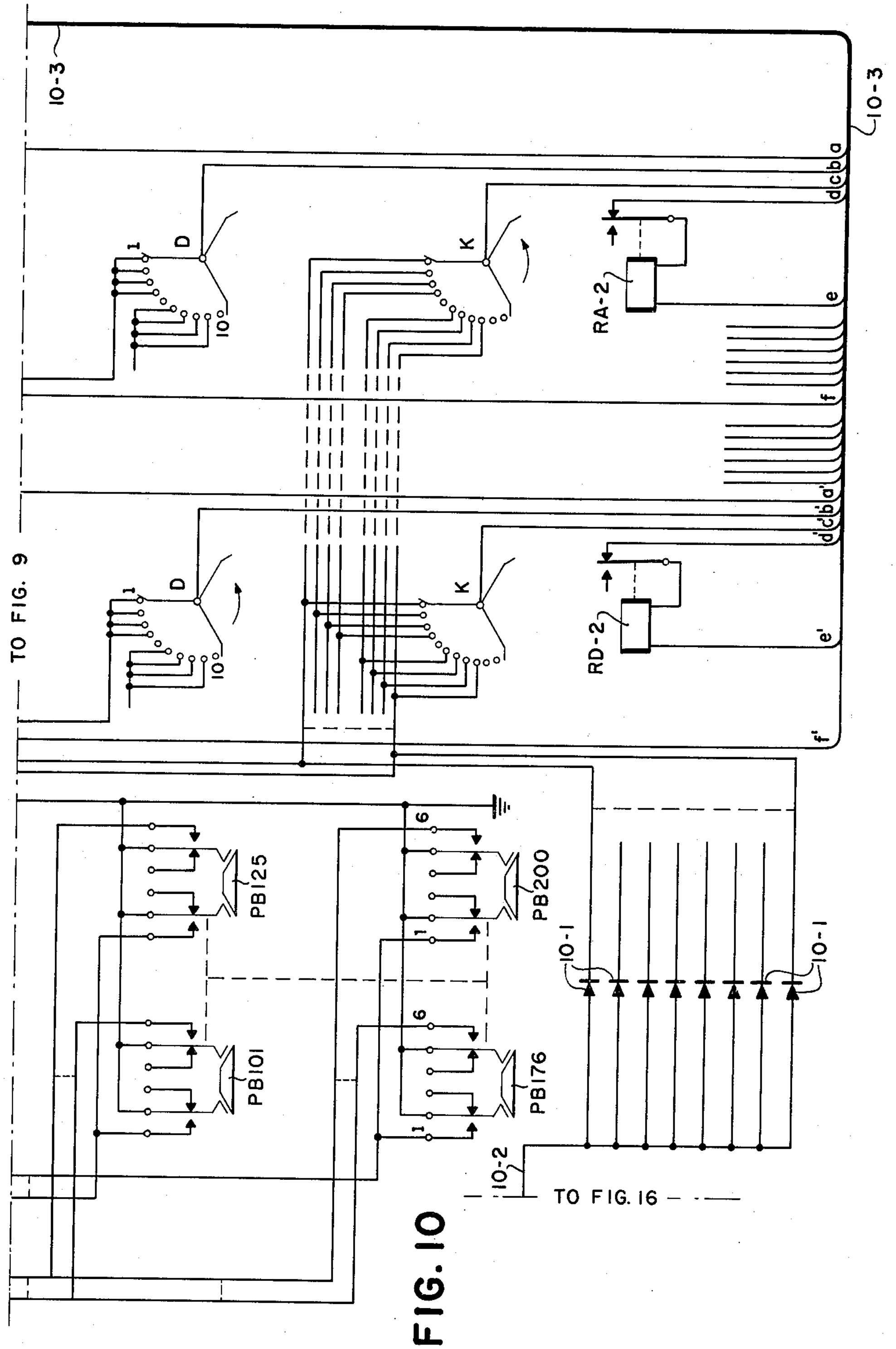

With manual control of the switching mechanism the marking of the various points on the primary and secondary route switches is effected through the operation of a destination push button such as PB–1 through PB–200, FIGS. 9 and 10. As noted, the movable elements of each push button are connected to ground, and the operation of a push button extends this ground through closed contacts of relay PBCN to a respective point on the K-levels of the primary route switches as well as to a respective point on the K-levels of the secondary route switches. As will be noted, the push buttons are divided into 8 groups of 25 push buttons each, and each push button in the first group is capable of marking only one point on the K-level of the primary route switches, and each group of 25 push buttons marks one of 8 points on the K-levels of the secondary route switches.

The ground which marks a point on the K-levels of the secondary rotary switches RA–2 to RD–2, the grounded point depending upon which horizontal row the actuated push button is in, is also applied through one of the 8 diodes 10–1 and over conductor 10–2, a front contact of relay RSPC, conductor 13–1, and through the coil of the route selector initiate relay RSI, to potential. Thus relay RSI is operated and relay RSPC will at this time be operated by a circuit from the plate of vacuum tube 26–1, conductor 26–2, through front contacts of relay RTXI, which is also operated at this time.

Figure 19:
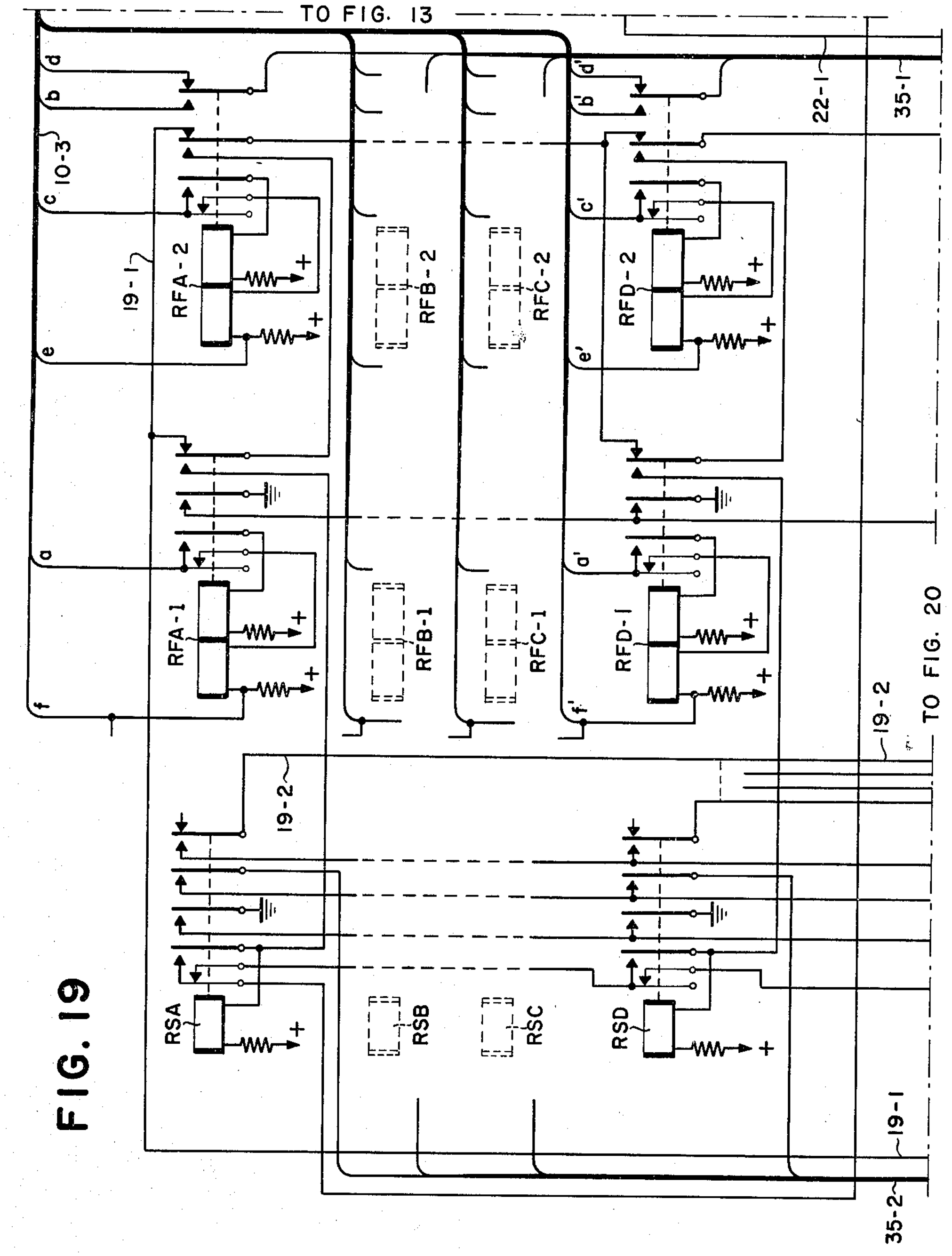
Figure 20:
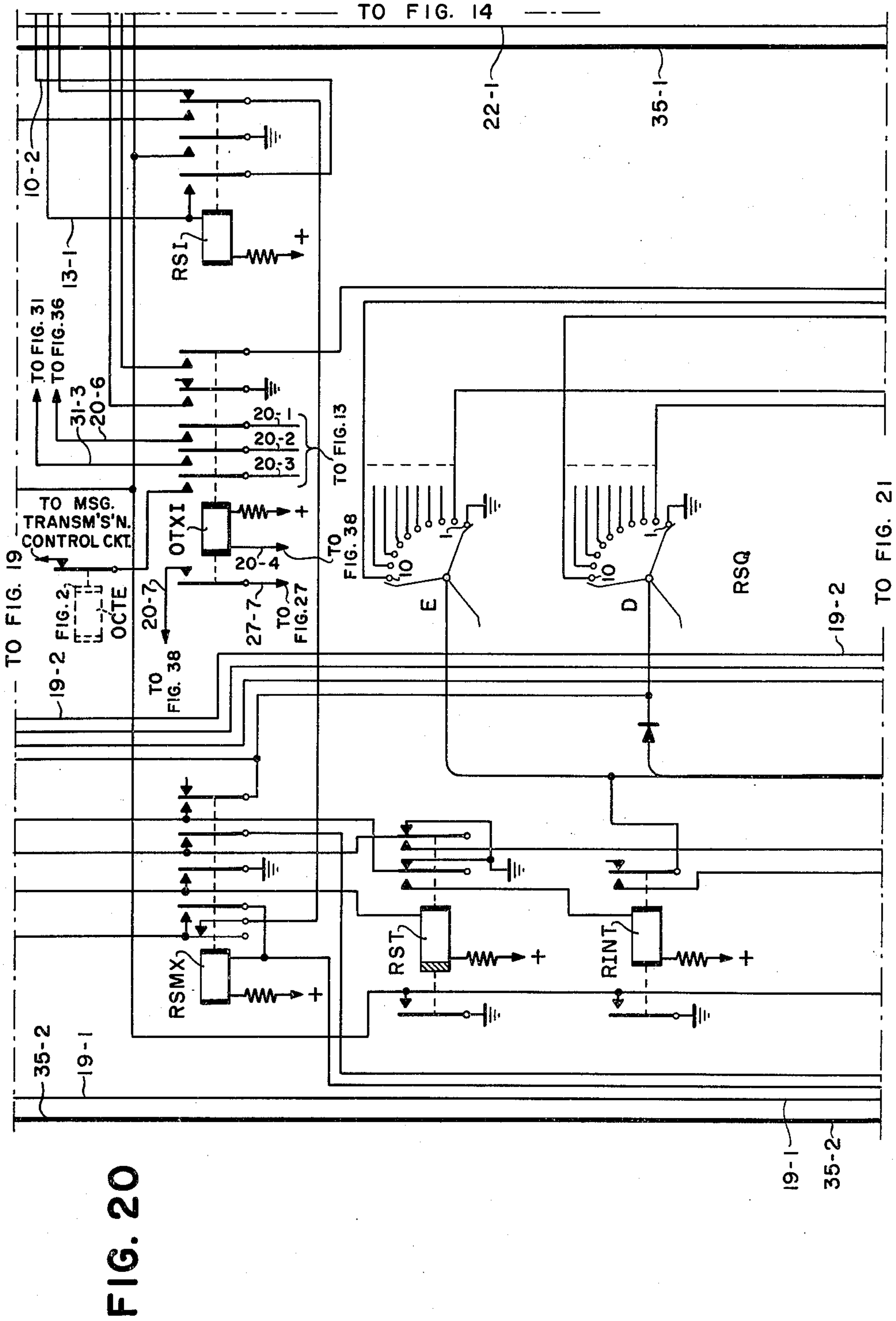

The secondary route switches RA–2 to RD–2 do not have any normal position and if the wipers are standing on the point that is grounded by the operation of a push button, an operating circuit via a conductor of cable 10–3 is immediately available for operating associated route finding relay RFA–2 through RFD–2, FIG. 19. Similarly, the primary route switches RA–1 to RD–1 have no normal position, and if any are standing on the point corresponding to the point grounded by a push button and the associated secondary switches are in proper position, an operating circuit will be immediately available via another conductor of cable 10–3 for associated route finding relays RFA–1 through RFD–1. Thus simultaneously with the operation of relay RSI one or more relays in each of the route finding relay groups may operate.

Operation of relay RSI closes a circuit from the outer tongue thereof which is at this time grounded, through a transfer contact network interconnecting the route finding relays, and it is the function of this network to determine whether any route switch set is already positioned to the points marked by the grounded conductors of cable 10–3. If that is the case, that route is selected and none of the route switches step. For example, if both relays RFD–1 and RFD–2 operate at the time RSI operates, the ground circuit will be diverted to operate relay RSD, FIG. 19, and operation of the latter signifies that the D route has been selected for the particular routing indicator being processed.

Figure 35:
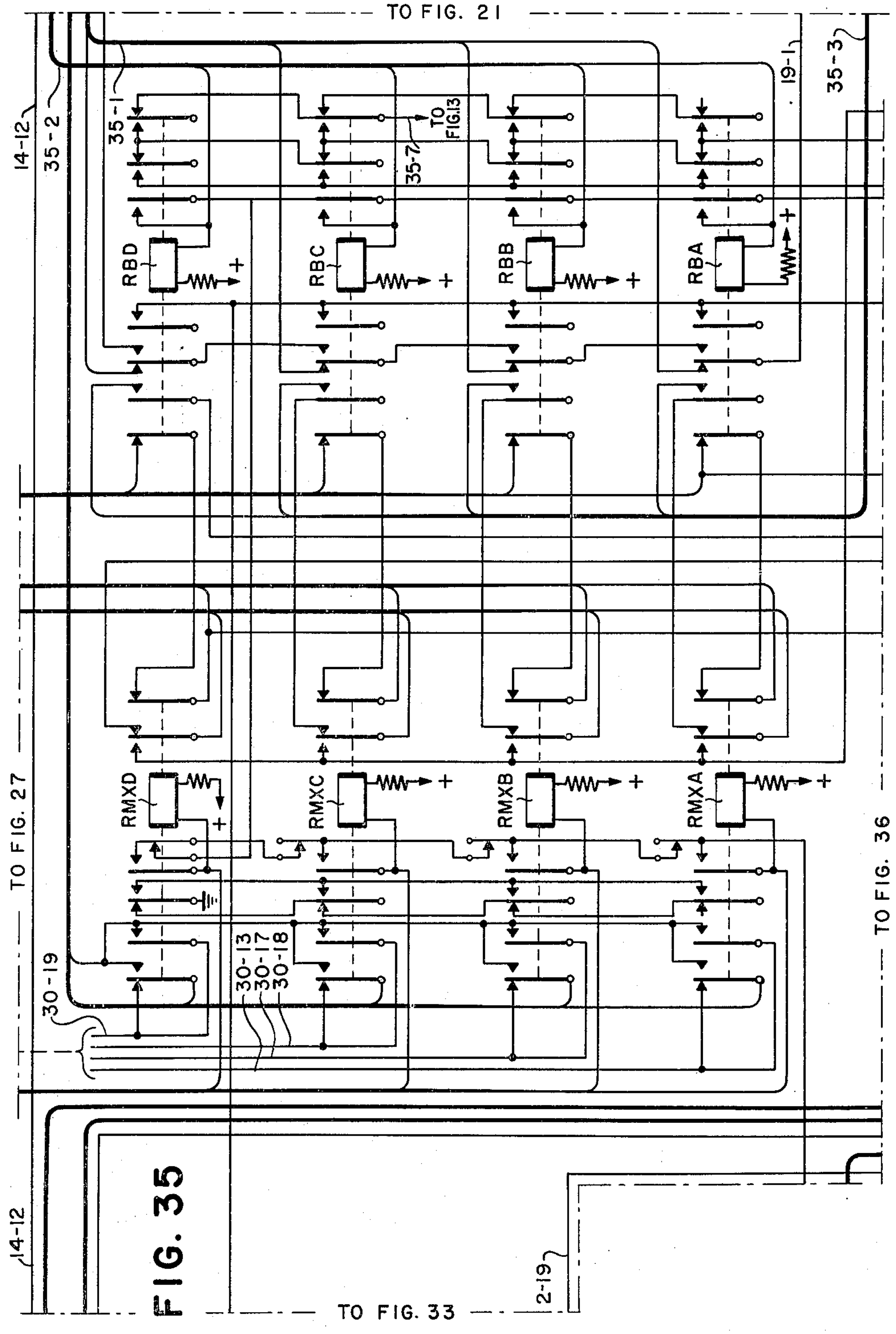
Figure 36:
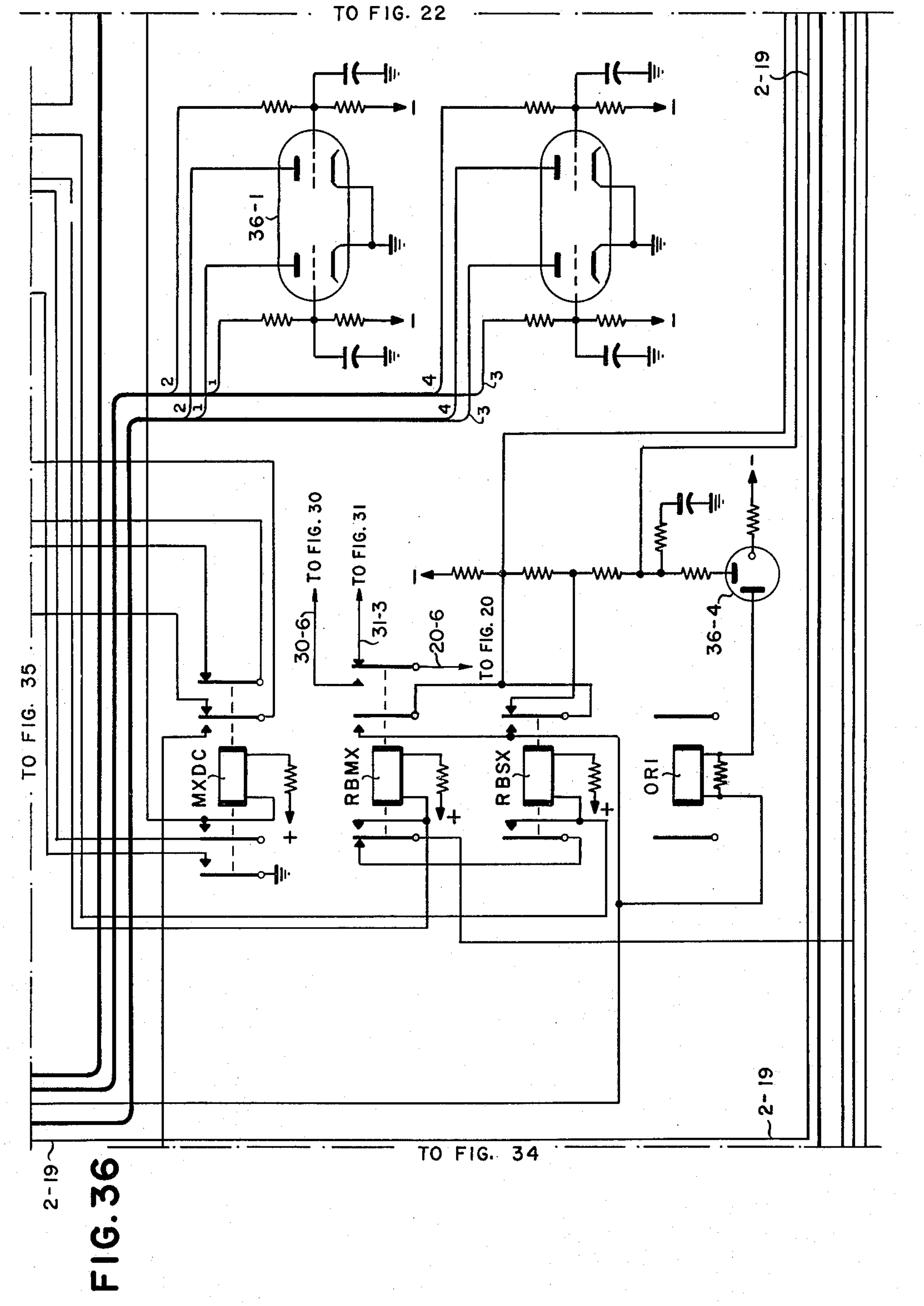
Figure 37:
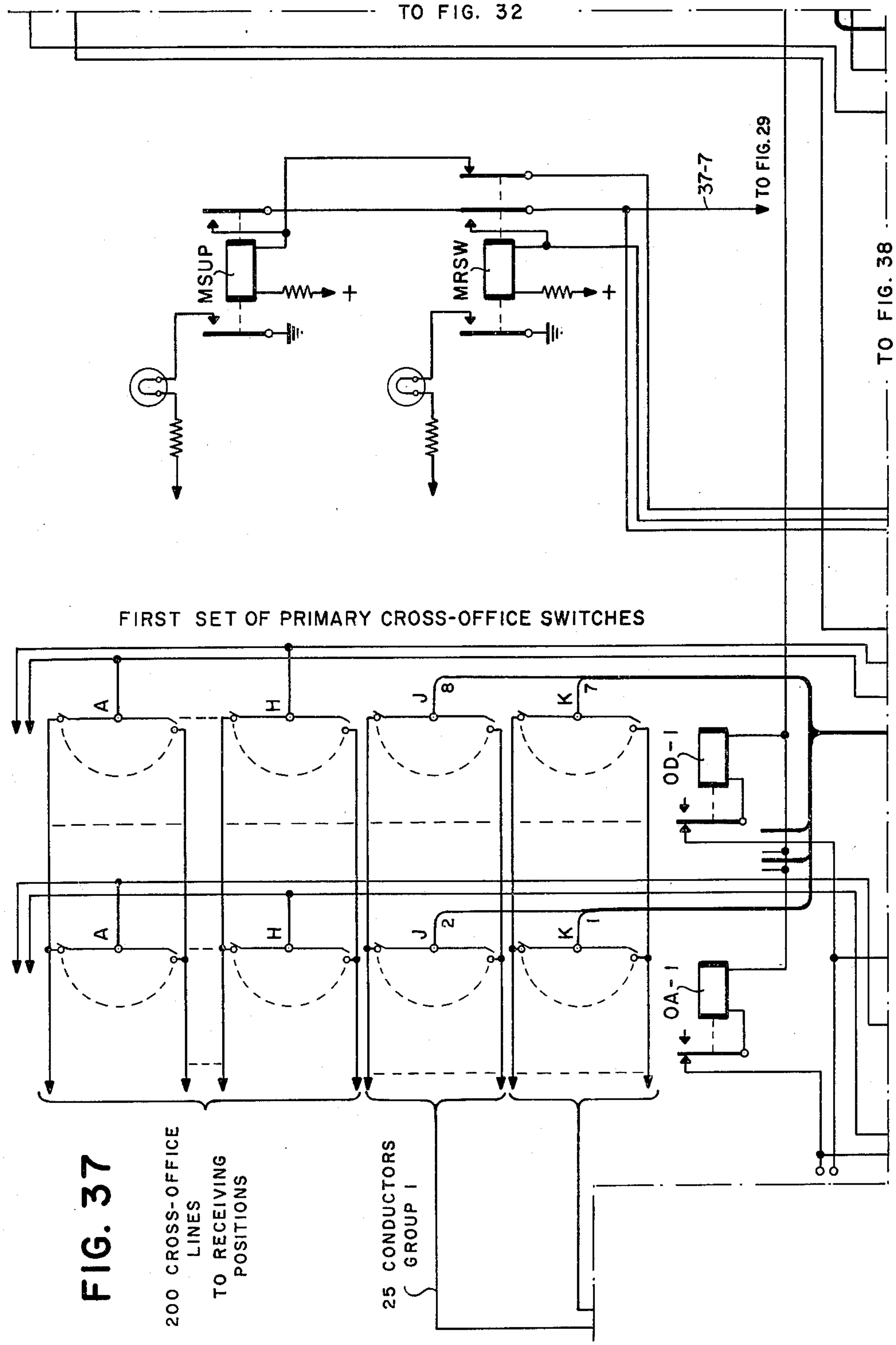
Figure 38:
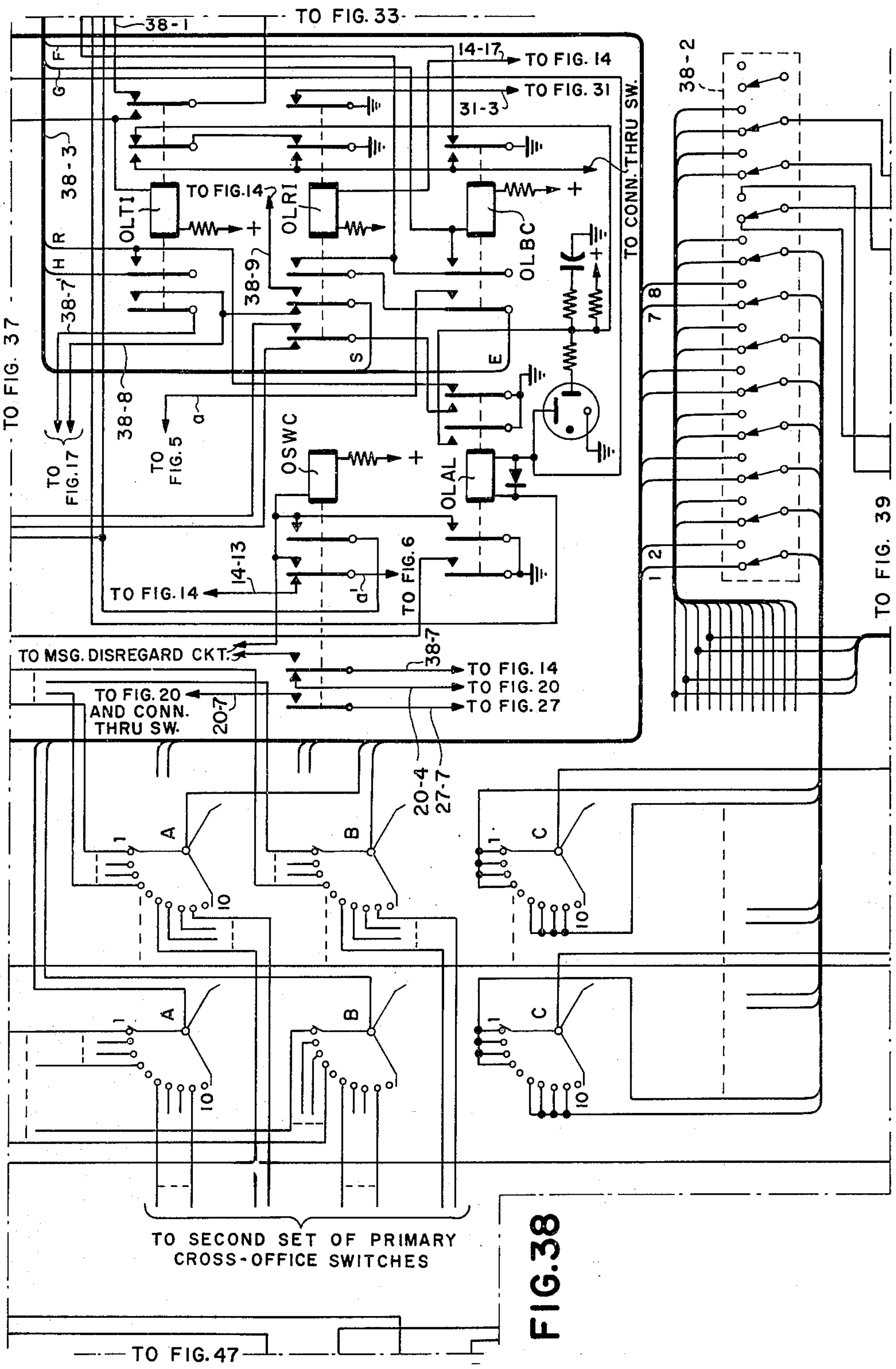
Figure 39:
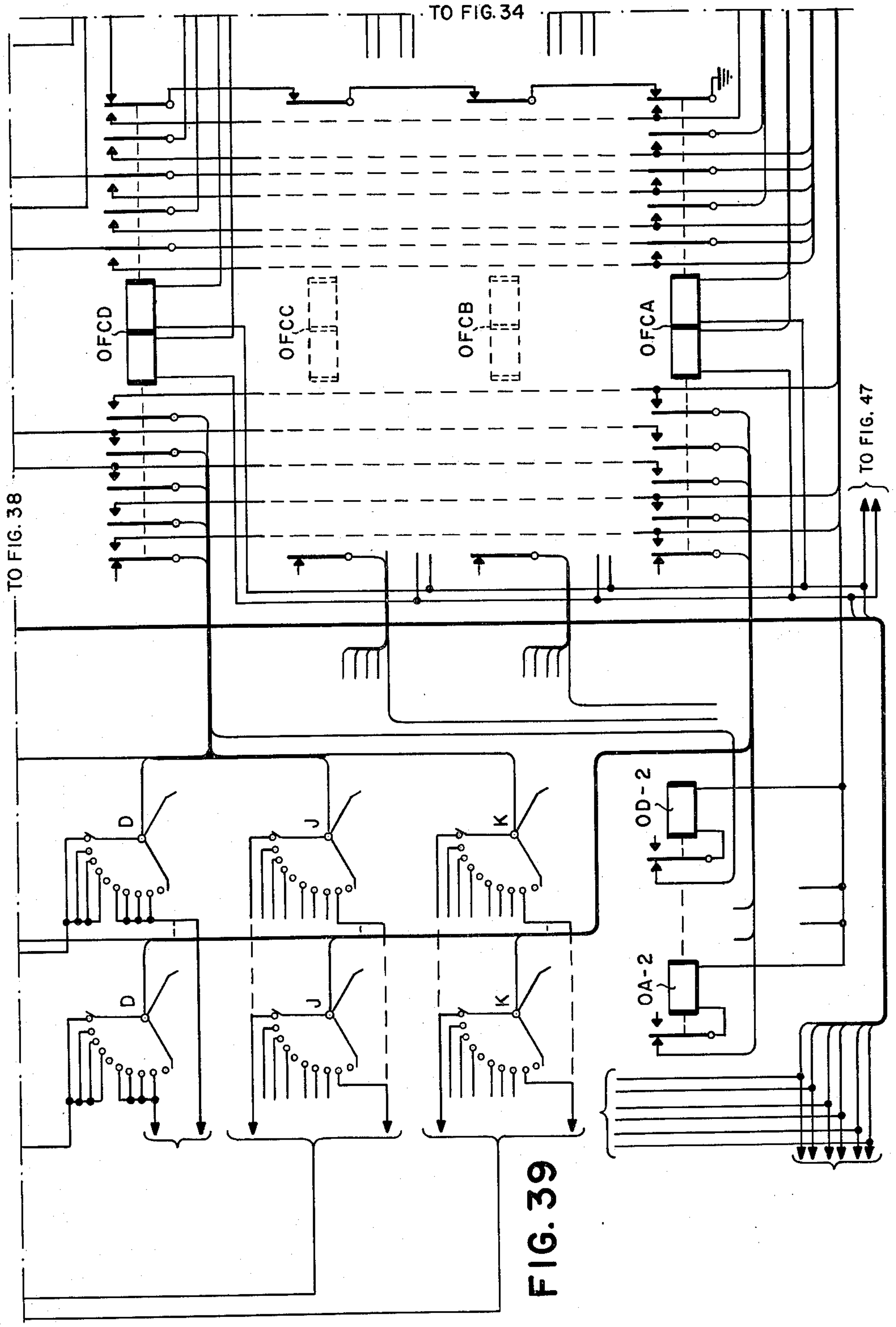
Figure 40:
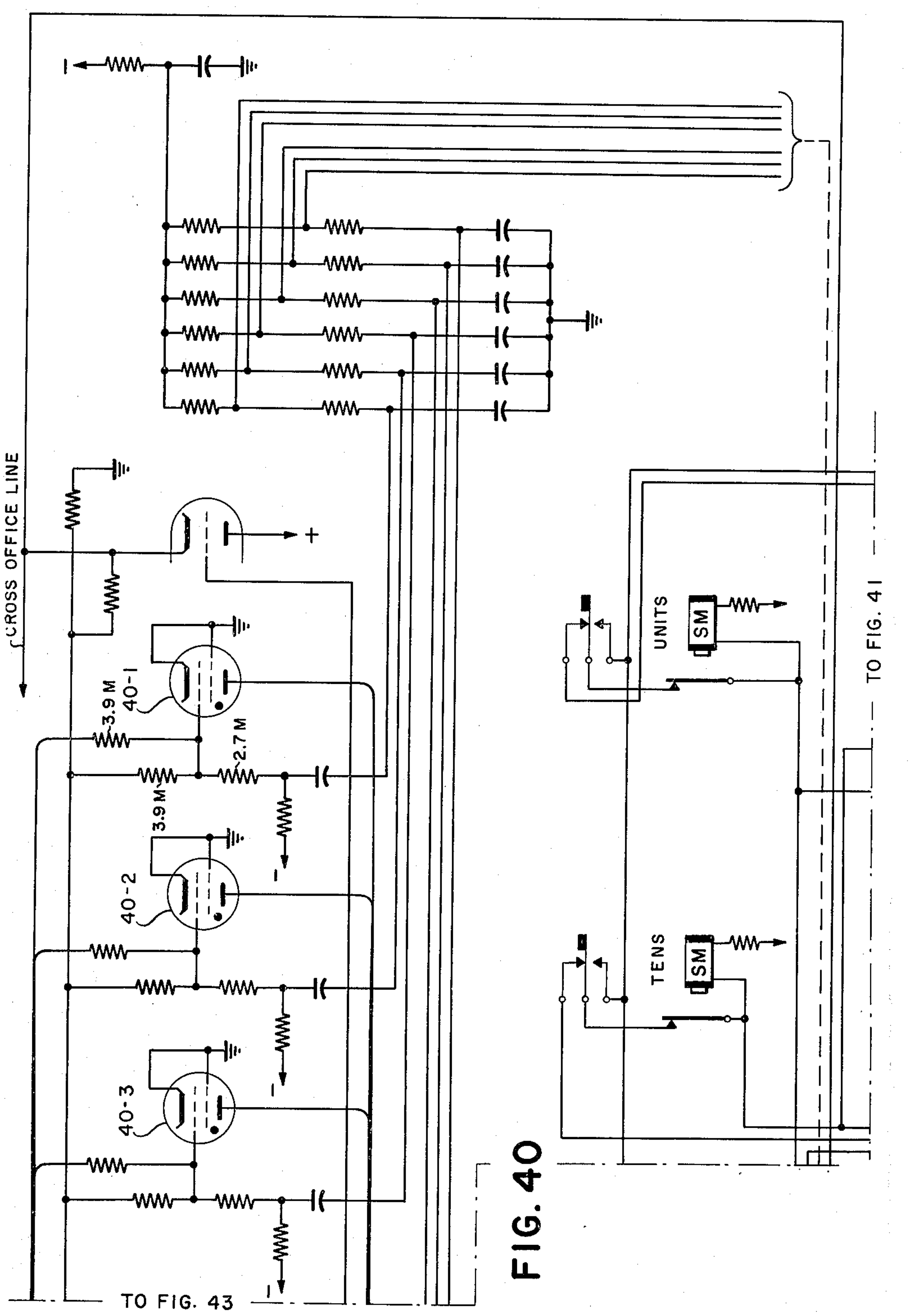
Figure 41:
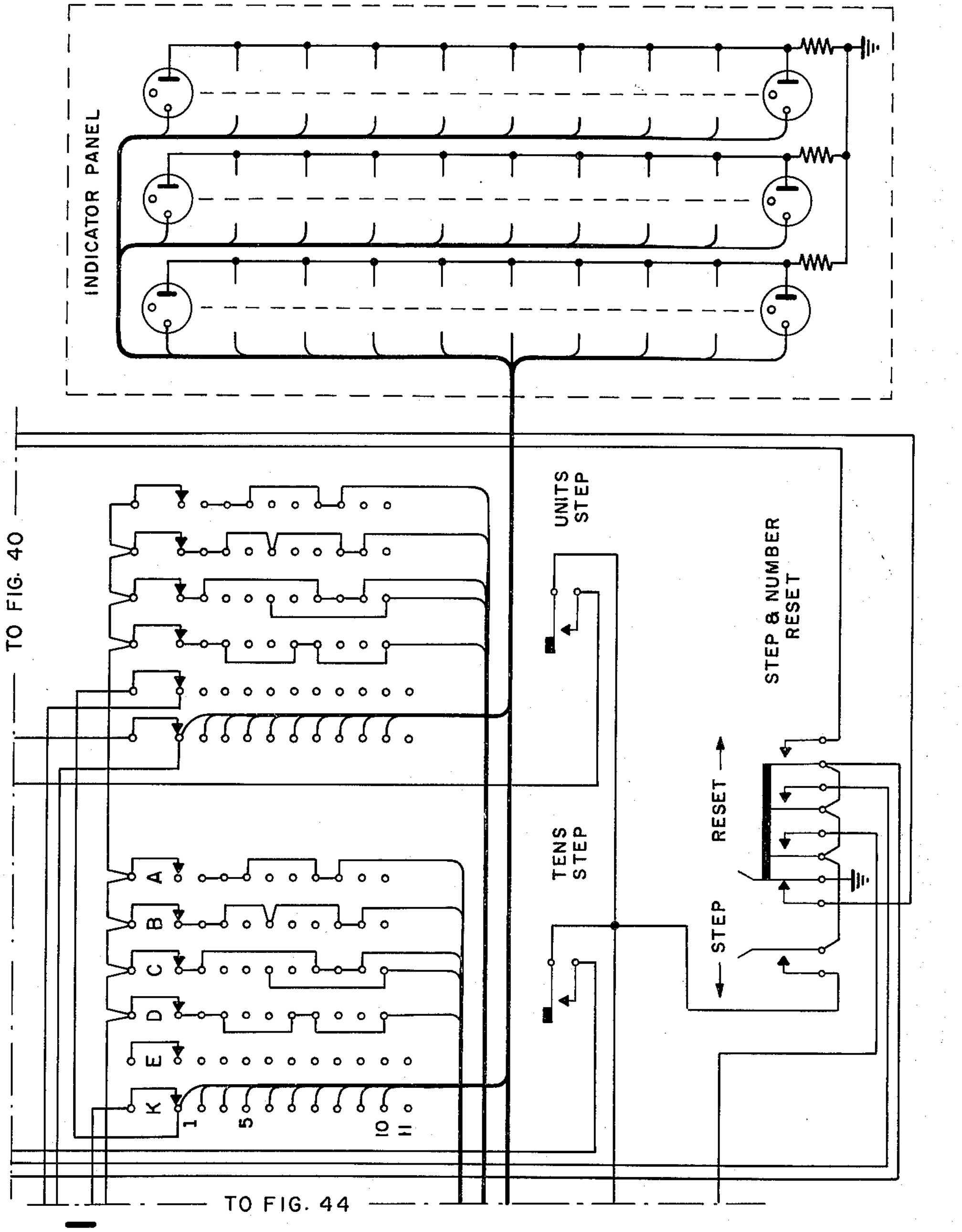

If no corresponding pair of route finding relays is operated, the ground circuit closed by the operation of relay RSI is extended via the transfer network and over conductor 19–1 to a transfer tongue of relay RBA, FIG. 35. With this relay released the ground is continued via a conductor of cable 35–1 to a second transfer contact set of relay RFA–2. If this relay is not already operated, the ground then provides a stepping circuit via a conductor of cable 10–3 for stepping the secondary rotary switch RA–2. When the K wiper of this switch reaches the grounded point, relay RFA–2 will operate and interrupt further stepping of this switch. The ground is then carried through the D wiper of secondary rotary switch RA–2 to step one or the other of the primary switches RA–1, etc. When the K wiper of one of these switches reaches the grounded point, RFA–1 will operate and interrupt further stepping thereof. With both route finding relays RFA–1 and RFA–2 operated, the ground circuit from relay RSI operates relay RSA. Thus if there is no set of route switches already standing on the marked conductor points, the A route will be the first one selected.

*Route selection storage*

Operation of any one of the relays such as RSA of the four relay set RSA to RSD indicates that the associated route A for relay RSA, etc., has been selected for the destination of the particular routing indicator. Thereafter the chosen route will be selected only for other routing indicators having the same destination requirement such as those representing destinations reached through a common remote switching center. Also, one of the relays such as RBA of the four relay set RBA to RBD is arranged to indicate which routes have already been selected and what routes are still available for different destination requirements. Operation of a relay such as RSA closes an operating circuit for its associated route busy relay RBA which when operated locks. The circuit for a route busy relay such as RBA includes one of the conductors of cable 35–2, a front contact of relay RSA to ground at a back contact of the routing selection test relay RST. The operation of these relays also interrupts the stepping of the A route switches so that no further stepping thereof can occur and a later operation of relay RSA can only be caused by both its associated route finding relays RFA–1 and RFA–2 operating due to the reappearance of the ground on the same conductors that caused the initial selection of the A route.

The assumed operation of relay RSA in addition to the above operations completes a ground circuit from a back contact of relay RST over conductor 19–2 to the A wiper of the routing sequence switch RSQ. If it is assumed that the first routing indicator is being processed switch RSQ will be on point 2 and the ground circuit through the A wiper will complete a circuit for the operation of relays RIN–1A and RIN–1B, the first pair of routing indicator storage relays. When operated the routing indicator storage relays lock and their operation indicates that the particular routing indicator under discussion requires subsequent cross office transmission to the destination determined by the positions of the A route switch set.

*Route selection check*

When relay RSA operates as above described, it closes an operating circuit for relay RST which is a slow-to-operate relay and its operation is delayed sufficiently to permit the above-described operation of the RBA and RIN relays. When relay RST operates, it transfers the RBA circuit to relay RBT. If relay RBA is locked as it should be, its locking ground operates RBT as a check. Likewise the operation of relay RST transfers the RIN relay circuit to the winding of relay RINT. If relays RIN–1A and –1B are locked in series, as they should be, a ground is returned via point 2 and the A wiper of rotary switch RSQ to operate relay RINT as a check. Thus the storage of a route indicator in the routing indicator storage relays is checked.

In the subsequent control of cross office transmission the E wiper of the switch RSQ may be required. To check this circuit the E wiper lead must be grounded for each routing indicator processed. In the assumed case this ground originates at a back contact of relay OBA one of a set of four cross office line busy relays OBA to OBD. With both routing indicator storage relays RIN–1A and –1B operated, this ground appears at point 2 of the E level of switch RSQ and with both relays RINT and RBT operated, this ground steps switch RSQ to point 3. Therefore the switch can only advance if all the processing functions required for a routing indicator have been correctly performed. Stepping of the switch RSQ is accompanied by the operation of relay RTXR and this opens the locking circuit for relay RSA. Thereupon the latter relay releases, and it in turn controls the release of relays RST, RINT and RBT. Removal of the route switch marking conductor grounds releases all operated route finding relays RFA–1, etc., and relay RSI. Relay RTXR releases when all of the above relays have released and thus the control circuits are ready for the processing of another routing indicator.

*Multiple address message*

The preceding set forth the manner in which the route switching circuits function for processing the first routing indicator of a message and this resulted in the selection of the A cross-office route. Where a message is destined for a plurality of outlets, a corresponding number of routing indicators are provided at the head of the message and the subsequent processing of the second through the remainder routing indicators follows the same general plan for manual switching as that outlined above. After the attendant reads the first routing indicator and depresses the appropriate destination indicating push button to initiate the switching functions, the tape transmitter through circuits previously described, steps the first routing indicator through the transmitter and stops at the beginning of the next such indicator. At this time the switching control lamp 16–1, which was caused to glow in conjunction with the processing of the first routing indicator and which was extinguished thereafter, is again caused to glow to indicate the presence of the following routing indicator at the pins of the transmitter. The circuit for the switching control lamp 16–1 includes a front contact of relay PBCN, a front contact of either the high or low routing priority relays RPH or RPL, conductor 22–1, and a front contact of relay RSPH. This second glowing of the switching control lamp indicates to the operator that more routing indicators follow and she may then inspect the tape to determine the destination represented by the second routing indicator and operate the appropriate push button.

It will be recalled that in accordance with the processing of the first routing indicator, relay RBA operated and completed a circuit for the operation of the route busy multiple address relay RBSX which operates and locks. Operation of the latter relay indicates that only one destination route had been requested up to this point. The actual route selected in accordance with the second operation of a destination push button may be the same as that selected in conjunction with the first selection or it may be different. Whether or not the route is the same or different depends upon the destination requirement indicated by the grounded connectors controlling the operation of the route switches both primary and secondary.

If the destination for the second routing indicator is the same, relay RSQ will operate again due to the operation of both route finding relays RFA–1 and RFA–2. The A route selection will operate both the routing indicator storage relays RIN–2A and RIN–2B due to the position of the route sequence switch RSQ as described above. A similar check is then made to determine that these relays are locked, that relay RBA is locked, and that ground is obtained from the third point of the E level of the RSQ switch. If these conditions exist indicating a proper check, switch RSQ steps to point 4 and releases the control circuits as above. If it is assumed in this case that both routing indicators selected the same cross office route, relay RBSX remains operated.

When the destination for the second routing indicator is different from the first, a different pair of conductors from the push buttons and controlling the primary and secondary route switches is marked or grounded. In this case route finding relays RFA–1 and RFA–2 will not operate so selection of the A route does not occur. For this condition one of the remaining routes B, C, or D is required.

The particular route selected depends upon the indications provided by the remaining route finding relays in the control group. When no corresponding pair of these relays is operated by the marking conditions through the primary and secondary route switches, the B route switches will operate to select the corresponding route. Whichever relay RSB, RSC or RSD operates, will cause the operation of its associated RBB, RBC or RBD relay to record that route assignment by positioning the associated routing indicator storage relay pair and initiate a check of these functions. With two of the RB relays operated, an operating circuit is closed for the route busy multiple address relay RBMX and the route busy single address relay RBSX is released. When RBMX operates, it indicates that more than one destination is required.

The above sequence of operation is repeated for each routing indicator preceding the message being processed and as long as the number of different destinations required does not exceed four in the arrangement disclosed, subsequent cross-office transmission to these destinations can be handled directly from the incoming line receiving position. When a message requires transmission to more than four destinations, relays RBA to RBD will already be operated at the time an attempt is made to establish a fifth route. Since the grounded conductors controlling route switch operations will not then operate any associated route finding relay pair, the ground circuit through front contacts of relay RSI will pass through operated transfer contacts of relays RBA to RBD and operate relay RSMX. This completes a circuit for relay MXDC and positions the RIN relay pair associated with that routing indicator to a D route indication. Thereafter these functions are checked in the same manner as pointed out above, and operation of relay MXDC indicates that at least five different destinations are required for the message being processed and that the D route will be employed in a special manner as will appear hereinafter.

Thus in the manner pointed out above, the switching control lamp 16–1 is illuminated to indicate a routing indicator in the transmitter which the attendant reads and operates the proper push button to establish a cross-office route lead in conjunction therewith. This routing indicator is then advanced through the transmitter and the lamp 16–1 reoperated for the next routing indicator and the process repeated until all of the routing indicators of the message are processed, which in the arrangement disclosed may be a total of nine. Each routing indicator is handled in turn and the control circuits retain a record of the particular route selected for each routing indicator. Relays RBSX and RBMX provide a record of whether the message requires transmission to more than four destinations. Further functions controlled by the above mentioned relays will be set forth in the following paragraphs.

The individual routing indicators are separated by a space character and the tape transmitter during manual switching operations is automatically stopped when such a character is detected between routing indicators so that the operator can inspect the next routing indicator and determine its switching requirements. On detection of the space character in the transmitter relay RSPC operates through circuits completed by thyratron 26–1.

A carriage return combination terminates the routing information whether or not it is a single routing indicator or one containing up to 9 routing indicators. When a carriage return character is detected by the electronic circuits associated with the transmitter, thyratron 26–4 fires and completes a circuit over conductor 26–6 for the operation of relay RCRC. Relay RCRC locks to the same ground previously used for the operation of relay RSPC. This ground extinguishes thyratron 26–4. When relay RCRC operates it opens the transmitter auto-stop circuit to prevent further stepping of the transmitter and thereby further stepping into the tape loop formed thereat. Relay RCRC also closes an operating circuit for the message start lamp 16–2 which indicates to the operator that the processing of all routing indicators has been completed and that the message start initiate push button 15–2 should be operated. Operation of this push button closes a circuit for stepping switch XSQ from point 2 to point 3.

As switch XSQ steps to point 3, it opens the circuit to relay TXTG which releases and in turn releases whichever of the relays PBPL or PBPH that was operated. Relay TXTG also opens the circuit to solenoid 18–16 permitting the slide member of the transmitter to return to its right hand position. This returns the tape which had been forming the tape loop back of the transmitter pins to a position ahead of the pins for subsequent resensing thereof. Release of relay PBPL or PBPH causes release of the multiple contact relay PBCN and releasing this relay disconnects the receiving position routing processing control circuits from the push button panel and makes the same available for the other receiving position of the pair associated therewith. Accordingly, a message can now be switched from the other associated receiving position. As relay PBCN releases, it opens the circuit to relay RTXI which releases and is followed by the release of relay RSQH and RSQO. As the latter relays release, switch RSQ is operated to return to its home position.

In accordance with the described embodiment of the invention, a message should not contain more than nine routing indicators. If a tenth routing indicator should appear and an attempt made to process the tenth routing indicator, the off-normal springs 21–1 of switch RSQ operate when the switch reaches point 11. This occurs following the processing of the ninth routing indicator, and operation of these contacts opens the step magnet circuit. Accordingly, if an attempt is made to process a tenth routing indicator, switch RSQ will not step, relay RTXR will not operate, and as a result the position will be tied up. With this condition an alarm is operated to appraise the attendant of the situation. Another guard feature of the system includes the arrangement for tying up the position should switch RSQ in stepping from one point to the next fail to stop, and the off-normal contacts 21–1 operating when the switch reaches its eleventh point tie up the position.

*Supervisory controls—Manual switching*

Sometimes the routing indicator appears in the perforated tape in a mutilated condition and it cannot be determined what destination it is intended for. In such a case the message tape is reset in the transmitter to the start-of-message combination and the master reset key 14–1 operated to return the receiving position control circuits to the starting point of a message processing cycle. Then when the message waiting lamp 14–6 operates, the priority key 14–8 is operated, and assuming the space character follows the precedence prosign, the switching control lamp 16–1 will operate when this character is detected. A push button assigned to a local supervisory position should then be operated to switch the message thereto for supervisory handling in accordance with established routine for such messages.

As described above, relay RBSX is operated when the first route has been selected, and with this relay operated the message start initiate key 15–2 can be operated to step switch XSQ from point 2 to point 3 even though the start-of-message lamp is not operated. Also, in accordance with the above, when more than one cross-office route is selected, relay RBSX is released and operation of the message start initiate button 15–2 will not step the switch XSQ until the start-of-message lamp circuit has been completed. This arrangement guards against incomplete processing of a routing line.

Where the start of a message is so mutilated that the required space character is not present following the precedence prosign characters, and also where it is desired to switch a supervisory note to some destination without requiring the note to contain the usual start-of-message and sequence number information, special handling of the message may be required. In these cases the sequence number indicator main switch can be stepped to point 11 by operating the comparison bypass switch which eliminates the comparison function. In this connection operation of the priority key 14–8 established a connection to the push button panel in the same manner as previously described. The reoperation of the comparison bypass switch closes a ground circuit through front contacts of relay PBCN to directly operate relay RSPC. Thereupon operation of any desired destination push button effects a route selection and as long as only one push button is operated, cross-office transmission of the message can be initiated by operating the message start initiate key 15–2. With this arrangement it is therefore possible to switch any message from the receiving position whether it is in proper form or not.

*Automatic switching*

Either one or the other or both of the receiving positions in the console can be adapted for automatic switching and when such is desired the automatic manual switch 15–1 is moved to its left hand or automatic position. In automatic switching a director is employed and controls the receiving switching functions for each message processed. A translator is also employed and provides a switching control code for each routing indicator processed or passed to it by the director.

In general the precedence prosign, the routing indicators and the end routing combinations are individually passed in the receiving position to the director and the director in turn passes them into the translator. In certain respects the automatic switching functions duplicate some of the functions effected during manual processing of the routing indicators and only those functions specific to the automatic switching will be described at this time.

In the specific embodiment of the invention disclosed herein, a switching center having a large number of receiving positions is divided into sections of 100 positions with each such section subdivided into 10 groups of 10 receiving positions each. The directors are employed on a sharing basis and a section of a hundred receiving positions may have a total of 6 directors. The directors are associated therewith in such a way that any director can serve any receiving position group at a time. Once connected to a receiving position group a director serves every position in that group requiring automatic switching before it is released. The translators, for which there may be one of each two directors, are also employed on a shared basis and with the above arrangement there may be 3 translators for each section of 100 receiving positions or the 10 groups of 10 each. Any translators of a section can serve any one of the 6 directors.

A director is connected to a receiving position and remains connected thereto for the processing time of the complete line of routing information. Each routing indicator is transferred to the director one character at a time at the rate of 200 words per minute and upon the transfer of the third character of a routing indicator the director obtains a connection to a translator. The director delivers all characters of a routing indicator simultaneously to the translator and the translator returns to the director a switching control code representing the disposition to be made of that routing indicator. This information is stored by the director and used to control the receiving position switching circuits.

The functions of the director are divided into two separate parts and one of these is concerned with obtaining from the receiving position each routing indicator for which a switching control is required and the other is concerned with the storing the switching control codes obtained from the translator and controlling the receiving position switching functions. With this arrangement a second routing indicator can be transferred to the director while switching operations are being performed for the preceding routing indicator. The delivery of the routing indicator characters from the director to the translator occurs simultaneously and the translator acts upon these characters substantially instantaneously and returns the desired switching code to the director. Thereafter the translator can be released for use by another director. Each director includes an electronic character storage unit which records the characters of a routing indicator.

Operation of the circuits at a receiving position for manual or automatic switching are similar up to the operation of relay TXTG and the automatic switching will be described beginning with the operation of this relay and for the time being it will be assumed that the message being processed has but a single routing indicator. Operation of relay TXTG and the movement of the tape transmitter slide member to its lefthand position closes an operating circuit for relay DCNI, FIG. 15. This indicates that the receiving position has a message on hand ready for the routing line processing by a director. When a director is connected to this receiving position as will be set forth, relays DCNS and DCN operate. As relay DCN operates, relay RTXI, FIG. 13, operates and in turn operates relay RSQH. As a result of these relays operating, switch RSQ steps to point 2 in readiness to process the first routing indicator and relay RSQE operates.

Operation of the director connect relay DCN which is a multiple contact relay similar to relay PBCN and having a number of circuits in parallel relation therewith, among other things connects the sensing pins of the tape transmitter over cable 18–12 to the director. Another circuit completed by the operation of relay DCN is a director probe circuit through contacts 40 from the plate of vacuum tube 25–18 via conductor 16–1. This circuit provides probe pulses to the director at the rate of 200 w.p.m. to control the character storage functions of the director. A probe pulse is delivered for each actual tape character transferred to the director but no probe pulses are delivered during transmitter auto-stopped periods.

Relay RTXI, which is operated by relay DCN, closes a transmitter auto-stop circuit and permits the transfer of characters in the tape to the director to commence. The first of these characters will be the precedence prosign and they pass into the tape loop being formed by virtue of the tape transmitter slide element being in the loop forming or left hand position. The space character following the precedence prosign causes the operation of relay RSPC and this stops the tape transmitter for the time being. As will appear hereinafter, the transfer of the precedence prosign characters to the translator results in the grounding of either one of the priority leads through tongues 34 or 35 of relay DCN, and causes operation of either the high or low priority routing relays RPH or RPL respectively. Operation of either one of these relays with relay RSPC operated grounds a switching control lead leading to the director through contacts 38 of relay DCN. Such operation indicates that the receiving position has responded to the priority indication.

In response to the grounding of the switching control lead (hereinafter these leads will generally be identified by the number of the contact of relay DCN through which they pass) the director grounds the transmitter start lead through contacts 46. Grounding of the transmitter start lead operates relay RTXR which causes release of relay RSPC. Relay RTXR in operating also grounds the control release lead to contacts 49 of relay DCN but this performs no function at this time. The release of relay RSPC removes ground from the switching control lead and indicates to the director that the connected receiving position has responded to the transmitter start indication.

Assuming that the message being processed contains a single routing indicator for the time being, the release of relay RSPC permits the transmitter to operate and transfer the characters of the routing indicator to the director, one character at a time, and these characters pass into the tape loop for subsequent retransmission by the transmitter when the desired cross-office circuit has been established. The detection of the carriage return character at the end of the routing combination, as in the manual switching operation, causes operation of relay RCRC which stops further operation of the tape transmitter. The routing indicator characters transmitted to the director cause it to operate and produce a switching code which it stores for the time being, and operation of relay RCRC grounds the carriage return control lead through contacts 39 of relay DCN to the director. This indicates to the director that a complete routing indicator has been transferred thereto and that the switching code produced should be returned to the receiving position control circuits. The grounding of the carriage return control lead also informs the director that the end of routing combination should be transferred next.

As will be set forth, the switching code is returned to the receiving position by grounding one of the 25 lead conductor set, contacts 1 to 25 of relay DCN, FIG. 8, and one of the leads of the 8 conductor set, contacts 26 to 33 of relay DCN. These grounded leads are the same as would be grounded, with relay PBCN operated, by operating one of the destination indicating push buttons PB1, etc., assigned to this destination. Thereafter the primary and secondary route switches control the circuits and operate in the same manner as set forth above for a manually controlled switching operation. Relay RSI operates to initiate a route selection function as above, but with switch 15–1 in its automatic position, operation of relay RSI is independent of the condition of relay RSPC.

During automatic switching the locking circuit for relays RCRC and RSPC, while subject to relay RTXR being released is also subject to relays RSI, RSA through RSMX being released. Operation of relay RSI in response to the switching code for the routing indicator being processed releases relay RCRC which permits the tape transmitter to pass the next character group into the director and remove the carriage return control lead ground. The character transfer occurs while the route selection function for the preceding routing indicator is being performed, and the characters passed into the director and the tape storage loop at this time should be the end of routing combination. At the end of the route selection function, switch RXQ steps to point 3 and relay RTXR operates in the same manner as during manual switching.

Operation of relay RTXR grounds the code release relay through contacts 49 of relay DCN and indicates to the director that the receiving position circuits have performed all the route selection functions and that the switching code may now be cleared out of the director switching code storage section. This results in the removal of ground from the route switch control conductor group and allows the associated control circuits of both the director and the receiving position to be released. This includes the release of relay RTXR at the conclusion of this function which removes ground from the code release lead to the director which indicates that the receiving position is in a condition to accept another piece of routing information. In the meantime the director has passed the end of routing combination into the translator and assuming it is in correct form, a message start indication is returned to the director. This is passed to the receiving position as a ground on the message start lead contact 47 of relay DCN and stepping relay XSQ to point 3. This releases relay TXTG and permits the slide member of the tape transmitter to return to its right hand position where the processed characters are in position to be resensed and transmitted cross-office to the selected outgoing line position, as will appear. When relay TXTG releases, relay DCNI also releases and grounds the release director lead through relay DCN which initiates a disconnect function including the release of relays DCNS and DCN. Release of relay DCN releases relay RTXI followed by the release of relays RSQH and RSQO whereupon switch RSQ steps to its home position or point 1.

For multiple address messages or those containing more than one routing indicator, relay RSPC operates on the detection of the space character by the transmitter at the end of the first routing indicator. This places a ground on the switching control lead to the director causing it to return the switching code for the first routing indicator as above, and operation of relay RSI in conjunction therewith releases relay RSPC. This allows the characters of the second routing indicator to be passed into the director and the control circuits reoperated through a similar cycle.

At the conclusion of these functions the code release lead to the director is grounded which clears out the switching code and is followed by the release of relay RTXR. Then operation of relays RSPC or RCRC at the end of the second routing indicator grounds either the switching control or the carriage return control lead respectively to the director causing it to return the switching code for the second routing indicator. If the switching control lead is grounded, the operation is the same as outlined above and the third routing indicator is passed into the director. However, if the carriage return lead is grounded, the director is also set for the end of routing combination as the next character group is passed into it. When the director receives this combination, the disconnect function of the director is initiated as in processing a single routing indicator message. From the above it is evident that the director can receive one group of routing characters while action on the preceding group of routing characters is taking place. This reduces the holding time of the director and permits rapid processing of the routing indicators by the director.

*Automatic switching supervisory controls*

It is obvious for automatic switching that the character groups indicating the precedence prosign, the routing indicators and the end of routing must be correct for proper operation. In cases where the translator can not interpret a character combination, it operates to return a routing failure indication to the director and the director, in turn, grounds the route code failure lead through contacts 37 on relay DCN causing operation of the director route failure relay DRFL. When this relay operates, the circuit is completed for the operation of the route failure lamp 14–9 individual to the involved receiving position as well as a general alarm at the center. Relay DRFL in operating also initiates release of the particular director connected thereto so that the director can be employed by other receiving positions and the involved receiving position is left tied up with the character group causing the tieup at the last portion of the tape in the storage loop. Thus a character group that can not be automatically processed by the director and translator does not tie up these pieces of equipment and permits them to be used by other positions while an indication is made by the alarm circuits of the receiving position involved.

As outlined above, there are six possible precedence prosign character pairs preceding the message and the routing line which indicate the type of handling the message should have and of these six pairs, the precedence prosign CC indicates that a connect-through set-up is desired. Such a connection is one where cross office connections to outgoing destinations are to be used continuously for a time for conference purposes. When a CC precedence prosign is sent through the director to the translator the translator returns to the director a connect-through indication by this indication is not immediately passed to the receiving position. Instead, the director returns a high priority indication and continues to perform switching code functions for all following routing indicators ahead of the message. When the subsequent end of routing combination is detected by the translator and the usual message start indication is returned to the director, the connect-through request lead, contacts 36 of relay DCN is grounded to the receiving position instead of the message start lead as in other cases. The grounding of the connect-through request lead causes operation of relay DCTI whereas the message start lead in the other cases stepped switch SXQ to point 3. As relay DCTI operates, it releases relay DCNI, disconnecting the director and also operates a connect-through indication lamp 15–3 at the receiving position and other supervisory alarms. In response to these signals, the supervisor proceeds to operate the proper switches and controls, as will be apparent, that are required for a connect-through set up.

*Cross office connection control circuits*

Following the processing of the routing information at the beginning of a message, the next step is the establishment of the cross office connections to one or more sending positions with the number of such connections depending upon the requirements of the message. The idle or busy condition of a desired sending position is obtained at the receiving position over the route lead connection established during the processing of the routing information of the message to be switched. There is a test circuit for each of the four possible route connections. Considering the A route test circuit, for example, its associated relay RBA is operated when the A route is selected. Before relay RBA operates, the grid of the left hand section of vacuum tube 36–1 is biased to cut off and relay ORTA in the plate circuit thereof will be released. When the A route is selected, resulting in the operation of RBA, the control grid of the left hand section of vacuum tube 36–1 is connected through back contacts of relays OBA and RMXA, the front contact of relay RBA, a conductor of cable 35–3, a front or back contact of relay RPH, a conductor of cable 22–2 through a wiper and point of one of the four secondary route switches RA–2 to RD–2 and the wiper and point of one of the four primary route switches RA–1 to RD–1 to a particular sending position. By employing the various levels of the secondary route switches and 8 levels A to H of the primary route switches any one of 200 route leads from the points of the primary switches may be selected. If the selected sending position is idle, the route lead terminates in positive potential in the sending position and through the above connection, positive potential will operate the left hand section of tube 36–1 causing the operation of the associated relay ORTA in its plate circuit. However, if the selected sending position is busy the route lead may be momentarily at ground potential or open for the duration of the busy period. Either of these conditions will not permit the left hand section of tube 36–1 to operate relay ORTA. Thus, the operating or released condition of relay ORTA indicates whether or not a sending position is available for a cross office connection on the A route. In a similar manner and through corresponding circuits, the B, C and D routes are tested to determine the availability of respective sending positions.

Only one connection can be made to a sending position at a time even though several receiving positions may desire a connection to the same receiving position. To permit only one connection at a time to a receiving position, a relay allotter arrangement common to all the receiving positions is employed.

At the conclusion of the processing of the routing information for a message, switch XSQ as explained above, is stepped to point 3. Such operation of switch XSQ completes a circuit from ground on the A wiper thereof over conductor 14–12, back contacts or relay OLTI, conductor 38–1 to the lower set of contacts 2–14 of the message waiting indicator. With one or more messages on hand waiting to be switched these contacts will be closed and the grounded circuit continued through the coil of relay OCNI to potential resulting in the operation of the latter relay. Reception of a higher priority message which operates relay OPH, causes operation of relay OCNI independently of the message waiting indicator contacts 2–14. Thus cross office connections for a high priority message can be established even though such a message has not been completely received.

A check is also made to determine that a relay RSQ is at its home position or that the wipers are on point 1 and this check circuit begins at ground on the K level of switch RSQ, back contacts of relay RSQH, conductor 18–17, the right hand closed contacts of 18–19, closed contacts of relay OCNI to contacts of relays ORTA through ORTD. This circuit also checks that the tape transmitter slide member has returned to its right hand position. Relays ORTA to ORTD operate if idle sending positions are available and operation of any one of these relays extends the above ground circuit through back contacts of relay RMXI and the coil of relay ORI, FIG. 36, to the plate of tube 36–4. The above ground circuit is also connected to the timing network of tube 36–4 associated with the starter anode thereof and operation of relay ORI depends upon the timing delay provided by the network.

In selecting a receiving position for establishing a cross-office connection, first choice is given to the positions having a high precedence message on hand; such positions are represented by the released condition of their RPL relay and the operated condition of either relays RBSX or RBMX. With either of the two latter relays operated, a ground is connected to the timing network of tube 36–4 at a point which produces no delay in the operation of relay ORI. Thus, such positions are instantly able to indicate their need for the use of the allotter.

Second choice is given to those receiving positions having a low precedence multiple address message on hand, since such messages require cross-office connections to more than one destination. In such cases relays RPL and RBMX are both operated and the ground is then connected to the timing network of tube 36–4 at a point which produces a 1/10 second delay in the operation of relay ORI. Final choice is given to those receiving positions having low precedence single address messages on hand and in such cases relays RPL and RBSX are operated. The ground in this case is connected to the timing network so as to produce a 2/10 second delay in the operation of relay ORI.

When relay ORI at any receiving position operates, it indicates the need of that position for the use of the allotter. From the above it is evident that if several receiving positions simultaneously desire a cross-office connection to the same destination, those positions with the highest choice message on hand will be first to operate their ORI relays. Thus these positions will obtain the allotter ahead of the positions having a lower choice message on hand. The exception to the above occurs for a high priority (5 bell signal) message in which case relay OPH operates on the detection of the 5 bell signal in the incoming line reception. Operation of this relay causes the controlling ground to be connected to the starter anode of tube 36–4 at a point which causes no delay in the operation of relay ORI regardless of the conditions of relays RPL, RBMX and RBSX. Accordingly, messages passing through the transmitter in advance of the actual 5 bell signal message will obtain first choice in the use of the allotter regardless of their actual priority indications. Thus unswitched messages ahead of a high priority or a 5 bell signal message will have first choice in use of the allotter so that the following 5 bell signal message will not be delayed while other messages of lower priority are being switched.

*Route selection at small centers*

At some switching centers where push button control switching only is employed, as there are not a sufficient number of receiving positions to warrant the use of automatic director controlled switching equipment, a relay allotter arrangement is employed in the route selection. The basic circuits for such a relay allottee arrangement is shown in FIG. 79 and it will be understood that some of the relays of these circuits are also involved in other phases of the system operation, and are therefore also shown in other figures.

Figure 79:
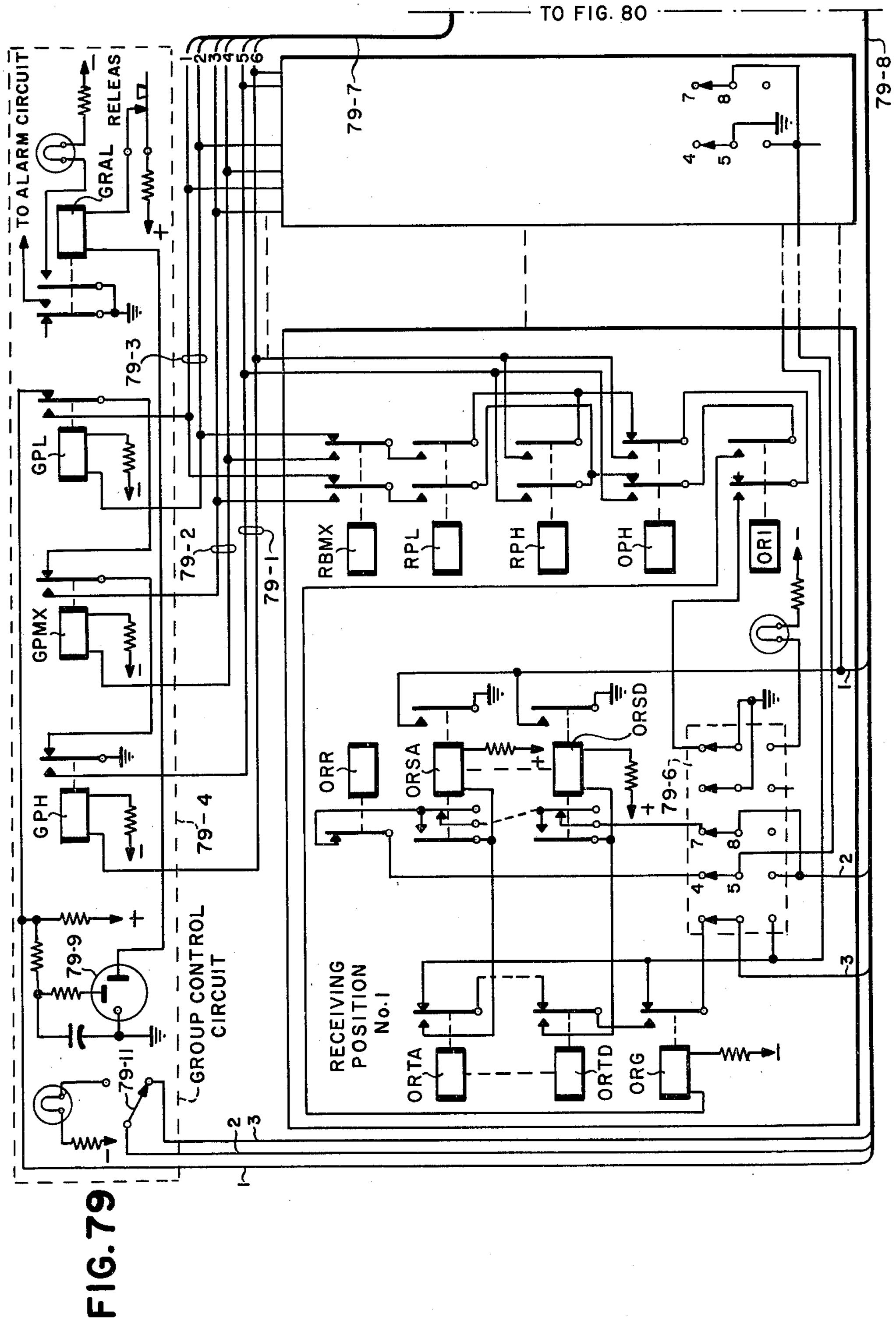

As shown in FIG. 79, three pairs of control conductors 79–1, 79–2 and 79–3 are multipled from the group control circuit 79–4 to all of the receiving positions, and one conductor of each of these pairs provides a circuit for operating an associated group control relay GPL, GPMX or GPH. Thus, these relays provide means for registering all choices of messages that are on hand waitiing to be switched. The other conductor of each pair serves as a means for selecting all receiving positions having the same choice of traffic on hand. Only one of the conductors can be grounded at a time and the conductor that is grounded will be that for the highest choice of message on hand at the moment.

As described, when a receiving position desires a cross-office connection its ORI relay operates and this completes a ground circuit through its cut-out switch, a front contact of relay ORI to contacts of relays OPH, RPH, RPL and RBMX. Depending upon the message waiting to be switched, one or more of these relays will be operated. For example, a low precedence single-address message will cause relay RPL to be operated whereby the grounded circuit is extended to the coil of relay GPL. Similarly, a high precedence single-address message results in the operation of relay GPH and multiple-address messages, either high or low precedence, will cause the operation of either relays GPH or GPL respectively together with relay GPMX. If relay OPH has been operated by a high priority, five bell signal message, the above grounded circuit is connected only to the control conductor for operating relay GPH regardless of the position of the other priority indicating relays. Thus, a receiving position can ground only one of the control conductors for any message being processed and any combination of relays GPL, GPMX or GPH may be operated at any one time.

Let it be assumed that the receiving position designated No. 1 has a low priority single-address message on hand as indicated by its RPL relay being operated. Subsequent operation of its ORI relay completes a circuit for the operation of the group control low priority relay GPL. If this is the only relay of the group control circuit operated at the moment, a ground circuit including back contacts of relays GPH and GPMX, a front contact of relay GPL, a back contact of the No. 1 receiving position relay RBMX, a front contact of relay ORI, to the coil of its ORG relay, results in the operation of relay ORG and in a similar manner the same ground also operates the ORG relay at all of the other receiving positions having the same choice of traffic on hand or whose ORI relays are also operated. When relay ORG operates, it indicates that the associated receiving position may have use of the allotter for establishing cross-office connections.

Relay ORG of receiving position No. 1 will not operate if either relay GPMX or GPH of the group control circuit are operated. If relay GPMX is operated, circuits are such that the ORG relays of only those receiving positions having low precedence multiple-address messages on hand will operate, and if relay GPH is operated, the ORG relays of only the receiving positions having high precedence traffic on hand will operate. The pattern of operated ORG relays can change from time to time and the group control circuit serves to select the receiving positions having the highest choice of traffic on hand at any moment and to also indicate to those positions that they may have use of the allotter.

Several of the ORG relays in different receiving positions may be operated at the same time and it is necessary to select a particular receiving position for the establishment of the desired cross-office connection. The particular receiving position selected may require cross-office connections for more than one of its possible four routes, and it is necessary to select only one route for this particular cross-office connection opportunity.

The selection function is performed by a selection chain circuit which starts at ground on the connect cut-out switch, such as 79–6, of the highest numbered receiving position or position No. 10 in FIG. 79, and passes through contacts of released relay ORR, ORSA through –D, of all the receiving positions and then through the connect cut-out switch to the transfer contacts of the ORG relay of the No. 1 receiving position. If the ORG relay of the No. 1 position is released, the circuit continues to the transfer contacts of the next higher numbered receiving positions and so on up to the highest numbered position. If no ORG relay is operated at the moment, the selection chain circuit is idle.

If it is assumed that the ORG relay of the No. 1 receiving position is operated, the selection chain ground circuit is then connected to the transfer contact circuit of associated relays ORTA through ORTD. One or more of the latter relays will be operated at this time and the chain circuit is extended through the coil of one of the associated relays ORSA through ORSD. This will result in the operation of one of the latter relays which lock directly with the selection chain ground and until it releases no other ORS relay in the entire chain can be operated. If it is assumed that relay ORSD of the No. 1 receiving position operated, it will allow the receiving position to establish a cross-office connection to a receiving position over its D route and relay ORTD releases during this operation. At the conclusion of that operation relay ORR of the involved receiving position operates in a manner to be set forth to open the locking circuit for relay ORSD, releasing the same.

When all circuits associated with establishing that cross-office connection are checked as having cleared out, relay ORR releases. This restores the selection chain circuit to its original condition and if relay ORTC of the No. 1 receiving position is operated, associated relay ORSC will operate next to furnish a cross-office connection for the C route of that position. This procedure continues until all ORT relays of the No. 1 position are released, and the next higher numbered receiving position whose ORG relay is operated has an opportunity to establish cross-office connections. When all the ORT relays of a receiving position are released, the associated ORI relay is also released and this is followed by the release of its ORG relay. Also, when all the ORI relays of all the receiving positions having the same choice of traffic on hand become released, the group control relay for that choice also releases. Then the receiving positions having the next lower choice of traffic on hand have the opportunity to establish cross-office connections in the same manner as that outlined above.

*Route selection at large centers*

Where a switching center has a sufficient number of receiving positions to warrant the use of automatic director controlled switching equipment, a different allotter arrangement is employed. In such cases, the group control circuit 79–4 is replaced by a cross-office route preference and selection circuit of the type shown in FIGS. 80, 81 and 82.

Figure 80:
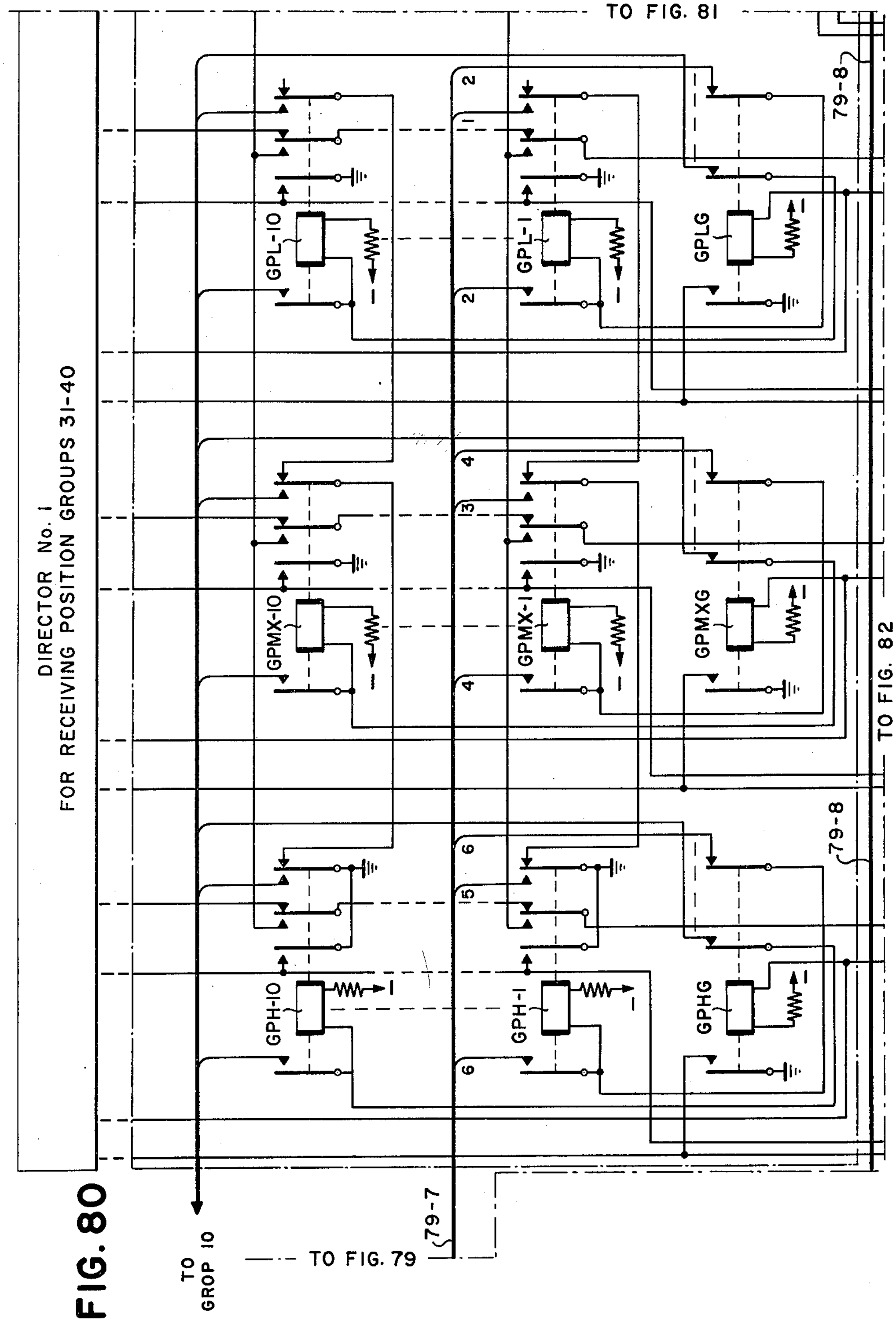

In automatic switching the receiving positions are divided into groups of ten positions each and ten such groups, form a section of 100 receiving positions. A section may be served by a maximum of six directors and with a maximum of 400 receiving positions there may be as many as four sections of ten groups of ten receiving positions each. Each section has its respective allotter equipment and a control common for all the allotters is included. The three pairs of common control conductors 79–1 to 79–13 and other control leads from the ten receiving positions comprising group 1 are connected as shown by cable 79–7 and 79–8 in FIG. 80. Similar sets of cable are connected to other receiving positions groups. In FIG. 80 the three pairs of control conductors extend to relays GPH–1, GRMX–1 and GPL–1, and the operating control of any one or all of these relays is the same as that previously set forth above with the exception that to operate relay GPH–1, for example, the associated GRHG relay must be released. However, once operated, relay GPH–1 locks directly to its control conductor and remains operated as long as that conductor is grounded even though relay GPHG operates. The particular pattern of operated ORG relays for the 10 receiving positions is determined by the highest choice of traffic on hand as before. Similar functions are performed for the other nine groups of ten receiving positions served by this director group. Thus independent patterns of operated ORG relays are established among the first ten receiving position groups and similar independent patterns exist for all other receiving position groups at a center having such groups.

After the establishment of the independent patterns it is next necessary to select one receiving position group from among those indicating the highest order of traffic on hand and allow that group to establish all cross-office connections required for that order of traffic. Furthermore, it is necessary to serve every receiving position group having the highest order of traffic indicated before any traffic of a lower order is handled or before any group of receiving positions already served for this highest order of traffic is allowed to be served again. As indicated in FIG. 80 each receiving position group of ten receiving positions has a GPH relay and there may be as many as ten such groups. These relays are identified as GPH–1 to GPH–10. Likewise each group of ten receiving positions has a GPMX relay and a GPL similarly identified. A GPH relay operates when one or more receiving positions of respective groups have the highest choice or order of traffic on hand. When one of these relays operates, a circuit is completed for relay GPHI through back contacts of relay GPHC. Relay GPHI in turn operates all GPHG relays which open the individual operating circuits for their associated GPH relays. However, any GPH relay that is operated remains locked directly to its control leads. Relay GPHI is somewhat slow operating to insure the operation of all GPH relays whose control circuits are grounded prior to the operation of relay GPHG. As relays GPHG operate, they in turn operate relay GPHC which opens the original operating circuit for relay GPHI. The latter relay, however, remains locked directly to the operated GPH relays and in effect provides a gating control for the GPH relay operations.

Following the above sequence of operation the lowest number receiving position group having its GPH relay operated is allowed to establish all required cross-office connections. On the completion of these high priority cross-office connections for receiving position group 1, ground is removed from the control lead to its respective GPH relay whereupon it releases. As long as the GPHG relays remain operated, the released GPH relay can not reoperate. Accordingly that particular receiving position group can not again be served until all the other groups that have operated GPH relays have been served. When the GPH relay of the last group of receiving positions to be served releases, it opens the circuit for relay GPHI permitting it to release. This operation is followed by the release of all GPHG relays and then a new pattern of operated GPH relays can be established. When relays GPHG release, relay GPHC also releases, which allows relay GPHI to operate again for any operated GPH relay. This permits the gating sequence outlined above to be repeated. In a similar manner the GPMX group and the GPL group of relays operate for their respective order or choice of traffic.

It will be evident from the circuits that for any operated combination of relays GPHI, GPMXI or GPLI, ground will be connected to the series transfer contact circuit of only one of the relay groups GPH, GPMX or GPL at any time and that this will be to the group indicating the highest choice of traffic on hand at the switching center. If it is assumed that relay GPH–1 for the lowest numbered receiving position is operated resulting in the operation of relay GPHI, a circuit will be closed through transfer contacts of relay GPH–1 to operate relay GORI–1 through back contacts of relay GORS–1. Operation of relay GORI–1 closes a selecting chain circuit for operating associated relay GORS–1 and this relay locks to the selecting chain battery source and no other GORS relay can operate until it releases. As relay GORSI–1 operates, it opens the original operating circuit for relay GORI–1 but this relay does not release at this time as it is locked directly to the GPHI ground through operated relay GPH–1.

With both relays GORI–1 and GORS–1 operated, the selecting chain circuit for that receiving position group is closed. For those positions whose ORG relays were operated by operation of relay GPH–1, route selections for cross-office connections can be made as previously described. Relay GPH–1 releases when the last required selection is made, which releases relay GORI–1 and transfers the selecting chain ground circuit of that receiving position group to a second winding of relay GORS–1. This releases GORS–1.

If some other GPH relays were operated when GPH–1 released, ground from the operated GPHI relay will operate relay GORI associated with the next operated GPH relay. When relay GORS–1 releases, the GORS relay associated with the next operated GORI relay will operate and thereupon that receiving position group will be served. Not until all operated GPH relays release will relay GPHI release, and not until the latter relay releases can a lower choice of traffic be handled. This assures that all the highest choice traffic will be served before any lower choice is served. In a similar manner operations involving relays GORI and GORS govern the serving of the two lower choices of traffic.

*Allotter supervisory controls*

The allotter arrangements include a number of alarm and control circuits whereby trouble or misoperation of any of the circuits can be readily located. In the arrangement of FIG. 79 a tube 79–9 with an associated timing network is employed. The operation of relays GPL, GPMX or GPH starts the timing network and unless an ORS relay operates within a predetermined length of time, the tube causes relay GRAL to operate and light the associated lamp and other alarm indications. In addition each receiving position is equipped with a connect cut-out switch, such as 79–6, and when the switch is thrown to its cut-out position, the selection chain circuit passes directly through that receiving position whereby that receiving position does not participate in the group control circuit actions. The group control circuit 79–4 also has a connect cut-out switch 79–11 by which it can interrupt the selection chain of all the receiving positions in the center and connect the selection chain ground part of the circuit to a signal lamp. If this circuit is closed through the relay contacts, the lamp will operate. Thus it can be determined whether the failure of the selection chain to operate properly is due to an open condition in the ORS or ORG parts of the circuit.

Figure 81:
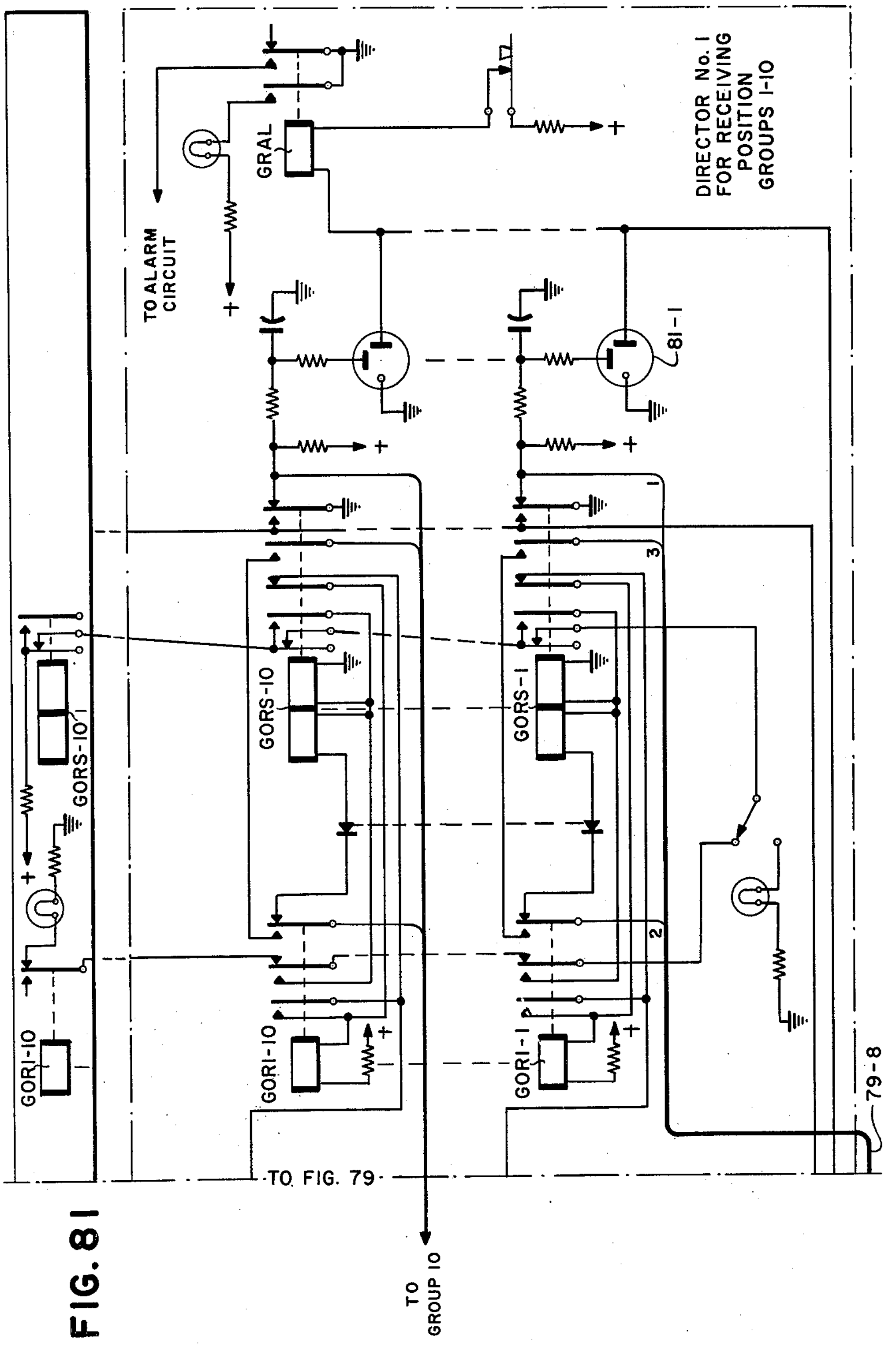
Figure 82:
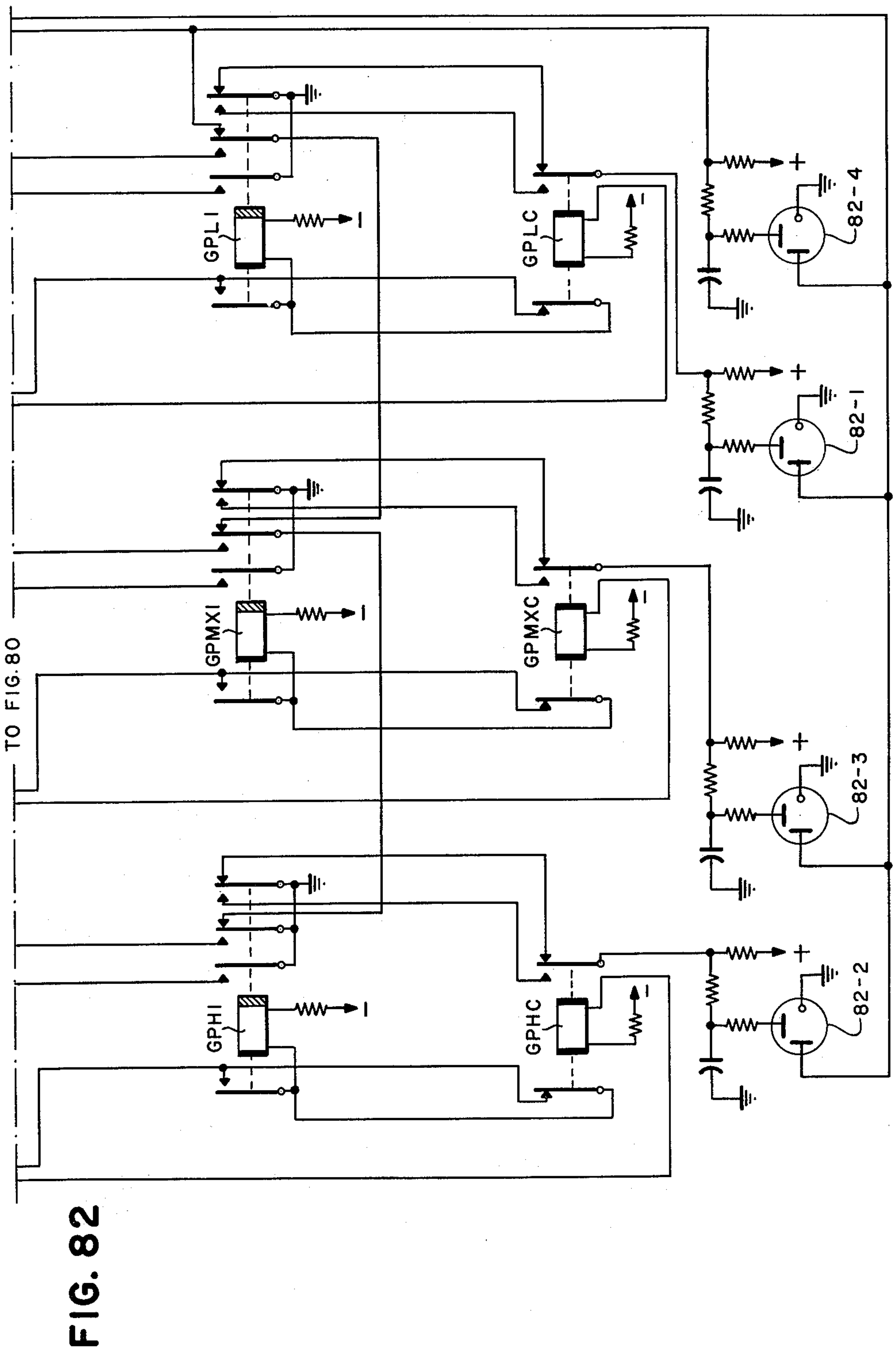

In the arrangement of FIGS. 80–82, a vacuum tube controlled delay alarm circuit is provided for each receiving group. The timing action of this circuit starts with the operation of a GORS relay which removes ground from the starter anode of its associated tube 81–1. Unless an ORS relay in the associated receiving position group operates within the timing interval to reapply ground to the starter anode, the tube fires and operates the GRAL relay common to that section. The GRAL relay completes an alarm circuit and illuminates a signal light to indicate the section of the allotter involved.

A check is also provided for the proper operation of the GORS relays. These timing actions start whenever a GPHI, GPMXI and a GPLI relay operates. Operation of either one of these relays should be followed by the operation of some GORS relay within the timing period and if this does not occur an 81–1 tube fires to operate the GRAL relay of that director to operate.

The gating action for some of the relay groups of FIGS. 80–82 is also checked by a time control alarm circuit. Timing action for the GPL relay group, for example, starts when relay GPLI operates. This should be followed by the operation of all GPLG relays and operation of relay GPLC if the gating circuit is working properly. Should relay GPLC fail to operate within the timing period, its associated tube such as 82–1 will fire and cause operation of relay GRAL in that director. Other tubes such as 82–2, –3 and –4 time operation of associated relays and also cause operation of relay GRAL for abnormal conditions.

Figure 2:
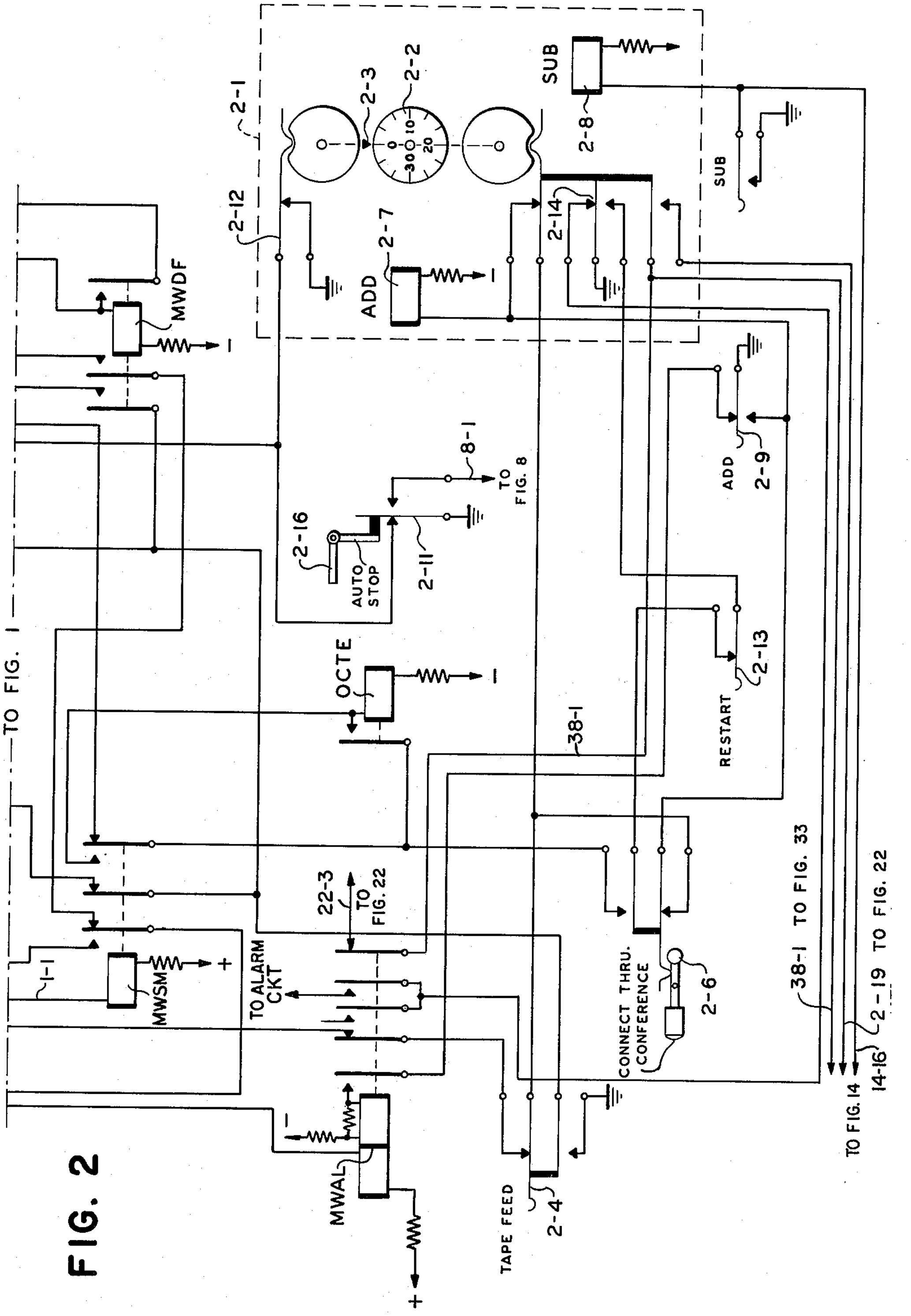

In FIG. 2 relay MWAL operates when two consecutive start-of-message combinations are detected at a receiving position. Operation of this relay opens the circuit to the add magnet 2–7 of the message waiting indicator and no further add count can be made. However, each message switched across office results in the subtract magnet 2–8 being operated and the net count will reach zero when the particular message associated with the operation of relay MWAL reaches the tape transmitter for processing. The start-of-message number checking and routing line processing for this message will take place in the normal manner. However, with the message waiting indicator at zero count, contacts between the conductors 2–19 and 38–1 will be open. With relays OPH released, it is not possible to operate relay OCNI when switch XSQ steps to point 3 at the conclusion of the processing function of this particular message. It is also impossible to operate relay OCNI through operated contacts of relay OPH with relay MWAL operated. Thus for a message having two consecutive start-of-message combinations, no request for the allotter can be made and the message in trouble is left partially handled in the transmitter for supervisory attention.

*Cross-office connection circuits*

The arrangement for establishing a cross-office transmission circuit from an incoming line or receiving position to a sending or outgoing line position involves a number of control crcuits and checking functions. The message signals are transmitted cross-office at the rate of 200 words per minute and at the line receiving position controls a reperforator to store the signals in a tape. The tape subsequently passes through a transmitter which transmits signals to the line at a speed governed by the capabilities of the line.

Among other things, the sending position includes a numbering machine for appending sequence numbers to the messages as they are transmitted therefrom and a sending position transmitting to a way or multi-station circuit has a number of numbering machines associated therewith, one for each station on the circuit. The reperforator of the sending position also employs "read back" pins which operate to check the accuracy of certain characters transmitted to the reperforator.

An outgoing line position may also be equipped with a load distributor arrangement which gives preference to certain types of messages of multi-channel outlets. A number of other units of equipment, such as message disregard circuits for transmitting to the sending line a predetermined sequence to inform the distant end that the message under transmission is to be disregarded, are also included in the sending line position equipment. These various units of equipment will be described in more detail in the following in conjunction with the description of the operation of the circuits and other equipment at the sending position.

The circuits and equipment for connection to a sending position are shown in FIGS. 40 to 51 and the particular circuit shown is indicated as being one associated with a multi-station circuit and having a plurality of numbering machines associated therewith, one for each station. The route leads from the points of the primary route switches RA–1 through RD–D, of which there are 200 in the arrangement shown in FIGS. 7 and 8 for a single set of route switches, extend to the sending line positions. Such a position sending to a multi-station circuit will have a number of route leads terminating thereat corresponding to the number of stations on the circuit. Each route lead is multipled to each receiving line position so that any receiving line position can establish a cross office connection to any sending line position.

Figure 46:
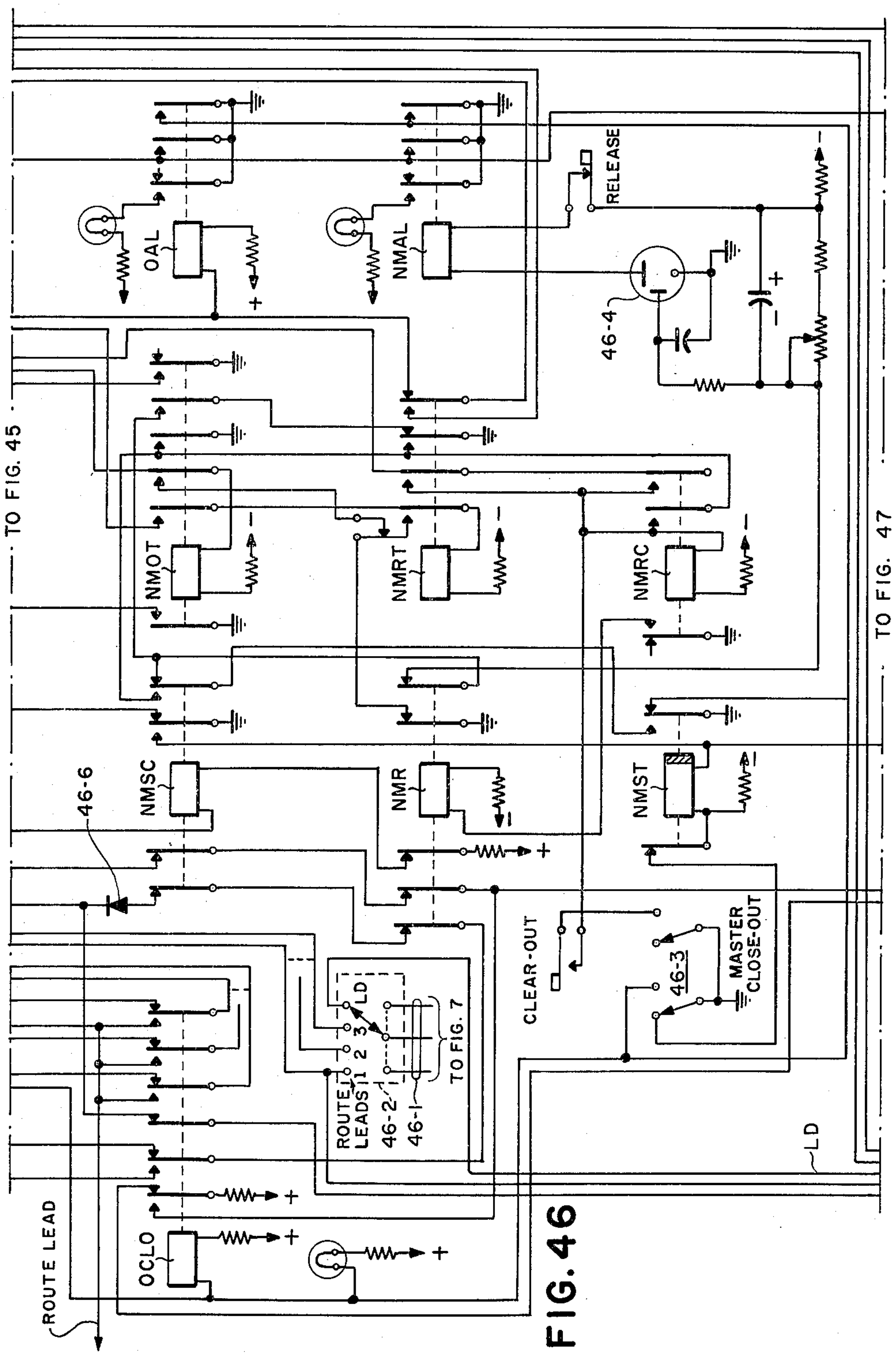

As indicated in FIG. 46, three of the route leads 46–1 extend from the primary route switches to the disclosed sending position as it is assumed that they are three stations on the multistation circuit that the sending position is arranged to transmit to. The routes leads may be cross-connected through a patch board 46–2 to permit flexibility of circuit assignment.

Figure 33:
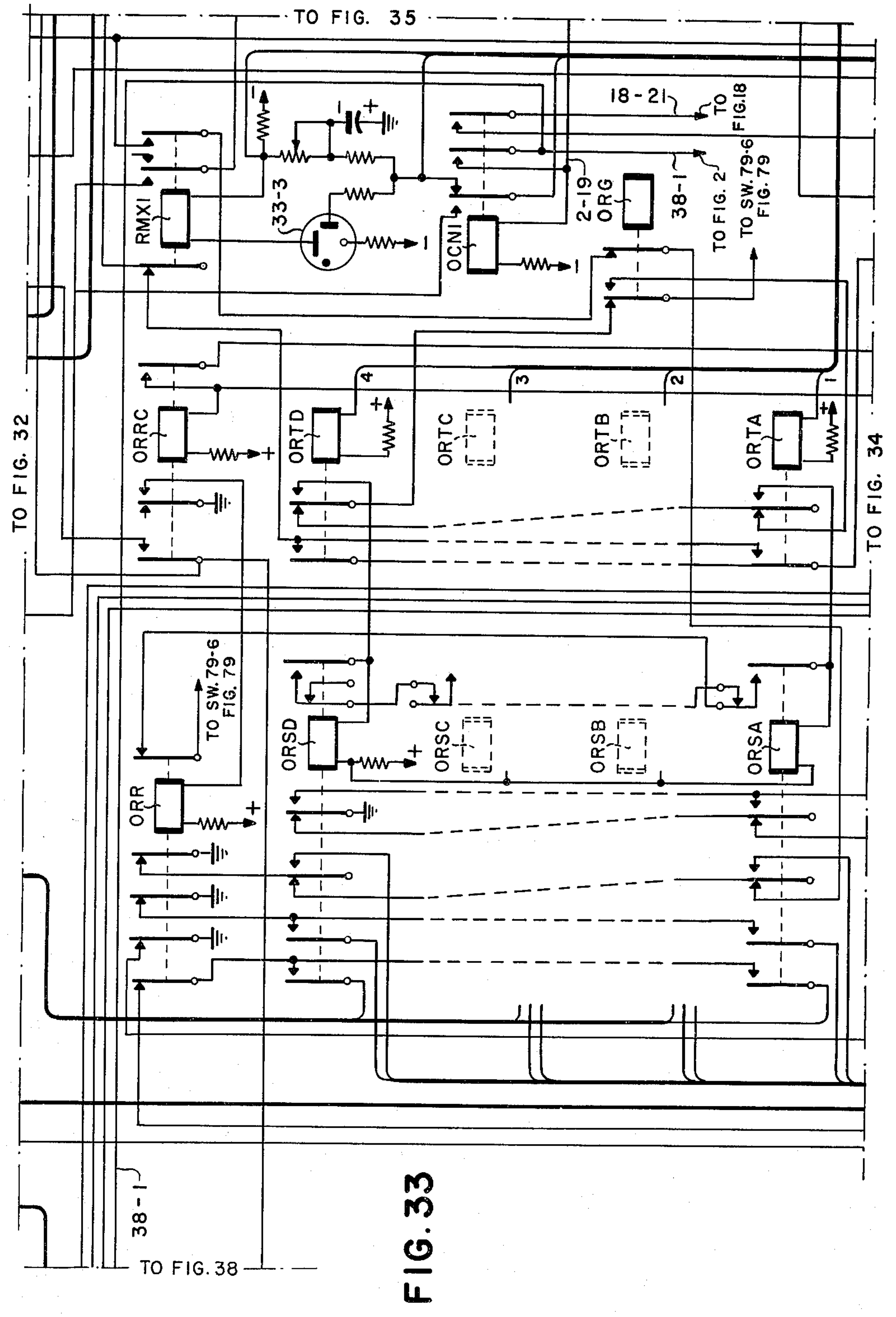

As set forth hereinbefore, operation of any one or more of the group of four relays ORSA through ORSD, FIG. 33, indicates that the receiving position may establish a cross office connetion to a sending position or positions associated with the respective route lead circuits. If it is assumed that relay ORSA operates, for example, this indicates that its receiving position may establish a cross office connection over the A route to a sending position and operation of this relay closes a ground circuit to the A route lead. At the sending position this operates relays NMS and OCD which lock with the locking circuit for relay NMS including the coil of relay NMSC. Operation of that relay opens the route lead circuit at the sending position for the duration of the cross officeconnection and operation of relay NMS indicates that this sending position has been selected to receive a cross office message.

At the receiving position, the ground of the A route lead biases the left hand section of vacuum tube 36–1 to cut off causing release of relay ORTA. Thereafter the opening of the route lead at the sending position maintains this cut-off condition. These route leads also result in the release of any previously operated route test relays at other receiving positions desiring a cross office connection to this same sending position. Thus, during the cross office connection to the particular sending position, it is busied to all other connection requests.

Actual transmission of the message signals from a receiving position to a sending position takes place over a cross office line. Such lines are multipled between the receiving and sending positions and in the arrangements shown in the drawings there is indicated the manner in which as many as 400 cross office lines can be employed. These cross office lines are arranged in groups of 200 lines. A switching center containing between 200 and 400 cross office lines would be considered a relatively large center and in instances where that many lines are not required, a single group of 200 lines could be employed.

Access to the cross office lines is effected through multiple level cross office rotary switches and these switches are divided into primary and secondary sets. The secondary set of four rotary switches OA–2 through OD–2, FIG. 39, has one or more sets of four primary cross office switches OA–1 through OD–1, FIGS. 37 and 38, associated therewith with the number of sets of primary switches being governed by the number of cross office lines at a switching center. The four switches of each set both primary and secondary are for the respective routes A through D, and to establish a line connection for a particular route it is necessary to position its set of rotary switches to points assigned to the indicated sending position.

The control circuits for establishing a cross office line connection are shown principally on FIGS. 32, 33, 34, 37, 38, 39 and 47. These control circuits include a set of 36 conductors interconnecting all sending and receiving positions as indicated. When an OCD relay at a sending position selected for a cross office connection operates, a ground is applied to one of a set of 25 conductors to mark a point on the K levels of the primary set OA–1 through OD–1 and also one of 8 conductors to mark a point on the K levels of the secondary switches OA–2 through OD–2. One or the other of two conductors designated select control conductors is also grounded to indicate which group of 200 sending positions the selected one is associated with. This determines the primary switch set to be used at the receiving position. The 36th conductor provides a lock ing control for the operated OCD relay of the selected sending position.

Since the functions performed by the group of 36 conductors are vital to the operation of the switching system, a duplicate group of 36 conductors is provided. Accordingly operation of any sending position OCD relay grounds the same ones of the 25 set and 8 set conductors as well as the same select control conductor in the two groups. The particular groups used by a receiving position for establishing a cross-office connection depends upon the position of the code group switch 38–2. Accordingly, if trouble should develop in one of the conductor groups, the code group switch can be operated to transfer the control to the other control group.

Under the assumed conditions, relay ORSA operated and resulted in the selection of the desired sending position and the operation of the OCD relay at that sending position. When relay ORSA operated, it also closed a ground circuit to one side of each of the coils of relay OFCA whereby the latter operate and lock up in series with the locking circuit of relay OCD regardless of which code control canductor is used. Relay OFCA in operating completes circuits for operating the A set of cross-office primary and secondary switches and also removes ground from the A route lead.

With relays OLF–1 and OLF–2 released, a ground through back contacts of relays ORR and OLF–2 and front contacts of relay OFCA is applied to one side of the stepping magnet circuit of switch OA–2 of the secondary cross-office set of rotary switches, causing the switch to step. With the code group switch 38–2 to the left as shown, the ground on one of the points of the J-level operates relay OLF–2 when the switch is stepped thereto. This stops switch OA–2. Operation of relay OLF–2 transfers the switch stepping ground to a similar circuit for stepping switch OA–1 of one or the other of the two sets of such switches. The particular OA–1 switch which steps will depend upon the position of the D-wiper of OA–2. With the code group switch 38–2 to the left as shown, relay OLF–1 operates when the grounded point on the J-level of switch OA–1 is encountered. This stops the operation of this switch. Accordingly, switch OA–2 and one or the other OA–1 switches of the two primary sets will be positioned in accordance with the cross-office line selection code of the sending position having the OCD relay operated.

*Line connection*

When relay OFCA operates, it closes a circuit for operating either relays OLS–1 or OLS–2 depending upon which one of the select control conductors is grounded by the operation of relay OCD. Whichever one of the two OLS relays is operated, it locks directly to the associated grounded select control conductor.

Figure 34:
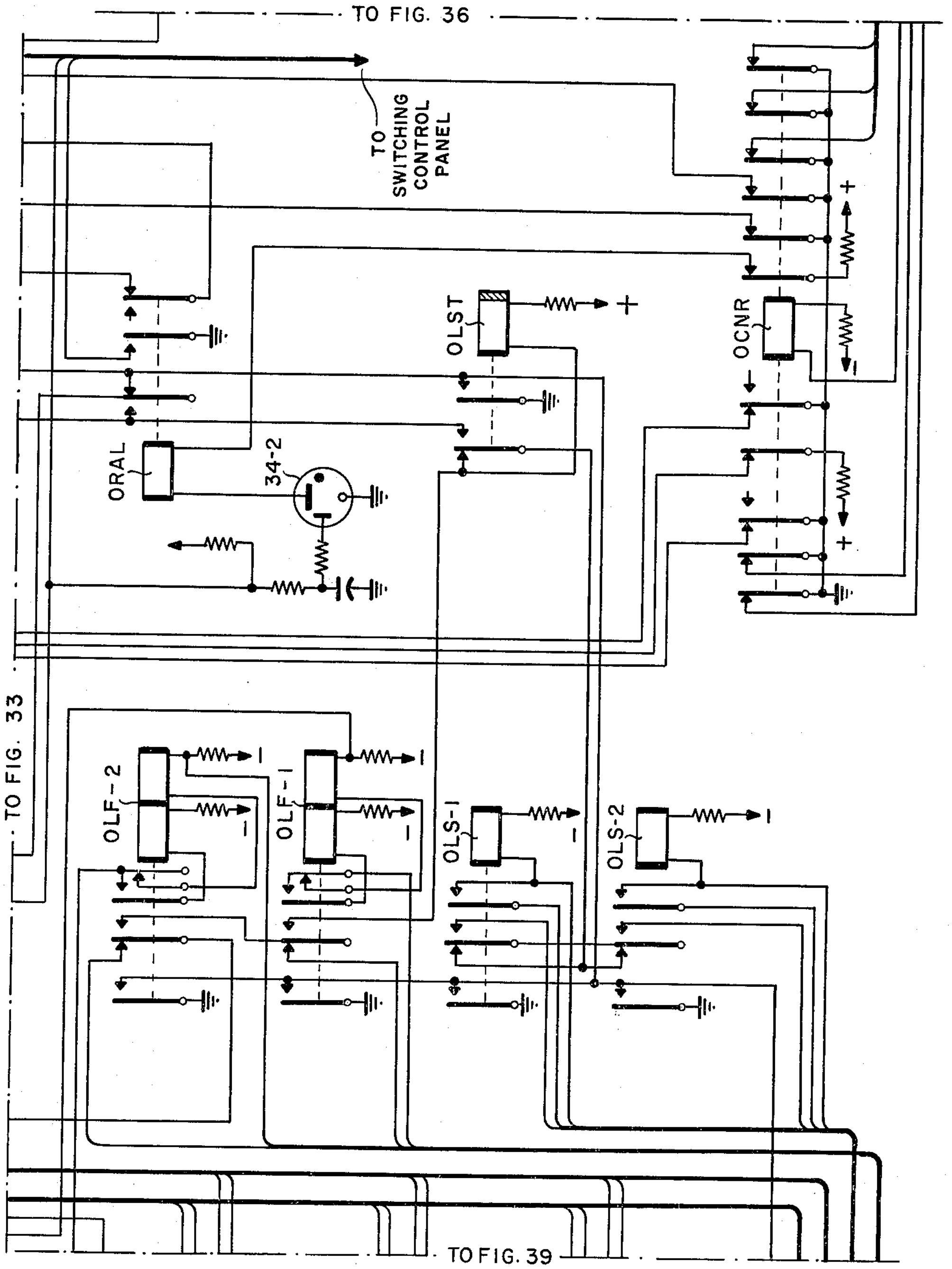

When both relays OLF–1 and OLF–2 have operated, ground is connected to the operating winding of relay OLST, FIG. 34, and while that relay remains released, to a transfer contact network interconnecting relays OLS–1 and OLS–2. No function is performed unless only one of these relays is operated. If it is assumed that relay OLS–1 is operated, the ground is connected through operated relay OFCA to operate relay OBA. That relay remains locked to ground through released relays OBRA and OCNA. If relay OLS–2 had been operated instead of relay OLS–1, the ground would have operated relays OCNA and OBA in series and they would lock in series to ground through released relay OBRA. Relay OLST is a slow operating relay and either of the above functions will be performed before it operates.

As pointed out above, relay OCNA may or may not operate, but relay OBA invariably operates for an A route cross-office connection. When relay OBA operates, it opens the A route test circuit at the receiving position and this prevents reoperation of relay ORTA when the sending position again becomes idle during disconnection of the cross-office line circuit.

*Line connection check*

As relay OLST operates, it transfers the operating circuit for relay OBA to the winding of relay ORRC. The locking ground of relay OBA should then operate the latter relay and it locks to all operated relays, the release of which must be checked. Operation of relay ORRC operates relay ORR. This indicates that the required A route cross-office line connection has been made and that the receiving position should release its A route section of the allotter.

Operation of relay ORR opens the locking circuit for relay ORSA whereupon it releases. However, until relay ORR releases, no other ORS relay in the allotter selection chain for this receiving position or any other receiving position can operate. Operation of relay ORR also removes ground from the circuit holding relays OFCA and OCD operated whereupon they release. As relay OFCA releases it disconnects the common line finding control circuits from the route switches and releases relays OLF–1 and OLF–2. As relay OCD releases, it removes ground from all the marked conductors of all the duplicate code group sets, and removal of ground from the marked select control conductor releases the associated OLS relay that was locked to that conductor. This indicates that the OCD relay of the selected sending position is actually released. Operation of relay ORR also removes ground from the operating circuit of relay OLST whereupon it releases. When the above mentioned relays have released, relays ORRC and ORR release, and the release of the latter restores the allotter selection chain to its normal condition so that another cross-office connection can be established.

As pointed out, relay ORRC operates at the conclusion of each cross-office connection sequence performed for any route of that receiving position. This provides a ground pulse for determining when all cross-office connections required for a particular message have been completed. A network interconnects relays RBA through RBD, RMXA through RMXD and OBA through OBD in the manner indicated in FIGS. 32 and 35. For each route requiring a cross-office connection the associated RB relay has already been operated. With the RMX relay released as shown, it is evident that no ORRC relay ground pulse function can be performed until each operated RB relay of the A through C routes has been matched by a cross-office connection operation of its associated OB relay. Assuming relay MXDC is in a released condition, the ORRC ground pulse from the last of these required cross-office connections is connected to a similar circuit for the D route. If the cross-office connection requirements for this route have already been satisfied, the ground pulse then operates relay OLTI. However, if the D route connection requirements have not yet been met the ORRC ground pulse when the D route cross-office connection is established will operate relay OLTI. Accordingly, operation of relay OLTI indicates that all required cross-office connections have been completed.

When relay OLTI operates, it locks to ground through point 3 of switch XSQ and opens the operating and locking circuits of relay OCNI. The latter relay thereupon releases and opens the circuit to the multipled contacts of relays ORTA through ORTD so that relay ORI can not be reoperated until cross office connections are required for the next message. Release of relay ORI, when the last cross office connection for the message being handled was established, indicated that the position no longer required use of the allotter.

In processing multiaddress messages it may at times not be possible to establish all the required cross office connections within a reasonable length of time because some of the desired sending positions may be busy. While waiting for some sending positions to become idle, transmission is held up to those to which cross office connections have been established and if this waiting time is excessive line time of those sending positions to which connections have been established is wasted. In this connection a timing action starts when the first actual cross office connection is established and includes relay RMXI, FIG. 33, and the tube 33–3 with the associated timing network. As pointed out, relay OCNI is operated as long as cross office connections are required and the first cross office connection established results in the operation of some one of the relays OBA through OBD. At this time ground is connected through the winding of relay RMXI to the plate circuit of tube 33–3 and to its associated timing network. This starts the timing network and if relay OCNI releases within this interval, the timing action is reset and relay RMXI will not operate. However, if relay OCNI does not operate within the timing interval relay MRXI will operate, and indicate that at least one cross-office connection has been established, that others are required and that one or more could not be established within the timing interval allowed which may be in the neighborhood of 30 seconds.

Operation of relay RMXI closes a circuit to a transfer tongue of relay OBD and ground is present on that circuit if relay ORR, relays ORSA through ORSD, and relay ORG are released, indicating that the receiving position is not using its section of the allotter at this time. Thus, should a previously busy sending position become idle soon enough, a cross-office connection to that sending position may be started before operation of relay RMXI can effect the normal connection procedure.

If relay OBD is released and the operation of relay RMXI closes the ground circuit, relay RMXD operates. However, if relay OBD is already operated the next released relay in the order OBC through OBA will cause the operation of its associated RMX relay. Thus, operation of relay RMXI results in operating only one of the relays RMXD through RMXA and the operated one of these relays locks to ground through contacts of relay OCNR and in so doing opens the locking circuit for relays RBD through RBA and relay MXDC. Any operated relay or relays in that group will therefore release and operation of any RMX relay removes ground from the RMXI circuit causing it to release. Thus, only one operation of relay RMXI occurs for any message being processed.

Operation of any RMX relay transfers the associated route circuit directly to the route test leads for the sending positions assigned to handle multiple address messages. An idle sending position in such a group operates the ORT relay for that route causing a cross office connection to be established to that sending position in the manner pointed out. Release of all of the RBA through RBD relays by the operation of a RMX relay closes their portion of the probing network as through no further cross office connections were required for this message. However, the operated RMX relay opens this network requiring a cross office connection to be established to the multiple address position. The ORRC ground pulse resulting from this cross office connection operates relay OLTI as pointed out and therefore all previously required cross office connections that had not been established during the 30-second timing interval have been combined into this one final connection to a multiple address sending position.

Whenever a message requires transmission to more than four destinations, relay MXDC operates as pointed out and opens the D route test circuit. This provides operation of relay ORTD even though a sending position associated with the destination previously programmed for the D route is available and therefore no connection can be established for this route as long as relay MXDC remains operated. Relays RBA through RBD would have been operated before operation of relay MXDC and indicates a need for more than four destination connections. The ORRC ground pulse at the conclusion of each connection is introduced at the C route point of the probing network and therefore connections for all routes C through A must be established before any action can be taken for a D route connection. When the last of these connections is completed, the ORRC ground pulse associated with it passes through operated relay MXDC and released relay OBD to operate a relay RMXD. Operation of this relay as before releases all RB relays, relay RMXD and requires that a D route connection be established to a multiple address position. Operation of relay RMDX and release of relay MXDC closes the D route test circuit to the previously described path for the multiple address sending position ground and when a connection is established to one of these positions the resulting ORRC ground pulse operates relay OLTI as before.

Thus it is evident that the last connection established is to a multiple address position and that such a connection takes place immediately upon completing the connections for the C through A routes. Thus the holding time imposed upon other connected sending positions is reduced to a minimum. It is also evident that the first connection established for the C through A routes starts the RMXI timing action as before and if the connections for these routes can not be established within the 30-second interval relay RMXI will operate. With relay OBD released, since no D route connection has been possible up to this time, relay RMXD operates. Thus whether all connections for the C through A routes are completed within the allotted time interval or not, the D route will be used for a connection to a multiple address sending position.

*Supervisory controls*

It is desirable that any failure to complete a connection to be detected promptly, and that the receiving position failing to make the desired connections release at the allotter in order not to interfere with other positions in the center. When any one of the relays ORSA through ORSD is operated, a timing circuit associated with tube 34–2 is activated and starts a timing interval for the operation of relay ORAL. This timing interval may be in the neighborhood of 1½ seconds which is ordinarily sufficient to complete and check a normal cross-office connection which when completed as pointed out effects the release of the operated ORS relay.

Should an ORS relay remain operated for a longer period than the timing interval, operation of relay ORAL provides an alarm indication and closes ground from the operated ORS relay to operate relay ORRC. This condition as set forth above releases the receiving position cross-office connection control circuits including the release of the operated ORS relay itself. In addition, operation of relay ORAL opens the circuit by which relay ORI can be operated and release of this relay by release of relay ORG as before. Thus until the alarm indication is cleared by releasing relay ORAL, the involved receiving position can no longer use the allotter.

The above assumed that the trouble was in the receiving position control circuits and in addition thereto trouble conditions may occur involving failure of the selected sending position OCD relay to release as it should, resulting in the locking of relay ORRC once it has been operated by relay ORAL. However, release of the operated ORS relay at this receiving position removes ground from the allotter alarm circuit timer common to the associated receiving position group. Failure of relay ORRC to release keeps relay ORR permanently operated. In this case no other receiving position in that group can use the allotter until the trouble condition is cleared. Operation of the allotter alarm in conjunction with the ORAL alarm at a particular receiving position serves to indicate troubles of this nature.

*Cross office transmission circuits*

Cross-office line transmission to connected sending positions is in a pulse code form produced by the receiving position electronic cross-office transmitter. In addition, certain portions of the transmission require check pulses to be transmitted to the receiving position from the connected sending positions. The electronic generation and detection of the various pulses required is described elsewhere herein.

The A route line circuit, for example, originates at the cathode of vacuum tube 30–23. If relay OBA is operated the circuit is connected through released or operated relay OCNA and the associated cross-office switch positions to the line conductor of a particular sending position where it terminates at the cathode of vacuum tube 25–18. Pulse transmission from the receiving position depends upon the presence of ground on either side of diode 30–21 which is associated with a controlling network for vacuum tube 30–8. If ground is present on either side of the diode, vacuum tube 30–8 passes pulses and reproduces them on the A line circuit through its control of vacuum tube 30–23. If no ground is present on either side of the diode no pulse transmission can take place. Similar means provide for individually controlling pulse transmission over the B through D line circuits.

The identifying number and precedence prosign characters of a message require transmission to all connected sending positions. During this portion of the cross-office transmission the required ground for each diode is obtained over its connection to an associated level of rotary switch RSQ which is on its stud 1. Thus, with the switch in this position pulse transmission occurs over all cross-office line circuits whose associated OB relays are operated. All connected sending positions, therefore, respond to this transmission.

Each routing indicator requires transmission only to the particular sending position associated with its destination. The rotary switch RSQ steps to stud 2 for transmission of the first routing indicator. Depending upon the operated combination of relay RIN–1A and relay 1B, ground is present at only one of the four levels A through D. Thus, only one of the four diodes is grounded, and only the associated cross-office line circuit carries pulse transmission representing that routing indicator. Since the operated combination of the RIN relay pair was determined by the destination requirements of this same routing indicator during the message processing sequence, the cross-office line circuit carrying this pulse transmission is connected to a sending position of that destination. The rotary switch RSQ advances one step for each routing indicator transmitted, and the diode grounded for transmission of the next routing indicator is determined by the operated combination of the next RIN relay pair, etc. Thus, each routing indicator of the routing line is transmitted to only one of the connected sending positions.

The end-of-routing combination, the message text and the end-of-message combination must be transmitted to all connected sending positions. Since the RSQ rotary switch at this time is no longer on stud 1, it can no longer ground all four diodes. However, ground is now connected to the lead multiplying the four diodes by a circuit to be described. This provides the required grounding condition for transmitting to all connected sending positions.

A cross-office line connection is sometimes established to a multiple address message sending position. Such a connection may be established over any one of the four routes A through D, the particular route being indicated by the operation of its associated RMX relay. It is then necessary to transmit over that cross-office line not only those routing indicators which are actually programmed for it during the processing sequence, but also all other routing indicators programmed for other routes for which no actual cross-office connections could be established because sending positions were not available.

Assume the RMXD relay or relays operated, and the RSQ rotary switch on stud 1. Initial ground for diode 31–5 is still obtained from the RSQ rotary switch. However, the ground now passes through both sets of operated RMXD relay contacts to control the diode. This condition exists during the numbering sequence, and certain check signal responses which are required from the connected multiple address message sending position in order to proceed with cross-office transmission. This provides a continuity check of the RMXD relay contacts that later control transmission of routing indicators previously programmed for other routes which now require transmission over the D route to the multiple address message sending position.

When transmission of the first routing indicator starts, rotary switch RSQ steps to stud 2 as before. Assuming that RIN–1A and RIN–1B are in positions representing an A route requirement and that relay OBA is operated, ground from the XSQ rotary switch A wiper causes transmission over the A cross office line in the normal manner. Since relay OBA is operated no ground is present at the XSQ rotary switch E wiper circuit. Therefore, diode 31–5 is not grounded, and no transmission takes place over the D cross-office line.

When the first routing indicator has been transmitted rotary switch RSQ steps to stud 3. Assume that relay RIN–2A and relay RIN–2B indicate that the second routing indicator should be transmitted over the B route. Assume further that no actual B cross office line connection has been established, as indicated by released relay OBB. Ground is present at the B wiper of rotary switch RSQ to ground diode 30–22, but since there is no B cross office line connection no sending position responds to transmission from this source. However, with relay OBB released and the RIN relay pair in the position assumed, ground is also present at the rotary switch XSQ E wiper to ground diode 31–5. Thus, this routing indicator is transmitted over the D cross office line to a multiple address message sending position. Those programmed for routes for which actual cross office connections were established are distributed as required to outgoing destination sending positions. Those programmed for routes for which cross office connections could not be established are transmitted to a multiple message sending position for further processing. The same general method is followed for operation of any one of the other relays RMXC through RMXA.

A determination is made at several points during the cross office transmission of a message that each connected sending position is operating properly, and they are required to transmit check pulse indications to the receiving position. It is further required that such check pulse indications be received from all connected sending positions before the next portion of the message transmission can take place. The general receiving position circuits associated with this function are described elsewhere.

Diodes 31–8 and their associated circuits, provide a means for determining that a desired check pulse indication has been received from all connected sending positions. Each diode circuit is individually controlled by contacts of its associated relay OBA through OBD. In effect, it always appears to these diode circuits that four cross-office connections have been established. If an actual connection for a particular route has been established the associated OB relay is operated, and the check pulse indication must then come from the connected sending position. If no cross office connection has been established for a particular route the associated OB relay is released. A local circuit then produces the check pulse indication. Thus, all four diode circuits must respond or an alarm indication will occur as described later.

*Line test*

To guard against the possibility of a cross office connection being established to a wrong line and which might also be busy, a test is made to determine that all connected lines are idle before transmission to any is allowed to take place. It is the No. 8 pulse of the pulse code that provides a busy signal which is transmitted continuously to all connected lines for the entire transmission period. When all required cross office connections are completed, this condition is indicated by the operation of relay OLTI, and its operation completes a circuit from ground through back contacts of relay OLAL, front contacts of OLTI, a conductor of cable 38–3 to the cathode of vacuum tube 25–28. If all connected lines are idle, no No. 8 pulse transmission is detected and vacuum tube 25–28 completes a circuit for the operation of relay OLBC which indicates that cross office transmission from this receiving position may now start. Relay OLBC locks to ground through back contacts of relay OCNR and remains in that condition until disconnection from the lines occur. The low impedance ground from vacuum tube 25–28 intially controls the No. 8 pulse section of vacuum tube 24–9 but is replaced by the locking circuit ground of relay OLBC as a means for extinguishing vacuum tube 25–28 while maintaining ground control over the No. 8 pulse section of vacuum tube 24–9. Grounding the No. 8 pulse section of the latter vacuum tube from either source starts continuous transmission of the No. 8 pulses over the connected lines. Thus, the lines are first checked to determine that they idle and are then busied as far as other receiving positions are concerned.

*Outgoing message number*

Each message transmitted over an outgoing circuit has its own individual message number and these message numbers are transmitted to the selected circuits before cross office transmission of the message takes place. Included with the message identifying number is a start-of-message combination and both of these groups of signals are produced or generated individually at each sending position by an automatic numbering machine. These machines consist essentially of a series of rotary switches operated in a manner hereinafter apparent, under the control of No. 7 pulses transmitted from the receiving position at a 200-word per minute rate. With the main switch of the SNI unit on point 11 as previously described, operation of relay OLBC, FIG. 38, closes a circuit from ground at released relay SNOC, to the No. 7 pulse section of vacuum tube 24–9. This starts transmission of No. 7 pulses to all connected sending positions and at the connected sending positions the numbering machines thereat start their functions in response to the detected No. 7 pulses. The output of the numbering machines include the circuit and channel identification numbers and these are fed to the reperforator at the sending line position so that they appear in the perforated tape issuing therefrom. On the completion of the operation of the numbering machine, it is stopped even though the No. 7 pulses are still being detected. As more fully explained elsewhere the sending position reperforator is equipped with a set of read back contacts with an associated control circuit. When a numbering function is started, the control circuit of the numbering machine is set to read the character combination ZCZC (start-of-message signal) as it passes over the sensing pins operating the read back contacts. When the ZCZC combination is detected by the read back contacts, a condition is set up for transmitting No. 10 pulses from the sending position when the numbering function has been completed. At the incoming message receiving position the No. 10 pulses must be detected from all connected sending positions before further transmission takes place. The detection function includes a circuit having ground at released relay OLAL connected to the cathodes of thyratrons 25–1, 25–29. Thus operated relay OLTI connects the plate circuit of vacuum tube 25–21 to the winding of relay SNOC and that relay will operate when the No. 10 pulse check condition occurs. Relay SNOC locks through operated relay OLTI, at the same time extinguishing vacuum tube 25–21. As relay SNOC operates, it stops transmission of the No. 7 pulses to the connected lines.

*Incoming message number*

The number that accompanied the message that was recorded at the incoming message receiving position must now be transmitted to all connected sending positions. This number is obtained from the SNI unit of the receiving position and particularly by the operation of the main switch thereof in stepping from points 11 through 25. This operation is initiated by the operation of relay SNOC which allows the main switch of the SNI unit to move one step at a time at a 200 word per minute rate over the specified points. These points of the switch are so interconnected that a number of characters are invariably transmitted followed by the message number. These characters includes an abbreviated start-of-message combination ZC, followed by the receiving position circuit and channel identification characters which are always the same for a particular position and are followed by the sequence number of the message to be transmitted cross office. This cross-office transmission stops when the sequence number indicator main switch reaches point 25.

A check is made to determine that all connected sending positions respond to the above transmission and the ZC combination is used for this purpose. At this time the control circuits associated with the readback contacts of the reperforators associated with the sending lines responding to the cross-office transmission are set to recognize the appearance of the ZC combination and to stop the No. 10 pulse transmission when this occurs.

At the receiving position vacuum tube 25–29 is connected to the step magnet circuit of switch XSQ when the sequence number indicated main switch reaches point 25. When the No. 10 pulse transmission stops from all the connected sending positions, vacuum tube 25–29 steps switch XSQ from point 3 to point 4 indicating that transmission from the tape transmitter of the incoming line receiving position, cross-office to the connected sending line positions may now commence. As switch XSQ steps from points 3 to 4, it releases relay OLTI which is followed by the release of relay SNOC to disconnect the transmission control circuits from the sequence number indicator.

*Precedence prosign*

As will be recalled the tape transmitter at the receiving line position has been auto-stopped since the end-of-routing indicator processing occurred. However, the loop gate slide has been returned to its right hand position and thus the tape in the transmitter is in a proper position to transmit characters from both the storage loop and the message text portion immediately following the loop. In this position of the tape, the first characters to be transmitted are the precedence pair, and they are transmitted to all connected sending positions. When switch XSQ steps to point 4, relay OTXI operates and the auto-stop circuit of the transmitter is connected to a contact of this relay. Operation of relay OTXI closes the auto-stop circuit whereupon the tape transmitter steps and characters in the tape are transmitted to the connected cross-office circuits. Since switch RSQ is at this time in its home position, these characters are transmitted to all connected sending positions.

*Routing indicators*

Operation of relay OTXI also closes a circuit for operating relay RSQH and the latter closes a circuit from point 1 of the K level of switch RSQ to operate relay RSQO. This establishes the proper conditions for controlling the stepping action of switch RSQ. As set forth, the precedence prosign character pair is followed by a space character and this character is detected sufficiently in advance of its transmission so that its actual transmission to connected lines can be suppressed as required.

When the message routing indicators require transmission to only one destination, relay RBMX is released and only one line connection will have been established. The detection of the space character at the end of the precedence prosign operates vacuum tube 26–1 and with relay RBMX released this provides a low impedance ground connection to the lead multipled to diodes 30–21, 30–22, 31–4 and 31–5. In this particular case no interruption of cross-office transmission to the connected sending position occurs. Since routing indicators and the text are to be transmitted to a single sending position, it is not necessary to use the RSQ switch functions.

When the routing indicators require transmission to more than one destination, relay RBMX is operated. In this case it is necessary to distribute the routing indicator among the connected sending positions by using the switch RSQ. With relay RBMX operated, the detection of the space character at the end of the precedence prosign results in vacuum tube 26–1 operating relay OSPC together with providing a low impedance ground for the network associated with the right hand section of vacuum tube 30–1. This suppresses line transmission of that character and relay OSPC locks ground through released relay RTXR. The locking ground extinguishes vacuum tube 26–1 but maintains ground from the network associated with the right hand section of vacuum tube 30–1. Relay OSPC in operating also opens the transmitter step magnet circuit leaving the space character in the tape over the transmitter pins.

In addition, relay OSPC connects the plate circuit of vacuum 25–3 to a step magnet circuit of switch RSQ. Thus the step pulse delivered by this tube steps switch RSQ from point 1 to point 2 and through its interrupter contacts opens the circuit extinguishing the tube in conjunction with the stepping operation. With switch RSQ on point 2, ground through the K level thereof and operated relay RSQO operates relay RTXR. This opens the locked circuit for relay OSPC causing it to release and remove ground from the network associated with the right hand section of vacuum tube 30–1. This allows line transmission of the space character to take place and the particular sending position which records this character is determined by the first RIN relay pair as described. Thereafter transmission of the first routing indicator to the same sending position occurs where it is recorded in the tape thereat. In this sequence operation of relay OSPC provided a locking circuit for relay RSQO. Thus, release of relay OSPC is followed by the release of relay RSQO and it in turn is followed by the release of relay TRXR and the operation of relay RSQE. This checks that switch RSQ has taken one step from an odd numbered point to the next even numbered point.

Relay RBMX is operated where there are at least two routing indicators and detection of the space character at the end of the first routing indicating results in operation of relay OSPC again and suppresses actual transmission of that character to the sending position which was recording the first routing indicator. The following step pulse from vacuum tube 25–3 steps switch RSQ to point 3 and the position of the second RIN relay pair determines the connected sending position to which that space character and its following routing indicator are to be transmitted and the sequence described above is repeated. This sequence is followed for each routing indicator encountered in the rounting line of the message and each step taken by switch RSQ is checked by the action of relays RSQO and RSQE.

*Message text*

The routing indicators, whether one or a plurality, are invariably terminated by a carriage return character and detection of this character indicates that all routing information has been transmitted cross office. This carriage return character and all that follow must be transmitted to all connected sending positions since they comprise the message text. As pointed out, with a message having but a single routing indicator, relay RBMX is released and detection of the space character at the end of the precedence prosign operates thyratron 26–1 which grounds the common controlling line for the connected diodes. Detection of the carriage return character at the end of such a routing line can not operate thyratron 26–4 because of the low impedance ground from thyratron 26–1 which is already operated. In this case therefore actual detection of the carriage return character is not required and cross office transmission of the message text continues without interruption.

With a message containing a plurality of routing indicators, relay RBMX is operated and the detection of the space character operates thyratron 26–1 to provide the previously described control for proper distribution of the routing indicators. In this case the detection of the carriage return character at the end of the routing indicators operates thyratron 26–4 providing a low impedance ground for the lead multiple to the diodes 30–21, 30–22, 31–4 and 31–5. This causes all the following characters to be transmitted to all connected sending line positions and occurs sufficiently in advance of the actual transmission of the carriage return character so that it is also transmitted to the sending line positions. In addition operation of thyratron 26–4 connects this low impedance ground to a network associated with thyratron 26–1 preventing further operation thereof. Thus any space characters occurring in the message text will not operate relay OSPC.

*End-of-message*

Each message is terminated with eight consecutive line feed characters followed by four successive N characters. A detection of the final line feed and four N characters indicates that the cross office lines are to be disconnected. Detection of this combination causes thyratron 27–2 to step switch XSQ from point 4 to point 5. This opens the plate circuit of tube 27–2 to extinguish the same and releases relay OTXI. This opens the plate circuits to tubes 26–4 and 26–1 extinguishing whichever was operated. Release of relay OTXI also opens the transmitter autostop circuit, preventing further tape characters from passing through the transmitter and also releases relay RSQH which permits switch RSQ to self-step to its No. 1 point or home position.

*Cross-office disconnect circuit*

At the sending position when relay XSQ reaches point 5, relay OLRI operates and causes No. 7 pulses to be transmitted to all connected sending positions. Before actual disconnection occurs each sending position is required to transmit No. 10 pulses to indicate that a line feed, N character combination, has passed over its readback contacts. Disconnection of the No. 7 pulses at those sending positions indicates that this is the proper time for this to occur. When relay OLRI operates, it connects thyratron 25–21 to the winding of relay OCNE and detection of No. 10 pulse transmission from all connected sending positions causes this thyratron to operate relay OCNE. This indicates that actual cross office disconnection can now take place. Relay OCNE locks to ground at various control points and in so doing extinguishes thyratron 25–21 and also operates relay OCNR. Operation of the latter relay removes ground from the No. 7 and No. 8 pulse transmission control points and from the locking circuit of relay OLBC. The interruption of the No. 7 and No. 8 pulse transmission to the connected sending positions allows them to be restored to their idle condition.

Another operation performed by the energization of relay OCNE is to connect ground to the H level wiper of the main switch of the SNI unit. With this switch on point 25, this initiates advance of the digit switches to the next sequence number and the return of the main switch to its home position. Thus the sequence number indicator and its associated circuits are conditioned to check the heading of the next message received over its associated incoming line circuit.

Operation of relay OCNE also connects ground to the message waiting indicator subtract magnet which operates and subtracts one count on the register dial indicating that the message has been completely transmitted cross office and that all necessary checking functions have been correctly performed.

As relay OCNR operates, it connects ground to the step magnet of switch XSQ through point 5 of the K level thereof causing the switch to step to its next home position or to point 6. At this point relay SNIC is operated and establishes connections to the message waiting indicator for the processing of the next message heading. However, operation of relay OCNR opens the transmitter autostop circuit so that no tape characters can advance through the transmitter until relay OCNR releases. In addition, relay OCNR in operating releases all relays that remained operated during the routing indicator processing, cross office connection, and cross office transmission functions associated with the message just handled. As these relays release, they in turn release relay OCNE which is followed by the release of relay OCNR. At this time, the transmitter autostop circuit is closed and processing of the next message can commence.

*Message disregard circuit*

It sometimes happens that after a message has started to be transmitted cross-office, a trouble condition occurs such as a tape tieup, and in such cases it is necessary to transmit to the connected sending line position a disregard or cancellation notice. Depending upon the point at which the trouble occurs either one or two notices are transmitted, a number disregard notice or a message disregard notice. The characters making up these notices are derived by operating a rotary switch called the message disregard switch, the various points of which are strapped together to give the desired characters as the wipers pass thereover. In addition the switch provides a means for obtaining a correct end-of-message combination to substitute for an errored combination in the message tape.

For a number disregard notice a sequence consisting of a precedence prosign character pair, a special routing indicator to cause the notice to be switched to a supervisory position at any following switching center, an end-of-routing combination, a series of characters which is the disregard notice itself, an identification of the switching center originating the notice and an end-of-message combination is transmitted. The transmitted information is thus in the form of an actual message with the notice serving as the text. Therefore this notice can be automatically switched at any other center to which it is transmitted. This notice is always transmitted automatically.

A message disregard notice can be transmitted only after the numbering and routing portions of a regular message have been transmitted cross office. Therefore, at such times the precedence prosigns, routing indicator and end-of-message parts of the sequence are omitted and such a notice therefore consists of the character series for the notice itself, identification of the office of origin and the end-of-message combination. Transmission of this notice is under supervisory control. For correction of an errored end-of-message combination, only the end-of-message characters need by transmitted.

Figure 51:
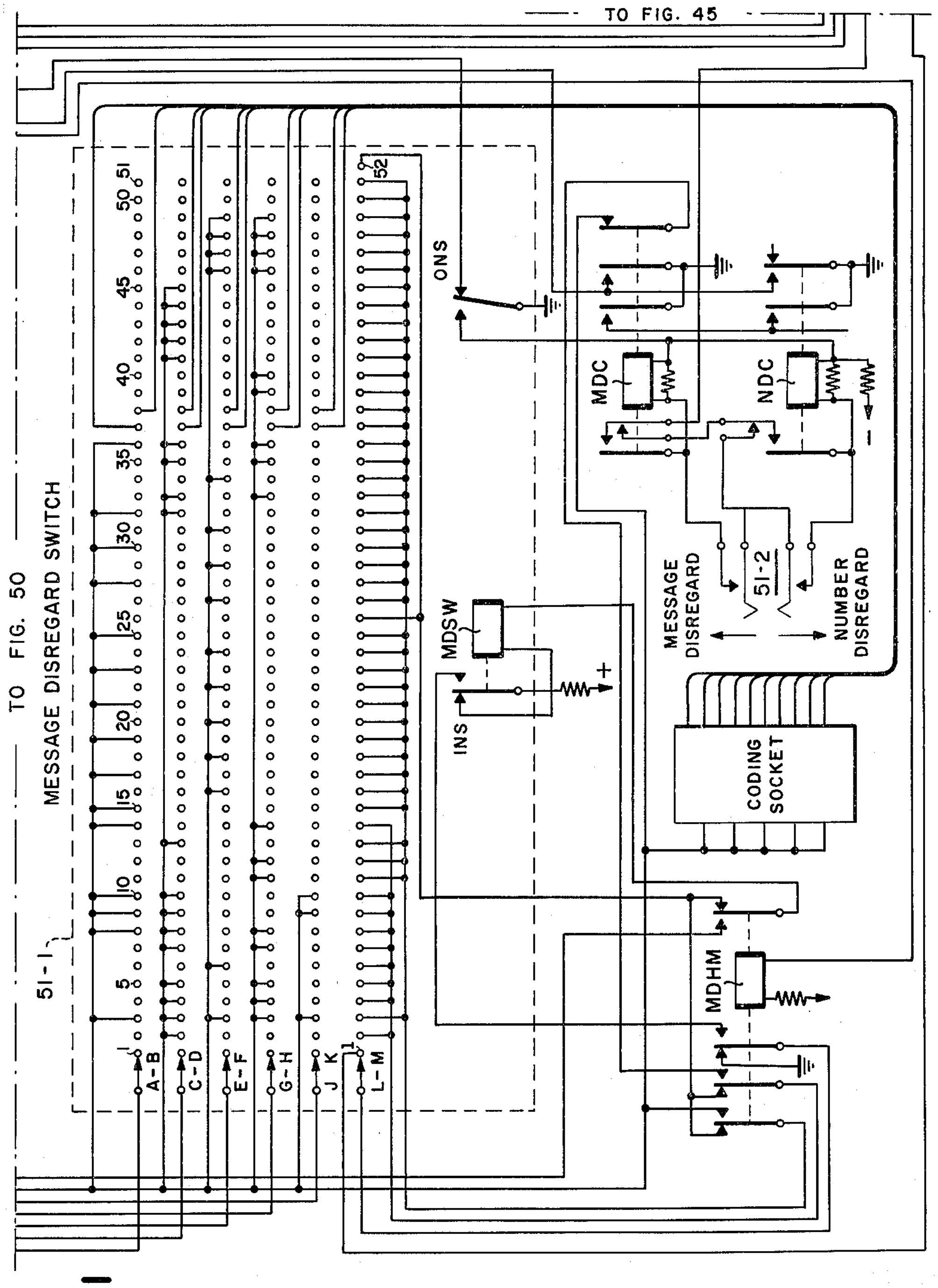

FIG. 51 shows the message disregard switch 51–1 and most of the primary controls therefor. Operation of relays MDL, FIG. 49, and MDHM, FIG. 51, closes a ground from the released ONS springs to a control circuit associated with thyratron 25–28 causing switch 55–1 to step to point 52. Release of relays MD1 and MDHM closes ground through the L–M wiper and point 52 to step the switch to point 1 and only one character sequence is available from the switch for each operation of the relays. The particular sequence transmitted is determined by circuits associated with the strapped points of the L–M level.

When the sending position is idle (relays NMSC and NMR released) and busied, relay OCLO operated, ground is available on the key switch 51–2. These requirements prevent interference between the cross-office reception of a message and the local reperforation of the disregard notice.

Depending upon which direction the switch 51–2 is thrown either a message disregard notice or a number disregard notice is sent to the reperforator and punched in its tape.

An automatic operation of the message disregard switch may be effected by the detection of a busy line when the idle line test is made, by failure of any connected sending position to return proper check indications during the numbering portion of a message, or by failure of any connected sending position to return a proper check indication when cross-office disconnection takes place.

*Connect through circuits*

In certain cases it is desirable to establish cross-office connections to outgoing destinations and use these connections continuously for a time for conference purposes. Such an arrangement is referred to as a connect through setup and the precedence prosign CC is used to indicate such a setup is desired.

In manual switching a connect through message is processed in the usual manner resulting in the operation of the message waiting signal and inspection thereof will indicate that it requires a high precedence switching operation. Thus the high priority initiate push button will be operated and the processing of the routing line proceeds in the normal manner with the message start initiate push button operated when the processing is completed. Finally the connect through switch should be thrown to its connect through position and the message waiting indicator set to a count of one if necessary.

In automatic switching a connect through message is processed in the usual manner and a connection obtained to a director for processing the routing line. In the translator the precedence prosign character CC is recognized as being a connect through request and a high priority classification. In this case when the end-of-routing combination is detected, relay DCTI, FIG. 15, at the receiving position is operated instead of performing the usual message start function.

Operation of relay DCTI among other things operates an alarm for supervisory attention and the supervisor should set the message waiting indicator to a count of one if necessary and throw the connect through switch to its connect through position. This provides the required message start operation and when switch XSQ steps to point 3, relay DCTI releases and cancels the alarm.

Operating routine should be such that a connect through request message should never contain routing indicators for more than four destinations. All required cross-office connections for these must be directly established and with the connect through switch in its connect through position, relay RMXI cannot operate. Therefore no selection of an MX position can be made. With said switch operated to its connect through position the circuit for stepping switch XSQ from point 4 to point 5 when the end-of-message combination is detected is opened. Therefore, with the switch in this position the established cross-office connection cannot be automatically released. As pointed out hereinbefore, the blank tape feedout circuit associated with the incoming line reperforator is altered by the connect through switch so that a double length of tape is fed out at the cessation of signals.

The individual items transmitted after a connect through setup has been established start with a single character Z and end with the normal end-of-message combination to provide proper control over the tape feed-out action.

The item requesting termination of the connect through setup is preceded by the character combination ZCZC resulting in the operation of relay MWSM which causes operation of relay OCTE. This produces an alarm for supervisory attention and opens the transmitter auto-stop circuit. Thus movement of the tape in the transmitter is halted so that the supervisor can inspect the connect-through termination request. To restart cross office transmission, the restart push button is operated and the tape watched so that when the ZCZC of the termination request item is being transmitted, the connect-through switch can be returned to its normal position. Release of the cross office connections then occurs in the normal manner when the end-of-message combination of this item passes through the transmitter. The message waiting indicator at this time should be adjusted to correspond to the number of messages on hand if any are present in the tape following the connect-through termination request item.

*Alarm system circuits*

A number of other alarm and supervisory circuits in addition to those mentioned hereinbefore are provided in the system to appreaise the attendant and supervisor of certain conditions and operations of various units of the system. Each receiving position has individual alarm circuits which are connected to a general alarm system and include a supervisory signal which operates when trouble conditions are encountered in the course of processing a message and also from other causes requiring supervisory attention.

Figure 42:
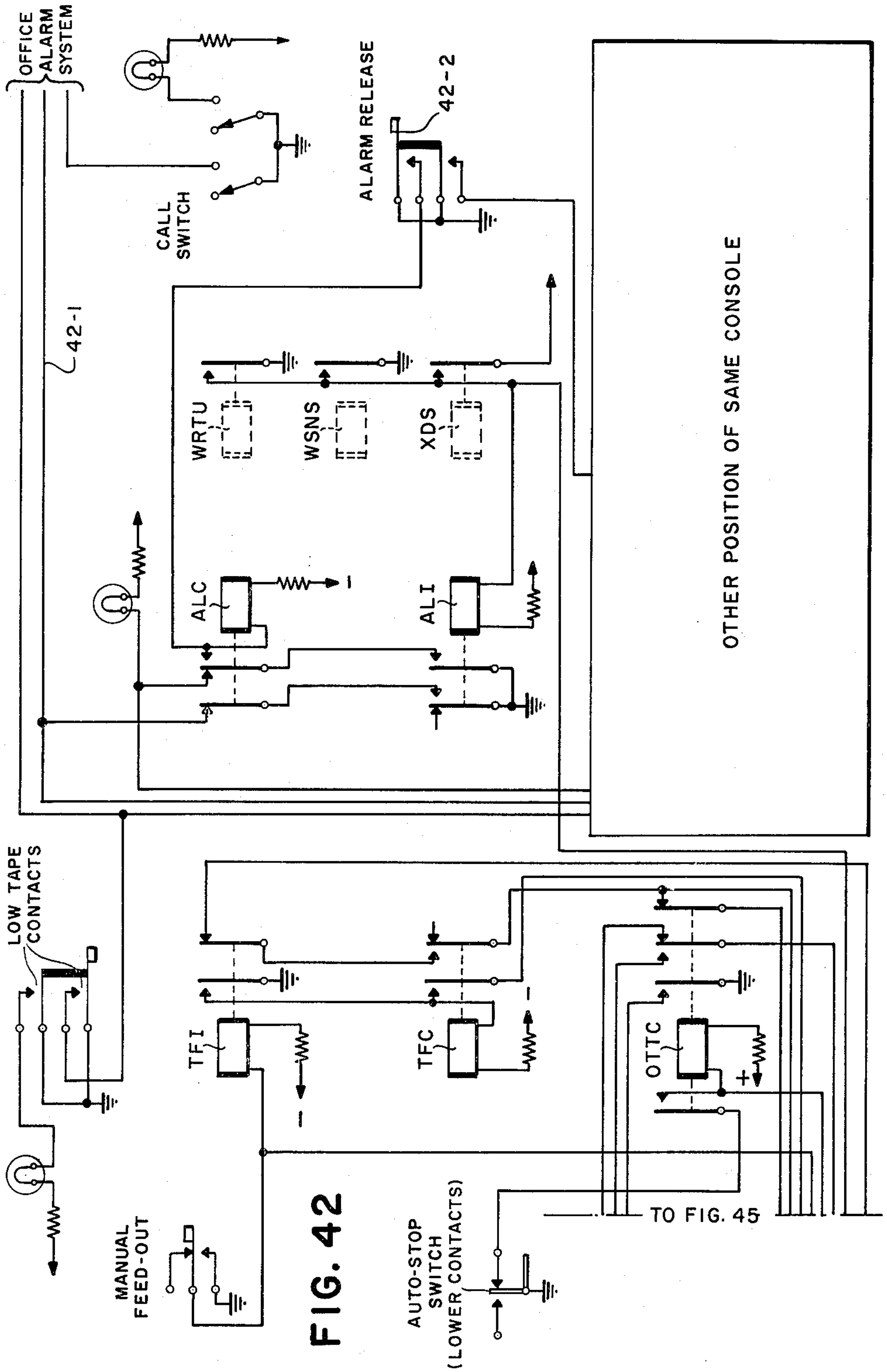
Figure 43:
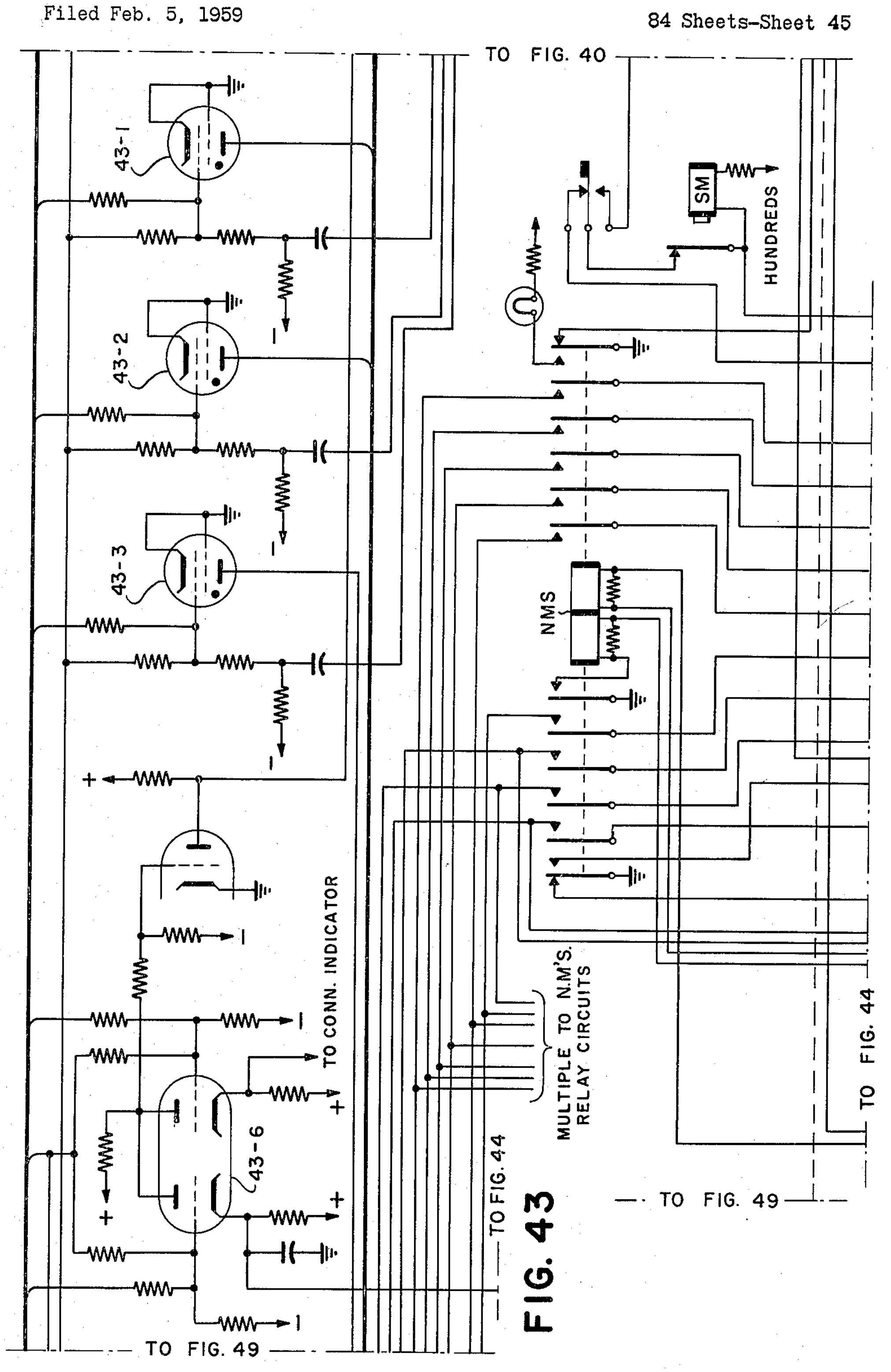
Figure 44:
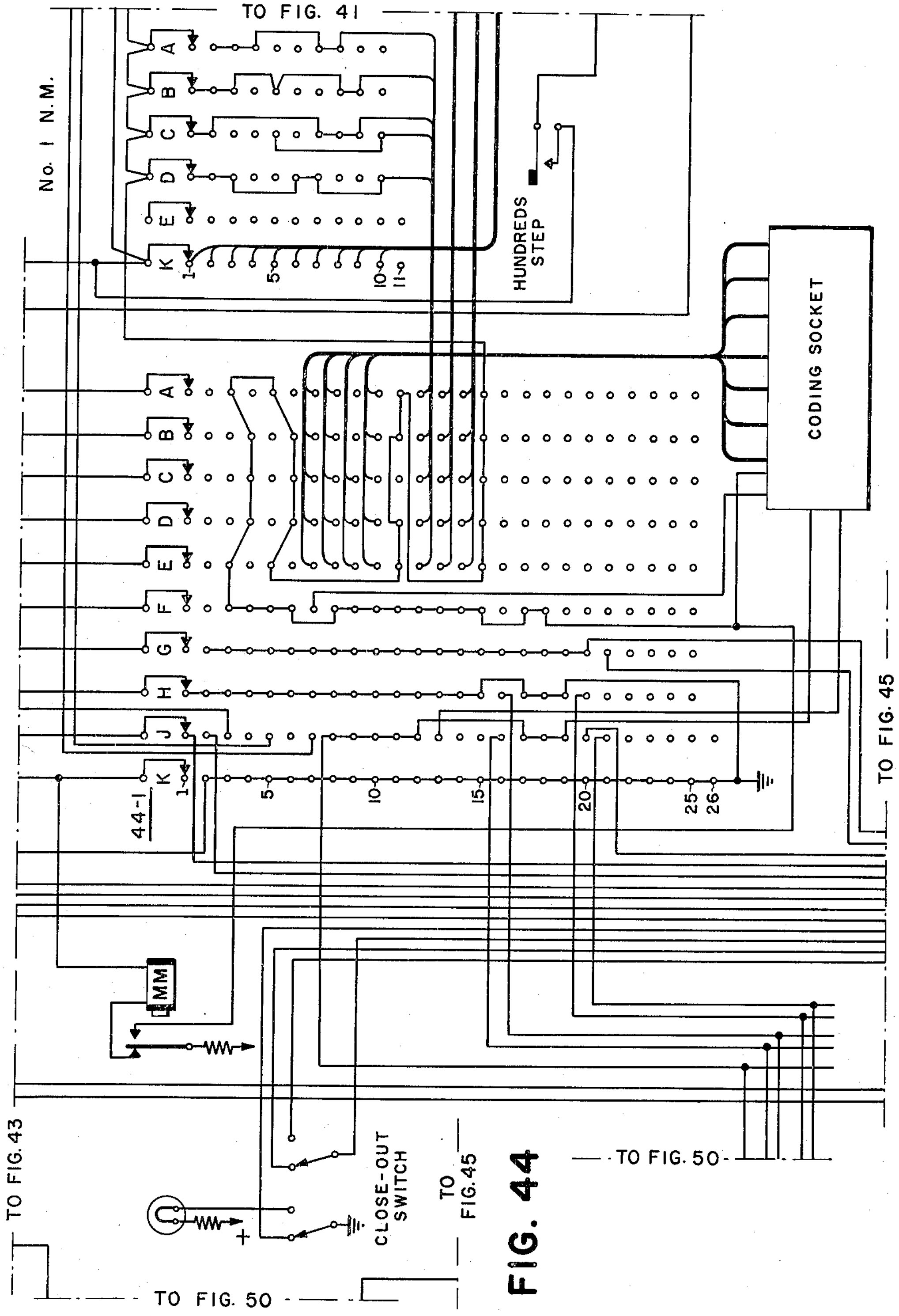
Figure 45:
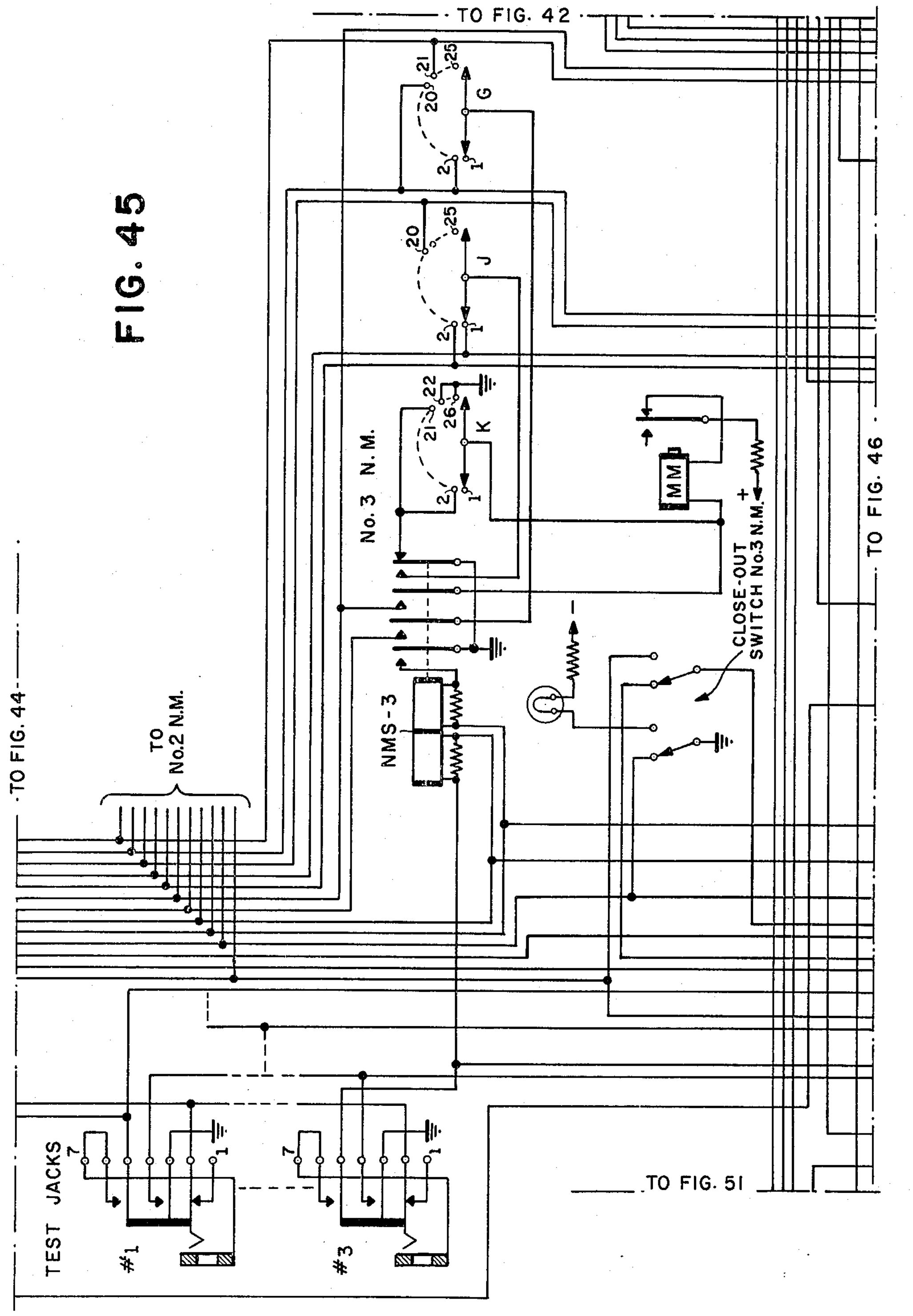

Some of these alarms are indicated and other alarm control circuits are shown mainly in FIG. 42. The receiving position alarm circuit includes a pair of relays ALI and ALC. The former relay is operated by any receiving position condition requiring supervisory attention which operates a console lamp as well as a common supervisory alarm (not shown) connected to conductor 42–1. A supervisor or attendant answering a supervisory alarm operates the console supervisory alarm release key 42–2 causing relays ALC to operate in both receiving positions of the console. The particular ALC relay associated with the operated ALI relay locks and cuts off the external supervisory alarm. The other ALC relay releases on release of the key 42–2.

When the receiving position trouble condition that caused the alarm is cleared the operated ALI relay releases followed by the release of the associated of the ALC relay.

*Director and translator*

As pointed out hereinbefore, a massage may be manually switched under the direction of the push buttons or automatically, and in the automatic switching a director is employed. The director controls the receiving position switching functions for each message processed and a translator operating in conjunction therewith provides a switching control code for each piece of routing information passed to it by a director.

At a switching center having a relatively large number of receiving positions, each 100 positions is divided into ten groups of ten receiving positions each, and for each ten groups a total of six directors may be provided. The circuitry between the directors and the receiving positions is such that any director can serve any receiving position at a time. However, when a director is once connected to a receiving position group, the director serves every position in that group requiring automatic switching before it is released.

The arrangement of the translators with respect to the directors is such that three translators are associated with each six directors and therefore for each 100 receiving positions there may be six directors and three translators. Thte translators are arranged so that any one of the three can serve any director in its respective assembly.

A director is connected to a receiving position for the entire processing time of a message routing line and each piece of routing information is transferred to the director one character at a time. Upon transfer of a certain character, such as the third of any piece of routing information, the director obtains a connection to a translator and subsequently delivers all characters of that piece of information simultaneously to the translator. The translater then returns to the director a switching control code which is stored and used to control the receiving position switching equipment. There are two phases of operation of the director; one is concerned with obtaining from the receiving position each piece of routing information for which a switching control is required and the other is concerned with storing the switching control code obtained from the translator and controlling the receiving position switching functions. Thus a second piece of routing information can be transferred from the receiving position to the director while switching operations are being performed for the preceding piece of routing information.

*Director connecting circuits*

The ten receiving position groups simutaneously register their director connection requirements and the lowest numbered group registering such a requirement is selected for the first director connection to be established. A gating arrangement provides that all registered groups will be served before another registration of their requirements is made. All idle directors simultaneously register this condition and the lowest numbered idle director is selected as the first to be connected to a receiving position group. A second gating circuit provides that each registered idle director will be used for a connection before another idle condition registration is made. Accordingly the lowest numbered idle director will be connected to the lowest numbered receiving position group requiring a connection. Only one director can be connected to a group at a time and if a director connection requirement exists for several position receiving groups, idle directors will be selected in numerical order and connected to those receiving position groups also in numerical order.

A director may be connected to any one of the ten receiving position groups and, once connected, it is not released until each receiving position in that group requiring automatic switching for a message has been served. In normal operation with normal messages, a director can serve any position in a group if necessary and disconnect from that group before any position in the same group has another message ready for automatic switching, and in view of this no gating circuit is provided for the ten receiving positions of a group.

Some of the control circuits for a set of directors such as is associated with ten groups of 10 receiving positions each and the associated translators are shown in FIGS. 54–75. These control circuits include some of the contacts, as indicated, of the DCN, PBCN, DCNI, and DCNS relays together with parts of the automatic manual switches. As was pointed out hereinbefore, a request for a director by a receiving position is indicated by the operation of its director connect initiate relay DCNI. The operation of such a relay at a receiving position grounds a control lead such as the one from the front contact of the second right hand tongue of relay DCNI, FIG. 15, corresponding to the lead 75–1 of FIG. 75. Contacts of each DCNI in a group are multipled to control lead 75–1 which extends through a group busy switch 71–1, and back contacts of an associated relay GDSB–1 to the coil of relay GDSI–1. Each of the other receiving position groups has corresponding GDSB and GDSI relays as well as other relays individual thereto. Let it be assumed that one or more of the receiving positions of group 1 require a director connection. Such a condition is evidenced by the operation of their DCNI relays and relay GDSI–1 will be operated through the above described circuit. This relay locks directly to the control lead 75–1 and closes an operating circuit for relay GDSC–1 which locks directly to its operating ground at released relay GDSB–1. Similar circuits are provided for the other nine receiving position groups and accordingly one or more of the GDSC relays may be operated at the same time.

When any one of the GDSC relays operates, it completes a circuit for the operation of relay GDSCG to open the operating circuit of all GDSC relays. However, any operated ones of these relays remain locked. Relays GDSCG provide a gating control to assign a director connection to each receiving group which has registered a need for one. As this relay operates, it closes an operating circuit for relay DSI, FIG. 72, through back contacts of relay GDSR. In addition, relay GDSCG closes a circuit from ground at back contacts of relay GDSR to additionally lock the lowest numbered operated GDSC relay. For the assumed case, this is relay GDSC–1. This in effect assigns to that receiving position group the first director connection to be established and operation of relay DSI indicates that a director connection is required for some receiving position group.

*Director selection*

Figure 69:
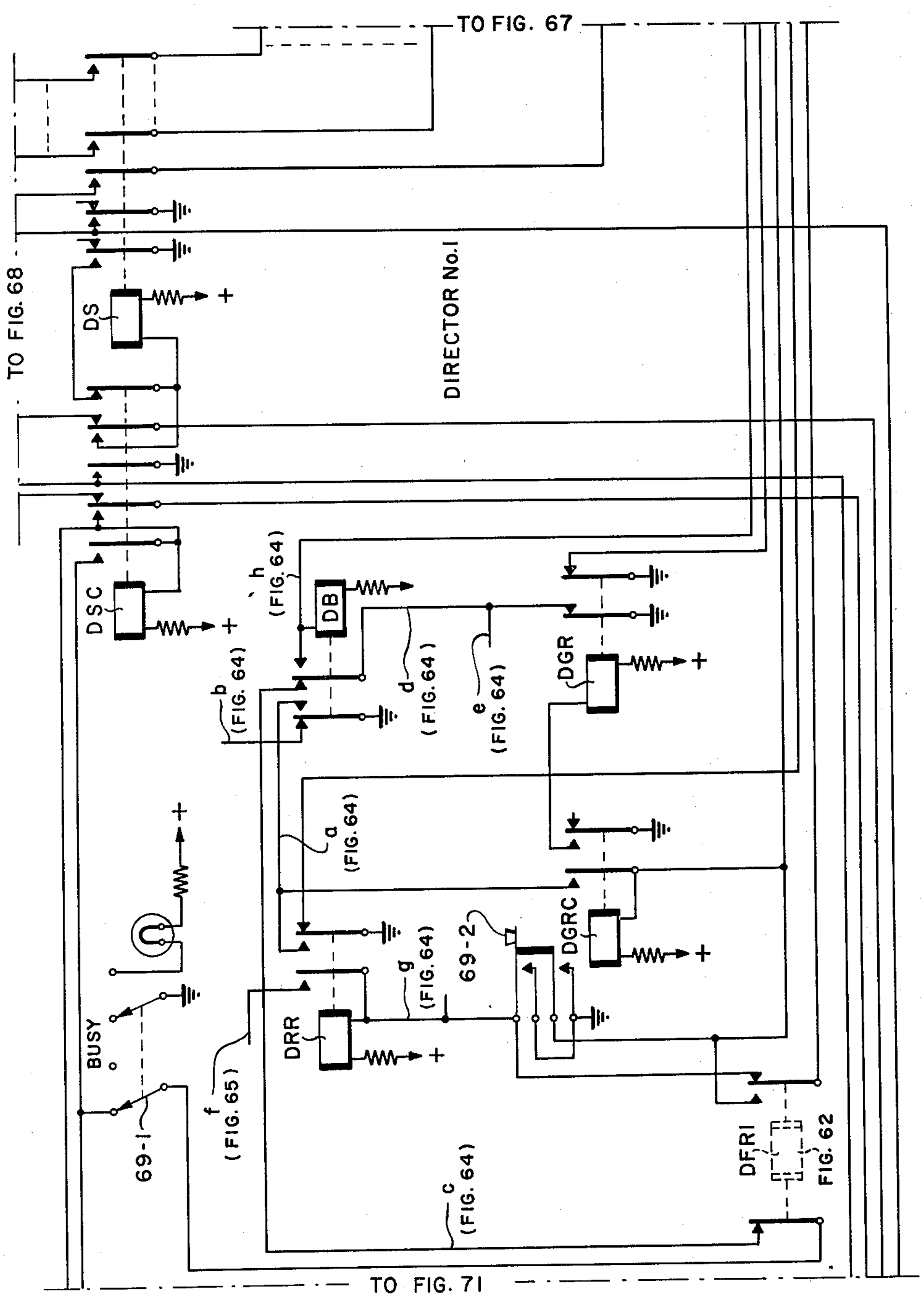
Figure 70:
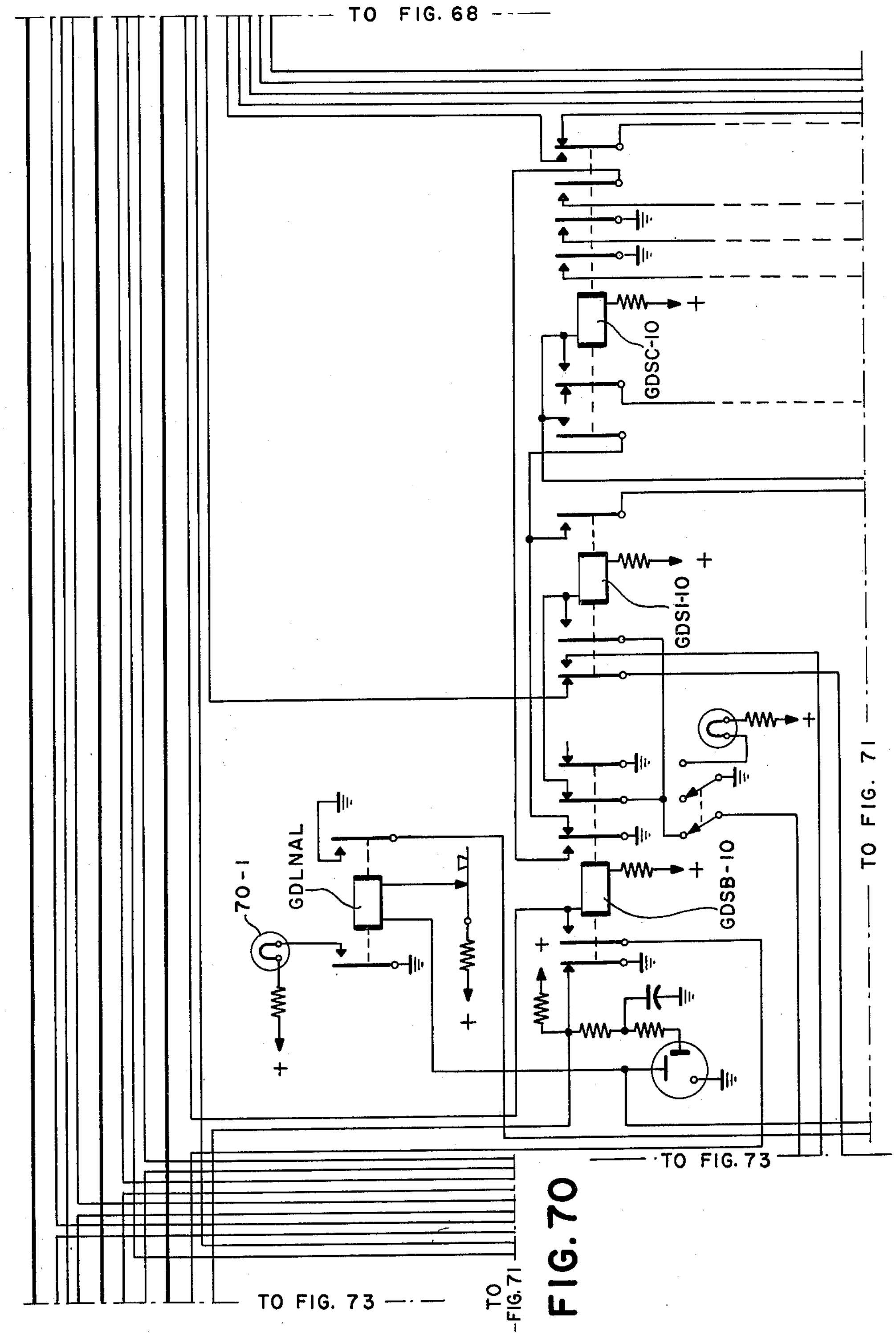
Figure 71:
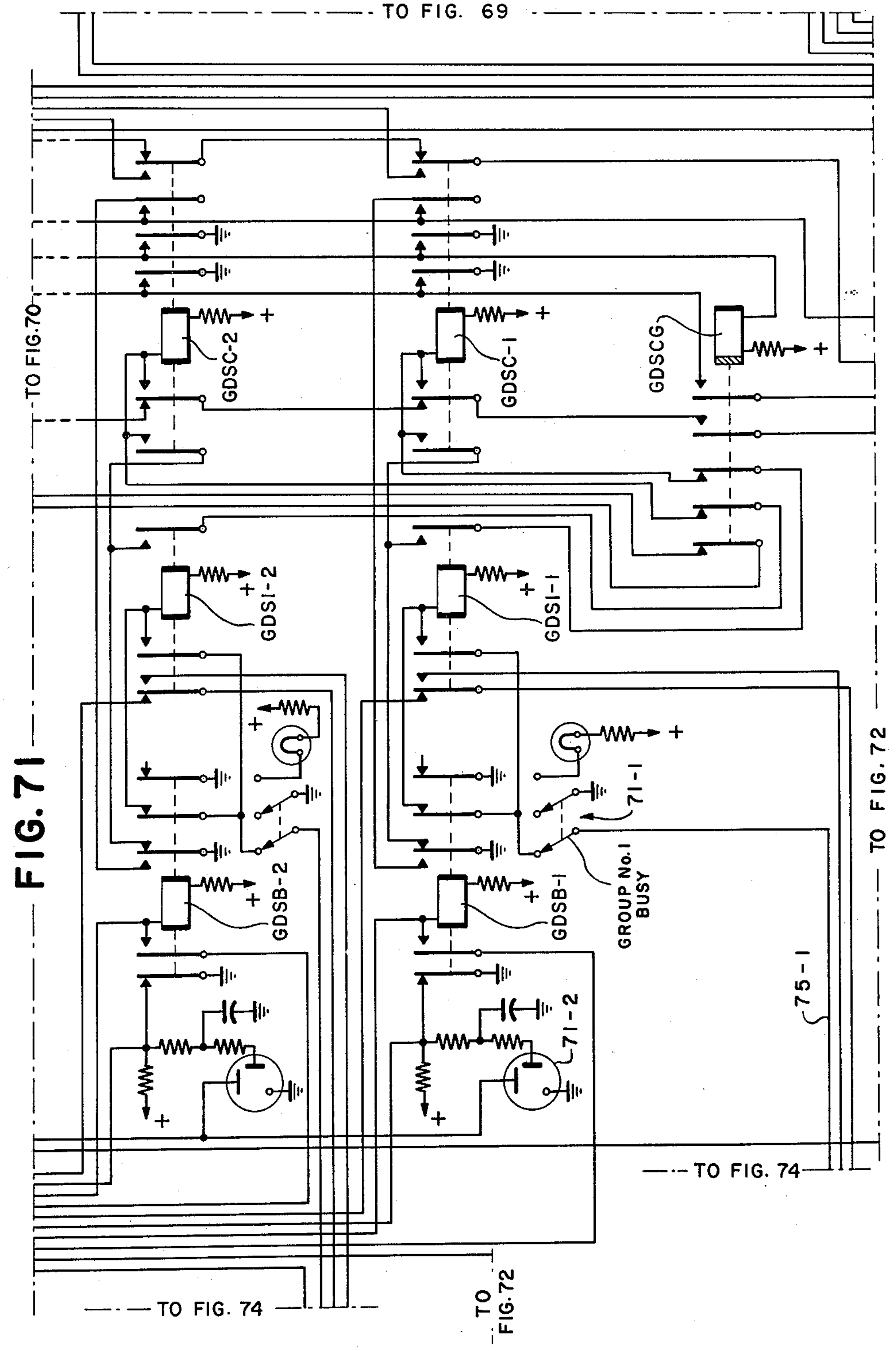

As explained above, there may be as many as 6 directors for each 100, or 10 groups of 10 each, receiving positions. Some of the relays of director No. 1 are shown in FIGS. 67 and 69 and some of the highest numbered directors in FIGS. 66 and 68, with the intermediate directors indicated. Each idle director is represented by its relays DGR, DB and DFRI being released, and in this condition an operating circuit is closed for relay DSC through back contacts of relay DSCG, a busy switch 69–1 of the first director, for example, and back contacts of relays DFRI, DB and DGR. Considering director No. 1, the operation of relay DSC indicates that the director is available for connection to a receiving position group and the DSC relays of one or more directors may be operated at the same time. When relay DSC of any director operates, it operates relay DSCG to open the operating circuits for the DSC relays of all the directors. However, any operated DSC relays remain locked directly to their associated DGR relays. Relay DSCG provides a gating control to assign one connection to each idle director and its operation indicates that at least one idle director is available.

With relay DSCG operated, operation of relay DSI closes a circuit from ground at released relay DGSR to additionally lock the DSC relay of the lowest numbered idle director. This in effect designates that director as the one which will be connected first. Ground from the released GDSR relay also operates relay DS of the lowest numbered idle director, which locks the ground directly through its operated DSC relay. When relay DS operates, it indicates that the associated director has been selected for connection to some receiving position group and it will be noted that only one DS relay can be operated at a time.

*Connection to receiving position group*

Figure 66:
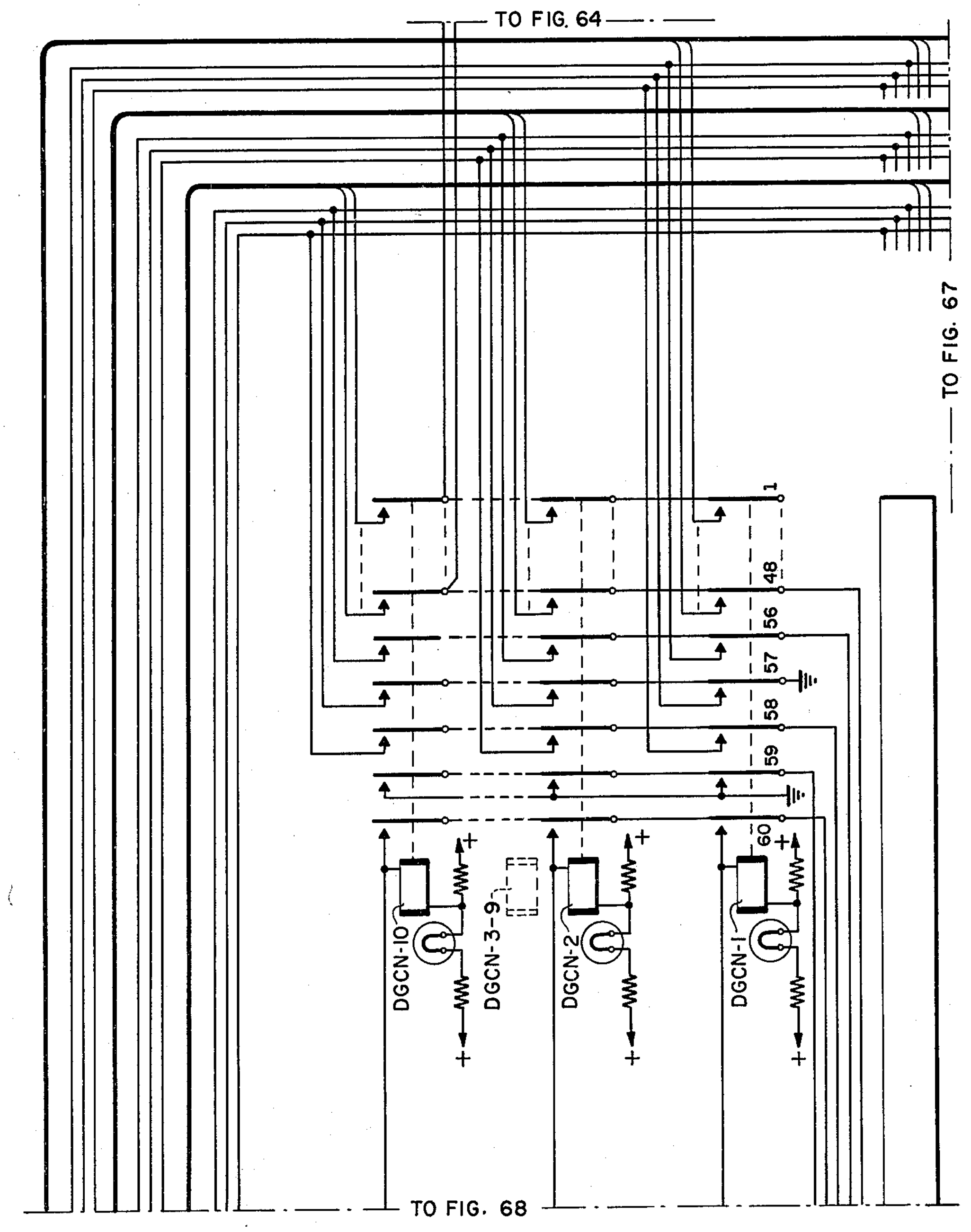
Figure 67:
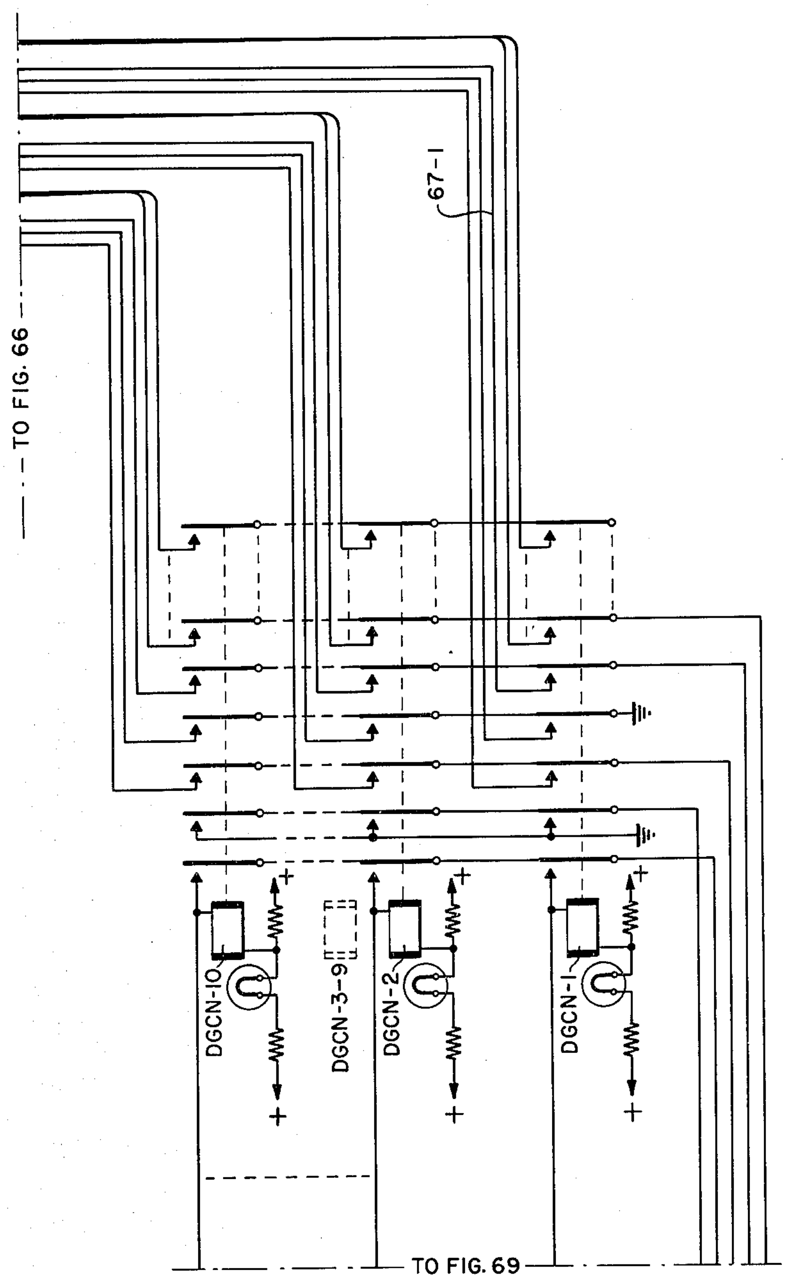
Figure 68:
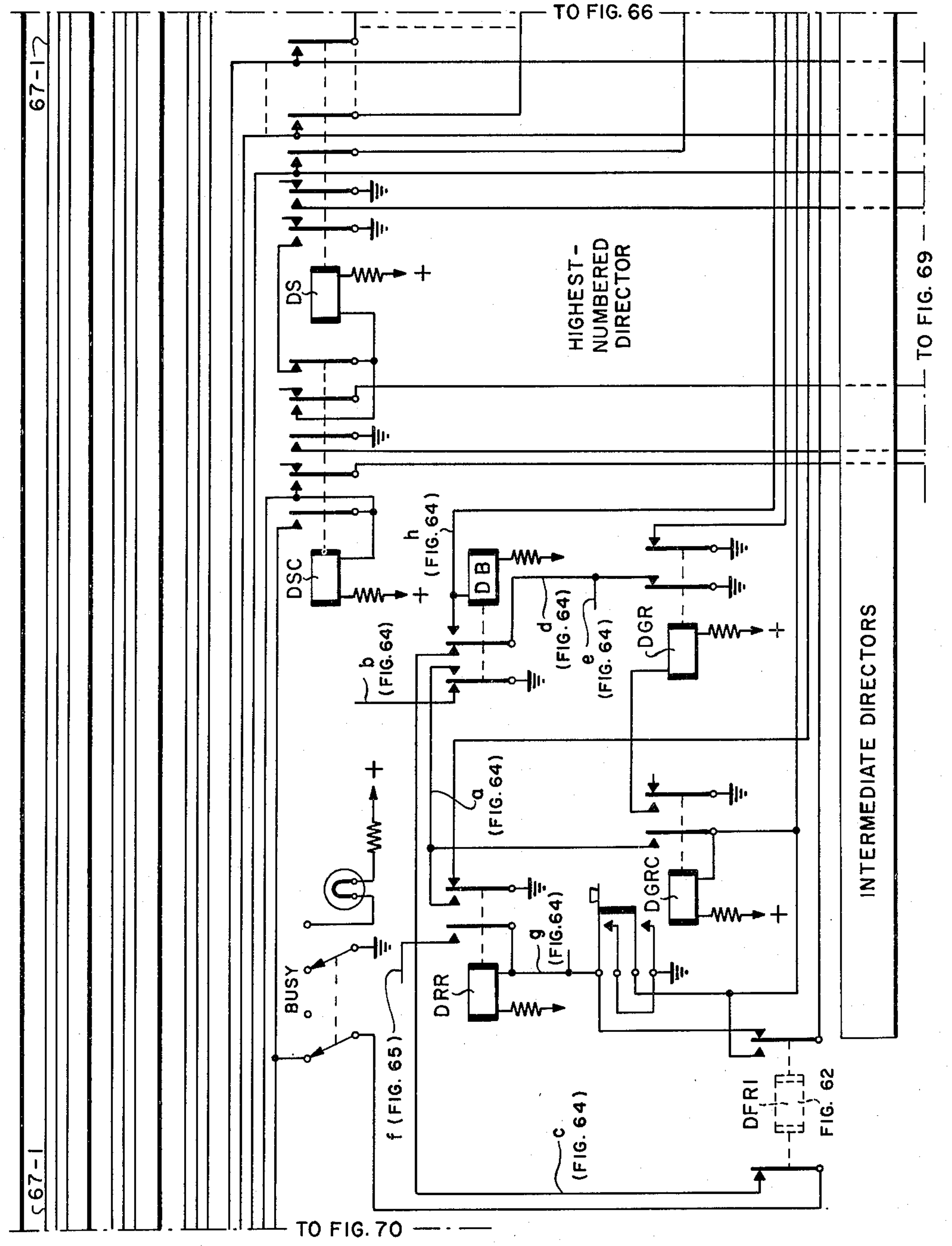

Each director, as indicated in FIGS. 66 and 67, is equipped with a set of 10 DGCN relays, which permit the director to be individually connected to any one of the 10 receiving position groups. Only one DGCN relay can be operated at a time and its operation closes all circuits required for controlling the automatic switching functions of the associated receiving position group. Let it be assumed that director No. 1 has been selected for connection to receiving position group No. 1, and in this case ground from released relay DGSR is connected to a series transfer contact circuit of the GDSC relays. As indicated, 10 associated control conductors are multipled to contacts of the DS relays of all directors. With relay DSCG–1 operated, the first conductor of this set is the only one grounded, and with relay DS of director 1 operated, this ground operates relay DGCN–1 of that director. The latter relay locks to ground at released relay DGR and operation of DGCN–1 connects this director to receiving position group No. 1.

Operation of any DGCN relay in a director completes a circuit for the operation of its DB relay which locks to ground at its released DGR relay. Operation of relay DB opens one of the locking circuits for its associated DSC relay. In addition, operation of relay DGCN–1 operates relay GDSB–1 which locks operated. This relay can be operated by the DGCN–1 relay of any director and its operation accordingly indicates that a director connection has been completed for receiving position group 1.

Operation of relay DGSB–1 opens the operating circuit for relay GDSI–1 but the latter relay remains locked as long as the associated receiving position group control lead is grounded. Operation of relay GDSB–1 also opens one of the locking circuits for relay DGSC–1, but the latter remains locked to ground at released relay GDSR. Further, relay GDSB–1 in operating completes a circuit for the operation of relay DGSRC through contacts of relay DGSC–1 and relay GDSRC locks to various control point grounds and operates relay GDSR. When relay DGSR operates it opens the final locking circuit for relay DGSC–1 which releases and also releases relay DSI which opens the final locking circuit for relay DSC of director No. 1. The release of relay DSC is followed by the release of the associated DS relay. At this time all control point grounds that held relay GDSRC operated are open and the relay releases followed by the release of relay GDSR which restores the director connection control circuits to their normal condition.

Another director can now be selected and connected to another receiving position group if required. This receiving position group will be the next higher numbered one whose GDSC relay is operated and the director involved in this case will be the next higher numbered one. For each such connection the above sequence of operations is repeated and when the last of the originally operated GDSC relays releases, relay GDSCG will also release. At this time a new pattern of operated GDSC relays can be set up for the receiving position groups which now require director connections. When the last originally idle director has been connected to a receiving position group, release of its DSC relay releases relay DSCG and at this time a new pattern of operated DSC relays can be set up for the directors which are now idle.

*Connection to receiving position*

When several receiving positions in a group require the use of a director simultaneously it tis necessary to select one receiving position as the first to be served. Let it be assumed that one or more receiving positions of group 1, FIG. 75, require a director connection and that a director such as the one of FIGS. 67 and 69 has been connected to this receiving position group in the manner heretofore pointed out. Operation of relay DGCN–1 completes a circuit from ground at a back contact of relay DRR, a front contact of relay DGCN–1, conductor 67–1 through the automatic manual switches and continuity contacts comprising a chain circuit of the DCNS relays of group 1 receiving positions to a transfer tongue of relay GDSI–1. With the latter relay operated the circuit continues through the transfer contacts of the DCNI relays of group 1 receiving positions. One or more of these relays must be operated since that was necessary to initiate the director connection and if it is assumed that the DCNI relay of receiving position No. 1 is operated it will cause the selecting chain circuit to operate the associated DCNS relay. As this DCNS relay operates it locks to the selecting chain ground source in such a manner that no other DCNS relay can be operated until that one releases.

When a DCNS relay of a receiving position operates, it completes the circuit for the operation of its associated DCN relay. This closes all circuits required between a receiving position and the connected director for controlling the automatic switching of a message. When a DCN relay operates, it closes a locking ground for relay GDSB of its respective group. For example, the operation of a DCN relay of receiving positions group 1 closes a locking ground for relay GDSB–1. The DCN relays of the receiving positions and the DGCN relays of the directors are multiple contact relays and each has some sixty circuits controlled thereby. All of these circuits are not shown in detail and some are grouped to indicate the various connections thereto and the circuits completed thereby. It will be noted that the front contacts of the DCN relays of each group of ten receiving positions are multiplied together and are connected to corresponding front contacts of the DGCN–1 relays of each director and that the front contacts of the DCN relays of the other receiving position groups are multiplied together and connected to front contacts of corresponding DGCN relays of the directors. By these connections any director can be corrected to any receiving position group.

*Disconnection of director from receiving position*

When the automatic switching functions for a message have been completed the DCNI relay of the connected receiving position releases. This closes ground through a front contact of the associated DCN relay to operate the DRR relay at the connected director. The operation of this relay clears out the director circuits and opens the DCNS selecting chain ground for the receiving position group to which the director is connected. For the previously assumed condition this release the DCNS relay for the No. 1 receiving position which in turn releases the associated DCN relay, when the latter relay releases the completion of the director clear out function releases relay DRR. At this time the DCNS relay section chain ground for receiving position group No. 1 is reclosed. Accordingly, if any other receiving positions in this group require a director connection, the DCNS relay of the next higher numbered position having an operated DCNI relay will cause the above described connections to be repeated. Thus, every receiving position requiring automatic switching will be served before the connected director is disconnected from this group.

When all receiving positions of a group have been served by a director all DCNI relays of that group are released and the associated GDSI relay will be released. In accordance with the above assumed case involving group 1 receiving positions relay GDSI–1 will release when all of the DCNI relays of that group are released. When GDSI–1 releases it can not be represented until relay GDSB–1 releases.

When relay DRR releases in the manner pointed out, in connection with the director disconnection from the last connected receiving position of group 1, the receiving position group 1 DCNS selection chain ground is reclosed. However, with relay GDSI–1 released the ground now operates relay DGRC of the connected director and that relay locks to various control point grounds. When the relay DGRC operates it completes a circuit for the operation of relay DGR which releases relay DGCN–1 and disconnects the director from receiving position group 1 and also clears out all operated director circuits. Release of relays DGRC and DGR when the director is cleared out returns it to its idle condition and it may then be selected for connection to any receiving position group when required. Release of both the connected director DGCN–1 relay and the last operated DCN relay of group 1 receiving positions, releases relay GDSB–1. At this time group 1 receiving position can again operate GDSI–1 when another director connection is required.

Figure 72:
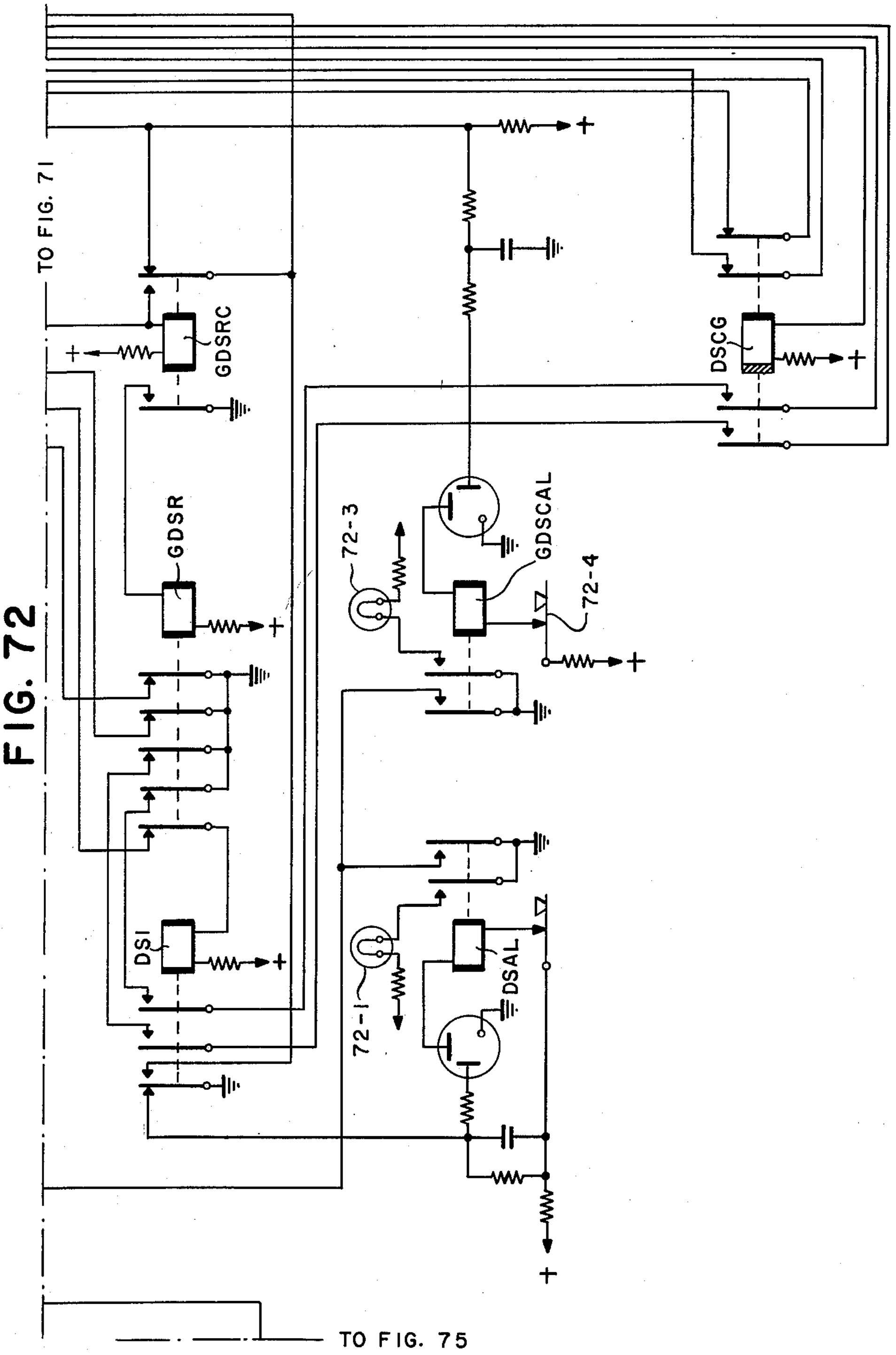
Figure 73:
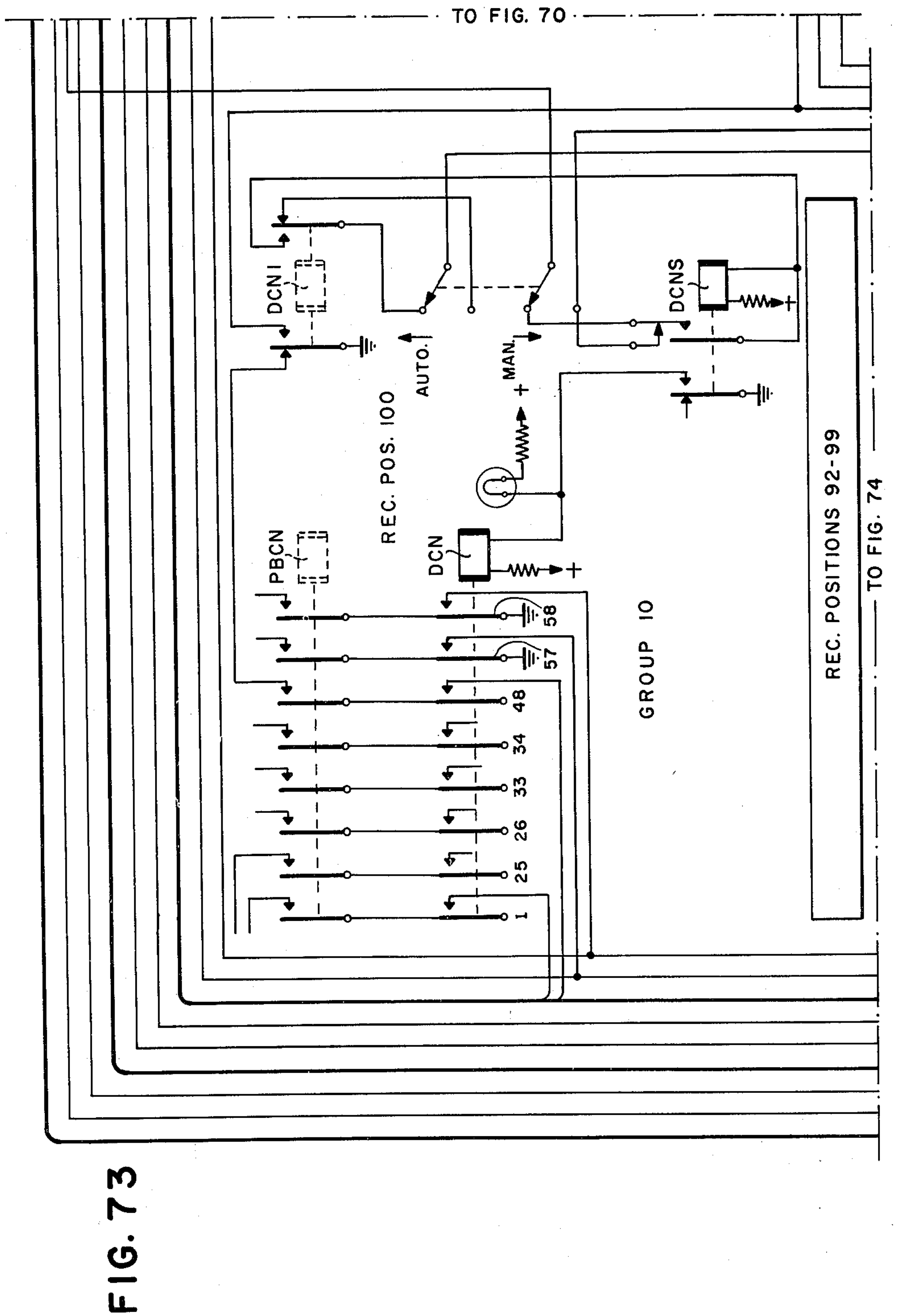
Figure 74:
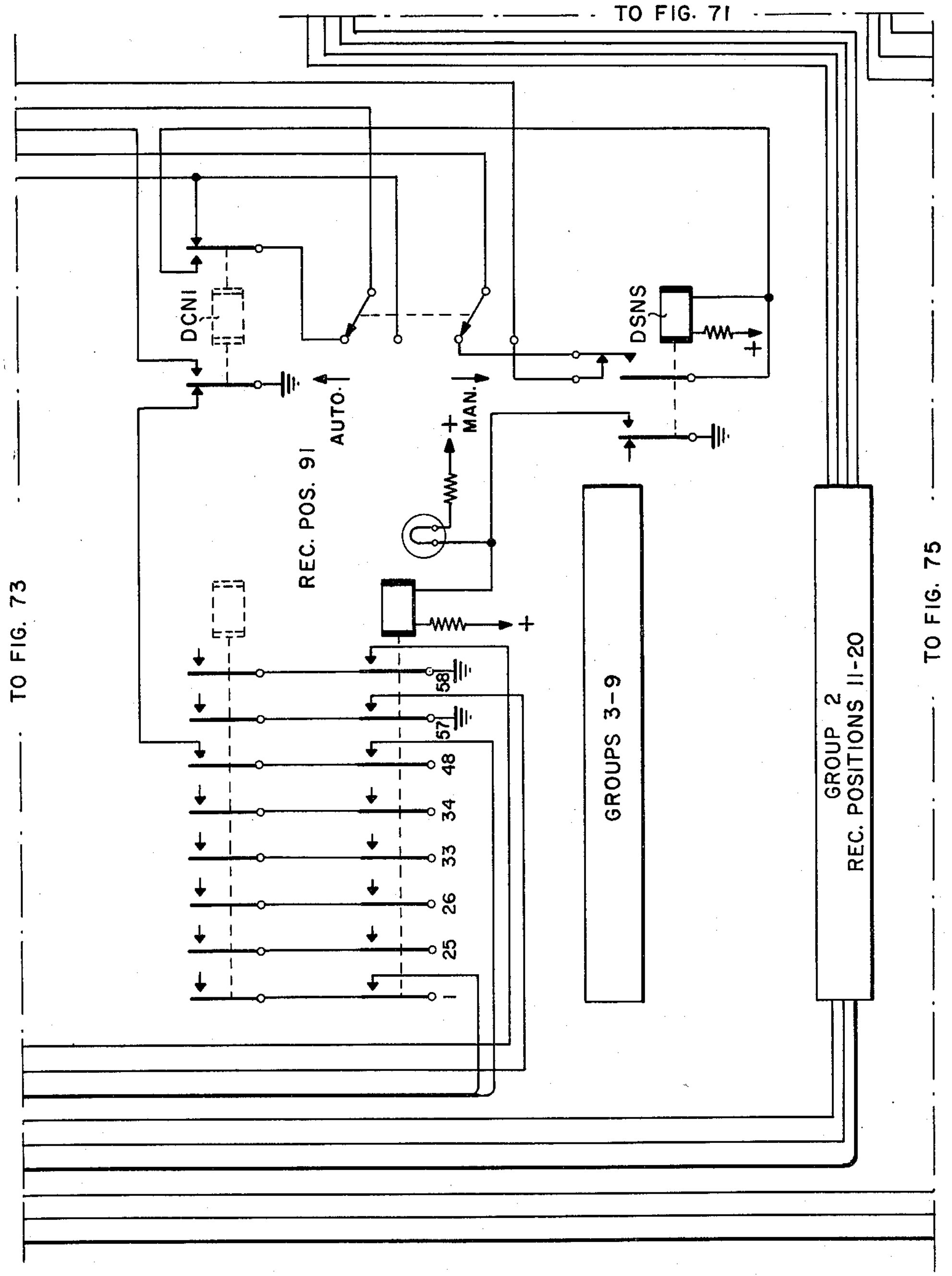
Figure 75:
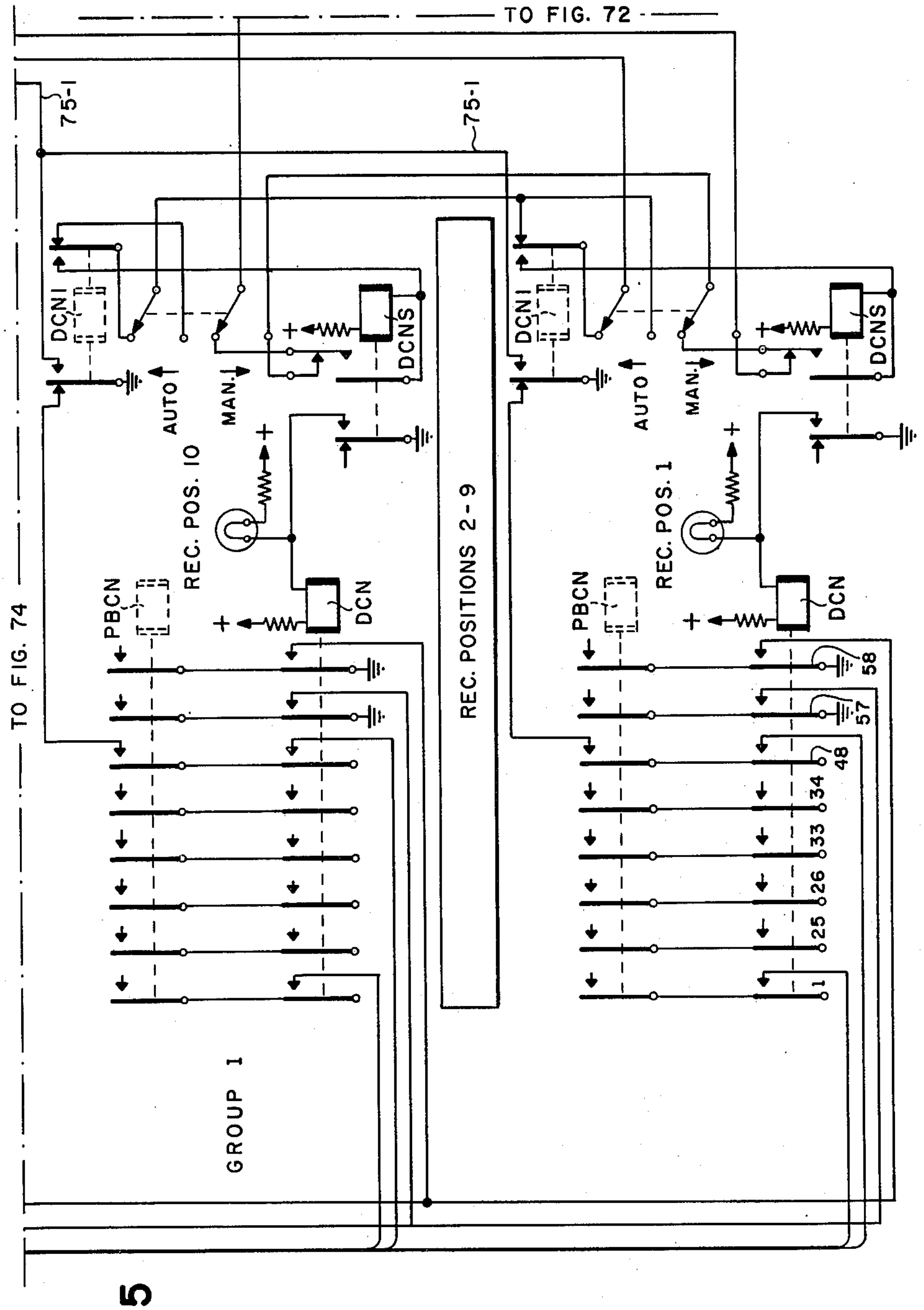

A number of alarm circuits are provided to indicate abnormal periods of time in establishing a director controlled switching function and include a relay DSAL, FIG. 72. When relay DSI operates, it removes ground from the timing network of the tube in the circuit of DSAL and approximately 60 seconds after the removal of this ground, if not reapplied, DSAL will operate to light the associated signal lamp 72–1. If all the directors happen to be busy when relay DSI operates, at least one should become available for a connection before the expiration of the 60-second timing interval. Release of relay DSI as each director connection is completed resets the timing network.

Operation of any GDSC relay removes ground from the timing network of the tube associated with relay GDSCAL. This timing interval network is approximately two-thirds of a second and operation of any GDSC relay should be followed by the operation of relay DSI well within this interval which resets the timing network. When a director connection is completed, relay GDSRC operates to release the common controlling circuits and also removes ground from the tube timing network of relay GDSCAL. Complete release of the common controlling circuit should occur well within the timing interval causing it to be reset. In either case failure to perform the required function within that interval results in operation of relay GDSCAL and the illumination of the associated signal lamp 72–3. The release key 72–4 is operated when the trouble is cleared to release relay GDSCAL.

Each director has a busy switch such as 71–1 which, when thrown to a position other than that shown, releases its associated DSC relay if already operated, or will prevent it from operating when the director becomes idle. However, if the director has just been selected for a receiving position group connection, the additional locking circuit provided by both relays DSCG and DSI being operated will cause the director connection to be completed.

When a GDSB relay of any group of receiving positions operates, it removes a ground and starts a timing network of an associated tube such as 71–2 which is adapted to operate in approximately two-thirds of a second. When any GDSB relay operates, it should be followed immediately by operation of the DCN relay for the first receiving position to be served in the associated group, which among other things resets the timing interval of the tube for that group. Release of an operated DCN relay restarts the timing interval but this should be followed either by the operation of another DCN relay in the same group or the disconnection of the director from the group and the release of the associated GDSB relay. If neither of these functions occur within the allowed interval, relay GDCNAL (FIG. 70) operates to illuminate the associated signal lamp 70–1. This indicates an abnormal condition in the operation of the circuits and the receiving position group in trouble can be determined by observing the tubes such as 71–2.

Among other things the automatic manual switch provided at each receiving position, when thrown to the manual position, passes the DCNS relay selection chain circuit directly through it. If a selection chain failure has occurred, these switches may be used to locate the receiving position causing the trouble. In addition, each receiving position group is provided with a busy switch such as 69–1 which, when operated, releases the associated GDSI relay if operated, or will prevent it from operating if ground appears on its control lead. The automatic switching functions for any receiving position in the group to which a director is already connected will be completed and the director disconnection from that receiving position will occur in the normal manner. However, with relay GDSI released, no other position in that group can be served.

If a director is connected to a receiving position and does not complete its normal functions, the usual automatic disconnection from the group will not occur. However, operation of the director release key 69–2 will directly operate relays DRR and DGRC which will cause the director to disconnect completely from the receiving position and the receiving position group. If the automatic switching requirement of that group had not been completed, its associated GDSI relay would still be operated when its GDSB relay released. This allows another director connection to be obtained at the proper time to complete the switching requirements.

*Character storage*

As mentioned above, each piece of routing information is transferred to a director one character at a time, and these characters are stored in an electronic character storage unit such as that shown in FIGS. 52 and 53.

Among the circuits completed by the operation of a director DGCN relay and a receiving position DCN relay are those between the five sensing pins of the receiving position transmitter, to the five conductors of cable 52–1 and also a circuit from the plate of vacuum tube 25–18 including conductor 52–2 to the control grid of vacuum tube 52–3. The above six circuits involve front contacts and tongues 40–45 of the above mentioned relays. The conductor 52–2 provides a probe pulse to control the character storage operations and when the tape transmitter is not auto-stopped, the probe pulses take place at the rate of 200 words per minute. The tape transmitter in the conventional manner grounds various ones of the leads of cable 52–1 in various combinations to represent the characters sensed in the tape, and while connected to the character storage unit, the pulses are transferred to and stored in groups of five thyratrons such as thyratrons 53–1 to 53–5. There are five such groups of storage thyratrons, and accordingly a total of five characters in the embodiment disclosed can be stored in the storage unit. Associated with the storage thyratrons 53–1, etc. are thyratrons 53–6 through 53–12 and 52–4 which form a counting chain for controlling the storage operations. In the idle condition of the storage register, thyratron 52–4 is operated and the probe pulse accompanying the first character to be stored extinguishes this thyratron and operates thyratron 53–6, setting up the character in the first storage group 53–1 to –5. The probe pulse accompanying the second character extinguishes thyratron 53–6 and operates thyratron 53–7, setting up that character in the second group of storage tubes. Such operation continues until either a space or a carriage return character is detected at the receiving position, at which time the receiving position tape transmitter is auto-stopped and no further probe pulses occur.

Figure 65:
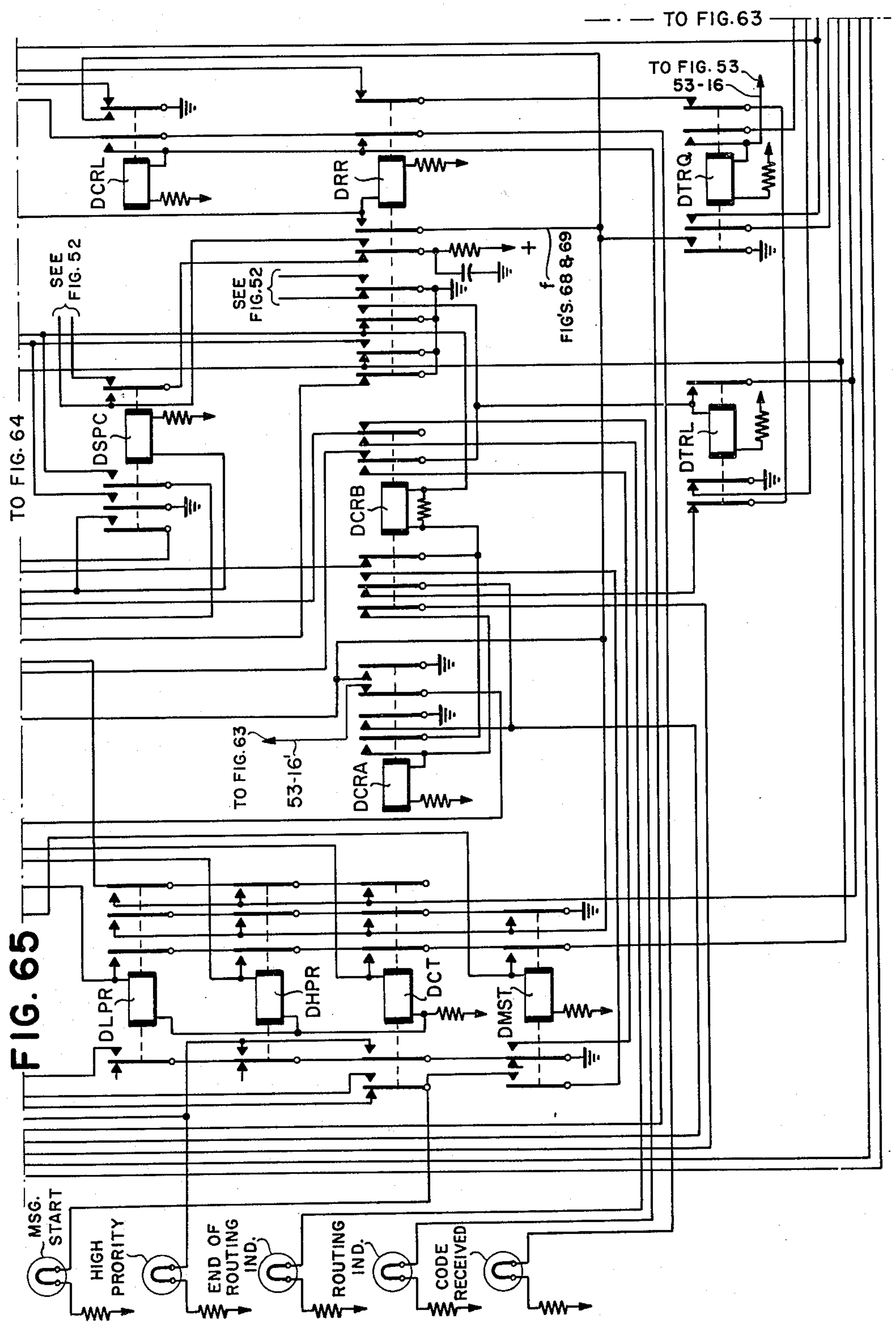

Coincident with the storage of the third character the thyratron 53–13 is fired to operate relay DTRQ, FIG. 65, over conductor 53–16. As this relay operates it locks and extinguishes thyratron 53–13 and causes the director to be connected to a translator, as will be evident hereinafter. Transfer of the stored characters to a translator occurs in such a way that the operated storage group thyratrons are extinguished. This automatically clears out the character storage section of the director.

Relay DSPC operates at the end of each piece of routing information transferred from the receiving position. Operation of this relay extinguishes the last operated thyratron in the group 53–6 through 53–12 and reoperates thyratron 52–4. This resets the counting chain in preparation for transfer of the first character of the next piece of routing information. The counting chain is also reset by the operation of relay DRR.

*Character rejection*

The control circuits of the storage unit are so arranged that certain characters such as a blank, lower case, upper case, space, or line feed will not be stored as a first character in any piece of routing information. Relay DPRB, FIG. 52, is released during the transfer of the precedence prosign piece of routing information. This sets up the control circuit so that the additional characters S and J will not be stored as a first character. These characters occur as a part of a five bell indicator which immediately precedes the precedence prosign characters of a high priority message.

Relay DPRB is operated during transfer of all routing indicators and the end of routing combination. This sets the control circuit so that the character R will not be stored as a first character. All routing indicators start with this character but it has no significance in determining a switching control code. With relay DPRB operated, the control circuits are set so that the characters S and J will be stored as first characters, as either may be used as the first character of a routing indicator group requiring translation into a switching control code.

A precedence prosign requires two characters plus a space character or a total of three characters to be stored, and normally a routing indicator requires five characters plus a space or a total of six characters to be stored. However, the system will operate properly where routing indicators consisting of as few as three characters plus space or four characters total are stored or as many as six characters plus a space or a total of seven characters. However, the maximum number of characters transferred to the director character storage unit for a particular piece of routing information should not exceed seven, and if more than seven are transferred, it indicates that an error has occurred in the transmission or in the preparation of that particular piece of routing information.

The counting chain including tubes 52–4 and 53–6 to 12 allows the transfer of seven characters of which the first five are stored in complete form as described. The transfer of the seventh character extinguishes vacuum tube 53–11 and operates vacuum tube 53–12. Should an eighth character be transferred, vacuum tube 53–15 via lead 53–16 will operate relay DMFL which locks and extinguishes the said vacuum tube. Relay DMFL operates DRFL at the connected receiving position which activates an alarm, releases the director connection and stops further processing of that message at the receiving position.

During transfer of the end of routing combination, relay DCRA is operated which prevents operation of relay DMFL should more than seven characters be transferred at that time. The translator will return either a message start or a failure indication, depending upon whether the end-of-message combination is correct or not. If it is incorrect, the director will operate relay DRFL at the connected receiving position to effect the above-described condition.

*Director circuits*

As outlined above, upon the receipt of the third character of a piece of routing information, a connection is established to a translator. All completely stored characters of that piece of routing information are transferred simultaneously to the translator which returns to the director a switching control code for the characters. This code is stored by the director and the translator disconnected, and the stored switch control code is used to control the receiving position switching functions for that piece of routing information.

Storage of the third character of a piece of routing information is accompanied by the operation of vacuum tube 53–13 and the operation of relay DTRQ as pointed out. This relay locks through released relays DTRL and TRFL and releases vacuum tube 53–13. In addition operation of relay DTRQ closes a circuit from ground at released relay DCLK to operate relay TCNI. This closes a circuit from ground to hold itself operated as long as relay DTRQ remains operated. Thus it can not be released by a subsequent operation of relay DCLK.

When relay TCNI operates, it initiates a connection between this director and an idle translator. Completion of this connection is indicated by operation of relays TCNS and TCN of this director and the appropriate TGCN of the selected translator. When relays TCN and TGCN operate, they close all circuits required for transferring all completely stored characters of a piece of routing information to the translator and for obtaining from the translator a switching control code for storage by the director.

*Translator disconnection*

Following the storing and checking of the switching control code by the director relay DTRL operates and locks to ground at operated contacts of relay TCNS. As relay DTRL operates, it releases relay DTRQ which is followed by the release of relay TCNI. The latter initiates disconnection from the translator and completion of this function is indicated by release of relays TCNS and TCN of this director. Release of relay TCNS permits relay DTRL to release if other circuits conditions permit.

*Precedence prosign*

The first piece of recording information transferred from a receiving position and stored by the director consists of the precedence prosign character pair, such as RR, MM and PP for low priority and ZZ, YY and OO for high priority followed by a space character. Detection of the space character at the receiving position operates relay RSPC which stops further character transfer to the director. Storage of the third character which is a space, at the director is accompanied by the operation of relay DTRQ to initiate a translator connection. The three stored characters are transferred simultaneously to the translator and the space character in the third character position conditions the translator to treat this group as a precedence prosign. The translator determines from the prosign characters the manner in which the message is to be switched from the receiving position, a high or low priority or by a connect-through setup.

If the message is to be switched on a low priority basis, the translator grounds the low priority lead to the director operating relay DLPR which in turn grounds the low priority lead to the receiving position operating its RPL relay. For a high priority message leads for relays DHPR and RPH are grounded in a similar manner and for a connect-through request the translator grounds the connect-through lead to the director operating relay DCT which also grounds the high priority lead to the receiving position operating relay RPH.

Only one of the relays DLPR, DHPR or DCT will be operated for a precedence prosign translation and the operated one locks to ground at released relay DRR. When one of these relays operates, it closes a ground circuit at operated relay TCNS to operate relay DTRL through back contacts of relays DPRB and DCRB. This releases the translator connection and relay DTRL releases as soon as this function is completed. Operation of either the low priority relay RPL or the high priority RPH grounds the switching control lead to the director. When relays DTRL and DTRQ are both released, relay DSPC operates through released relays DCRB, DRR, DCDB and DPRB. This closes an operating circuit for relay DPRA and operation thereof with relay DPRB released ground the transmitter start lead to the receiving position, operating its RTXR relay to release its RSPC relay. This removes ground from the switching control lead to the director, releasing relay DSPC whereupon relay DPRB operates in series with relay DPRA removing ground from the transmitter start lead and releasing relay RTXR at the receiving position. As relay RSPC releases, it closes the transmitter auto-stop circuit and starts character transfer of the first routing indicator to the director. With relay DPRA operated, the director priority indicating relay operating circuits are opened.

*Single address message*

A single address message has but a single routing indicator and all characters requiring translation are stored in the storage unit and terminated by a carriage return character. Detection of this character at the receiving position in the manner set forth operates relay RCRC which autostops the transmitter. Relay DTRQ operates to initiate a translator connection accompanying the storage of the third character of the routing indicator and all characters stored are transferred simultaneously to the translator. The translator returns the corresponding switching control code for operation of one relay in each of the three groups of relays, DWC-1 through DWC-8, DSC-1 through DSC-5, and DSC-6 through DSC-10, FIG. 63. This results in operation of relay DCLK, FIG. 62, which closes a locking circuit for the operated code storage relays and also closes a circuit through the front contacts of relay TCNI to operate relay DTRL. This releases the translator connection and relay DTRL releases when this operation is completed.

Whenever relay RCRC operates at a receiving position, the carriage return control lead to the director is grounded causing operation of relay DCRA through back contacts of relay DCRB. Operation of relay DCRA closes a circuit through released relay DCRB to operate relay DSPC which does not occur, however, until both relays DTRL and DTRQ are released. Operation of relay DSPC then completes a ground circuit through front contacts of relay DPRB to operate relay DCDA, which in turn grounds one of the 8 wiper code leads and one of the 25 point code leads to the secondary and primary route switches of FIGS. 7 to 10, in accordance with the stored switching code. As pointed out, these control leads determine the route selection functions at the receiving position for this routing indicator.

Relay RSI operates in response to the code lead marking and releases relay RCRC. This recloses the transmitter auto-stop circuit and starts transfer of the next character group to the director. With a single address message the characters being transferred at this time are the remainder of the end-of-routing indicator combination, carriage return, line feed and D or Z. Release of relay RCRC removes ground from the carriage return control lead to the director allowing relay DCRB to operate in series with relay DCRA and release relay DSPC. Relay DSDB then operates in series with relay DCDA to ground at operated relay DCLK.

Figure 63:
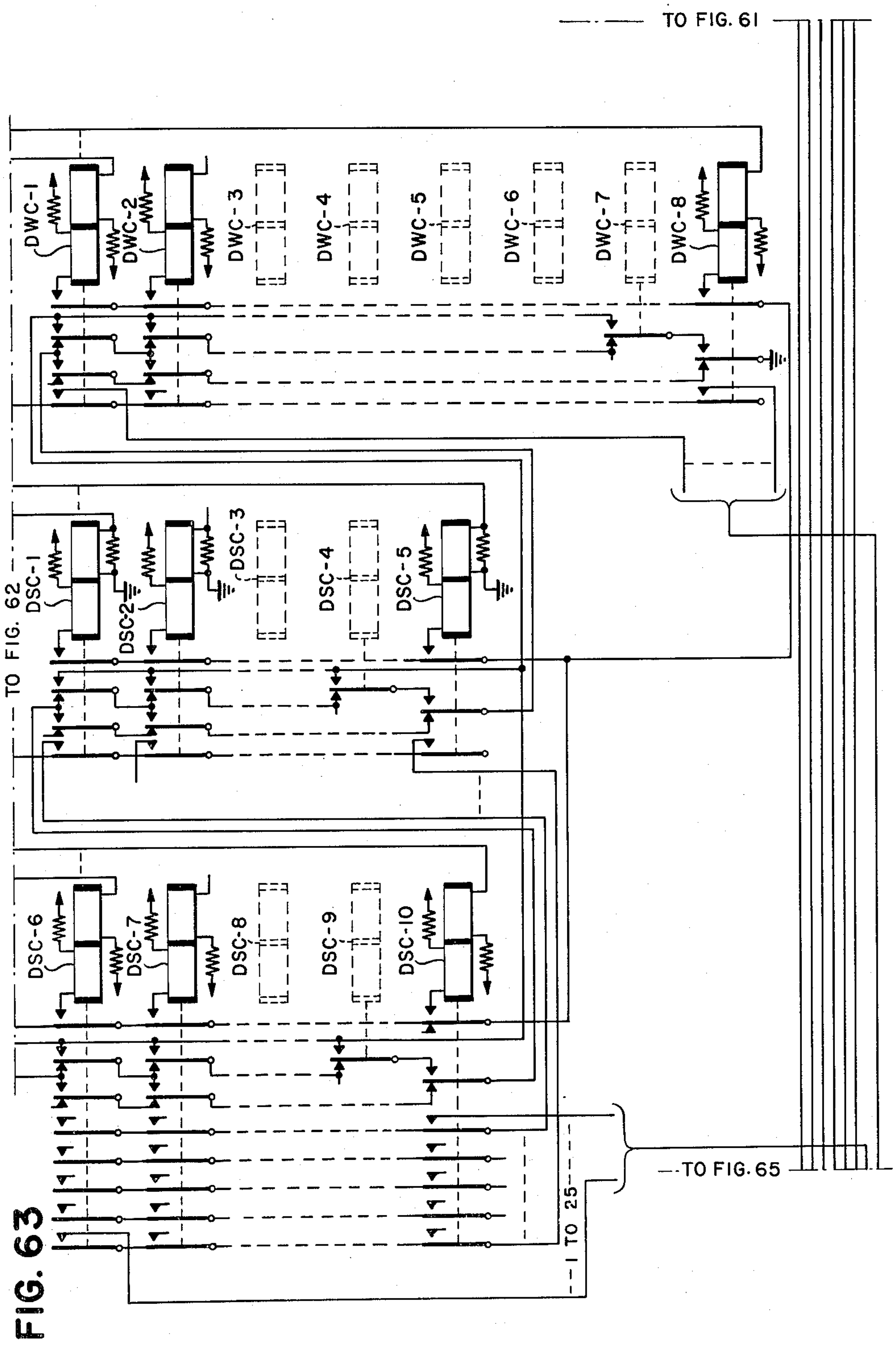
Figure 64:
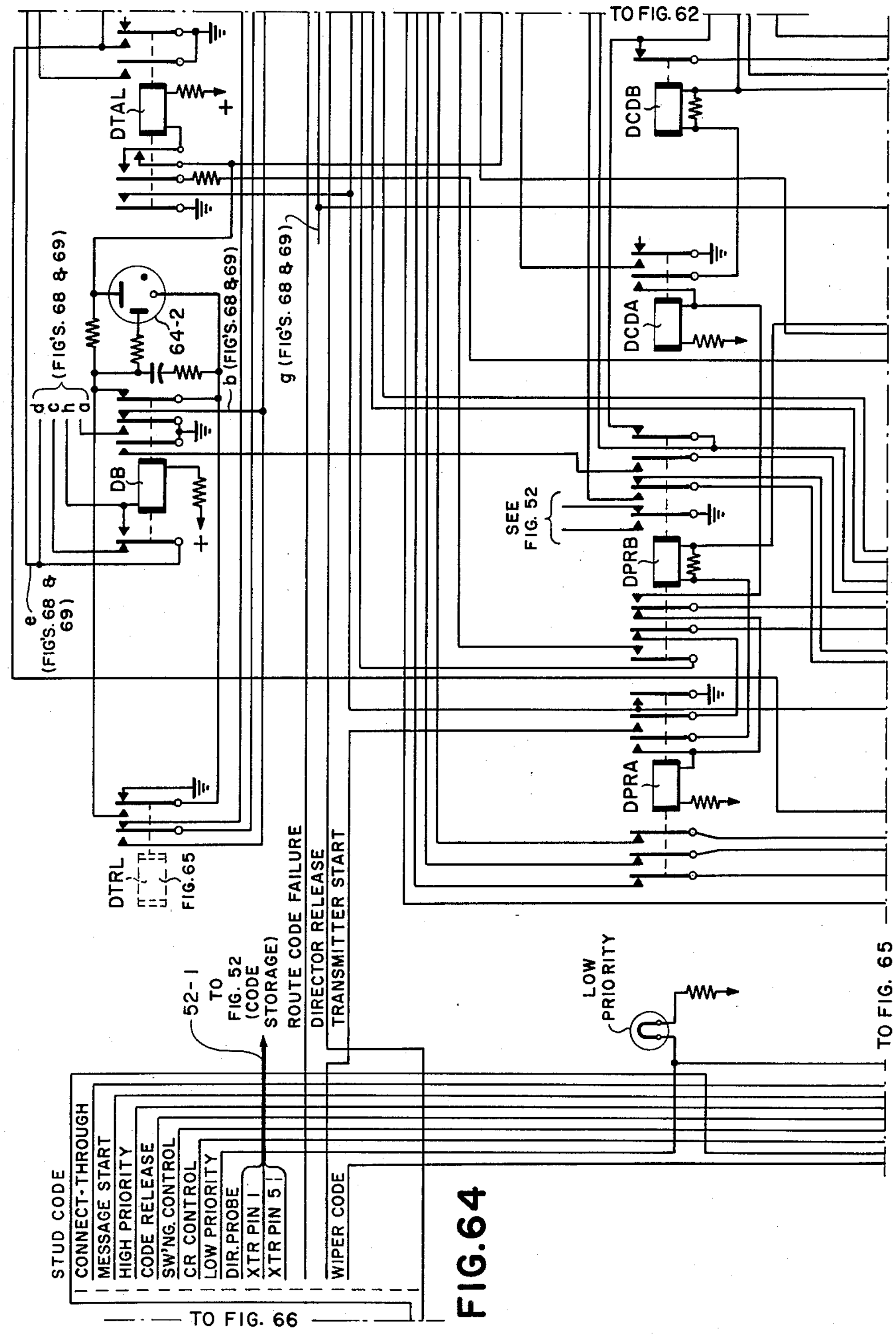

When the route selection functions are completed at the receiving position, operation of relay RTXR grounds the code release lead to the director, and relay DCRL operates to open the locking circuits for the code storage relays of FIG. 63. As these relays release, relay DCLK releases and removes the wiper code and point code lead group marking grounds. Release of the receiving position route selection control circuits causes relay RTXR to release. This removes ground from the code release lead to the director which together with the release of relay DCLK allows relays DCRL, DCDA and DCDB to release. Thereupon the switching code storage and associated control circuits are in condition to accept and store another switching control code if required.

Relay DTRQ may operate during transfer of the next character group before the switching code storage circuits have been cleared. However, as long as relay DCLK remains operated, operation of relay DTRQ cannot cause another translator connection to be established. The characters set up in the storage unit, FIGS. 52 and 53, are then held in storage until a translator connection can be obtained.

*End of routing*

For the assumed single address message the stored end-of-routing combination are the characters carriage return, line feed and D or Z. Upon the storage of the third character of this group, relay DTRQ operates in the manner pointed out. This requests a translator connection and when one is obtained the stored characters are transferred thereto. When the first character of a group transferred to a translator is a carriage return code, the translator treats this as an end-of-message combination. If the remaining characters of the group are correct, the translator grounds the message start lead to the director operating relay DMST. This operates relay DTRL through operated relay DCRB and causes the translator to be disconnected.

Relay DMST in operating, also closes ground to the message start lead if relay DCT is released. At the receiving position, this advances switch XSQ from point 2 to point 3. However, had relay DCT been operated, the connect through lead would have grounded and operated relay DCTI at the receiving position to call attention of the supervisor to the connect through request. Subsequently, relay DRR is operated and releases all the operated director circuits whereupon the director is ready to handle the routing line requirements of another message.

*Multiple address messages*

As outlined above, the routing indicators in the multiple address message are separated by space characters and after processing the precedence prosign and the first routing indicator the following space character and the attendant operation of relay RSPC again grounds the switching control lead to the director causing operation of relay DSPC. In conjunction therewith the primary and secondary route switches are again marked and operation of relay RSI releases relay RSPC which starts transfer of the next routing indicator characters. Release of relay RSPC also removes ground from the switching control lead to the director causing release of relay DSPC.

This is followed by the operation of relay DCDB in series with relay DCDA. When the receiving position route selection functions are completed, relay RTXR operates, grounding the code release lead to the director. This, as before, is followed by the operation of relay DCRL and the clearing out of the stored switching code. Thereupon relay RTXR releases and removes ground from the code release lead to the director and releasing relays DCRL, DCDB and DCDA.

Relay DTRQ may operate during transfer of the next routing indicator before the director switching code storage circuits are cleared out. As long as relay DCLK remains operated, operation of relay RDRQ cannot result in establishing another translator connection. Furthermore, as long as relay DTRQ remains operated, DSPC can not be operated and therefore until a translator connection has been obtained and the characters held in the storage unit have been transferred into a stored switch control code at the director, further character transfer from the receiving position can not take place.

The above sequence of operations is repeated for each routing indicator of the routing line and it will be noted that character transfer for a following routing indicator can start as soon as the switching control code for the previous routing indicator has been stored. Also, it will be noted that a switching control code is held in storage until the route selection functions at the receiving position are completed. The last routing indicator and the following end of routing combination operate the circuits in the manner pointed out above for a single address message.

*Director trouble detecting circuits*

For any one of a number of reasons the director and/or translator may misoperate or develop a trouble condition, and to detect and facilitate the correcting of these conditions, a number of alarm or trouble detecting circuits are provided. For example, when a translator is connected to a receiving position, trouble may occur during transfer of the routing information characters to the director or during control of the receiving position functions by the director. The cause of the trouble may be in the receiving position operations or in the director operations. Similarly, with the director connected to a translator, trouble may occur in either director or translator functions. The director is provided with a failure counting circuit which records each failure condition encountered. Each such failure is accompanied by release of the director from the connected receiving position or translator. The released director is permitted to serve another receiving position or to obtain a connection to another translator. If it then functions properly the original failure count is cancelled. However, if in its next connection another failure occurs, it is counted and if three consecutive failures are recorded the director is automatically busied and a supervisory alarm operated.

With a director connected to a receiving position as pointed out above, relay DB is operated which removes ground from the timing network associated with vacuum tube 64–2. The timing interval of the network is approximately eight seconds and each translation of a piece of recording information is concluded by the operation of relay DTAL to release the translator connection which also sets the timing interval. Normally the translator should be released before the expiration of the timing interval and disconnection from the receiving position should also occur well within the timing interval after the end of routing combination has been translated. Disconnection from the receiving position releases relay DB which resets the timing interval. If neither function occurs within the timing interval, tube 64–2 fires to operate a relay DTAL which locks to release relay DRR. Operation of relay DTAL completes a circuit for the operation of relay DMFL to automatically disconnect the director from the receiving position.

Another trouble condition which will operate relay DMFL is the transfer to the electronic character storage unit of more than seven characters for a particular piece of routing information. In this instance relay DMFL is operated by firing of tube 53–13.

When a director is connected to a translator, approximately a third of a second interval is allowed for the translator to complete its operation and be disconnected. If the translator operation is not completed in this interval the circuit to the 46th front contact of relay TCN is grounded in the translator through elements hereinafter described to operate relay TRFL, FIG. 60. When operated relay TRFL locks to ground through back contacts of relay DTRL, and releases relay DTRQ which is followed by the release of relay TCNI. This disconnects the translator from the director and relay TRFL also completes a circuit for the operation of relay DTAL through back contacts of relay DRR. As described above, operation of relay DTAL in turn operates relay DMFL to cause automatic disconnection of the director from the receiving position.

When a routing indicator switching control code is returned to the director by the translator, only one relay in each of the three code storage groups, FIG. 63, should be operated. This operation is checked by the operation of relay DCLK and its operation initiates the disconnection from the translator. If more than one relay operates in any of the three code storage groups, relay DCFL will operate instead of relay DCLK. This grounds a lead to the connected translator to cause it to record a code storage failure as will appear. This is followed by the operation of relay TRFL causing the director to be disconnected from the translator. In addition, operation of relay TRFL with relay DCFL operated, locks the code storage relays in their operated combination to assist in analyzing the trouble condition. As set forth operation of relay TRFL results in the disconnection of the director from the receiving position. In addition, the operation of relay DCFL operates relay DCRI which busies the director so that it can not be selected by another receiving position.

Operation of relay DMFL in any of the above described manners grounds the route code failure lead to the connected receiving position causing operation of its DRFL relay. This causes the director to be disconnected and in connection therewith, relay DRR is operated which provides a locking circuit for relay DMFL and releases relay DTAL. Also relay DRR operates relay DTRL releasing relay TRFL had it been operated. Relay DRR releases when the director circuits are completely cleared out and its release is followed by the release of relay DMFL.

Relay DTRL operates whenever the director is to be disconnected from a translator and its operation removes ground from the timing circuit of vacuum tube 62–2 in the operating circuit of relay DRAL. The timing network is approximately one-third of a second and normally the director is disconnected within this period and relay DTRL releasing resets the timing interval. Relay DMFL operates in the manner described to produce automatic disconnection of a receiving position from a translator. Its operation also removes ground from the timing network of tube 62–2. The disconnection should occur within the timing interval and release of relay DMFL resets the timing network. If either relay DTRL or relay DMFL remains operated for the timing interval and tube 62–2 fires, relay DRAL operates and locks to ground at the operated one of these relays. This activates an alarm circuit as well as lights the signal light 62–3.

*Consecutive failures*

Relay DTAL which operates for certain trouble conditions as described, in turn operates relay DMFL to cause automatic disconnection of the director from a receiving position. If the disconnection takes place, relay DTAL releases and with the switch 62–4 in the position shown, the first operation of relay DTAL causes operation of relay DCF–1. Relays DCF–1, DCF–2 and DCF–3 constitute a relay counting chain to count consecutive failures, and relay DCF–3 operates if three consecutive trouble conditions of the director occur, and it indicates the trouble is probably in the director and that it should be removed from service. After being automatically disconnected because of a trouble condition from one receiving position, the director can be connected to another receiving position and should an immediate failure occur in serving that receiving position, it is disconnected and a third attempt to operate is made. The correct functioning of the director after either the first or second failure resets the relay counting chain and restores the circuits associated therewith to normal. The director is automatically removed from service on the third consecutive failure and appropriate alarm circuits operated to indicate this condition.

*Automatic busy control*

Any operation of relay DFRI is preceded by the operation of relays DTAL and DMFL. Operation of the latter causes disconnection from the connected receiving position. However, with relay DFRI operated, operation of relay DRR during this disconnection procedure is prevented. With relay DFRI operated, the ground from the connected receiving position which would normally operate relay DRR operates relay DGRC instead. This causes the director to disconnect from the receiving position group and with relay DFRI operated, relay DSC cannot operate. Accordingly the director cannot be selected for another receiving position connection. Since relay DRR does not operate in the above sequence, all relays previously locked to ground at back contacts of relay DRR remain operated. In addition relay DFRI provides a ground to lock relay DSPC had it already been operated, and closes a circuit through back contacts of relay DCRB to hold relay DCRA operated if it had already been operated. Thus all direct relays including the trouble detecting relays will be held operated in the pattern that existed when the third consecutive failure was recorded. This facilitates the analyzing of the trouble conditions. As indicated in the drawings, various lamps are provided to show the particular stage in the processing sequence at which a trouble condition occurs as well as the particular type of trouble, all of which facilitates correcting the trouble conditions.

*Translator connecting circuits*

The control circuits whereby the translators answer requests for connections from the directors will now be described and reference is made to FIGS. 76, 77 and 78 which disclose these control circuits. While some of these circuits include contacts of various other relays, for the sake of simplicity only the relays operating circuits directly concerned with the translator connecting circuits are shown in these figures. It will be assumed for the purpose of the following description that there are three director groups of two directors each, or a total of six associated with three translators. The control circuits include contacts of relays TCN, TCNI and TCNS of the directors and contacts of relays TGCN, TS, TGR, TGRC, TSC, TB, TRR and TFRI relays of the translators. Some of the operating circuits of the above mentioned relays are involved in the control circuits and these circuits are shown complete whereas others of the relays include only the contacts thereof and the circuits and description thereof are found elsewhere.

The three director groups simultaneously register translator connection requirements and the lowest numbered group registering a requirement is selected for the first translator connection to be established. A gating arrangement provides that all registered groups will be served before another registration of their requirements is made. All idle translators simultaneously register this condition and the lowest numbered idle translator is then selected as the first to be connected to a director group. As with the directors a gating circuit provides that each registered idle translator will be used for a connection before another idle condition registration is made. Accordingly the lowest numbered idle translator will be connected to the lowest numbered director group requiring a connection. Only one translator can be connected to a group at a time and if translator connection requirements exist for more than one director group, idle translators will be selected in numerical order and connected to those director groups in numerical order.

Once a translator is connected to a director group, it is not released until each director in that group has been served and it will serve each director for one piece of routing information only. There is no gating circuit provided for the directors of a group and normally a translator can serve both directors in a group if necessary and disconnect from the group before either director has another piece of routing information ready for translation.

A control lead such as 76–1 is provided for each director group and is grounded by the operation of the TCNI relays of either one of the directors which requires a translator connection. The grounded control lead operates its associated group translator selection initiate relay GTSI and assuming that director group No. 1 is under discussion this will be relay GTSI–1. This relay locks directly to its group control lead and closes an operating circuit for its associated relay GTSC–1 which operates and locks directly to ground at back contacts of associated relay GTSB–1. The other director groups have similar relay sets and one or more of the GTSC relays may operate at the same time.

Operation of any GTSC relay completes a circuit for the operation of relay GTSCG which opens the operating circuits of all GTSC relays. However, any operated ones of these relays remain locked to their associated GRSB relays. Relay GTSCG provides a gating control to assign a translator connection to each director group which has a need for one. In addition, operation of relay GTSCG completes an operating circuit for relay TSI through back contacts of relay GTSR, and also completes a circuit from ground at back contacts of relay GTSR to additionally lock the lowest numbered operated GTSC relay. For the assumed case this is relay GTSC–1 and this in effect assigns to that director group the first translator connection to be established. When relay TSI operates it indicates that a translator connection is required for some director group.

*Translator selection*

When a translator is idle its TGR, TB and TFRI relays are released which completes a circuit for operating its TSC relay. This circuit includes a back contact of relay TSCG, contacts of the translator busy switch 78–1 and back contacts of the above-mentioned three relays to ground. With relay TSC operated it indicates that the translator is available for connection to a director group. One or more of the TSC relays of the translators may be operated at the same time and the operation of any one, completes a circuit for the operation of relays TSCG which opens the operating circuits of all the TSC relays. However, any operated TSC relay remains locked to its TGR relay. The operation of relay TSCG provides a gating control to assign one connection to each idle translator and indicates that at least one idle translator is available.

With relay TSCG operated, operation of TSI closes a circuit from ground at back contacts of relay GTSR to provide an additional lock to the operated TSC relay of the lowest numbered idle translator. This in effect designates this translator as the one which will be connected first. The ground from the released GSTI relay also operates relay TS of the lowest numbered idle translator. The latter relay locks to ground directly through its associated operated TSC relay. When relay TS operates, it indicates that its particular translator has been selected for connection to some director group. It will be noted that the circuits are such that only one TS relay can be operated at a time.

*Connection to director group*

For the assumed conditions, of three director groups of two-each and three-translators, each translator is equipped with a set of three multicontact TGCN relays. Through these relays, a translator may be individually connected to any one of the director groups and obviously only one TGCN relay of a translator is operated at any one time. When a TGCN relay is operated, it completes all the circuits required for performing a translation function for the associated director group.

If it is assumed that translator No. 1 is selected for connection to the director group No. 1, ground from released relay GRSR is connected to a series transfer contact circuit of the GRSC relays. Three associated control conductors are multipled as indicated to contacts of the TS relays of all translators. With relay GRSC–1 operated, the first conductor of this set is the only one grounded and with relay TS of translator No. 1 operated, this ground operates the TGCN–1 relay of that translator. As relay TGCN–1 operates, it locks to ground through back contacts of relay TGR. The operation of relay TGCN–1 completes a number of circuits and connects this translator to the director group No. 1.

When any TGCN relay operates, it operates its relay TB which locks to ground through back contacts of relay TGR. Operation of relay TB opens one of the locking circuits for the associated TSC relay. In addition, a TGCN relay in operating, completes a circuit for the operation of its GTSB relay which locks through front contacts of the TCN relay. Relay GTSB–1, for example, can be operated by the TGCN–1 relay of any translator and its operation therefore indicates that a translator connection has been completed for director group No. 1.

Operation of relay GTSB–1 opens the operating circuit for relay GRSI–1 but the latter relay remains locked as long as the associated director group control lead such as 76–1 is grounded. Operation of relay GRSB–1 also opens one of the locking circuits for relay GRSC–1 but the relay remains locked through another locking circuit including back contacts of GTSR. In addition operation of relay GTSB–1 operates relay GRSRC through front contacts of relay GRSC–1 and relay GTSRC locks to various control point grounds, and operate relay GTSR.

When relay GTSR operates, it opens the final locking circuit for relay GRSC–1 which releases and it in turn releases relay TSI which opens the final locking circuit for relay TSC. The release of relay TSC is followed by the release of the associated TS relay and at this time all control point grounds holding relay GTSRC operated, are broken to release that relay which is followed by the release of relay GTSR. This restores the translator connection control circuits to their normal condition. At this time another translator can be selected and connected to another director group if required. The director group will be the next higher numbered one having a GRSC relay operated and the translator employed will be the next higher numbered idle one. The above described sequence of operations will be repeated for each such connection and when the last of the originally operated GTSC relays release, relay GTSCG will also release. At this time a new pattern of operated GTSC relays can be set up for the director groups which now require translator connections. When the last originally idle translator has been connected to a director group, release of its TSC relay releases relay TSCG and a new pattern of operated TSC relays can be set up for the now idle translators.

*Connection to director*

When both directors of a group require a translator connection at the same time, it is necessary to select one to be served first. If both directors of group 1 require a translator connection, and a translator such as translator No. 1 has been connected to this director group in the manner pointed out, operation of the TGCN–1 relay closes ground from released relay TRR to a selecting chain circuit passing through the TCNS continuity contacts of director No. 1 to a transfer tongue of relay GTSI–1. With that relay operated the circuit next passes through the transfer contacts of relay TCNI of director group 1. With TCNI of director 1 operated, the selecting chain circuit operates the associated TCNS relay. That relay locks to the selecting chain ground in such a way that the TCNS relay of director No. 2 in group 1 cannot be operated until relay TCNS of director No. 1 releases. The operation of relay TCNS of director No. 1 operates the associated TCN relay which closes all circuits required between this director and the connected translator.

*Disconnection from director*

When the translation function for a piece of routing information is completed, the TCNI relay of the connected director releases. This completes a ground circuit through front contacts of the operated TCN relay of that director to operate relay TRR of the connected translator. This clears out the translator circuits and opens the TCNS relay selecting chain ground for the involved director group. In the assumed case this releases the TCNS relay of director No. 1, followed by the release of its TCN relay. If the other director in this group requires a translator connection, its TCNS relay will operate and the above sequence will be repeated. Thus both directors in the group will be served, if required, before the translator is disconnected from that group.

*Disconnecting from director group*

After both directors in a group have been served the TCNI relays will be released causing the associated GTSI relay to be released. For the assumed case this will be relay GTSI–1 and when once released it cannot be reoperated until relay GTSB–1 is released. Release of relay TRR when the translator disconnects from the last connected director, recloses the director group TCNS relay selection chain ground. However, with relay GTSI–1 released, the ground now operates relay TGRC of the connected translator which locks to various control point grounds. This relay operates relay TGR causing release of relay TGCN–1 to disconnect the translator from director group 1 and clear out all operated translator circuits. Release of relays TGRC and TGR when the translator is cleared returns to its idle condition where it may be selected for connection to any director group. Release of relay TGCN–1 and the last operated TCN relay of director group No. 1 releases relay GTSB–1 and thereafter this director group can again operate GTSB–1 when another connection is required.

*Supervisory controls*

A number of supervisory controls including signal lamps are provided to indicate misoperation of the above translator circuits. These lamps indicate when an abnormal length of time has passed without certain phases of the translator connection control circuits functioning. One such lamp 77–1 is operated by the energization of relay TSAL in the plate circuit of tube 77–2. When relay TSI operates, ground is removed from the timing network associated with tube 77–2 and if relay TSI is not released within the timing period of the network, which may be approximately 60 seconds, the tube fires causing the lamp 77–1 to light. If all the translators are busy when TSI operates, at least one should become available within the 60-second time interval. Release of relay TSI, as each translator connection is completed, resets and thus the lamp 77–1 when lighted indicates an abnormal waiting time for a director connection to a translator. The release key 77–3 releases relay TSAL to extinguish the lamp when the trouble is cleared.

Another timing network is associated with tube 77–4 which controls relay GTSCAL. The timing network for this tube is approximately ⅔ of a second and it starts timing whenever any GTSC relay operates. Operation of any GTSC relay should be followed by the operation of relay TSI well within the ⅔ second timing interval to reset it. When a translator connection is completed, relay GTSRC operates to release the common connection controlling circuits and also removes ground from the timing network of tube 77–4. This should work well within the timing interval to reset the timing circuit and in either case failure to perform the required functions within the interval results in the operation of relay GTSCAL and the lighting of lamp 77–6.

There is a translator busy switch such as 78–1 for each translator which busies the translator when thrown to the position opposite that shown. When thrown to the opposite position the associated TSC relay will release if operated or be prevented from operating when the translator becomes idle. However, if the translator has been selected, the additional locking circuit provided by relays TSCG and TSI will cause the translator connection to be completed. The translator selection control switch 78–2, one for each translator, when thrown to the position other than that shown connects the additional locking circuit for relay TSC and the operating circuit for relay TS directly through the translator.

Signal lights such as 76–2 associated with each TCN relay and similar lights such as 78–3 are associated with each TGCN relay. Thus the particular director group and director to which the translator is connected can be determined by observing the lighted ones of these lamps.

When any GTSB relay operates, it removes ground from the timing network of an associated tube such as 77–5. This timing network has an interval of approximately ⅔ of a second and operation of any GRSB relay should be followed almost immediately by operation of a TCN relay for the first director to be served in the associated group which resets the timing interval. Release of the operated TCN relay restarts the timing interval. However, this should be followed either by the operation of the other TCN relay of the group, or by disconnection of the translator from that group and release of the associated GTSB relay. If neither of these functions occur within the timing interval, relay GTCNAL operates to light lamp 77–7. The relay controlling lamp 77–7 is common to three tubes such as 77–5 and hence will operate for a trouble condition in any of the director groups.

Each director is provided with a selection control switch such as 76–3 for passing the TCNS relay selection chain circuit directly through it. By means of these switches the director causing a selection chain failure may be determined. Also, each director group is provided with a busy switch such as 77–8 which prevents the associated GTSI relay from operating when its control lead such as 76–1 is grounded. The translation functions for any director in the group to which a translator is already connected, when the switch is thrown to the position other than that shown, will be be completed and the disconnection from that connector will occur in the normal manner. However, if the group busy switch is thrown while GTSI is released, the other director in that group cannot be served. Instead, the translator will be completely disconnected from the group.

If a translator is connected to a director and does not complete its normal functions the usual disconnection from the director or the group will not occur. Under such circumstances, the operation of the translator release key 78–4 will directly operate relays TRR and TGRC. This will cause the translator to be completely disconnected from both the director and the director group. If the translation requirements of that group have not satisfied, its associated GTSI relay will still be operated when its GTSB relay releases, allowing a connection to be established to another translator, if available, at the proper time.

*Translator circuits*

As hereinbefore set forth, all the characters of each piece of routing information are simultaneously transferred from a director to the translator it is associated with and the translator determines the proper switching control codes. These codes are returned to the director where they are stored and control the same in accordance therewith.

When a translator is connected to a director by the operation of a director TCN relay and one of the TGCN relays of the selected translator, a number of circuits are completed and these includes the 25 leads from the tubes of the character storage unit, FIGS. 52 and 53, and the five groups of five character selection relays in the translator. The translator character selection or storage relays appear on FIGS. 57 and 59 and are designated TP1–1 through TP5–1 for the first set of five through TR1-5 to TP5–5 for the fifth set. When the above mentioned connection is made the first set of character storage relays TP1–1 through TP5–1 operate to reproduce the character stored by the first storage tube set of the director. These relays are operated in accordance with the operated ones of the tube set and each operated relay in the group locks to ground at back contacts of relay TRR, FIG. 57. This grounds the plate circuits of the operated tubes of the associated set so that the operated tubes are thereupon extinguished. In a similar manner other characters stored in the character storage unit are transferred to a second, third, fourth and fifth sets of relays, and the entire transfer occurs simultaneously.

Each one of the five sets of selection or storage relays in the translator are provided with a tree arrangement of contacts whereby certain selected ones of a number of output leads such as 59–1 for the first character selection tree, 59–2 for the second, 59–3 for the third, 57–1 for the fourth and 57-2 for the fifth. One of these output leads for each set is normally selected from each group and its selection depends upon the manner in which the various storage relays are operated. The operation of any storage relay in the set completes the circuit for the operation of its associated TPR relay located therebelow and the operation of the TPR relays applies a ground directly through back contacts of relay TRR to the selection tree and through the same to the output lead for the first three character selection trees. The ground for the fourth and fifth selection trees is applied through their respective TPR relays from a different source hereinafter pointed out.

*Precedence prosign translation*

Whenever a precedence prosign translation is required, it is necessary to determine whether the accompanying message is to be switched on a high priority or a low priority basis, or whether it is a connect-through request. The precedence prosign characters consists of any one of seven pairs CC, MM, PP, RR, YY or ZZ followed by a space character. When the third character of a character group transferred to the storage relays is a space character, the SP output lead of group 59-3 is grounded and causes operation of relay TSPC. Whenever relay TSPC operates it indicates that a precedence prosign translation is required. When the first two characters of the precedence prosign are CC, the output leads of groups 59-1 and 59-2, designated C, are grounded and cause the operation of relay TCTC. Operation of this relay together with relay TSPC grounds the lead passing through the No. 54 tongues of the TGCN and TCN relays and is known as the cut-through or connect-through lead. This lead when grounded operates relay DCT, FIG. 65. When the M output leads of the first and second groups are grounded, relay THLC is operated, and this relay operated together with relay TSPC grounds the low priority lead passing through the No. 52 tongues of relays TGCN and TCN to operate the low priority relay DLPR in the director.

The precedence prosign characters YY and ZZ indicate a high priority and when either of these two pairs appear as the first two characters, relays TCTC and THLC are released. In this case the operation of relay TSPC then grounds the high priority lead passing through the No. 53 tongues of relays TGCN and TCN to operate the high priority relay DHPR of the connected director. In a similar manner the three character pairs OO, PP and RR with the priority control switches 58-1 in the positions shown are effective to ground the low priority lead. With any one or more of the switches 58-1 thrown to their other position, the receipt of any respective character pair will cause the high priority lead to be grounded. Thus the priority indication obtained from these three character pairs can be changed from one priority basis to the other as desired by operating the switches 58-1 accordingly.

It will be noted that the appearance of a low priority indicating character in only one of the two character selection groups is sufficient to operate relay THLC. It will also be noted that any characters in these two groups which are not specifically low priority indicating characters leave relay THLC released. As long as a space character appears as the third character, a priority indication will always be returned to the connected director. Thus there is considerable latitude for error in the actual precedence prosign characters of a message. Operation of any of the relays DCT, DLPR or DHPR at the connected director initiates disconnection from the translator in the manner previously described. Relay TRR operates in conjunction with this disconnection sequence which clears out all operated translator relays.

*Routing indicator translation*

The precedence prosign at the beginning of a message is followed by one or more routing indicators which indicate the one or more destinations to which the accompanying message is to be transmitted. It will be assumed that the precedence prosign has been processed by the translator and the desired lead such as high priority, low priority or connect-through have been marked accordingly and that a routing indicator is now stored in the character storage unit of FIGS. 52 and 53. All the characters of this stored routing indicator are simultaneously transferred or shifted to the five sets of TP relays, FIGS. 57 and 59, of the translator to operate the said relays in accordance therewith. The arrangement of the routing indicators of the message are such that the first three characters thereof in combination designate a particular switching center to which a copy of the accompanying message is to be transmitted. In accordance with the circuit arrangement of the system as disclosed, any sixteen first characters may be used and these will mark, by grounding, any one of sixteen output leads 59-1 from the first character selection tree. Generally these output leads extend to a cross-connect board 58-2 where the "service" characters may be cross-connected in any desired arrangement and then to the coils of sixteen TSC relays TSC-1 to TSC-16.

Similarly, the second character of a routing indicator may be any one of sixteen to mark any one of sixteen output leads 59-2 of the second character selection tree. These leads pass through a cross-connect board 56-1 similar to the cross-connect board 58-1, where the "area" characters in use may be cross-connected and some multipled for areas with more than 30 centers, and then extend to the coils of twenty TAG relays TAG-1 through TAG-20.

The tongues of the TSG relays, of which there may be 26 for each relay, are multipled to respective tongues of each of the other relays and each group of tongues is individually connected to the output leads 59-3 of the third character selection tree. Since there are 26 tongues for each TSG relay, all 26 third characters are usable. The front contacts of the TSG relays extend to the input terminals of an inter-area patching panel 56-2 where all "service" and third letter combinations in use (416 maximum combinations) are cross-connected. Some of the output terminals of the panel 56-2 are multipled for combinations repeated in other areas whereby a total of 600 possible three-character combinations may be assigned at the output side of the patching panel. These are individually connected to the 30 front contacts of the 20 TAG relays. Thus in accordance with the first three characters, any one of 600 tongues of the TAG relays may be grounded.

For the purpose of intra-area patching, an intra-area patchboard 56-3 is employed having 600 jack pairs with each pair multipled together and individually connected to one of the tongues of the TAG relays. Thus for any assigned three-character combination, ground will appear at the jack pair in the intra-area patch panel 56-3 assigned to that switching center designation. One of these three character combinations designates this particular switching center and the respective jack pair is designated as the "home center output jack."

Except for the home center combination all other three-character combinations represent distant switching centers and traffic for these centers is switched to outgoing trunk circuits. A particular outgoing trunk may serve as a traffic facility for several distant centers and the three-character combinations designating distant centers reached by a common trunk must be grouped together to produce the same switching control code. The intra-area patching board 56-3 allows a certain amount of this grouping to be accomplished. However, an inter-area patch board 54-1 having 600 jacks multipled in 30 groups of 20 each permits further grouping. One of the multiple groups in board 54-1 is designated as the tributary selection group and may be connected to the home output center jack of the intra-area patch board. The other 29 sets of the inter-area patch board jacks serve as multipling facilities for very large groups of three-character combination designating switching centers reached by a common trunk circuit. Use of the inter-area patch board enables the intra-area patch cord system to be simplified.

The fourth and fifth characters of a routing indicator in combination designate a particular tributary office or local position to which the accompanying message is to be sent. In the arrangement disclosed any one of ten fourth characters may be used and the output leads 57–1 of the fourth character selection tree (first tributary character) are individually cross-connected through a cross-connect board 55–1 to the coils of ten TTG relays TTG–1 through TTG–10. Any one of 20 fifth characters may be employed and the output leads 57–2 from the fifth character selection tree (second tributary character) are individually cross-connected through cross-connect board 55–2 to a tongue of each of the 20 TTG relays. Thus for a particular fourth and fifth character combination, one TTG relay will be operated and one set of tongues marked so that any one of the 200 leads 55–3 from the front contacts of these relays will be grounded. The leads 55–3 extend to individual jack pairs in the tributary and local path board 54–2. Thus a particular jack pair grounded by the fourth and fifth character combinations represents the desired tributary office or local position. In case more than one character combination is assigned to a tributary office or local position, the jack pairs of patch board 54–2 may be multipled by patch cords as needed. It will be noted that while the fourth and fifth characters of every routing indicator will be set up by the character selection relay groups, no jack pair of patch board 54–2 will actually be grounded unless the first three characters ground the home center output jack of the intra-area patch board.

In the arrangement disclosed the circuits are such that the maximum number of destinations to which messages can be switched is 200. These may be trunk circuits, tributaries, or local positions in the switching center, and an output jack panel 54–3 with a total of 200 jacks is provided, each jack representing an individual destination. For reasons hereinafter apparent the jacks are arranged to eight vertical rows with each row having 25 jacks, and the layout of the jacks corresponds to the layout of the destination push buttons in a receiving position push button panel. Grounding a particular jack in the panel 54–3 by processing a routing indicator in the manner set forth produces the same switching control code for route selection purposes as is produced by operating the correspondingly located push button in the panel when a message is manually switched. Some of the output jacks of panel 54–3 are patched by patch cords 54–4 to the inter-area patch board 54–1 and through it to the intra-area patch board 56–3 and some through patch cords such as 54–6 to the tributary and local patch board 54–2.

Connected to the jacks of the output jack panel 54–3 by leads 54–7 are 100 TC relays TC–1 through TC–100. Each of these relays has two operating windings and they are arranged in four groups of 25 relays each. Accordingly there are eight groups of 25 relay windings. The other side of the relay windings of each group are individually multipled together and when connected to a director, the eight multiples terminate in battery through the operating winding of the director code storage relays DWC–1 through DWC–8. Ground on any output jack of board 54–3 will therefore operate one TC relay and one director DWC relay in series. For example, the first jack being grounded operates relay TC–1 and DWC–1 in series. This will ground the first conductor of the eight conductor set extending to the connected receiving position for controlling its route selection operations, and this is the same conductor that will be grounded by operating the No. 1 push button. Each TC relay has a single make contact and operation of any one of these relays closes a circuit for operating one of the director code storage relays in the group DSC–1 through DSC–5 and one of the relays in group DSC–6 through DSC–10 in series. For example, the circuitry is such that the operation of relay TC–1 operates DSC–1 and DSC–6 in series. The operation of these relays grounds the first conductor of the 25 conductor set extending to the connected receiving position for controlling its route selection functions and is the same conductor that would be grounded by operating the No. 1 push button when switching manually.

From the above it can be seen that grounding any output jack in the panel 54–3 results in operating only one relay in each of the three director code storage groups. Also, that the combination of operated relays grounds the same conductor in the two group selection control sets that would be operated by operating the push button corresponding to the grounded jack. Operation of the director relay DCLK checks that only one relay in each of these groups has been operated. This relay locks the operated code storage relays and initiates disconnection from the translator as described. Operation of relay TRR during this disconnection sequence clears out all translator relays.

*End of routing translation*

Each routing indicator or group of routing indicators is followed by the end of routing combination consisting of the characters carriage return, line feed, and a D or Z character. In response to the carriage return character which is set up in the first character selection tree in the same manner as the first character of a routing indicator, the carriage return output lead CR of the output leads 59–1 is grounded and completes a circuit for the operation of relay TRRC, FIG. 58. The appearance of a line feed character as the second code operates a second character selection tree to ground the line feed lead of the group 59–2 and completes a circuit for the operation of relay TLFC. The appearance of a D or Z character as the third character operates the third character selection tree to ground either the D or Z output leads of the group 59–3, which leads are connected to a pair of tongues of relay TLFC. With relay TLFC and relay TCRC operated, the ground from the third character selection tree is extended through the tongue No. 55 of relays TGCN and TCN to the message start lead and operates relay DMST at the connected director. Such operation initiates disconnection from the translator as previously described, and includes the operation of relay TRR during the disconnection sequence.

*Translator trouble detecting circuits*

The translator includes a number of trouble detecting circuits for operating supervisory alarms to indicate a trouble condition and the nature thereof to assist the attendant in correcting the same. When connected to a director, trouble may occur during transfer and translation of the characters of a piece of routing information or during return of the switching control code to the director for storage thereat. This trouble may be in the director or translator operations. The translator is provided with a failure counting arrangement which records each failure encountered and each failure is accompanied by the release of the translator from the connected director. The translator after release may again be connected to a director, and if on the next connection it functions properly, the original failure count is cancelled. However, two consecutive failures are counted and when three consecutive failures are recorded, the translator is automatically busied and a supervisory alarm operated.

Figure 55:
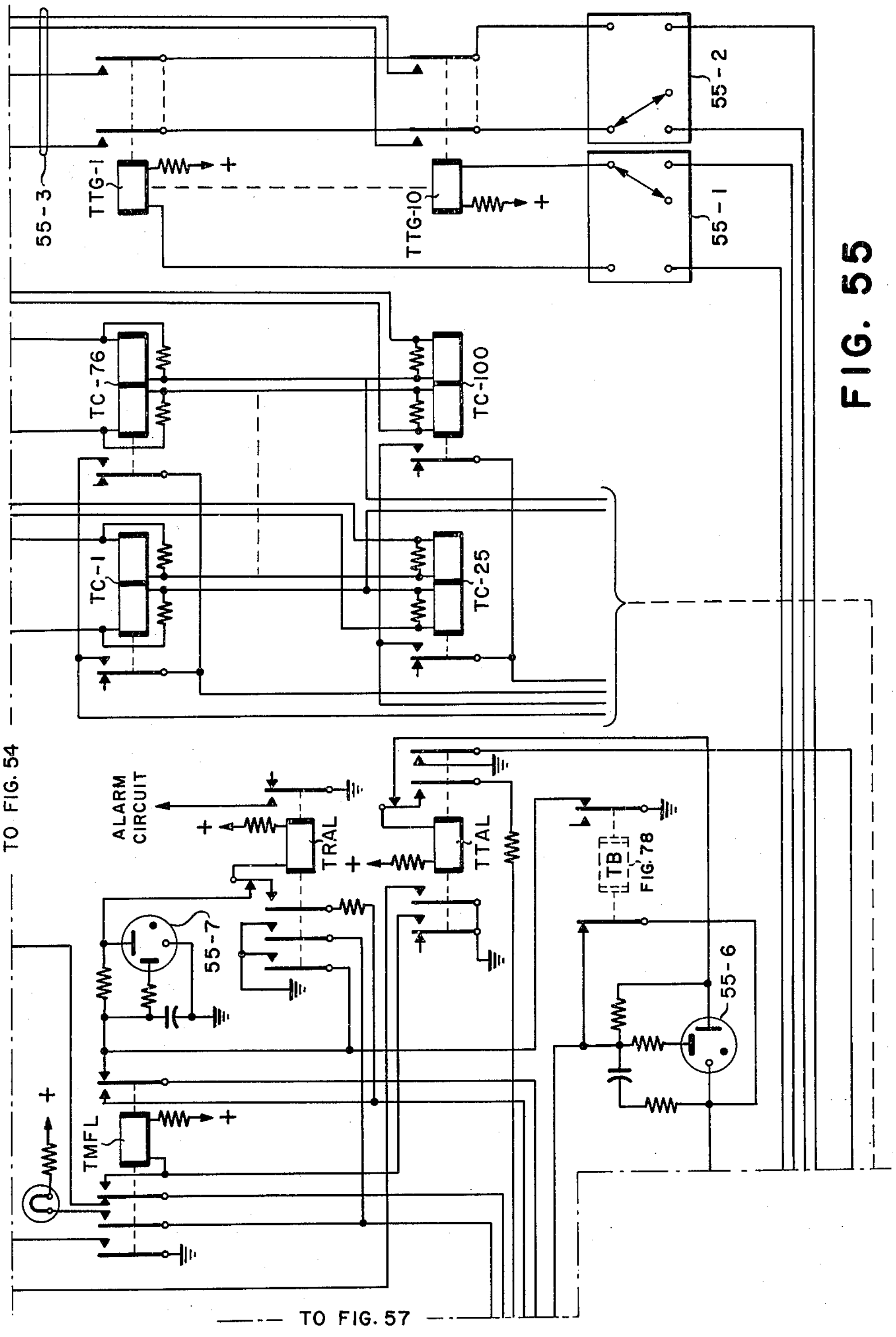

When a translator is connected to a director, relay TB, FIG. 55, is operated to remove ground from the timing network associated with tube 55–6. The timing network provides a delay of approximately one-third of a second, and each translation of a piece of routing information is concluded by the release of relay TCNI of the connected director to initiate release of the translator. During the release, relay TRR, FIG. 57, operates, resetting the timing interval. Normally, complete translation of the piece of routing information and disconnection of the translator should occur well within the one-third second timing interval and on disconnection of the translator, relay TB releases. This also resets the timing network and should occur well within the timing interval. If neither of the above operations occur within the timing interval, relay TTAL operates and in turn operates relay TMFL to cause the translator to be automatically disconnected from the director.

*Director switching code storage failure*

For proper operation the transfer of a switching control code to the director for storage should result in operation of only one relay in each of the three code storage groups accompanied by the operation of relay DCLK as set forth above. If more than one relay in any of the groups operates, relay DCFL operates and grounds a lead through the 44th tongue of relay TGCN to the connected translator operating its TCFL relay, FIG. 56. Relay TCFL when operated locks to ground through back contacts of relay TRR and completes a circuit for the operation of relay TFRI to remove the translator from service as will be described. Since normal release of the translator in the above instance did not occur, relay TTAL operates, which in turn completes a circuit for the operation of relay TMFL to cause disconnection of the translator from the director. Any operation of relay TMFL to cause disconnection of the translator from the director. Any operation of relay TMFL grounds a lead to the connected director to operate its TRFL relay which initiates disconnection of the translator. During this disconnection sequence, relay TRR operates and locks relay TMFL during the operated period of relay TRR. When relay TRR operates, it releases relay TTAL and assuming that the operated translator circuits clear out in the normal manner, relay TRR releases followed by the release of relay TMFL.

*Disconnection failure*

The translator may fail to properly disconnect from a director and when this occurs an alarm is operated. Relay TRR operates during disconnection of the translator to remove ground from the timing network of a tube 55–7 in the operating circuit of relay TRAL. The timing interval provided by the network is approximately one-third of a second and normally the disconnection from the director should occur well within this interval and release of relay TRR in conjunction therewith resets the timing network. Relay TMFL is operated as described whenever automatic disconnection from a director is required. This also removes ground from the timing network of tube 55–7 and the automatic disconnection should occur well within the timing interval. The release of relay TMFL on disconnection resets the timing network. If either relay TRR or TMFL remain operated for the duration of the timing interval, relay TRAL operates and locks to the operated one of these relays and completes an alarm circuit.

The translator control circuits also include an arrangement to automatically remove the translator from service after three consecutive failures to operate properly. These circuits include relay TTAL which operates from certain trouble conditions and in turn operates relay TMFL to cause automatic disconnection. After disconnection takes place, relay TTAL releases. With the consecutive failure disable switch 56–6 in the position shown, the first operation of relay TTAL operates relay TCF–1 and release of relay TTAL allows relay TFL–1 to operate in series with relay TCF–1. The translator can now be connected to a director a second time and if another failure occurs, relay TTAL will operate relay TCF–2 and hold relay TFL–1 operated. Relay TCF–1 remains operated during this period and release of relay TTAL allows relay TFL–1 to release but relays TCF–2 and TCF–1 remain operated in series. Automatic disconnection of the translator will again take place and it may be connected to a director a third time. If a failure occurs in serving this director, operation of relay TTAL operates relay TCF–3 and thus the operation of the latter relay indicates three consecutive trouble conditions have occurred.

If a first or second failure is recorded and the translator functions properly the next time it is connected to a director, relay TMFL remains released. If the piece of recorded information being translated is not a precedence prosign, relay TCFC will also be released. In this case operation of relay TRR when normal disconnection of the transmitter occurs completes a circuit to the other winding of relay TCF–1. Relay TCF–1 thereupon releases and opens the circuit to whichever one of relays TFL–1 or TCF–2 was last operated. In this case any previously recorded trouble may have been due to director faults. As will be noted when processing a precedence prosign, operation of relay TSPC operates relay TCFC, preventing reset of the consecutive failure counting circuit. Operation of relay TCF–3 also releases TCF–1 to reset the consecutive failure counting circuit and relay TCF–3 directly operates relay TFRI which provides an alarm indication and automatically removes the translator from service.

*Automatic busy control*

Figure 56:
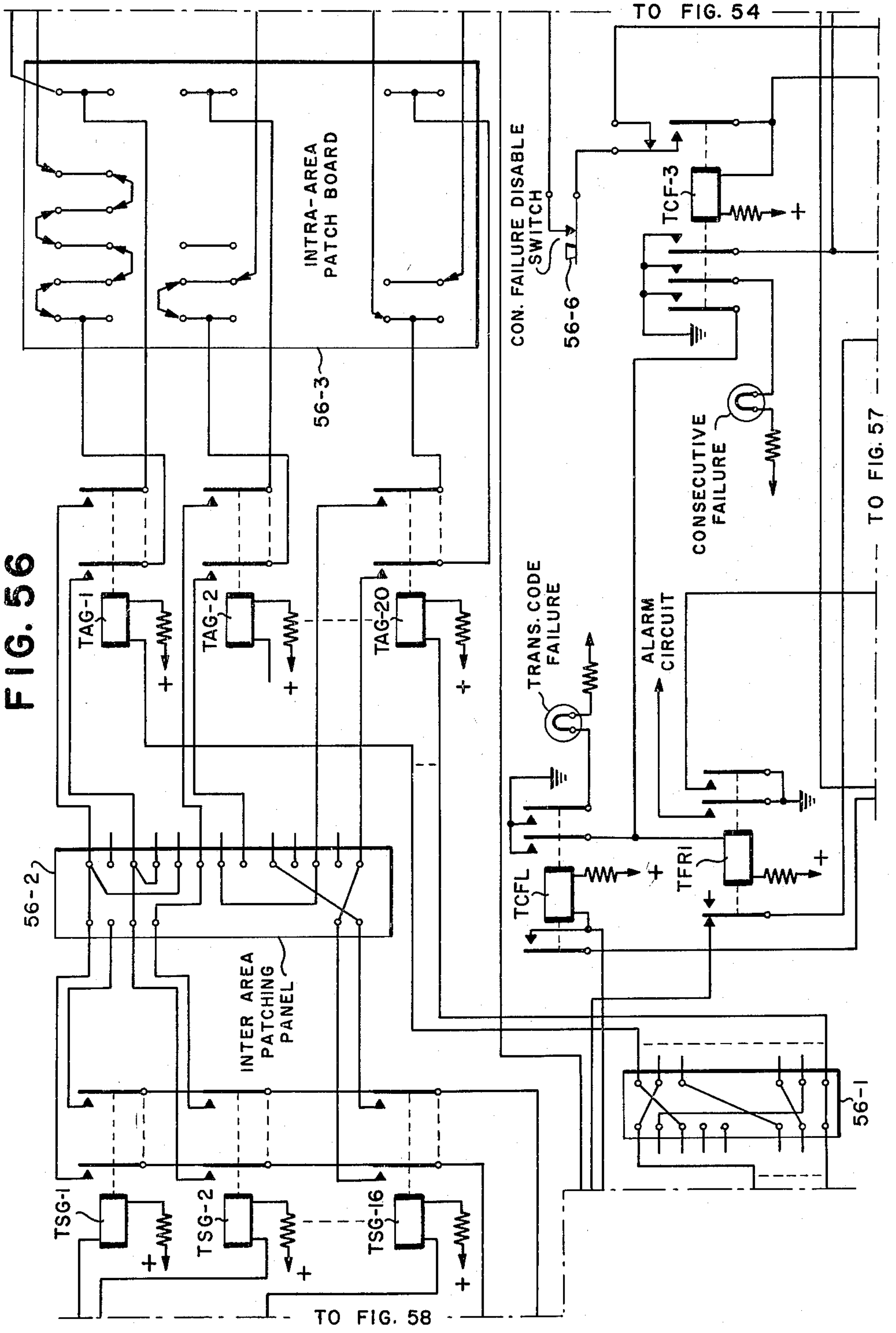
Figure 57:
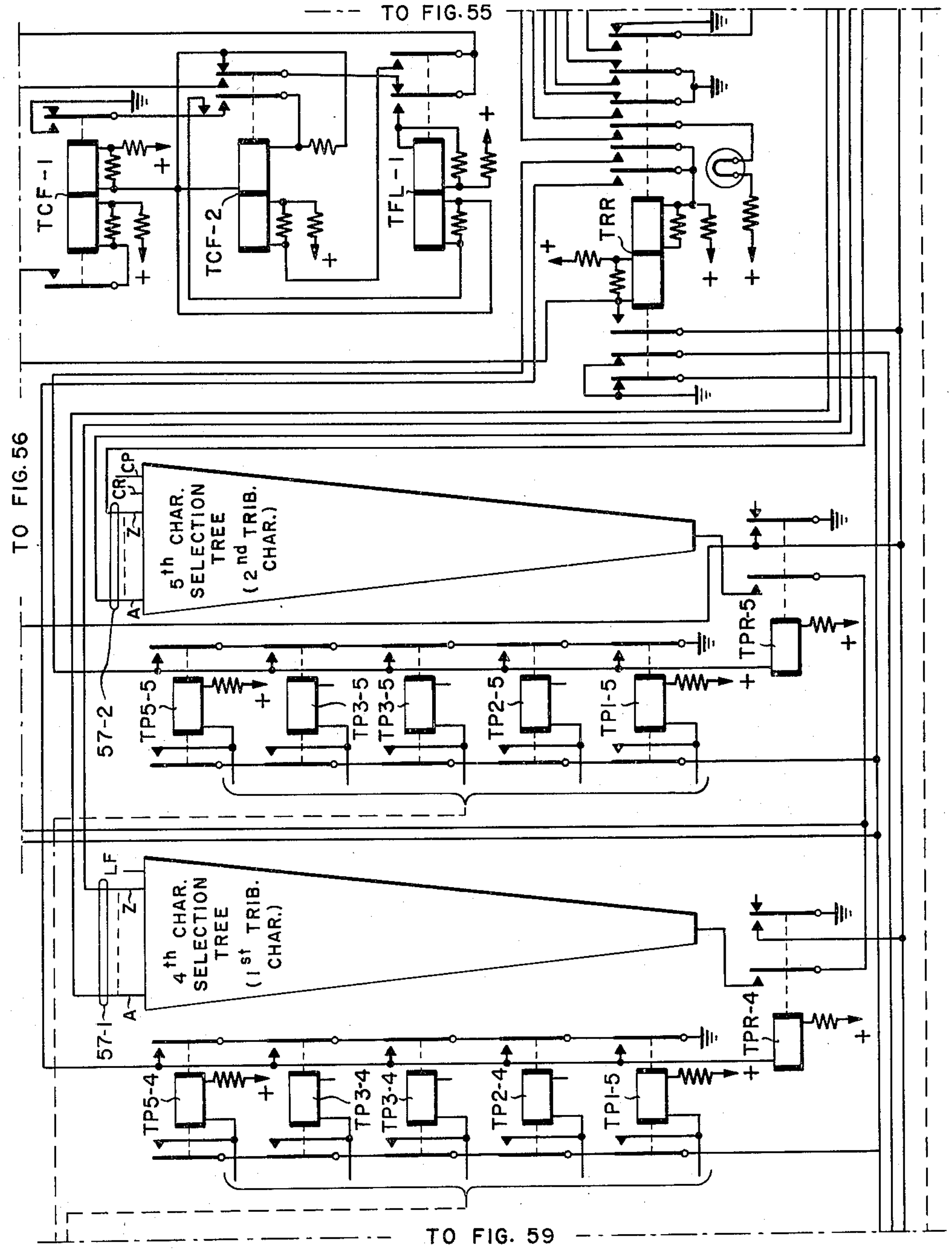
Figure 58:
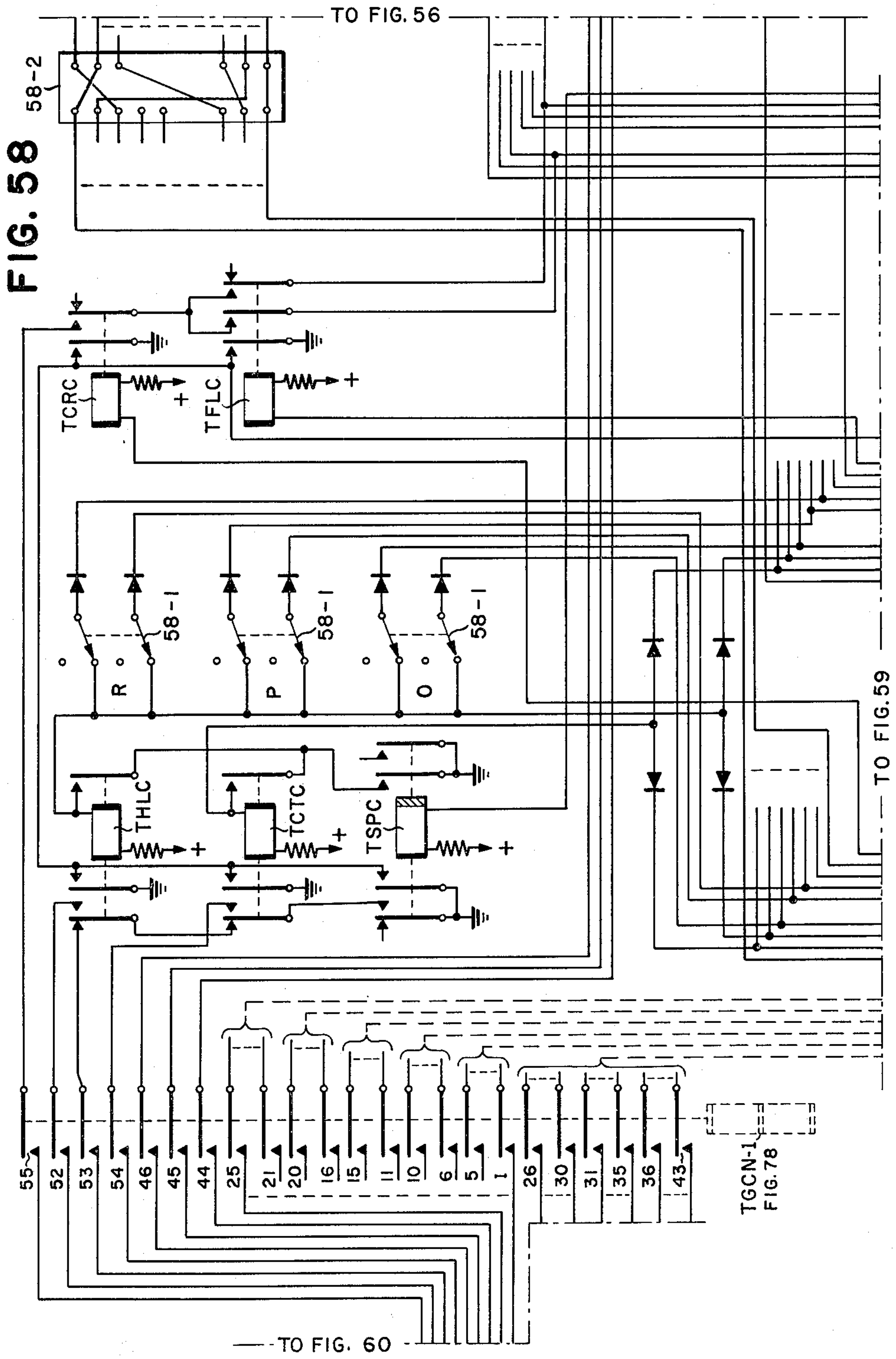
Figure 59:
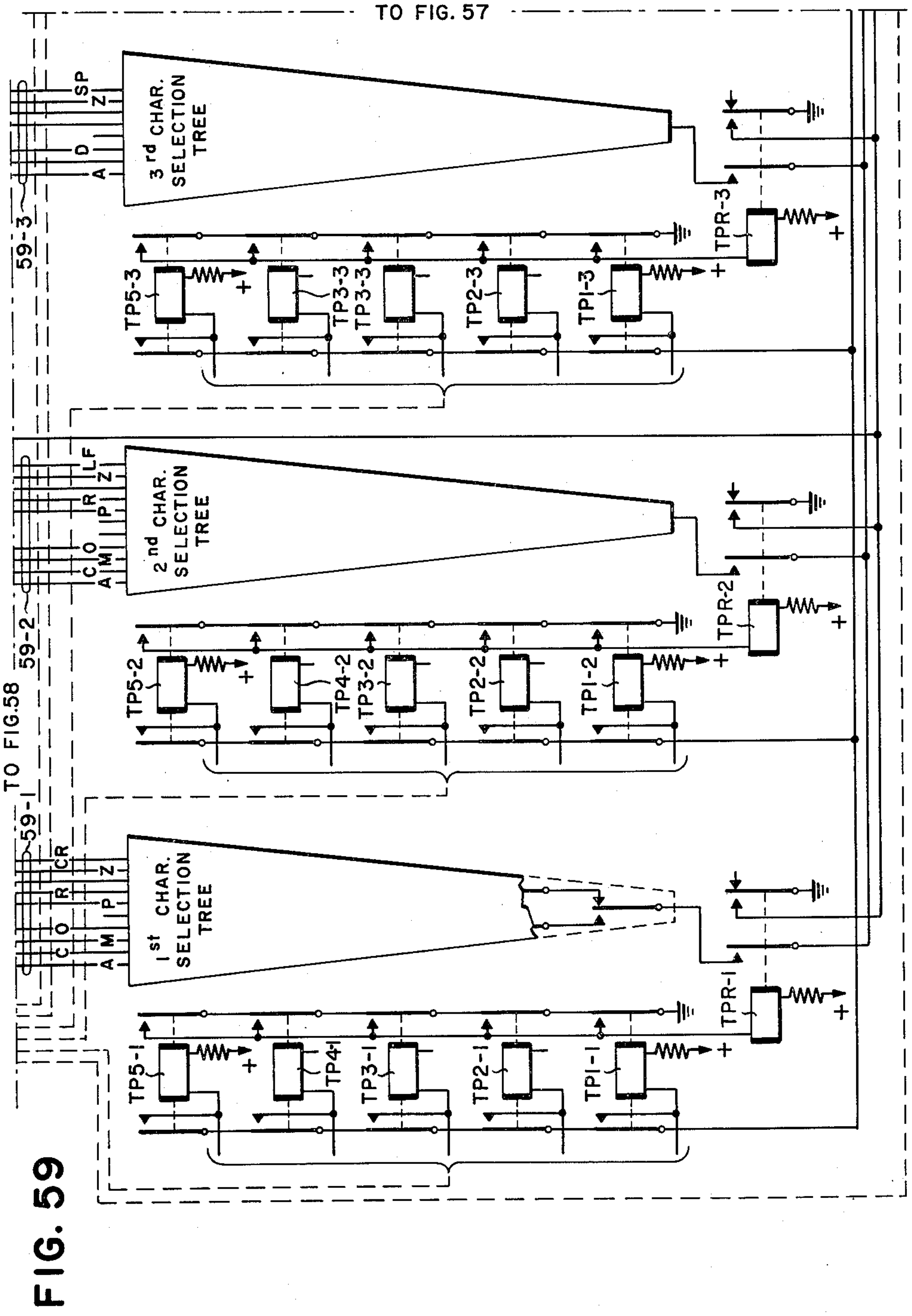
Figure 60:
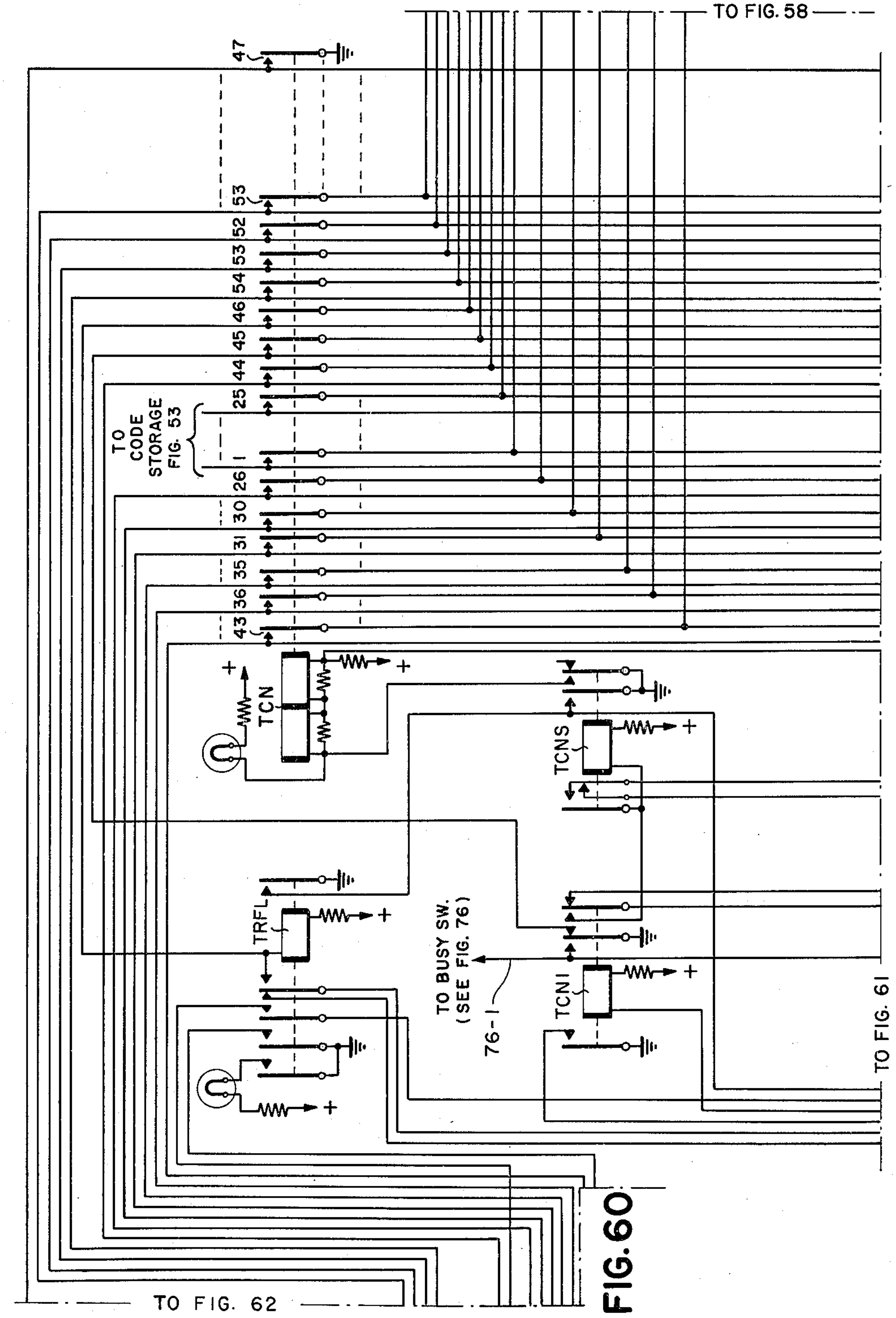
Figure 61:
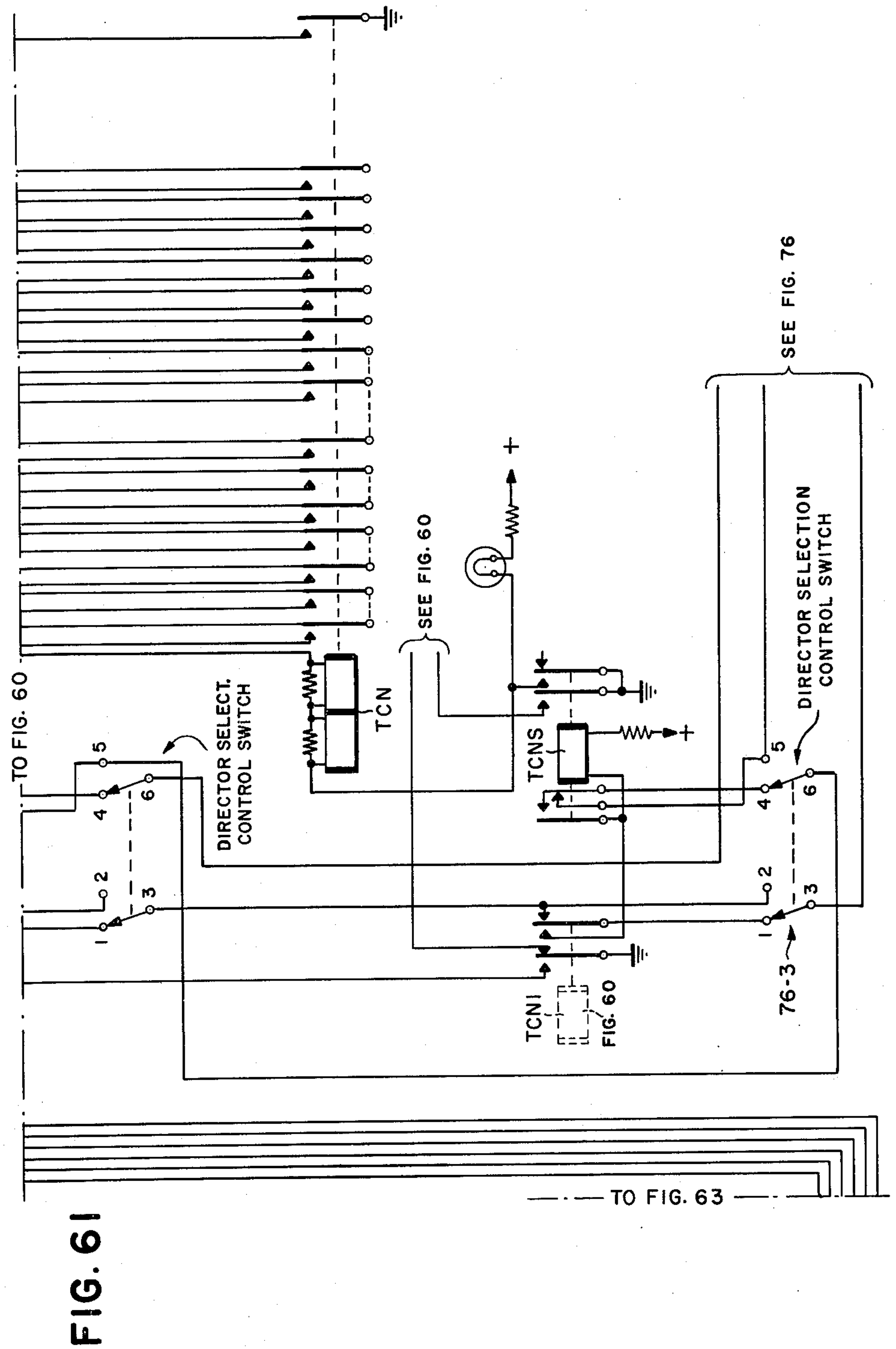
Figure 62:
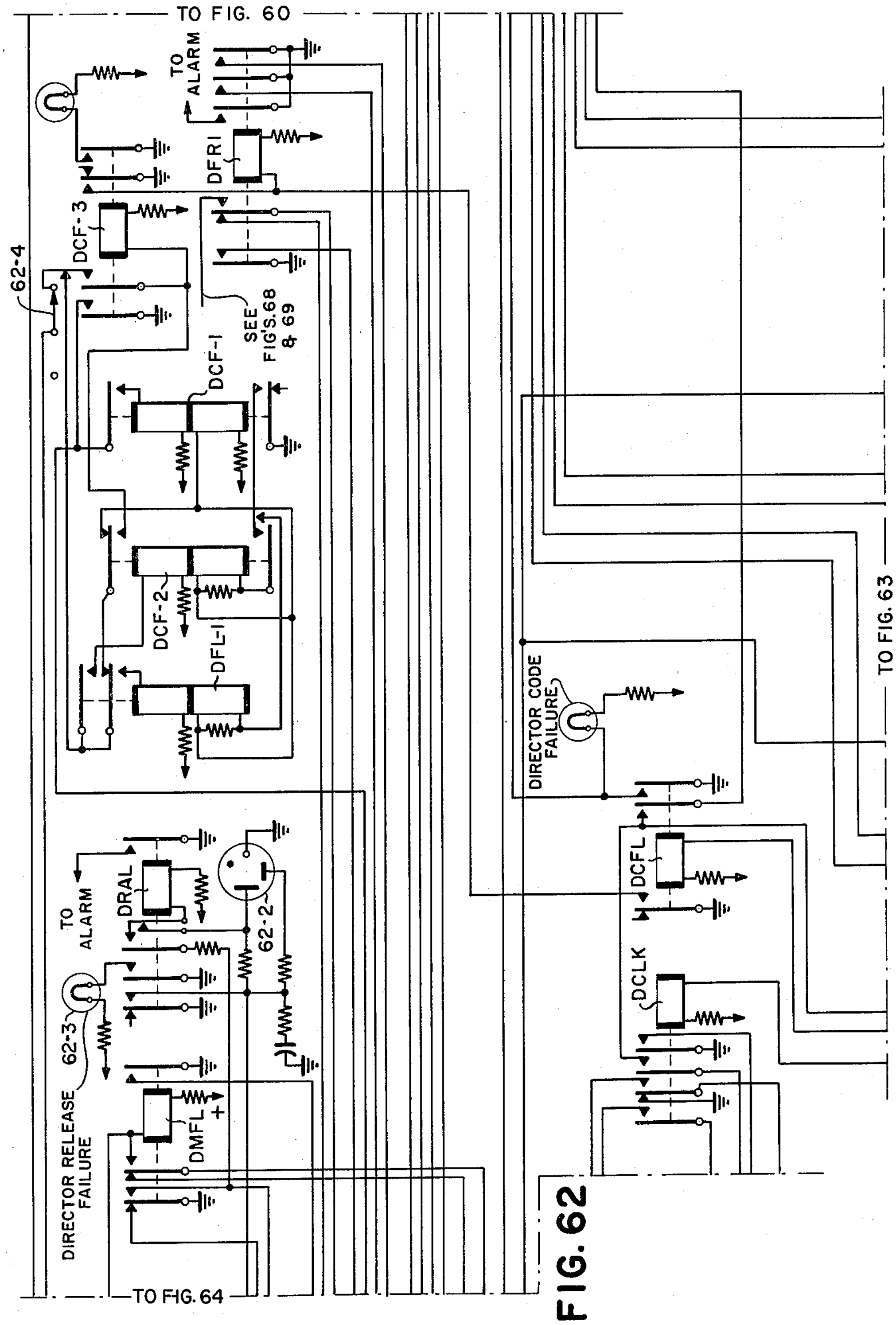

Any operation of relay TFRI, FIG. 56, is preceded or accompanied by the operation of relays TTAL and TMFL. The latter causes disconnection of the translator from the connected director. However, with relay TFRI operated, operation of relays TRR is prevented. With relay TFRI operated, the ground from the connected director which would normally operate relay TRR operates relay TGRC instead. This causes the translator to disconnect from the director group and operation of relay TSC can not occur. Therefore, the translator can not be selected for another director connection.

Since relay TRR does not operate during the above disconnection sequence, all relays previously locked to ground at back contacts of relay TRR remain operated. This facilitates the analyzing of trouble conditions.

*Outgoing line position (cross-office side)*

As pointed out, switched messages are received and recorded on a reperforator at a sending position over its individual cross-office line from any receiving position. The outgoing line may be a trunk channel, a local circuit, or a multipoint circuit.

A numbering machine is operated at the sending position before cross-office message transmission starts to cause the reperforator to record channel, circuit and message sequence number identification characters. On multipoint circuits a number of numbering machines may be used, one for each station on the circuit, and in such cases certain additional characters identify the particular station which is to receive the message.

To determine that a sending position is operating correctly certain character groups of each recorded message are checked from the reperforated tape. First the start-of-message group ZCZC from the numbering machine is checked, followed by the abbreviated start-of-message combination ZC heading the incoming message number. Later a check is made of the end-of-message combination.

*Numbering machine circuits*

The numbering machine at the sending position includes a main rotary switch and three digit rotary switches which represent the last message number transmitted. This number is also displayed by three sets of ten neon lamps.

When relay NMS operates it indicates that a message sequence number is required from the numbering machine and the main switch wipers are then connected to external circuits followed by the stepping operation of the main switch. In conjunction with an operation of the main switch 44–1, the units and one or more of the other digit switches are advanced to indicate the next higher number in a manner similar to that employed to advance the digit switches by the SNI unit.

*Sequence number transmission*

Main switch levels A through E correspond to pulses 1 through 5 of the 5-unit code. Level F provides the sixth pulse control for character punching by the reperforator. For each step of the switch positive battery appears on a lead connected to the make contact of the INS springs. This lead is connected to a stud of the F level for each character to be punched, and to correspondingly numbered studs of the A through E levels in accordance with the selection code for those characters. No character selection or punching is performed for the first two steps of the switch but for the next four steps of the switch the start-of-message combination ZCZC is punched by the reperforator.

The next four steps of the switch (studs 7, 8, 9 and 10) provide the call-letter identification characters for the destination served by this numbering machine. To enable these to be changed readily those studs of the A through E levels are individually wired to a coding socket. Stud 7 of the F level and the lead from the INS make contact are also connected to the coding socket. A strapped plug inserted in this socket sets up the required identification character sequence. No strapping is provided for the first of these four characters, and no character will be punched by the reperforator, unless the outgoing line is a multipoint circuit. In that case a first character X, Y, or Z is strapped in the coding plug, depending upon which of the three possible stations the Number Machine is assigned to serve. This character later guides the outgoing line multi-point conrtol circuit in selecting the proper station to receive the message.

The following five steps of the switch (studs 11 through 15) provide the proper outgoing sequence number for the message being switched cross office to this sending position. When the main switch steps to stud 16 cross office reception of the switched message can commence. Further stepping of the main switch is then controlled from the receiving position to which this sending position is connected over its cross office line circuit.

*Message recording circuits*

All outgoing message characters are recorded in punched tape by a reperforator 50–1 of the type well known in the art and operated at 200 w.p.m. The mechanical functions of punching a character selection in the tape are controlled by a motor-driven shaft, normally held at rest by a clutch. Each character selection to be punched is accompanied by a sixth pulse which operates the clutch trip magnet 50–2, allowing the shaft to make one rotation for the punching cycle associated with that character. During that cycle a set of release contacts 50–3 is momentarily operated to clear out the selector and clutch trip magnet operating circuits.

The reperforator is also equipped with a set of readback contacts 50–4 located five tape character positions to the left of the punch pins. Each tape character punched by the reperforator passes over these contacts, and is reproduced as an individually closed circuit for each marking pulse of the character. A universal contact 50–6, associated with the readback contact set, operates to determine the time at which each character can be read out for external circuit controlling purposes.

Each reperforator selector magnet is individually in series with the plate circuit of an associated thyratron 40–1, 40–2, 40–3, 43–1 and 43–2. The clutch trip magnet is in series with the plate circuit of thyratron 43–3 for message character punching but, with relay MDI released, can also be operated from the plate circuit of thyratron 49–1 for blank tape feed-out purposes. The plate circuit battery supply for these tubes is obtained through the reperforator release contacts, which are normally closed. The operated pattern of thyratrons 40–1, etc., determines a character selection, and operation of 43–3 initiates the punching cycle for that character. The momentary operation of the release contacts during the punching cycle extinguishes all operated thyratron tubes, releasing all operated reperforator magnets. The reperforator is then ready to accept and punch the next character selection.

*Reperforator tape feed-out*

In order to pass the last message character punched by the reperforator through the outgoing line distributor-transmitter 50–7 it is necessary to feed out blank tape automatically when cross office message character reception ceases. However, because some message texts are enciphered and use the blank character for traffic purposes it is necessary to restrict the feed-out operation so that it will occur only between the end of one outgoing message and the start of the next.

Initiation of a blank tape feed-out is normally subject to a tight-tape condition, as indicated by operation of the auto-stop switch tape lever, and the position of the tape feed control switch 50–8. However, some methods of crypotographic operation on the outgoing line circuit may require that outgoing line transmission of a message, once started, proceed without any interruption through the end-of-message character combination. To guard against any interruption due to auto-stopping, the tape feed control 50–8 switch may be thrown to the left hand position. In that case a blank tape feed-out will be initiated at the end of each message received cross office, even though the autostop switch tape lever is unoperated.

When cross office reception of a message commences the selected numbering machine main switch 44–1 operates to provide the outgoing message sequence number. The first step of this switch operates relay NMOT, which locks to ground at released relay NMR. Relay NMOT operates relay TFI. This, in turn, operates relay TFC, which locks to ground at the normally closed reperforator tape meter contacts 50–9. Operation of relay NMOT also operates relays OTTC, which locks to ground as long as the auto-stop switch tape lever remains unoperated.

When cross office reception of the message is completed the selected numbering machine main switch advances to stud 20 where relay NMRT operates, locking that relay to ground at released relay NMR and releasing operates relay NMOT. Release of relay NMOT releases relay TFI. At that time a ground circuit is closed from released relay MDHM to contacts of relay OTTC and the tape feed control switch. With this switch to the right, as shown, no function can be performed by the ground circuit until OTTC releases.

If no further cross office messages are received within the period required for a tight tape operation of the auto-stop switch tape lever relay OTTC will release. This causes the reperforator to punch blank tape, since no selector magnets are operated. At the end of the feed-out operation, opening of the tape meter contacts releases relay TFC which cuts off output pulses from thyratron 49–1 stopping further punching of blank tape by the reperforator.

Any cross office message switched to the sending position is accompanied by operation of relays NMOT, OTTC and TFI at the start of its reception. Should this occur during blank tape feed out the operation of relay TFI immediately terminates that function. With the tape feed control switch 50–8 to the left the feed-out control contacts of relay OTTC are shorted out. In that case release of relay TFI when reception of a cross office message is completed immediately starts a blank tape feed-out operation without regard to the position of the auto-stop switch tape lever.

Operation of relay MDC, for reperforation of a message disregard notice, or relay NDC, for reperforation of a number disregard notice, results in the operation of relay TFI followed by relay TFC. Relays MDHM and MDI are also operated at this time. With relay MDI operated output pulses from thyratron 49–1 step the message disregard switch to produce reperforation of the required character sequence. When this function is completed releases of relay MDHM allows the message disregard switch to return to its home position, and when this has occurred a blank tape feed-out operation starts. Thus reperforation of either notice is followed by production of sufficient blank tape to insure passage of the last of their characters through the distributor-transmitter for outgoing line transmission.

*Character checking circuits*

The read-back contacts 50–4 provide a means for checking that any desired characters are present in the punched tape produced by the reperforator and are individually connected to the A to E wipers of the character check switch 50–11.

Operation of the universal contacts 50–6 establishes the time at which any character set up by the read-back contacts may be checked. The C lead connected to one of the universal contact springs is normally open, but is connected to ground when some specific character is to be checked. Thus such characters are reproduced as individually closed circuits to ground for each marking pulse set up by the read-back contacts. The open or grounded condition of the C lead is determined by the position of the selected numbering machine main switch, or the position of the character check switch.

*Character check switch*

The character check switch provides a means for establishing particular character sequences whose presence in the perforated tape is to be checked. All character sequences to be checked for each message occupy approximately one-third of a switch rotation.

Establishment of a cross-office line connection results in operation of relay NMS of the selected numbering machine and the common NMSC relay in series. Switch 50–11 is then free to advance one step at a time subject to output pulses from thyratron 49–2. Its control circuit is so arranged that an output pulse occurs only if the leads associated with diodes 49-3, 49–4 and 49–5 are all grounded, and no group is present on lead 50–12. For the switch position shown this can occur only when a Z character appears in the tape, and the universal contact C lead is connected to ground. The switch will then step to stud 2, and remain there until a C character appears in the tape, together with the universal contact C lead being grounded. This general procedure is followed for each character to be checked, and should result in the switch being at its next home position when cross-office reception of a message is completed, and the cross-office line circuit is to be disconnected.

The first characters punched by the reperforator when a cross-office line connection is established are the ZCZC start-of-message combination. These are produced by stepping the selected numbering machine main switch over studs 3 through 6.

The universal contact C lead is grounded by studs of the main switch only during the time the start-of-message characters should be passing over the read-back contacts. If those characters are present in the tape the character check switch steps from stud 1 to stud 5. At stud 5 the universal contact C lead circuit is open. Therefore, the switch cannot step again due to any Z character that may appear in the call identification character group. All characters in this group will have passed over the read-back contacts by the time the message sequence number character group punching has been completed, and the numbering machine main switch will have reached stud 16. Cross-office transmission from the connected receiving position is allowed to start only if the character check switch has reached stud 5.

The first characters received over the cross-office line are the abbreviated start-of-message combination ZC transmitted from the connected receiving position SNI unit. With the numbering machine main switch on stud 16, ground (via the J level) is connected to the H level wiper of switch 50–11. With that switch on stud 5 the ground is connected to the universal contact C lead. Therefore, switch 50–11 will step from stud 5 to stud 7 when the ZC characters pass over the read-back contacts. When it reaches stud 7 the universal contact C lead circuit is opened, so no further character check stepping of the switch can occur. Cross-office transmission of the message text from the connected receiving position is permitted only if switch 50–11 has reached stud 7.

When cross-office reception of a message is completed the end-of-message combination in the tape has not been checked by the read-back contacts. Before cross-office line circuit disconnection takes place, appearance of the last line-feed and first N characters of that combination in the tape are checked. To check those characters it is necessary to punch two additional characters locally at the sending position. Two blank characters are provided as the numbering machine main switch passes over studs 17 and 18 when it is stepped towards its home position.

While the numbering machine main switch is stepping over studs 17, 18, and 19, ground is connected to the universal contact C lead. With the character check switch on stud 7 passage of the line-feed and N characters over the read-back contacts causes it to step to its next home position. Normal cross-office line circuit disconnection takes place only if this occurs.

*Cross-office connection circuits route lead*

The idle or busy condition of a sending position is indicated over its individual set of route leads. If idle, all route leads of its set terminate in positive battery, but if busy all route leads of the set are open.

If the outgoing line is to a tributary office, or is a single trunk to a distant center, only the No. 1 route lead of the set is used at the sending position. If the outgoing line is to a multi-point circuit a separate route lead is provided for each station of that circuit. Since there may be as many as three stations all route leads of the set may be used. If relays OCLO, NMR and NMSC are released all route leads in use terminate in positive battery through windings of relay OCD and an NMC relay individual to each lead. Operation of relays OCLO, NMR or NMSC opens the positive battery circuit for all route leads, indicating that the sending position is busy and unavailable for a cross-office connection.

Any operated NMS relay locks in series with relay NMSC to battery at released relay NMR. Relay NMSC opens the common positive battery supply for all route leads terminating at this sending position. This provides a busy indication to other receiving positions desiring to establish a connection to this particular sending position.

*Cross-office line connection*

Operation of relay ODC sets up a cross office line switching code individual to this sending position. In response to the switching code the cross office line switches of that receiving position function to establish an actual cross-office line connection to this sending position and ground is removed from the route lead. When that is completed relay OCD is released.

*Supervisory controls*

Each numbering machine is provided with a close out switch. In the position shown the associated numbering machine can be selected as described. When thrown to the other position the route lead circuit through the NMS operating winding is opened, so that the numbering machine can no longer be selected.

A master close out switch 46–3 is also provided. Throwing this switch to its other position operates relay OCLO to open all route lead circuits in use. No further cross office connection for any of the destinations served by the sending position can then be established. However, if any NMS relay has just operated when the switch is thrown, establishment of that cross office connection will proceed without interruption.

Failure of a sending position to perform its cross office connection functions properly must be detected promptly. Furthermore, the sending position must be removed from service so that no other receiving position can establish a cross office connection to it. Relay NMST is normally operated. Each operation of relay OCD opens the NMST relay operating circuit, and each operation of relay NMSC recloses it. Relay NMST is sufficiently slow-releasing not to release completely in the interval between those relay operations.

Trouble in the locking circuit of an operated NMS relay will result in failure of relay NMSC to operate. In such a case the sending position will be unable to perform its later cross office reception functions properly. Relay OCD will then remain operated sufficiently long for relay NMST to release. Release of relay NMST shorts its operating battery source to ground at the master close-out switch, preventing it from reoperating when relay OCD releases. Release of relay NMST operates relay OCLO to busy the sending position completely. Release of relay NMST also removes from ground the timing network of tube 46–4 associated with relay NMAL. The timing interval of this network is adjusted to be 60 seconds and the operation of relay NMAL at the expiration of this interval provides an alarm indication.

Operation of the master close-out switch to its other position allows relay NMST to reoperate, but keeps the sending position busied by retaining relay OLCO operated. Reoperation of relay NMST resets the timing network. Restoration of the master close-out switch to its normal position, when the trouble has been cleared, releases relay OCLO. This returns the position to service for cross-office connections.

Operation of any individual numbering machine close-out switch transfers the route lead for that destination to a conductor designated "route lead to assigned close-out intercept position" 48–1. Likewise, operation of relay OCLO transfers all route leads in use to that conductor. This conductor is used in common by all sending positions assigned to message traffic service in the center. In effect it is a route lead which automatically causes a cross office connection to be established to a sending position assigned to close-out intercept service when the regular sending position for a destination is unavailable. Thus the receiving positions are able to switch all of their message traffic cross office to some sending position, and the supervisory attention required for those messages which can not be switched directly to their destination positions is concentrated at the close-out intercept position.

*Outgoing message number*

When all sending position cross office connections have been established for switching a message from a receiving position the selected numbering machines at those sending positions are operated to provide the individual outgoing message sequence numbers required.

When an outgoing message numbering function is desired the receiving position switching the message transmits No. 7 pulses at a 200 w.p.m. rate to all connected sending positions over their individual cross-office lines. At each such position the cathode of thyratron 49–6 is connected to ground via the H wiper of the numbering machine main switch 44–1, and the plate of the tube is connected to positive battery via the main switch stepping magnet and INS springs in series. Thus the switch will step once for each No. 7 pulse received until the cathode ground connection is opened at stud 16.

Each stepping operation of the switch connects positive battery through the INS make contact to certain studs of the A through F levels. When the F wiper steps to any stud connected to that lead a positive battery pulse will be delivered to the grid circuit of tube 43–3 when the next switch step occurs. The resulting operation of 43–3 initiates a character punching operation of the reperforator 50–1. Positive battery pulses are also delivered to the grid circuits of five tubes 40–1, –2, –3, 43–1, –2, for the pattern of correspondingly numbered A through E level studs connected to the INS contact lead. This pattern determines the character selection to be punched by the reperforator.

When the main switch 44–1 reaches stud 8, ground is connected to the read-back universal contact C lead for the next few steps. During that time the ZCZC sequence number start-of-message combination should be present in the tape passing over the read-back contacts. Detection of that sequence causes the character check switch 50–11 to step to stud 5. Ground is removed from the universal contact C lead at the time so that no further stepping of the switch can occur from characters in the call identification sequence.

When the main switch 44–1 reaches stud 16 its stepping operation ceases. Ground is then connected to the H level wiper of the switch 50–11 and with that switch on stud 5 this ground is connected via the J level wiper to the cathode circuit of the left hand section of tube 43–6 and via the H level stud 5 and 6 connection to the universal contact C lead. Ground of this cathode circuit causes No. 10 pulses to be transmitted at a 600 w.p.m. rate over the individual cross-office line to the receiving position switching the message. Transmission of these pulses, therefore, indicates that the sending position has completed its outgoing message numbering and character checking functions.

*Incoming message number*

Normal cross-office transmission of a message being switched by the receiving position does not start until the No. 10 pulse transmission from all connected sending positions is detected as being present. When that occurs receiving position No. 7 pulse transmission is stopped, and transmission of the incoming message number character sequence is started from the receiving position SNI unit to all connected sending positions.

At each such position the pulse code pattern of each character of that sequence is converted into an operation of tube 43–3 to initiate a character punching operation of the reperforator, and an operated pattern of the five tubes 40–1, etc., to determine the character selection punched.

The first two characters punched for each incoming message sequence number are the abbreviated start-of-message combination ZC and with the universal contact C lead grounded switch 50–11 will advance to stud 7 when the ZC combination is detected in the tape passing over the read-back contacts. This removes ground from the cathode circuit of tube 43–6 stopping the No. 10 pulse transmission from this sending position. This indicates that reperforation of the incoming message number has occurred, and that the fixed character sequence at its beginning has been checked as correct in the tape. The five tubes 40–1, –2, –3, 43–1 and –2, as well as the other pulse detecting and generating tubes hereinafter mentioned are timed in their operation and controlled in part by the "pulse generator" 49–11 similar to the pulse generator of FIGS. 23 and 28.

*Message text*

Normal cross-office transmission of the text portion of a message being switched by the receiving position does not start until No. 10 pulse transmission from all connected sending positions is detected as having ceased. A test for this condition is made following transmission of the last incoming message number character from the SNI unit. If that condition is met, transmission of the message text characters is started from the receiving position tape transmitter.

The first information transmitted consists of the routing line contained in the tape storage loop. The first character group in the line is the precedence prosign for the message, and this is transmitted to all connected sending positions. The precedence prosign is followed by from one to nine routing indicators, each representing a destination which is to receive a copy of the message. Each routing indicator is transmitted over only one of the connected cross-office lines and to the particular sending position assigned to serve the desired destination.

The routing line is terminated by a carriage-return character. This and all following characters of the message are transmitted to all connected sending positions. When the end-of-message combination is detected at the receiving position, disconnection from all connected sending positions is initiated. Throughout cross-office reception of the routing line, message body and end-of-message combination the selected numbering machine main switch remains on stud 16, and the character check switch on stud 7.

*Supervisory controls*

Failure of a sending position to perform its outgoing message numbering or cross-office reception functions properly must be detected promptly. Furthermore, the sending position must then be removed from service so that no other receiving position can establish a cross-office connection to it.

Relay NMSC operates when a numbering machine is selected. This opens the ground circuit to the timing network of tube 46–4. If no further sending position function is performed within the timing interval of this network, the resulting operation of relay NMAL provides an alarm indication, and operates relay OCLO to insure that the sending position will remain busied out when the receiving position releases its control of the cross-office connection. Operation of the master close-out switch to its other position keeps the sending position busied by retaining relay OCLO operated, and allows the clear-out button to be used to operate relay NMRC. This in turn operates relay NMR to release the selected NMS relay and the common NMSC relay. Release of that relay and relay NMR resets the timing network.

The timing network of tube 46–4 is adjusted to be 60 seconds. Normally, operation of relay NMSC is followed by an outgoing message numbering operation of the selected numbering machine well within this interval. The 60-second interval allows adequate margin for a 30-second timed MX connection to occur, if that is necessary, as described. Ground via J–2 of the selected numbering machine main switch operates relay NMOT when that switch takes its first step in response to the outgoing message numbering function. Relay NMOT remains locked to ground through released relays NMRT and NMR as the switch continues to step to stud 16. Operation of relay NMOT closes ground from released relay NMRT through released relay NMR to the timing network, resetting the timing action. Operation of relay NMOT, therefore, indicates that the outgoing message numbering function has at least been started.

Thyratron 49–7 provides a means for an alarm indication of trouble occurring during the sending position cross-office reception functions. The control grid circuit of this tube is so arranged that no output is produced if No. 8 pulse reception over the cross-office line is detected. With the sending position disconnected the plate circuit of tube 49–7 is open, so no function is performed due to lack of No. 8 pulse reception. Operation of any relay NMS connects the plate circuit to the G wiper of the associated numbering machine main switch. However, the plate circuit will be open as long as that switch remains on stud 1, so lack of No. 8 pulse reception will still perform no function.

When all sending position cross-office connections have been established the receiving position switching the message transmits No. 7 pulses at a 200 w.p.m. rate to step each sending position numbering machine main switch for the outgoing message numbering function. Transmission of No. 8 pulses at a 600 w.p.m. rate also starts coincident with the first No. 7 pulse transmitted, and continues for the remainder of the cross-office connection period. When a sending position numbering machine main switch takes its first step in response to No. 7 pulse reception, the plate circuit of tube 49–7 is closed to relay OAL by the strapped stud group G–2 through G–20. For the remainder of the outgoing message numbering function and for the entire cross office message reception time, when the main switch remains on stud 16, no operation of relay OAL will occur if No. 8 pulse reception is continuously detected.

Should No. 8 pulse reception be interrupted at any time during this period the resulting output of tube 49–7 operates relay OAL to provide an alarm indication. Operation of relay OAL also operates relay OCLO to insure that the sending position will remain busied out when the receiving position releases its control of the cross-office connection.

From the foregoing it is evident that relay NMAL provides alarm protection from the initial selection of a numbering machine to the start of pulse reception over the cross office line, and that relay OAL then provides alarm protection for the cross office reception functions. Thus once a sending position cross office connection is established its operation is under constant alarm supervision, and the particular alarm indication which may occur will indicate the general portion of the operating sequence in trouble.

*End-of-message check*

When the end-of-message combination is detected at the receiving position disconnection from all connected sending positions is initiated. Before actual disconnection takes place a check is made that the last line feed and first N characters of that combination are present in the tape at the sending positions. To do this it is necessary to punch two additional characters locally at each sending position.

Switches 44–1 and 50–11 have been on studs 16 and 7 respectively during the cross office reception of all message text characters. Under this condition the cathode of thyratron 49–6 is connected to ground and the plate to the main switch stepping magnet. When the end-of-message check function is desired the receiving position switching the message again transmits No. 7 pulses at a 200 w.p.m. rate to all connected sending positions. At each such position the main switch will step once for each No. 7 pulse received as long as the cathode ground is maintained and the main switch will now step from stud 16 to stud 20.

On the first step no character is punched by the reperforator. On each of the next two steps a "blank" character is punched because of the F level stud connections to the INS make contact, and the absence of similar connections for the corresponding A through E level studs. On the final step of the switch no character is punched.

Punching these characters allows the desired two characters of the end-of-message combination to be checked by the read-back contacts. Ground is connected to the universal contact C lead during the time the check should be made. If the desired characters are present in the tape the character check switch steps from stud 7 to stud 9 its next home position. Ground is then connected to the cathode of tube 48–6 through the main switch H–20 lead. This allows the main switch to step to stud 21 in response to the next received No. 7 pulse.

When the main switch reaches stud 21 ground is connected to the cathode circuit of the left side of tube 43–6. This causes No. 10 pulse transmission again at a 600 w.p.m. rate to the receiving position, which indicates that the sending position has completed its end-of-message checking functions and is ready to be released.

*Sending position release*

Complete release of the sending position does not occur until the receiving position switching the message detects No. 10 pulse transmission as being present from all connected sending positions. At that time all receiving position pulse transmission stops, it disconnects from the cross office lines, and proceeds to process the next messages. When the selected numbering machine main switch reaches stud 20 during the end-of-message checking function relay NMRT is operated and locks to ground at released relay NMR. If the main switch steps to stud 21, as it should, the plate of tube 49–7 is transferred from relay OAL to the main switch step magnetic circuit via operated relay NMRT. No further function will be performed as long as No. 8 pulse reception over the cross office line continues.

When the line receiving position stops pulse transmission, the output from tube 49–7 steps the main switch 44-1 from stud 21 to stud 22. From that point the switch self-steps to stud 1, its home position. Ground, via J–1 and operated relay NMRT then operates relay NMRC. This, in turn, operates relay NMR which opens the locking circuit for the selected NMS relay, releasing it together with the common NMSC relay. Operation of relay NMR also releases relay NMRT. Release of the operated NMS and NMRT relays allows relay NMRC to release, followed by release of relay NMR. All sending position circuits have then been restored to their idle condition, and the position is again available for a cross office connection.

*Route lead control*

Operation of relay NMSC when a cross office connection to a particular receiving position is established opens the positive battery circuit for all route leads. This makes the sending position busy to any other receiving positions desiring a cross office connection to it. Relay NMSC remains operated until released by the operation of relay NMR. Since the route lead positive battery circuit also passes through contacts of relay NMR, operation of that relay maintains the sending position busy condition. Thus relay NMR will not release until all sending position circuits are restored to their idle condition and the sending position busy condition is not removed by restoration of positive battery to the route leads until the position is ready to accept another cross office connection.

*Supervisory controls*

Alarm protection for the sending position functions is provided by the previously described relay OAL circuit for the entire cross office reception period, including the end-of-message checking operation. Operation of relay NMRT indicates that cross office reception of No. 8 pulses is expected to stop legitimately and transfer of the plate circuit of tube 49–7 at that time terminates the alarm protection of relay OAL. However, operation of relay NMRT also removes ground from the timing network, whether relay NMOT releases or not. Thus alarm protection for the releasing function is provided by the NMAL circuit, and this function should be completed well within the timing interval allowed.

In performing the outgoing or incoming numbering functions for a message a connected sending position may fail to complete its character checking operations. The required check pulse indication from all connected sending positions is then not detected by the receiving position switching the message. In that case the receiving position first disconnects from any sending positions in trouble, then transmits a "number disregard notice," instead of the message text, to any sending positions not in trouble. Since that notice replaces the text and terminates with an end-of-message combination, those positions will release in the normal manner and become available for other cross-office connections.

Likewise, in performing the end-of-message checking function a connected sending position may fail to complete its character checking operations. Again, the required check pulse indication from all connected sending positions will not be detected by the receiving position. In this case the receiving position first disconnects from any sending positions in trouble, then proceeds with the usual disconnection sequence for any sending positions not in trouble. Thus those positions will release in the normal manner and become available for other cross-office connections. Finally, all connected sending positions may perform their cross-office reception checking functions properly. In that case receiving position disconnection will occur in the usual manner. However, one of the positions may fail to release because of local trouble, but any positions not in trouble will complete this function and become available for other cross-office connections. For any of the above cases the sending position in trouble remains busy due to the operated condition of relays NMSC or NMR.

*Load-distributor circuits*

To handle heavy traffic loads to a particular destination several outgoing line circuits may be provided, each equipped with a sending position at this center. For cross-office switching purposes all sending positions of such a group represent the same destination. It is therefore necessary to select an individual sending position out of the group for each cross-office connection established for that destination. This is the function of a circuit arrangement referred to as a load-distributor.

Load distributor operation may also be provided for other purposes. For example, if more than one sending position is assigned to MX service the group will operate on a load-distributor basis. Likewise, if more than one sending position is assigned to close-out intercept service the group will also operate on a load-distributor basis.

To reduce the amount of unsent tape at each sending position of a load-distributor group to a minimum, selection of a sending position for a cross-office connection is governed by the overall traffic situation of the entire group. First choice is given to those sending positions with a tight-tape condition, since they have no messages on hand for outgoing transmission. If no tight-tape sending position is available, each sending position in the group is selected in rotation as cross-office connections are established. An exception to this rotational method of selection may be made if a particular sending position of the group shares its outgoing line circuit with another sending position on a flip-flop basis. This exception is described under "Dual sending position control."

Figure 47:
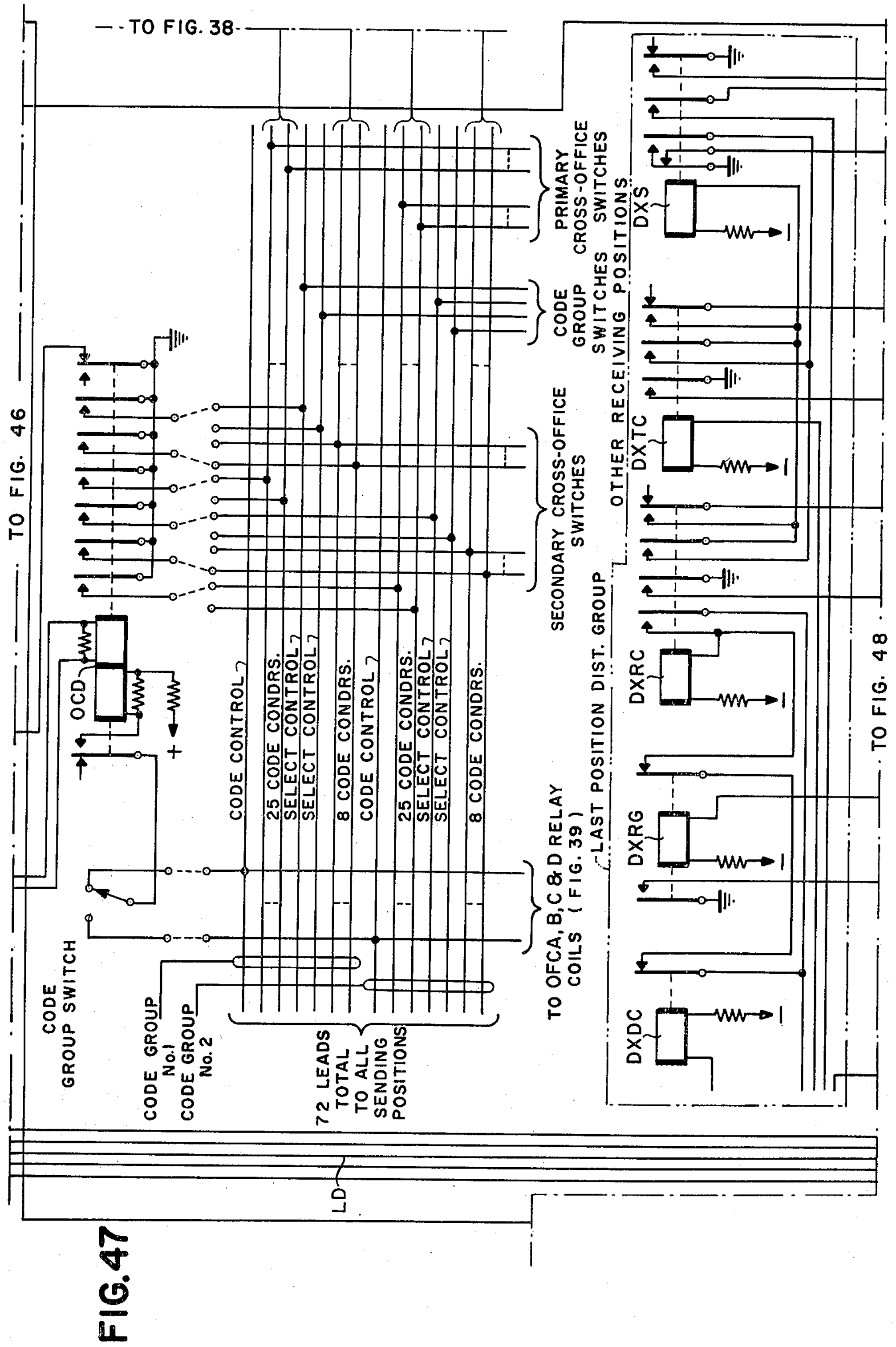
Figure 48:
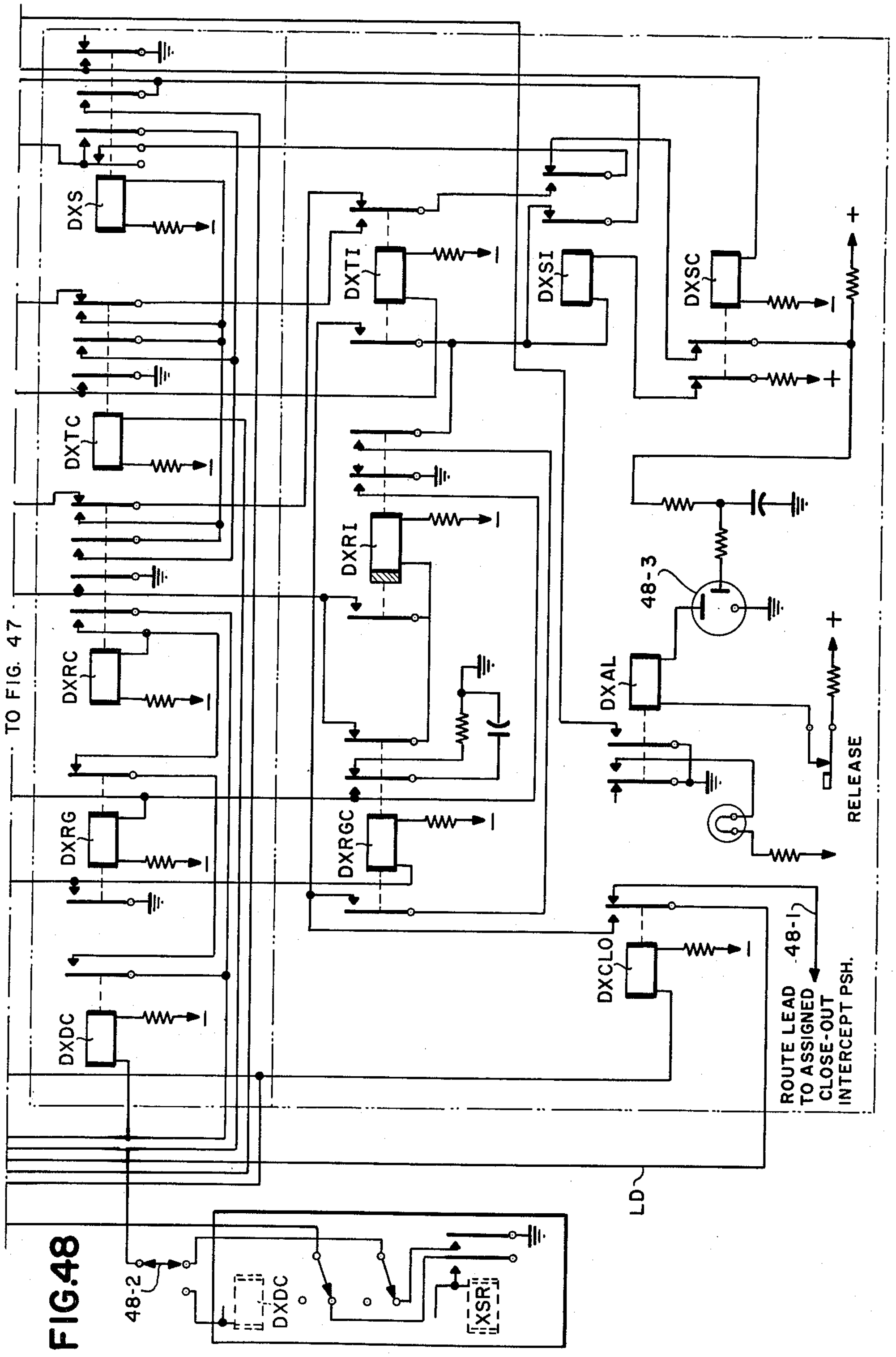
Figure 49:
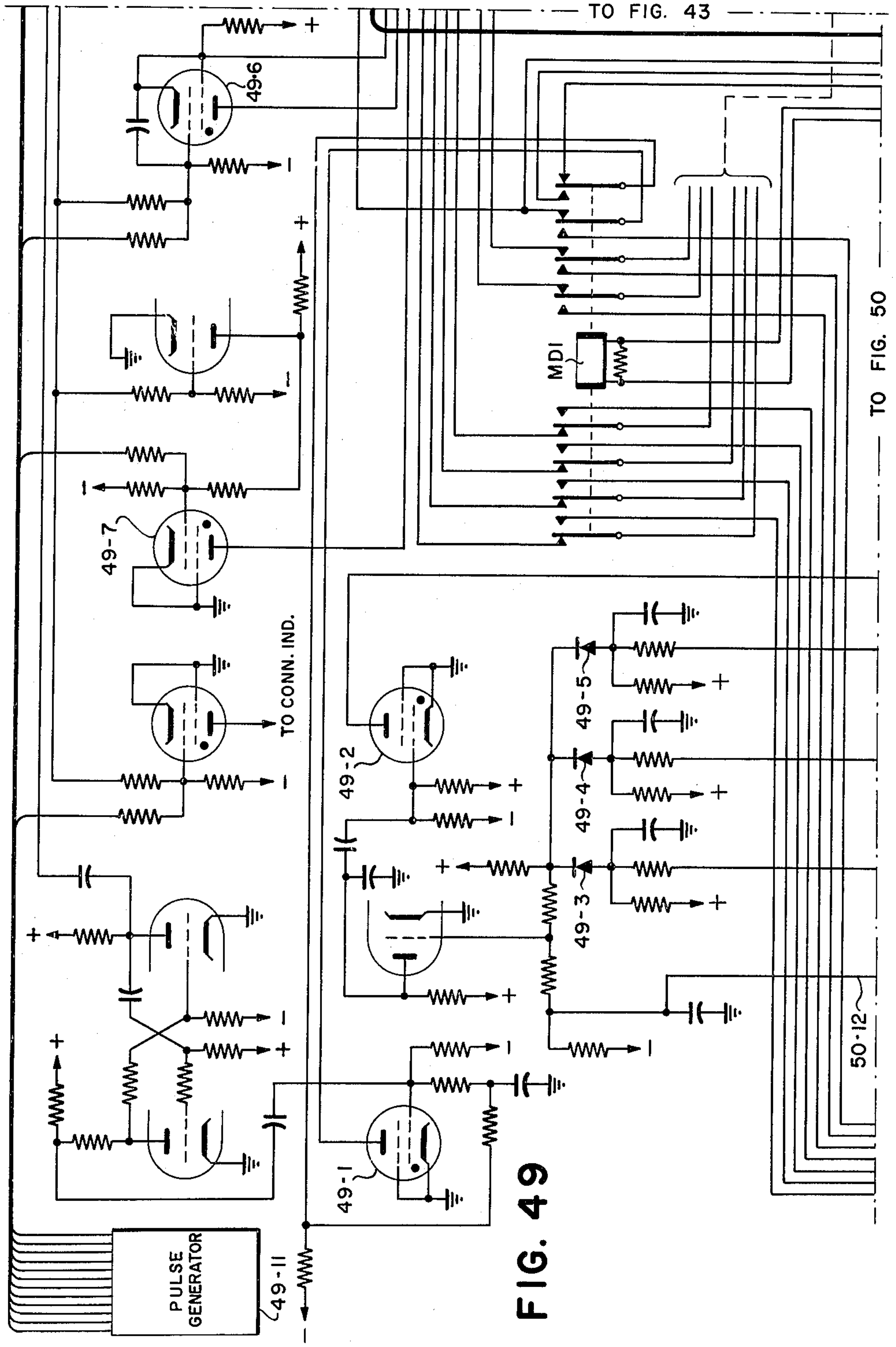
Figure 50:
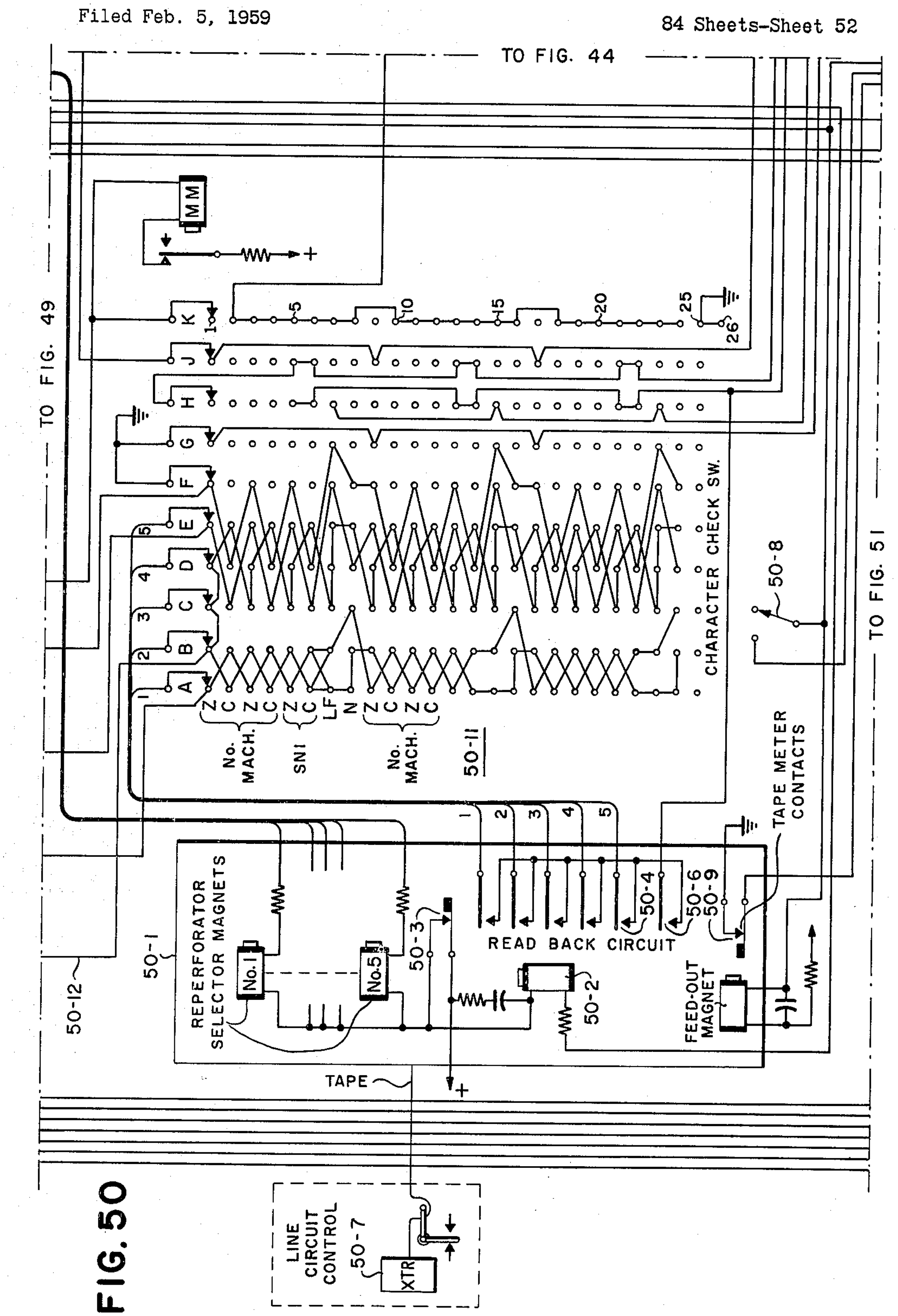

The circuits associated with the load-distributor functions are shown primarily in FIGS. 47 and 48 and include a set of relays interconnected as indicated for each sending position of the group. These provide the means for indicating the availability of the associated position on a tight-tape or rotational basis, for providing dual position control when required, and for selecting only one of the available positions for each cross-office connection established. An additional set of common relays, interconnected to the individual sets as indicated, is also provided. The route lead for the destination served by this group is connected to the common relay set via the LD route lead terminal of the same sending position containing the common relay set. The principal functions of this common relay set are to provide the required idle or busy route lead indication for the group as a whole, and to govern the selection of a particular position on the proper basis when a cross-office connection is to be established. The common relay group also provides alarm protection for the operation of the complete load-distributor arrangement.

Each available sending position in the group is indicated by the position shown by its close-out switch, and the released positions of its OCLO relay. Ground from each such position is then connected via an individual diode such as 46–6 to a common lead for operating DXCLO. Operation of that relay, therefore, indicates that at least one sending position in the group is available for cross-office connections.

Each idle sending position in the group is indicated by the released positions of its NMSC and NMR relays. With the sending position also available, ground from the close-out switch is connected to a transfer assembly tongue of relay OTTC. Relay OTTC operates whenever cross-office reception of a message starts and once operated it locks to ground at the auto-stop switch contacts, which close due to recording of the message in punched tape for outgoing line transmission. Thus the operated position of relay OTTC indicates that unsent tape is on hand. Whenever a tight-tape condition occurs the opening of the auto-stop switch contacts releases relay OTTC. This position of relay OTTC therefore indicates that there is no further punched tape on hand for outgoing line transmission.

For an idle sending position with a tight-tape condition, ground from its close-out switch is connected via its released OTTC relay to operate the DXTC relay individual to that sending position. Operation of any DXTC relay in the load-distributor group operates common relay DXTI. Operation of that relay, therefore, indicates that at least one sending position in the group has a tight-tape condition and should be selected for the next cross-office connection established. The operated pattern of DXTC relays indicates those positions having this condition from which one should be selected for the connection.

*Rotational control*

For an idle sending position with unsent tape on hand, ground from its close-out switch is connected via its operated OTTC relay to operate the DXRC relay individual to that sending position via series-connected break contacts of the associated released DXDC and DXRG relays. Relay DXRC locks around those break contacts to its operating ground sources. Operation of any DXRC in the load-distributor group operates common relay DXRI through break contacts of released relay DXRGC. Relay DXRI locks around those break contacts direct to its operating ground source at the operated DXRC relays. DXRI is slow-operating, allowing all possible DXRC relays to operate before any further functions are performed.

Operation of relay DXRI operates all sending position individual DXRG relays of the load-distributor group. Operation of each DXRG relay opens the operating circuit for its associated DXRC relay. As long as the DXRG relays remain operated no additional DXRC relays can be operated. However, the originally operated pattern of DXRC relays remains locked as previously described.

Operation of the DXRG relays results in operation of relay DXRGC which together with DXRI indicates that while there is still unsent tape on hand at least one such sending position in the group is available for a cross office connection, if there are no tight-tape positions available. The operated pattern of DXRC relays indicates those positions from which a selection should be made under this condition.

Selection of such a position and establishment of a cross office connection to it results in release of its DXRC relay, as described later. Once released that DXRC relay can not be reoperated as long as the associated DXRG relay remains operated. Not until the last originally operated DXRC relay is released by establishment of a cross office connection to its sending position can relay DXRI release, and not until this occurs can all DXRG and the DXRGC relays release. At that time a new pattern of idle sending positions with unsent tape on hand can be registered by the operation of their individual DXRC relays. This arrangement provides a gating control for distributing cross office connections among such sending positions as evenly as possible. This keeps the amount of unsent tape at each position to a minimum.

*Route lead control*

If no sending position of the load-distributor group is idle relays DXRGC, DXRI and DXTI are released. In that case the route lead circuit assigned to this destination is open, assuming relay DXCLO to be operated. If any sending position of the group has a tight-tape condition and is idle relay DXTI is operated, as is relay DXCLO. The route lead circuit then terminates in positive battery through the DXSI relay winding and contacts of the released relay DXSC. If any sending position of the group has unsent tape on hand but is idle relays DXRGC and DXRI are both operated, as is relay DXCLO. Again the route lead circuit terminates in positive battery through the series-connected make contacts of relays DXRGC and DXRI, the DXSI winding and contacts of released relay DXSC. It should be noted that both of these paths through the DXSI winding may be closed simultaneously.

In response to the positive battery condition a receiving position desiring to establish a cross-office connection to this destination first obtains the use of an allotter circuit and then grounds the route lead.

In this case grounding the route lead at a receiving position results in operation of relay DXSI of the load-distributor common control circuit. Operation of that relay, therefore, indicates that at least one of the load distributor group sending positions is idle, and some receiving position desires a cross office connection for this destination.

It is next necessary to select a single sending position for this cross office connection from the several which may be idle. A selection chain circuit starts with ground at the last sending position of the load distributor group, and passes through contacts of released DXS relays of each position in the group to a transfer assembly tongue of relay DXSI. With that relay operated the circuit continues to a transfer assembly tongue of relay DXTI.

If a tight-tape sending position is to be selected relay DXTI is operated. In that case the selection chain ground is connected to the seriesed transfer contacts of relay DXTC of each position, commencing with the first position of the group. One or more of these must be operated to have had relay DXTI operated. The selection chain ground operates the DXS relay of the lowest position in the group whose DXTC is also operated. The operated DXS relay locks to the selection chain ground source, and until it releases no other DXS relay in the group can be operated.

If an idle sending position with unsent tape on hand is to be selected relay DXTI is released. The selection chain ground is then connected to the seriesed transfer contacts of relay DXRC of each position, commencing with the first position of the group. One or more of these must be operated to have had relay DXSI operate via relays DXRGC and DXRI. Again, the selection chain ground will operate the DXS relay of the lowest position in the group whose DXRC relay is also operated. Relay DXS locks to the selection chain group source, preventing any other DXS relay from being operated. However, this time the locking circuit passes through additional contacts of the associated DXRC relay, maintaining the locked condition until that relay releases. The DXS relay group, therefore, furnishes a means for designating the particular sending position of the group selected for a cross office connection. Once operated a DXS relay remains locked until a cross office connection for its associated sending position has been established.

*Sending position connection*

Operation of any DXS relay operates relay DXSC. This opens the operating battery circuit for relay DXSI, releasing that relay. The grounded route lead for this destination is then connected via released DXSI relay and the operated DXS relay to the No. 1 route lead terminal of the sending position associated with that DXS relay. This selects the sending position numbering machine by operating its NMS relay, and sets up the cross office switching code individual to this position by operating relay OCD. In response to the switching code the receiving position establishing this connection removes ground from the route lead. It then proceeds to establish a cross office line connection to that sending position, as previously described.

Operation of the numbering machine NMS relay operates relay NMSC. This opens the idle condition indicating ground circuit to the transfer assembly tongue of relay OTTC. Loss of this ground releases relay DXRC or DXTC, whichever had been operated, resulting in release of the associated DXS relay. Release of the operated DXS relay restores the selection chain ground circuit to the transfer assembly tongue of relay DXSI. Release of that DXS relay also releases relay DXSC, closing the operating battery circuit for relay DXSI. However, since ground has been removed from the route lead by the receiving position establishing this cross-office connection, relay DXSI remains released for the duration of that function. Therefore, relay DXSI will operate again only when another cross-office connection is desired to some sending position assigned to serve this destination. At that time the entire selecting and connecting sequence described above will be repeated.

*Dual sending position control*

In some cases two sending positions may be assigned to transmit over the same outgoing line circuit on a flip-flop basis. Usually one of these positions will accept only high-precedence cross-office switched messages for its destination, and the other position will accept only low-precedence cross-office switched messages for the same destination. In this case the high-precedence position is given preference over the low-precedence position in the use of the outgoing line circuit. That is, the high-precedence position will obtain use of the outgoing line circuit at the end of any low-precedence message being transmitted, and will not return the line circuit to the low-precedence position until all high-precedence messages on hand have been transmitted. When the low-precedence position of such a setup is also part of a load-distributor group for the low-precedence traffic to that destination, an additional control of the rotational selection of that position is required.

When the high-precedence position has the use of the outgoing line circuit, its XSR relay is operated. As long as there is unsent high-precedence message tape on hand relay XSR is locked to relay OTTC, which in turn is locked to the slack-tape position of the associated autostop switch contacts. With relay XSR operated, ground via the patch panel connection 48–2 operates the individual load-distributor DXDC relay of the associated low-precedence dual position.

If that position is idle and has a tight-tape condition, its DXTC relay will be operated, as previously described. It will then be selected for a cross-office connection before any other positions of the group are selected on a rotational basis. However, when that cross-office connection is ended and the position is again idle, it cannot operate its DXRC relay while its DXDC relay is operated. Therefore this position cannot accept any cross-office connections on a rotational basis.

Had the position been idle with unsent tape on hand, and had relay DXRC operated before relay DXDC, relay DXRC would remain operated. The position can then be selected for a cross-office connection on a rotational basis in the usual manner. However, when that cross-office connection ends and the position again becomes idle, relay DXRC cannot reoperate as long as relay DXDC remains operated. Therefore, this position will be prevented from accepting any further cross-office connections on a rotational basis.

Thus relay DXDC allows the dual low-precedence position to accept not more than one cross-office connection while outgoing line transmission is taking place from the high-precedence position. This limits the number of unsent messages that the low-precedence position can accumulate. Release of relay DXDC is accompanied by an opportunity for the low-precedence position to transmit at least one message to the outgoing line circuit. Thus, while the accumulation may remain constant during a period of high activity for the high-precedence position it can not increase markedly.

Operating the individual close-out switch of any sending position of a load-distributor group releases its DXTC or DXRC relay, whichever may have been operated. That sending position will then no longer be selected for cross office connections. Likewise, operation of the individual OCLO relay from any of its sending position controls produces the same result.

Operation of the individual close-out switches or OCLO relays of all sending positions of a load-distributor group releases common control relay DXCLO. This transfers the route lead for this destination to the route lead for the close-out intercept position. Cross-office connections for this destination will then be handled by that position.

*Supervisory control*

The starter-anode timing network of tube 48–3 associated with relay DXAL provides an interval of approximately ⅓ second. With all DXS relays, DXSI and DXSC released the selection chain ground blocks the timing action. However, any open in this circuit allows relay DXAL to be operated.

Operation of relay DXSI to initiate a sending position cross-office connection opens the blocking ground from the timing network. The complete sequence of selecting and connecting a sending position and returning the load-distributor circuits to their idle condition should be completed well within the alarm timing interval. Each return of the load-distributor circuits to their idle condition resets the timing interval. If the timing interval is exceeded during a cross-office connection sequence relay DXAL will be operated to provide an alarm indication.

While the present invention has been described with reference to a specific embodiment thereof, it should be understood that the description is made only by way of example and not as a limitation to the scope of the invention.

What is claimed is:

1. In a telegraph switching system, a plurality of incoming lines and a plurality of outgoing lines, each of said incoming lines and said outgoing lines having respective individual message signal storage means and transmitting means for the storage and transmission of message groups of signals with each such group including destination indicating signal, switching means for selectively establishing paths of transmission from any one of said incoming line transmitting means to any one of said outgoing line storage means, means responsive to destination indicating signals stored in said incoming line storage means for automatically controlling said switching means in accordance therewith, manually operable means for controlling said switching means and other means individual to each of said incoming lines for shifting the control of said switching means with respect to any incoming line from either one of said switching control means to the other.

2. In a telegraph switching system, a plurality of incoming lines and a plurality of outgoing lines, each of said incoming lines and said outgoing lines having respective individual message signal storage means and transmitting means, and switching means for establishing paths of transmission from any one of said incoming line transmitting means to any one of said outgoing line storage means, said means including route leads for determining the availability of said outgoing line storage means for the storage of message signals and message transmission paths, and means controlled by said route leads for temporarily selecting an outgoing line storage means and thereafter controlling the establishment of the message transmission path thereto.

3. In a telegraph switching system, a plurality of incoming channels each having individual storage and transmitting means for storing and transmitting messages received over said channels, a plurality of transmitting channels, each of said messages including at least one routing indicator for indicating transmitting channels to which the message is to be transmitted, switching means for automatically selecting said transmitting channels in accordance with said routing indicators and means controlled by said switching means following the selection of a predetermined number of transmitting channels according to some of the routing indicators of a message having a plurality of routing indicators and others of the routing indicators indicate additional transmitting channels are needed, to select a single predetermined channel for the other routing indicators.

4. In a telegraph switching system, a plurality of incoming channels each having individual storage and transmitting means for storing and transmitting messages received over said channels, a plurality of transmitting channels, each of said messages including at least one routing indicator for indicating transmitting channels to which the message is to be transmitted, switching means for automatically selecting up to a predetermined number of channels under the control of said routing indicators and means controlled by said switching means and operative when the switching requirements of a message as indicated by said routing indicators cannot be satisfied by the predetermined number of channels to select a single predetermined channel for all unsatisfied routing indicators.

5. In a telegraph message switching system where the destination or destinations of each message is indicated by one or more routing indicators appended thereto, a switching center having a plurality of incoming and outgoing channels, message receiving and transmitting positions respectively at said incoming and outgoing channels for receiving and transmitting messages over respective channels with some of said transmitting positions representing a plurality of destinations, switching means controlled by said routing indicators for simultaneously establishing a plurality of transmission paths from a receiving position to individual sending positions, and means for combining said routing indicators to establish a single path to single sending positions when such sending positions represent two or more routing indicators of the same message.

6. In a telegraph switching system, a plurality of incoming lines, individual message storing and receiving means associated with each of said lines for storing received messages and subsequently transmitting the same with each stored message including priority indicating codes, a plurality of outgoing channels, switching means for connecting the transmitting means of an incoming line selectively to said outgoing channels for the transfer of one message at a time, means for operating said switching means to connect the transmitting means having the highest priority message ready for transfer when two or more transmitting means have different priority messages for the same outgoing channel and means to effectively give low priority messages at a transmitting means waiting transfer higher priority on the subsequent storage of a higher priority message thereat.

7. In a telegraph switching system, a plurality of message storage mediums and respective signal transmitting means, said mediums being adapted to have messages successively stored therein with each message including a message priority indication, a plurality of message outlets, switching means for selectively establishing transmission paths from said transmitting means to said outlets for the transmission of message signals thereover one message at a time, means for controlling said switching means when a plurality of said mediums have messages waiting transfer in accordance with the priority of the first message of each medium waiting transfer and means to switch messages of a low priority ahead of higher priority messages in the same storage medium before switching messages of the same low priority from other storage mediums.

8. In a telegraph system, a switching center having a plurality of sending channels terminating thereat, individual transmitters for each of said channels, separate storage mediums for each of said transmitters with respective signal controlled means for storing signals in said mediums, a source of message groups of signals, a message load distributor, switching means, and means controlled jointly by said switching means, said message load distributor and the number of untransmitted signals stored in said storage mediums for distributing messages to said sending positions in a predetermined order.

9. In a telegraph system, a message switching center, a plurality of message sending positions having separate transmitting channels to a common destination, said sending positions having individual signal transmitters with signal storage mediums and storage medium preparing means, sources of messages having address codes included therewith, switching means controlled by said address codes, a message load distributor, and means including said load distributor and said switching means on the switching of a message having the address code of said common destination to select one of said common destination sending positions and cause the message to be stored in the associated storage medium.

10. The combination as set forth in claim 9 and including means dependent on the number of untransmitted signals stored in said storage mediums and the previous one selected for selecting another one of said common destination sending positions at a time in a predetermined order.

11. The system as set forth in claim 9, and including means for selecting idle nontransmitting sending positions in preference to busy transmitting ones to said common destination.

12. The method of operating a telegraph switching center comprising the steps of storing all received messages in storage media, determining form address codes accompanying each message the switching requirement thereof, preselecting outlets in accordance with the requirements of messages, establishing representative route leads to said outlets and thereafter establish message transmission paths under control of said route leads to said outlets.

13. In a telegraph switching system, a switching office having a plurality of individual outgoing channels with at least some of said individual channels leading toward a plurality of separate destinations, a plurality of incoming channels at said office for receiving messages with each message having at least one appended address code, switching means for establishing a plurality of cross office message transmission paths from each of said incoming channels to selected outgoing channels under control of said address codes, and means controlling said switching means to establish a single cross office path to an outgoing channel when one or more of the address codes of a message represent destinations reached over a single outgoing channel from said switching office.

14. The combination as set forth in claim 13 and including means for selecting a predetermined cross office transmission path and transmitting the message and the address codes thereto for which outgoing channels have not been selected when the address codes of a message are such as to require more than a predetermined number of cross office transmission paths.

15. The combination as set forth in claim 13 and including means for transmitting a message to selected outgoing channels and accompanying the same with only the address codes of the destinations reached thereover.

16. In a telegraph switching system, a switching center having a plurality of separate incoming and outgoing channel equipments, first storage means associated with said incoming channel equipments for storing received message characters with each message including destination address codes, second storage means associated with said outgoing channel equipments for controlling transmitting means to transmit to said channels, switching means for selectively establishing signal transmission paths for the transfer of stored signals from said first storage means to said second storage means, means for automatically controlling said switching means by said destination address codes, electronic signals pulse transmitting and receiving means and means including said electronic pulse transmitting and receiving means for transferring the stored signals from said first to said second storage means over said established paths.

17. The combination as set forth in claim 16 and including means for transmitting one or more control signal pulses from said outgoing channel equipment to said incoming channel equipment for each character transferred from said first to said second storage means.

18. In a telegraph system, a first storage means for storing code groups with each group represented by a predetermined number of permuted pulses, a second storage means and associated storage preparing means for storing code groups having the same said predetermined number of permuted pulses, electronic pulse generating means for adding other pulses to each of said stored code groups and transmitting the same serially to selected ones of said second storage preparing means, electronic pulse receiving means, means controlled by said electronic pulse receiving means in response to pulses from said pulse transmitting means to operate said second storage preparing means.

19. In a telegraph switching system, a perforated tape controlled transmitter, a plurality of tape reperforators for perforating transmitter controlling tapes, said controlling tapes having one or a plurality of address codes therein preceding each message therein, switching means, manually operable elements for controlling said switching means to establish signal transmission paths from said transmitter selectively to said reperforators, means operative when said tape has more than one address code to a message to advance only one address code through said transmitter at a time in conjunction with each operation of a manually operable element.

20. In a telegraph switching system, a plurality of incoming lines and a plurality of outgoing lines, each of said incoming lines and said outgoing lines having individual message signal storage means and transmitting means respectively associated therewith, switching means for establishing paths of transmission from any one of said incoming line transmitting means to any one of said outgoing line storage means, a director common to a plurality of said incoming lines, means for automatically associating said director with one of said incoming lines at a time to control said switching means in accordance with destination signals stored in said incoming line storage means, means operative to disassociate said director from an incoming line after the establishment of a transmission path, means operative to also disassociate said director from an incoming line on the failure to establish a transmission path within a predetermined length of time, and means operative following a predetermined number of successive failures of said director to establish transmission paths to prevent further association of said director with said incoming lines.

21. In a telegraph switching system, a plurality of incoming lines and a plurality of outgoing lines, each of said incoming and said outgoing lines having respective individual message signal storage means and transmitting means, switching means for establishing paths of transmission from any one of said incoming lines transmitting means to any one of said outgoing line storage means, said means including route leads for determining the availability of said outgoing line storage means for the storage of message signals and message transmission paths, means controlled by said route leads for temporarily selecting an outgoing line storage means and thereafter controlling the establishment of a message transmission path thereto and means for releasing the route lead following the establishment of the message transmission path.

22. In a telegraph message switching system, where the destination or destinations of each message is indicated by one or more routing indicators appended thereto, a switching center having a plurality of incoming and outgoing channels, message receiving and transmitting positions respectively at said incoming and outgoing channels for receiving and transmitting messages over respective channels with some of said transmitting positions representing a plurality of destinations, switching means controlled by said routing indicators for establishing a plurality of transmission paths for simultaneous transmission from a receiving position to individual sending positions, means for combining said routing indicators to establish a single path to single sending positions when such sending positions, represent two or more routing indicators of the same message, and means for transmitting said routing indicators only to the sending positions represented thereby and the message to all selected sending positions.

23. In a telegraph system, a message switching center, a plurality of message sending positions having separate transmitting channels to a common destination, said sending positions having individual signal transmitters with signal storage mediums and storage medium preparing means, sources of messages having address codes included therewith, switching means controlled by said address codes, a message load distributor, means including said load distributor and said switching means on the switching of a message having the address code of said common destination to select one of said common destination sending positions and cause the message to be stored in the associated storage medium, and means for selecting said common destination sending positions in rotational order when the untransmitted signal in each storage medium is at least a predetermined number.

24. In a telegraph switching system, a plurality of incoming channels each having individual storage and transmitting means for storing and transmitting messages received over said channels, a plurality of transmitting channels, each of said messages including at least one routing indicator for indicating transmitting channels to which the message is to be transmitted, switching means for automatically selecting up to a predetermined number of transmitting channels under the control of said routing indicators and means controlled by said switching means and operative after the selection of said predetermined number of transmitting channels and said routing indicators indicate the need of additional channels to substitute for one of the selected channels a predetermined channel for all unsatisfied routing indicators.

25. In a telegraph switching system, a switching center having a plurality of separate incoming and individual outgoing channel equipments, first storage means associated with said incoming channel equipments for storing received message character with each message including destination address codes, second storage means for said outgoing channel equipments for controlling transmitting means to transmit to said channels, switching means for selectively establishing signal transmission paths for the transfer of stored signals from said first storage means to said second storage means, means for automatically controlling said switching means by said destination address codes, electronic signal pulse transmitting and receiving means, and means including said electronic pulse transmitting and receiving means for transferring the stored signals from said first to said second storage means over said established paths, said electronic pulse transmitting means also including means for transmitting over the established paths control signal pulses between said outgoing channel equipments and said incoming channel equipments.

References Cited in the file of this patent

UNITED STATES PATENTS

| | | |
|---|---|---|
| 2,546,627 | Blanton | Mar. 27, 1951 |
| 2,575,329 | Blanton | Nov. 20, 1951 |
| 2,635,139 | Branson | Apr. 14, 1953 |
| 2,654,797 | Knandel | Oct. 6, 1953 |